United States Patent
Hammarlund et al.

(10) Patent No.: US 11,803,471 B2
(45) Date of Patent: Oct. 31, 2023

(54) SCALABLE SYSTEM ON A CHIP

(71) Applicant: Apple Inc., Cupertino, CA (US)

(72) Inventors: Per H. Hammarlund, Sunnyvale, CA (US); Lior Zimet, Kerem Maharal (IL); Sergio Kolor, Haifa (IL); Sagi Lahav, Haifa (IL); James Vash, San Ramon, CA (US); Gaurav Garg, Santa Clara, CA (US); Tal Kuzi, Tel Aviv (IL); Jeffry E. Gonion, Campbell, CA (US); Charles E. Tucker, Campbell, CA (US); Lital Levy-Rubin, Tel Aviv (IL); Dany Davidov, Tirat Carmel (IL); Steven Fishwick, St Albans (GB); Nir Leshem, Beit Yanai (IL); Mark Pilip, Kiryat Bialik (IL); Gerard R. Williams, III, Los Altos, CA (US); Harshavardhan Kaushikkar, Santa Clara, CA (US); Srinivasa Rangan Sridharan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/821,312

(22) Filed: Aug. 22, 2022

(65) Prior Publication Data
US 2023/0058989 A1 Feb. 23, 2023

Related U.S. Application Data

(60) Provisional application No. 63/235,979, filed on Aug. 23, 2021.

(51) Int. Cl.
*G06F 12/08* (2016.01)
*G06F 12/0831* (2016.01)
(Continued)

(52) U.S. Cl.
CPC ...... *G06F 12/0831* (2013.01); *G06F 12/0811* (2013.01); *G06F 12/0815* (2013.01);
(Continued)

(58) Field of Classification Search
CPC . G06F 12/0831; G06F 12/0811; G06F 12/128
See application file for complete search history.

(56) References Cited

U.S. PATENT DOCUMENTS

| 976,697 A | 11/1910 | Roth |
| 5,893,160 A | 4/1999 | Loewenstein et al. |

(Continued)

FOREIGN PATENT DOCUMENTS

| CN | 100349147 | 11/2007 |
| EP | 2463781 A2 | 6/2011 |

(Continued)

OTHER PUBLICATIONS

Lenoski et al., The Directory-Based Cache Coherence Protocol for the DASH Multiprocessor, Computer Sustems Laboratory, Stanford University, CA 94305, 1990 IEEE12 pages.
(Continued)

*Primary Examiner* — Jae U Yu
(74) *Attorney, Agent, or Firm* — Kowert, Hood, Munyon, Rankin & Goetzel, P.C.

(57) ABSTRACT

An integrated circuit (IC) including a plurality of processor cores, a plurality of graphics processing units, a plurality of peripheral circuits, and a plurality of memory controllers is configured to support scaling of the system using a unified memory architecture. For example, the IC may include an interconnect fabric configured to provide communication between the one or more memory controller circuits and the processor cores, graphics processing units, and peripheral devices; and an off-chip interconnect coupled to the interconnect fabric and configured to couple the interconnect
(Continued)

fabric to a corresponding interconnect fabric on another instance of the integrated circuit, wherein the interconnect fabric and the off-chip interconnect provide an interface that transparently connects the one or more memory controller circuits, the processor cores, graphics processing units, and peripheral devices in either a single instance of the integrated circuit or two or more instances of the integrated circuit.

22 Claims, 72 Drawing Sheets

(51) Int. Cl.
| | | |
|---|---|---|
| *G06F 12/128* | (2016.01) | |
| *G06F 12/0811* | (2016.01) | |
| *G06F 12/0815* | (2016.01) | |
| *G06F 12/109* | (2016.01) | |
| *G06F 13/28* | (2006.01) | |
| *G06F 13/16* | (2006.01) | |
| *G06F 13/40* | (2006.01) | |
| *G06F 15/173* | (2006.01) | |
| *G06F 15/78* | (2006.01) | |

(52) U.S. Cl.
CPC .......... *G06F 12/109* (2013.01); *G06F 12/128* (2013.01); *G06F 13/161* (2013.01); *G06F 13/1668* (2013.01); *G06F 13/28* (2013.01); *G06F 13/4068* (2013.01); *G06F 15/17368* (2013.01); *G06F 15/7807* (2013.01); *G06F 2212/305* (2013.01); *G06F 2212/657* (2013.01)

(56) References Cited

U.S. PATENT DOCUMENTS

| | | | |
|---|---|---|---|
| 5,897,657 | A | 4/1999 | Hagersten et al. |
| 6,049,847 | A | 3/2000 | Vogt |
| 6,111,582 | A | 8/2000 | Jenkins |
| 6,263,409 | B1 | 7/2001 | Haupt |
| 6,976,115 | B2 * | 12/2005 | Creta ................. G06F 13/4031 |
| | | | 711/158 |
| 7,098,541 | B2 | 8/2006 | Adelmann |
| 7,171,534 | B2 | 1/2007 | Hargis et al. |
| 7,340,548 | B2 | 3/2008 | Love |
| 7,480,770 | B2 | 1/2009 | Zeffer et al. |
| 7,580,309 | B2 | 8/2009 | Yang et al. |
| 7,721,035 | B2 | 5/2010 | Utsumi |
| 8,190,820 | B2 | 5/2012 | Thantry et al. |
| 8,190,855 | B1 | 5/2012 | Ramey et al. |
| 8,260,996 | B2 | 9/2012 | Wolfe |
| 8,291,245 | B2 | 10/2012 | Nguyen et al. |
| 8,321,650 | B2 | 11/2012 | Steinmetz et al. |
| 8,327,187 | B1 | 12/2012 | Metcalf |
| 8,458,386 | B2 | 6/2013 | Smith |
| 8,670,261 | B2 | 3/2014 | Crisp et al. |
| 8,732,496 | B2 | 5/2014 | Wyatt |
| 8,751,864 | B2 | 6/2014 | Swanson et al. |
| 8,786,069 | B1 | 7/2014 | Haba et al. |
| 8,874,855 | B2 | 10/2014 | Conte |
| 8,959,270 | B2 | 2/2015 | de Cesare |
| 9,009,368 | B2 | 4/2015 | White |
| 9,029,234 | B2 | 5/2015 | Safran et al. |
| 9,170,946 | B2 | 10/2015 | Hum et al. |
| 9,201,608 | B2 | 12/2015 | Hendry et al. |
| 9,244,874 | B2 | 1/2016 | Hearn et al. |
| 9,348,762 | B2 | 5/2016 | Fahs et al. |
| 9,355,034 | B2 | 5/2016 | Lepak et al. |
| 9,424,191 | B2 | 8/2016 | Cherukuri et al. |
| 9,442,869 | B2 | 9/2016 | Easwaran |
| 9,405,303 | B2 | 11/2016 | Harriman |
| 9,620,181 | B2 | 4/2017 | Li |
| 9,678,564 | B2 | 6/2017 | Fatemi |
| 9,747,225 | B2 | 8/2017 | Ozguner |
| 10,153,006 | B2 | 12/2018 | Hamada |
| 10,403,333 | B2 | 9/2019 | Brandl et al. |
| 10,523,585 | B2 | 12/2019 | Davis et al. |
| 10,534,719 | B2 | 1/2020 | Beard et al. |
| 10,585,826 | B2 | 3/2020 | Jayasena |
| 10,673,439 | B1 | 6/2020 | Ahmad |
| 10,733,350 | B1 | 8/2020 | Prasad |
| 11,016,810 | B1 | 5/2021 | Parikh |
| 11,061,850 | B2 | 7/2021 | Safranek et al. |
| 11,327,786 | B2 | 5/2022 | Hay |
| 11,544,193 | B2 | 1/2023 | Vash et al. |
| 2004/0261078 | A1 | 12/2004 | Abou-Emara et al. |
| 2005/0138260 | A1 | 6/2005 | Love |
| 2005/0195835 | A1 | 9/2005 | Savage |
| 2007/0233932 | A1 | 10/2007 | Collier et al. |
| 2008/0082751 | A1 | 4/2008 | Okin et al. |
| 2008/0162869 | A1 * | 7/2008 | Kim ................... G06F 12/0893 |
| | | | 711/216 |
| 2009/0083488 | A1 | 3/2009 | Madriles Gimeno |
| 2009/0305463 | A1 | 12/2009 | Bartley et al. |
| 2010/0037024 | A1 | 2/2010 | Brewer et al. |
| 2010/0042759 | A1 | 2/2010 | Srinivasan et al. |
| 2010/0095039 | A1 | 4/2010 | Marietta |
| 2010/0169581 | A1 | 7/2010 | Sheaffer et al. |
| 2010/0274941 | A1 | 10/2010 | Wolfe |
| 2011/0252180 | A1 | 10/2011 | Hendry et al. |
| 2012/0089761 | A1 | 4/2012 | Ryu |
| 2012/0096295 | A1 | 4/2012 | Krick |
| 2012/0144104 | A1 | 6/2012 | Gibney et al. |
| 2013/0318308 | A1 | 11/2013 | Jayasimha et al. |
| 2014/0022263 | A1 | 1/2014 | Hartog et al. |
| 2014/0149686 | A1 | 5/2014 | Blaner et al. |
| 2014/0201500 | A1 | 7/2014 | Niell et al. |
| 2014/0289435 | A1 | 9/2014 | Lakshmanamurthy et al. |
| 2014/0301241 | A1 | 10/2014 | Kumar |
| 2014/0325129 | A1 | 10/2014 | Ahlquist |
| 2014/0365796 | A1 | 12/2014 | Han et al. |
| 2015/0036536 | A1 | 2/2015 | Kumar |
| 2015/0113193 | A1 | 4/2015 | De Cesare |
| 2015/0331826 | A1 | 11/2015 | Ghosh et al. |
| 2015/0341224 | A1 | 11/2015 | Van Ruymbeke |
| 2016/0140064 | A1 | 5/2016 | Chin |
| 2016/0182398 | A1 | 6/2016 | Davis et al. |
| 2016/0378701 | A1 | 12/2016 | Niell |
| 2017/0220499 | A1 | 8/2017 | Gray |
| 2017/0269666 | A1 * | 9/2017 | Patil ....................... G06F 1/324 |
| 2018/0218105 | A1 | 8/2018 | de Lescure |
| 2018/0285290 | A1 | 10/2018 | Luan |
| 2019/0004796 | A1 | 1/2019 | Pelster |
| 2019/0018815 | A1 | 1/2019 | Fleming et al. |
| 2019/0079877 | A1 | 3/2019 | Gaur |
| 2019/0205493 | A1 | 7/2019 | Garibay |
| 2019/0340314 | A1 | 11/2019 | Boesch et al. |
| 2019/0361770 | A1 | 11/2019 | Geng et al. |
| 2019/0378238 | A1 | 12/2019 | Ramadoss et al. |
| 2020/0074713 | A1 | 3/2020 | Schluessler et al. |
| 2020/0151005 | A1 | 5/2020 | Park et al. |
| 2020/0153757 | A1 | 5/2020 | Bharadwaj |
| 2020/0183854 | A1 | 6/2020 | Johns et al. |
| 2020/0301860 | A1 | 9/2020 | Hsu |
| 2020/0341536 | A1 | 10/2020 | Waugh |
| 2023/0028642 | A1 | 1/2023 | Li et al. |
| 2023/0069310 | A1 | 3/2023 | Myronenko et al. |

FOREIGN PATENT DOCUMENTS

| | | |
|---|---|---|
| EP | 2490100 A1 | 8/2012 |
| EP | 3198460 A1 | 8/2017 |
| TW | 1720926 B | 3/2021 |
| WO | 2014185917 A1 | 11/2014 |
| WO | 2017112198 A1 | 6/2017 |

OTHER PUBLICATIONS

Raghavan et al., Token Tenure: PATCHing Token Counting Using Directory-Based Cache Coherence, University of Pennsylvania, ScholarlyCommons,Technical Reports CIS, http://repository.upenn.

(56) References Cited

OTHER PUBLICATIONS edu/cis_reports/903, http://repository.upenn.edu/cis_reports?utm_source=repository.upenn.edu%2Fcis_reports%2F903&utm_medium=PDF&utm_campaign=PDFCoverPages, Nov. 2008, 14 pages.
SRWO, PCT/US2021049777, dated Dec. 22, 2021, 12 pages.
SRWO, PCT/US2021/049780, dated Dec. 20, 2021, 18 pages.
U.S. Appl. No. 17/868,495, filed Jul. 20, 2022.
U.S. Appl. No. 17/337,805, filed Jun. 3, 2021, 55 pages.
Hansson et al., "An On-Chip Interconnect and Protocol Stack for Multiple Communication Paradigms and Programming Models", Harware/Software Codesign and System Synthesis Conference, Grenoble, France, Oct. 11-16, 2009, 10pages.
Office Action in U.S. Appl. No. 17/246,311 dated Aug. 29, 2022, 13 pages.
Office Action in U.S. Appl. No. 17/337,805 dated Sep. 6, 2022, 8 pages.
Office Action in U.S. Appl. No. 17/353,349 dated Sep. 12, 2022, 6 pages.
Cabarcas et al., Interleaving Granularity on High Bandwidth Memory Architecture for CMPs, 2010, IEEE, 8 pages (Year: 2010).
Notice of Allowance in U.S. Appl. No. 17/315,725 dated Aug. 23, 2022, 11 pages.
U.S. Appl. No. 17/821,305, filed Aug. 22, 2022.
U.S. Appl. No. 17/821,296, filed Aug. 22, 2022.
International Search Report and Written Opinion in PCT Appl. No. PCT/US2022/041189 dated Dec. 6, 2022, 17 pages.
Office Action in ROC (Taiwan) Pat. Appln. No. 111131730 dated Jul. 6, 2023, 12 pages.
Office Action in U.S. Appl. No. 17/821,296 dated May 22, 2023, 11 pages.
Office Action in U.S. Appl. No. 17/821,305 dated May 3, 2023, 10 pages.

\* cited by examiner

| Virtual Channel | Networks |
|---|---|
| Bulk | CPU, I/O, Relaxed |
| LLT | CPU, I/O, Relaxed |
| RT | I/O |
| VCP | I/O |

A80

| Type | Networks |
|---|---|
| Coherent | CPU, I/O |
| Non-coherent | Relaxed |
| RT | I/O |
| VCP | I/O |

A82

| State | Meaning |
|---|---|
| M | Dirty Exclusive (modified) |
| O | Dirty Shared (owned) |
| E | Clean Exclusive |
| EnD | Clean Exclusive, No Data |
| P | Clean Shared Primary |
| S | Clean Shared Secondary |
| I | Invalid |

| Message | Meaning |
|---|---|
| CRdXX | Cacheable Read. XX= requested cache state, may be opportunistic. |
| CtoE[Cond] | Change to Exclusive. Conditional for Store Conditional Instruction. |
| CRdE-Donly | Cacheable Read Exclusive, to transition to EnD state. |
| NCRd | Non-Cacheable Read. |
| NCWr | Non-Cacheable Write. |
| SnpFwdXX | Snoop, forward data to requestor. XX=state in receiver after snoop. |
| SnpBkXX | Snoop, return data to memory controller. XX=state in receiver after snoop. |
| SnpInvFw | Snoop invalidate, completion to requesting agent. |
| SnpInvBk | Snoop invalidate, completion to coherency controller. |
| FillXX | Fill Data Completion, XX=state of the block for requestor. |
| Ack | Acknowledgement Completion. |
| CWB | Cacheable Write Back to Memory, for eviction. |
| CpBkSR | Copy back to Memory, for snoop response. |
| NCWrRsp | Non-Cacheable Write Completion. |
| NCRdRsp | Non-Cacheable Read Completion. |

Sending, by a first instance of an integrated circuit to a second instance of the integrated circuit, data via a set of transmit pins of an external interface.
E610

Receiving, by the first instance of an integrated circuit from the second instance of the integrated circuit, data via a set of receive pins of the external interface, wherein the set of transmit pins and the set of receive pins are located in complementary positions relative to an axis of symmetry of the integrated circuit.
E620

Routing, by the first instance, a set of transmit pins to a first on-chip router using a non-default pin assignment to send first data via the set of transmit pins.
E710

Routing, by the first instance, the set of receive pins to a second on-chip router using a default pin assignment to receive second data via the set of receive pins.
E720 ent. The provisional application is incorporated herein
SCALABLE SYSTEM ON A CHIP This application claims benefit of priority to U.S. Provisional Patent Application Ser. No. 63/235,979, filed on Aug. 23, 2021. The provisional application is incorporated herein by reference in its entirety. To the extent that anything in the incorporated material conflicts with the material expressly set forth therein, the expressly set forth material controls.

BACKGROUND

Technical Field

Embodiments described herein are related to digital systems and, more particularly, to a system having unified memory accessible to heterogeneous agents in the system.

Description of the Related Art

In the design of modern computing systems, it has become increasingly common to integrate a variety of system hardware components into a single silicon die that formerly were implemented as discrete silicon components. For example, at one time, a complete computer system might have included a separately packaged microprocessor mounted on a backplane and coupled to a chipset that interfaced the microprocessor to other devices such as system memory, a graphics processor, and other peripheral devices. By contrast, the evolution of semiconductor process technology has enabled the integration of many of these discrete devices. The result of such integration is commonly referred to as a "system-on-a-chip" (SOC).

Conventionally, SOCs for different applications are individually architected, designed, and implemented. For example, an SOC for a smart watch device may have stringent power consumption requirements, because the form factor of such a device limits the available battery size and thus the maximum time of use of the device. At the same time, the small size of such a device may limit the number of peripherals the SOC needs to support as well as the compute requirements of the applications the SOC executes. By contrast, an SOC for a mobile phone application would have a larger available battery and thus a larger power budget, but would also be expected to have more complex peripherals and greater graphics and general compute requirements. Such an SOC would therefore be expected to be larger and more complex than a design for a smaller device. This comparison can be arbitrarily extended to other applications. For example, wearable computing solutions such as augmented and/or virtual reality systems may be expected to present greater computing requirements than less complex devices, and devices for desktop and/or rack-mounted computer systems greater still.

The conventional individually-architected approach to SOCs leaves little opportunity for design reuse, and design effort is duplicated across the multiple SOC implementations.

BRIEF DESCRIPTION OF THE DRAWINGS

The following detailed description refers to the accompanying drawings, which are now briefly described.

FIG. 39 is a table illustrating a plurality of cache states according to one embodiment of the coherence protocol.

FIG. 40 is a table illustrating a plurality of messages that may be used in one embodiment of the coherency protocol.

FIG. 54 illustrates a flow diagram of an embodiment of a method for transferring data between two coupled integrated circuits.

Figure 1:
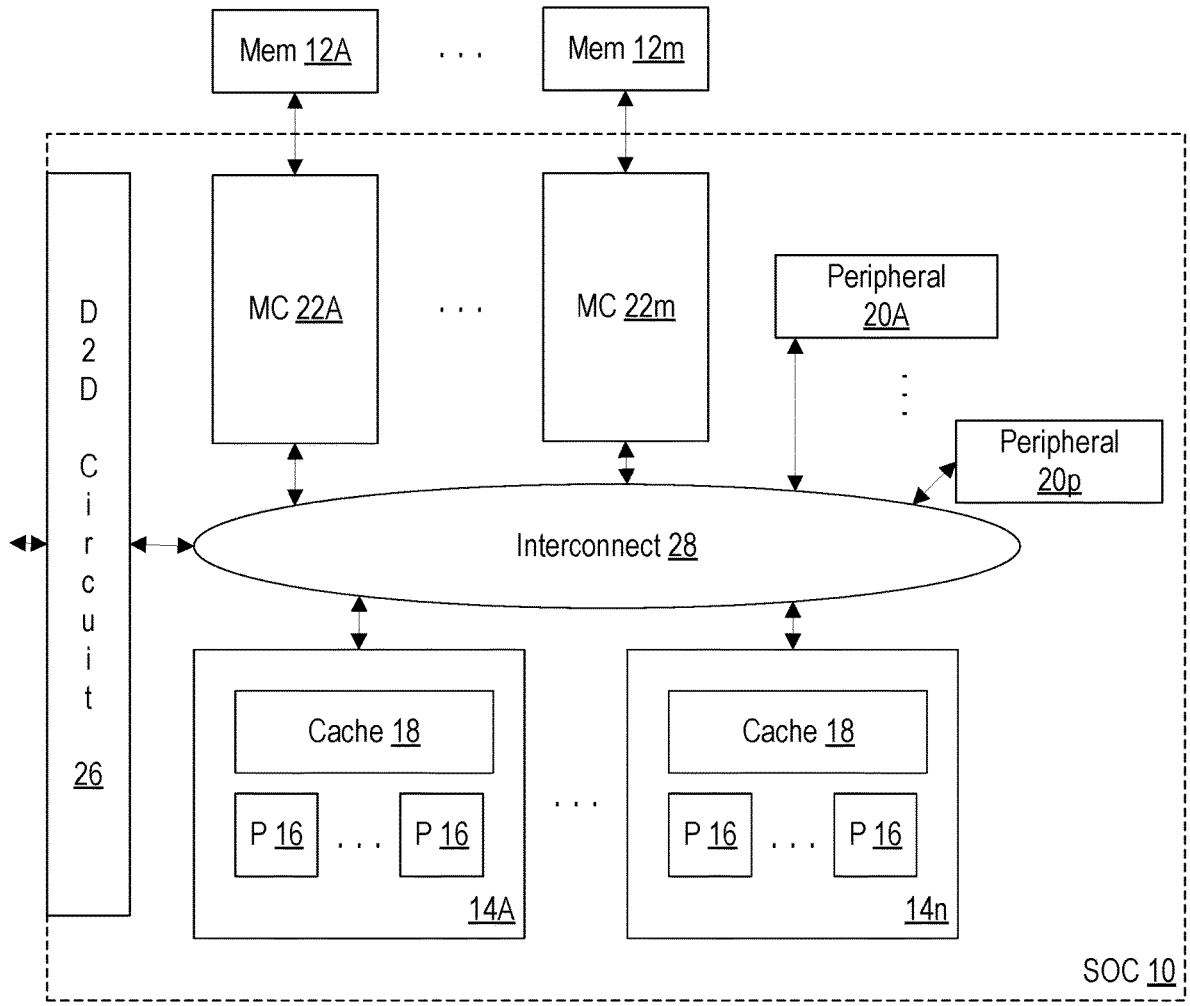
FIG. 1 is a block diagram of one embodiment of a system on a chip (SOC).

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

An SOC may include most of the elements necessary to implement a complete computer system, although some elements (e.g., system memory) may be external to the SOC. For example, an SOC may include one or more general purpose processor cores, one or more graphics processing units, and one or more other peripheral devices (such as application-specific accelerators, I/O interfaces, or other types of devices) distinct from the processor cores and graphics processing units. The SOC may further include one or more memory controller circuits configured to interface with system memory, as well as an interconnect fabric configured to provide communication between the memory controller circuit(s), the processor core(s), the graphics processing unit(s), and the peripheral device(s).

The design requirements for a given SOC are often determined by the power limitations and performance requirements of the particular application to which the SOC is targeted. For example, an SOC for a smart watch device may have stringent power consumption requirements, because the form factor of such a device limits the available battery size and thus the maximum time of use of the device. At the same time, the small size of such a device may limit the number of peripherals the SOC needs to support as well as the compute requirements of the applications the SOC executes. By contrast, an SOC for a mobile phone application would have a larger available battery and thus a larger power budget, but would also be expected to have more complex peripherals and greater graphics and general compute requirements. Such an SOC would therefore be expected to be larger and more complex than a design for a smaller device.

This comparison can be arbitrarily extended to other applications. For example, wearable computing solutions such as augmented and/or virtual reality systems may be expected to present greater computing requirements than less complex devices, and devices for desktop and/or rack-mounted computer systems greater still.

As systems are built for larger applications multiple chips may be used together to scale the performance, forming a "system of chips". This specification will continue to refer to these systems as "SOC", whether they are a single physical chip or multiple physical chips. The principles in this disclosure are equally applicable to multiple chip SOCs and single chip SOCs.

An insight of the inventors of this disclosure is that the compute requirements and corresponding SOC complexity for the various applications discussed above tends to scale from small to large. If an SOC could be designed to easily scale in physical complexity, a core SOC design could be readily tailored for a variety of applications while leveraging design reuse and reducing duplicated effort. Such an SOC also provides a consistent view to the functional blocks, e.g., processing cores or media blocks, making their integration into the SOC easier, further adding to the reduction in effort. That is, the same functional block (or "IP") design may be used, essentially unmodified, in SOCs from small to large. Additionally, if such an SOC design could scale in a manner that was largely or completely transparent to software executing on the SOC, the development of software applications that could easily scale across differently resourced versions of the SOC would be greatly simplified. An application may be written once, and automatically operates correctly in many different systems, again from the small to the large. When the same software scales across differently resources versions, the software provides the same interface to the user: a further benefit of scaling.

This disclosure contemplates such a scalable SOC design. In particular, a core SOC design may include a set of processor cores, graphics processing units, memory controller circuits, peripheral devices, and an interconnect fabric configured to interconnect them. Further, the processor cores, graphics processing units, and peripheral devices may be configured to access system memory via a unified memory architecture. The unified memory architecture includes a unified address space, which allows the heterogenous agents in the system (processors, graphics processing units, peripherals, etc.) to collaborate simply and with high performance. That is, rather than devoting a private address space to a graphics processing unit and requiring data to be copied to and from that private address space, the graphics processing unit, processor cores, and other peripheral devices can in principle share access to any memory address accessible by the memory controller circuits (subject, in some embodiments, to privilege models or other security features that restrict access to certain types of memory content). Additionally, the unified memory architecture provides the same memory semantics as the SOC complexity is scaled to meet the requirements of different systems (e.g., a common set of memory semantics). For example, the memory semantics may include memory ordering properties, quality of service (QoS) support and attributes, memory management unit definition, cache coherency functionality, etc. The unified address space may be virtual address space different from the physical address space, or may be the physical address space, or both.

While the architecture remains the same as the SOC is scaled, various implementation choices may. For example, virtual channels may be used as part of the QoS support, but a subset of the supported virtual channels may be implemented if not all of the QoS is warranted in a given system. Different interconnect fabric implementations may be used depending on the bandwidth and latency characteristics needed in a given system. Additionally, some features may not be necessary in smaller systems (e.g., address hashing to balance memory traffic to the various memory controllers may not be required in a single memory controller system. The hashing algorithm may not be crucial in cases with a small number of memory controllers (e.g., 2 or 4), but becomes a larger contributor to system performance when larger numbers of memory controllers are used.

Additionally, some of the components may be designed with scalability in mind. For example, the memory controllers may be designed to scale up by adding additional memory controllers to the fabric, each with a portion of the address space, memory cache, and coherency tracking logic.

More specifically, embodiments of an SOC design are disclosed that are readily capable of being scaled down in complexity as well as up. For example, in an SOC, the processor cores, graphics processing units, fabric, and other devices may be arranged and configured such that the size and complexity of the SOC may easily be reduced prior to manufacturing by "chopping" the SOC along a defined axis, such that the resultant design includes only a subset of the components defined in the original design. When buses that would otherwise extend to the eliminated portion of the SOC are appropriately terminated, a reduced-complexity version of the original SOC design may be obtained with relatively little design and verification effort. The unified memory architecture may facilitate deployment of applications in the reduced-complexity design, which in some cases may simply operate without substantial modification.

As previously noted, embodiments of the disclosed SOC design may be configured to scale up in complexity. For example, multiple instances of the single-die SOC design may be interconnected, resulting in a system having greater resources than the single-die design by multiple of 2, 3, 4, or more. Again, the unified memory architecture and consistent SOC architecture may facilitate the development and deployment of software applications that scale to use the additional compute resources offered by these multiple-die system configurations.

FIG. 1 is a block diagram of one embodiment of a scalable SOC 10 coupled to one or more memories such as memories 12A-12m. The SOC 10 may include a plurality of processor clusters 14A-14n. The processor clusters 14A-14n may include one or processors (P) 16 coupled to one or more caches (e.g., cache 18). The processors 16 may include general purpose processors (e.g., central processing units or CPUs) as well as other types of processors such as graphics processing units (GPUs). The SOC 10 may include one or more other agents 20A-20p. The one or more other agents 20A-20p may include a variety of peripheral circuits/devices, for example, and/or a bridge such as an input/output agent (IOA) coupled to one or more peripheral devices/circuits. The SOC may include one or more memory controllers 22A-22m, each coupled to a respective memory device or circuit 12A-12m during use. In an embodiment, each memory controller 22A-22m may include a coherency controller circuit (more briefly "coherency controller", or "CC") coupled to a directory (coherency controller and directory not shown in FIG. 1). Additionally, a die to die (D2D) circuit 26 is shown in the SOC 10. The memory controllers 22A-22m, the other agents 20A-20p, the D2D circuit 26, and the processor clusters 14A-14n may be coupled to an interconnect 28 to communicate between the various components 22A-22m, 20A-20p, 26 and 14A-14n. As indicated by the name, the components of the SOC 10 may be integrated onto a single integrated circuit "chip" in one embodiment. In other embodiments, various components may be external to the SOC 10 on other chips or otherwise discrete components. Any amount of integration or discrete components may be used. In one embodiment, subsets of processor clusters 14A-14n and memory controllers 22A-22m may be implemented in one of multiple integrated circuit chips that are coupled together to form the components illustrated in the SOC 10 of FIG. 1.

The D2D circuit 26 may be an off-chip interconnect coupled to the interconnect fabric 28 and configured to couple the interconnect fabric 28 to a corresponding interconnect fabric 28 on another instance of the SOC 10. The interconnect fabric 28 and the off-chip interconnect 26 provide an interface that transparently connects the one or more memory controller circuits, the processor cores, graphics processing units, and peripheral devices in either a single instance of the integrated circuit or two or more instances of the integrated circuit. That is, via the D2D circuit 26, the interconnect fabric 28 extends across the two or integrated circuit dies and a communication is routed between a source and a destination transparent to a location of the source and the destination on the integrated circuit dies. The interconnect fabric 28 extends across the two or more integrated circuit dies using hardware circuits (e.g., the D2D circuit 26) to automatically route a communication between a source and a destination independent of whether or not the source and destination are on the same integrated circuit die.

Thus, the D2D circuit 26 supports the scalability of the SOC 10 to two or more instances of the SOC 10 in a system. When two or more instances are included, the unified memory architecture, including the unified address space, extends across the two or more instances of the integrated circuit die transparent to software executing on the processor cores, graphics processing units, or peripheral devices. Similarly, in the case of a single instance of the integrated circuit die in a system, the unified memory architecture, including the unified address space, maps to the single instance transparent to software. When two or more instance of the integrated circuit die are included in a system, the system's set of processor cores 16, graphics processing units, peripheral devices 20A-20p, and interconnect fabric 28 are distributed across two or more integrated circuit dies, again transparent to software.

As mentioned above, the processor clusters 14A-14n may include one or more processors 16. The processors 16 may serve as the central processing units (CPUs) of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors. Additionally, processors 16 in a given cluster 14A-14n may be GPUs, as previously mentioned, and may implement a graphics instruction set optimized for rendering, shading, and other manipulations. The clusters 14A-14n may further include other hardware such as the cache 18 and/or an interface to the other components of the system (e.g., an interface to the interconnect 28). Other coherent agents may include processors that are not CPUs or GPUs.

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc. The number of processors 16 in a given cluster 14A-14n may differ from the number of processors 16 in another cluster 14A-14n. In general, one or more processors may be included. Additionally, the processors 16 may differ in microarchitectural implementation, performance and power characteristics, etc. In some cases, processors may differ even in the instruction set architecture that they implement, their functionality (e.g., CPU, graphics processing unit (GPU) processors, microcontrollers, digital signal processors, image signal processors, etc.), etc.

The caches 18 may have any capacity and configuration, such as set associative, direct mapped, or fully associative. The cache block size may be any desired size (e.g., 32 bytes, 64 bytes, 128 bytes, etc.). The cache block may be the unit of allocation and deallocation in the cache 18. Additionally, the cache block may be the unit over which coherency is maintained in this embodiment (e.g., an aligned, coherence-granule-sized segment of the memory address space). The cache block may also be referred to as a cache line in some cases.

The memory controllers 22A-22m may generally include the circuitry for receiving memory operations from the other components of the SOC 10 and for accessing the memories 12A-12m to complete the memory operations. The memory controllers 22A-22m may be configured to access any type of memories 12A-12m. More particularly, the memories 12A-12m may be any type of memory device that can be mapped as random access memory. For example, the memories 12A-12m may be static random access memory (SRAM), dynamic RAM (DRAM) such as synchronous DRAM (SDRAM) including double data rate (DDR, DDR2, DDR3, DDR4, etc.) DRAM, non-volatile memories, graphics DRAM such as graphics DDR DRAM (GDDR), and high bandwidth memories (HBM). Low power/mobile versions of the DDR DRAM may be supported (e.g., LPDDR, mDDR, etc.). The memory controllers 22A-22m may include queues for memory operations, for ordering (and potentially reordering) the operations and presenting the operations to the memories 12A-12m. The memory controllers 22A-22m may further include data buffers to store write data awaiting write to memory and read data awaiting return to the source of the memory operation (in the case where the data is not provided from a snoop). In some embodiments, the memory controllers 22A-22m may include a memory cache to store recently accessed memory data. In SOC implementations, for example, the memory cache may reduce power consumption in the SOC by avoiding reaccess of data from the memories 12A-12m if it is expected to be accessed again soon. In some cases, the memory cache may also be referred to as a system cache, as opposed to private caches such as the cache 18 or caches in the processors 16, which serve only certain components. Additionally, in some embodiments, a system cache need not be located within the memory controllers 22A-22m. Thus, there may be one or more levels of cache between the processor cores, graphics processing units, peripheral devices, and the system memory. The one or more memory controller circuits 22A-22m may include respective memory caches interposed between the interconnect fabric and the system memory, wherein the respective memory caches are one of the one or more levels of cache.

Other agents 20A-20p may generally include various additional hardware functionality included in the SOC C10 (e.g., "peripherals," "peripheral devices," or "peripheral circuits"). For example, the peripherals may include video peripherals such as an image signal processor configured to process image capture data from a camera or other image sensor, video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC 10 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included. The other agents 20A-20p may also include bridges to a set of peripherals, in an embodiment, such as the IOA described below. In an embodiment, the peripheral devices include one of more of: an audio processing device, a video processing device, a machine learning accelerator circuit, a matrix arithmetic accelerator circuit, a camera processing circuit, a display pipeline circuit, a nonvolatile memory controller, a peripheral component interconnect controller, a security processor, or a serial bus controller.

The interconnect 28 may be any communication interconnect and protocol for communicating among the components of the SOC 10. The interconnect 28 may be bus-based, including shared bus configurations, cross bar configurations, and hierarchical buses with bridges. The interconnect 28 may also be packet-based or circuit-switched, and may be hierarchical with bridges, cross bar, point-to-point, or other interconnects. The interconnect 28 may include multiple independent communication fabrics, in an embodiment.

In an embodiment, when two or more instances of the integrated circuit die are included in a system, the system may further comprise at least one interposer device configured to couple buses of the interconnect fabric across the two or integrated circuit dies. In an embodiment, a given integrated circuit die comprises a power manager circuit configured to manage a local power state of the given integrated circuit die. In an embodiment, when two or more instances of the integrate circuit die are included in a system, respective power manager are configured to manage the local power state of the integrated circuit die, and wherein at least one of the two or more integrated circuit die includes another power manager circuit configured to synchronize the power manager circuits.

Generally, the number of each component 22A-22m, 20A-20p, and 14A-14n may vary from embodiment to embodiment, and any number may be used. As indicated by the "m", "p", and "n" post-fixes, the number of one type of component may differ from the number of another type of component. However, the number of a given type may be the same as the number of another type as well. Additionally, while the system of FIG. 1 is illustrated with multiple memory controllers 22A-22m, embodiments having one memory controller 22A-22m are contemplated as well.

While the concept of scalable SOC design is simple to explain, it is challenging to execute. Numerous innovations have been developed in support of this effort, which are described in greater detail below. In particular, FIGS. 2-14 include further details of embodiments of the communication fabric 28. FIGS. 15-26 illustrate embodiments of a scalable interrupt structure. FIGS. 27-43 illustrate embodiments of a scalable cache coherency mechanism that may be implemented among coherent agents in the system, including the processor clusters 14A-14n as well as a directory/coherency control circuit or circuits. In an embodiment, the directories and coherency control circuits are distributed among a plurality of memory controllers 22A-22m, where each directory and coherency control circuit is configured to manage cache coherency for portions of the address space mapped to the memory devices 12A-12m to which a given memory controller is coupled. FIGS. 44-48 show embodiments of an IOA bridge for one or more peripheral circuits. FIGS. 49-55 illustrate further details of embodiments of the D2D circuit 26. FIGS. 56-68 illustrate embodiments of hashing schemes to distribute the address space over a plurality of memory controllers 22A-22m. FIGS. 69-82 illustrate embodiments of a design methodology that supports multiple tapeouts of the scalable Soc for different systems, based on the same design database.

The various embodiments described below and the embodiments described above may be used in any desired combination to form embodiments of this disclosure. Specifically, any subset of embodiment features from any of the embodiments may be combined to form embodiments, including not all of the features described in any given embodiment and/or not all of the embodiments. All such embodiments are contemplated embodiments of a scalable SOC as described herein.

Fabric

FIGS. 2-14 illustrate various embodiments of the interconnect fabric 28. Based on this description, a system is contemplated that comprises a plurality of processor cores; a plurality of graphics processing units; a plurality of peripheral devices distinct from the processor cores and graphics processing units; one or more memory controller circuits configured to interface with a system memory; and an interconnect fabric configured to provide communication between the one or more memory controller circuits and the processor cores, graphics processing units, and peripheral devices; wherein the interconnect fabric comprises at least two networks having heterogeneous operational characteristics. In an embodiment, the interconnect fabric comprises at least two networks having heterogeneous interconnect topologies. The at least two networks may include a coherent network interconnecting the processor cores and the one or more memory controller circuits. More particularly, the coherent network interconnects coherent agents, wherein a processor core may be a coherent agent, or a processor cluster may be a coherent agent. The at least two networks may include a relaxed-ordered network coupled to the graphics processing units and the one or more memory controller circuits. In an embodiment, the peripheral devices include a subset of devices, wherein the subset includes one or more of a machine learning accelerator circuit or a relaxed-order bulk media device, and wherein the relaxed-ordered network is further coupled to the subset of devices to the one or more memory controller circuits. The at least two networks may include an input-output network coupled to interconnect the peripheral devices and the one or more memory controller circuits. The peripheral devices include one or more real-time devices.

In an embodiment, the at least two networks comprise a first network that comprises one or more characteristics to reduce latency compared to a second network of the at least two networks. For example, the one or more characteristics may comprise a shorter route than the second network over the surface area of the integrated circuit. The one or more characteristics may comprise wiring for the first interconnect in metal layers that provide lower latency characteristics than wiring for the second interconnect.

In an embodiment, the at least two networks comprise a first network that comprises one or more characteristics to increase bandwidth compared to a second network of the at least two networks. For example, the one or more characteristics comprise wider interconnect compared to the second network. The one or more characteristics comprise wiring in metal layers farther from a surface of a substrate on which the system is implemented than the wiring for the second network.

In an embodiment, the interconnect topologies employed by the at least two networks include at least one of a star topology, a mesh topology, a ring topology, a tree topology, a fat tree topology, a hypercube topology, or a combination of one or of the topologies. In another embodiment, the at least two networks are physically and logically independent. In still another embodiment, the at least two networks are physically separate in a first mode of operation, and wherein a first network of the at least two networks and a second network of the at least two networks are virtual and share a single physical network in a second mode of operation.

In an embodiment, an SOC is integrated onto a semiconductor die. The SOC comprises a plurality of processor cores; a plurality of graphics processing units; a plurality of peripheral devices; one or more memory controller circuits; and an interconnect fabric configured to provide communication between the one or more memory controller circuits and the processor cores, graphics processing units, and peripheral devices; wherein the interconnect fabric comprises at least a first network and a second network, wherein the first network comprises one or more characteristics to reduce latency compared to a second network of the at least two networks. For example, the one or more characteristics comprise a shorter route for the first network over a surface of the semiconductor die than a route of the second network. In another example, the one or more characteristics comprise wiring in metal layers that have lower latency characteristics than wiring layers used for the second network. In an embodiment, the second network comprises one or more second characteristics to increase bandwidth compared to the first network. For example, the one or more second characteristics may comprise a wider interconnect compared to the second network (e.g., more wires per interconnect than the first network). The one or more second characteristics may comprise wiring in metal layers that are denser than the wiring layers used for the first network.

In an embodiment, a system on a chip (SOC) may include a plurality of independent networks. The networks may be physically independent (e.g., having dedicated wires and other circuitry that form the network) and logically independent (e.g., communications sourced by agents in the SOC may be logically defined to be transmitted on a selected network of the plurality of networks and may not be impacted by transmission on other networks). In some embodiments, network switches may be included to transmit packets on a given network. The network switches may be physically part of the network (e.g., there may be dedicated network switches for each network). In other embodiments, a network switch may be shared between physically independent networks and thus may ensure that a communication received on one of the networks remains on that network.

By providing physically and logically independent networks, high bandwidth may be achieved via parallel communication on the different networks. Additionally, different traffic may be transmitted on different networks, and thus a given network may be optimized for a given type of traffic. For example, processors such as central processing units (CPUs) in an SOC may be sensitive to memory latency and may cache data that is expected to be coherent among the processors and memory. Accordingly, a CPU network may be provided on which the CPUs and the memory controllers in a system are agents. The CPU network may be optimized to provide low latency. For example, there may be virtual channels for low latency requests and bulk requests, in an embodiment. The low latency requests may be favored over the bulk requests in forwarding around the fabric and by the memory controllers. The CPU network may also support cache coherency with messages and protocol defined to communicate coherently. Another network may be an input/output (I/O) network. This network may be used by various peripheral devices ("peripherals") to communicate with memory. The network may support the bandwidth needed by the peripherals and may also support cache coherency. However, I/O traffic may sometimes have significantly higher latency than CPU traffic. By separating the I/O traffic from the CPU to memory traffic, the CPU traffic may be less affected by the I/O traffic. The CPUs may be included as agents on the I/O network as well to manage coherency and to communicate with the peripherals. Yet another network, in an embodiment, may be a relaxed order network. The CPU and I/O networks may both support ordering models among the communications on those networks that provide the ordering expected by the CPUs and peripherals. However, the relaxed order network may be non-coherent and may not enforce as many ordering constraints. The relaxed order network may be used by graphics processing units (GPUs) to communicate with memory controllers. Thus, the GPUs may have dedicated bandwidth in the networks and may not be constrained by the ordering required by the CPUs and/or peripherals. Other embodiments may employ any subset of the above networks and/or any additional networks, as desired.

A network switch may be a circuit that is configured to receive communications on a network and forward the communications on the network in the direction of the destination of the communication. For example, a communication sourced by a processor may be transmitted to a memory controller that controls the memory that is mapped to the address of the communication. At each network switch, the communication may be transmitted forward toward the memory controller. If the communication is a read, the memory controller may communicate the data back to the source and each network switch may forward the data on the network toward the source. In an embodiment, the network may support a plurality of virtual channels. The network switch may employ resources dedicated to each virtual channel (e.g., buffers) so that communications on the virtual channels may remain logically independent. The network switch may also employ arbitration circuitry to select among buffered communications to forward on the network. Virtual channels may be channels that physically share a network but which are logically independent on the network (e.g., communications in one virtual channel do not block progress of communications on another virtual channel).

An agent may generally be any device (e.g., processor, peripheral, memory controller, etc.) that may source and/or sink communications on a network. A source agent generates (sources) a communication, and a destination agent receives (sinks) the communication. A given agent may be a source agent for some communications and a destination agent for other communications.

Figure 2:
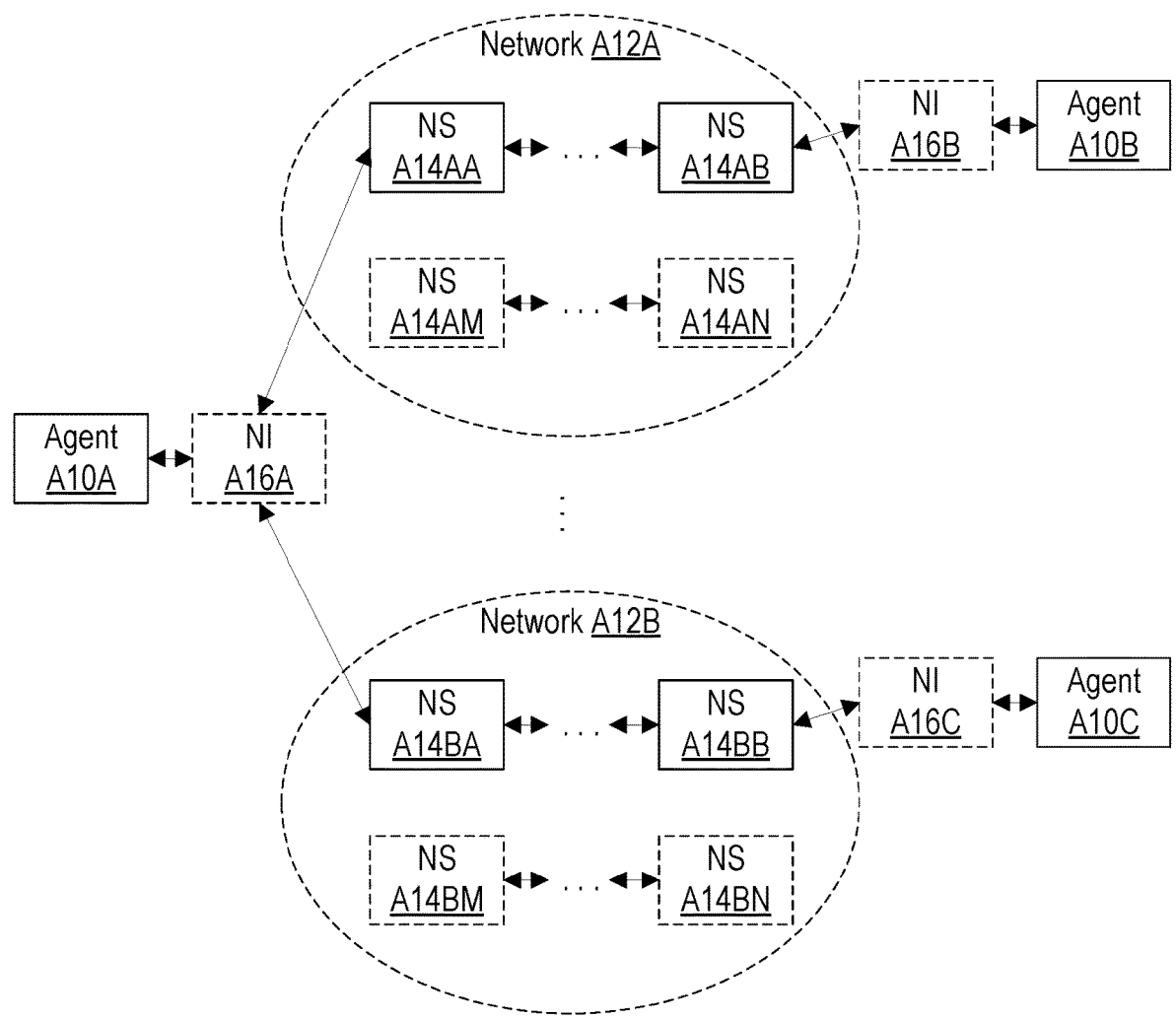
FIG. 2 is a block diagram of a system including one embodiment of multiple networks interconnecting agents.
Figure 3:
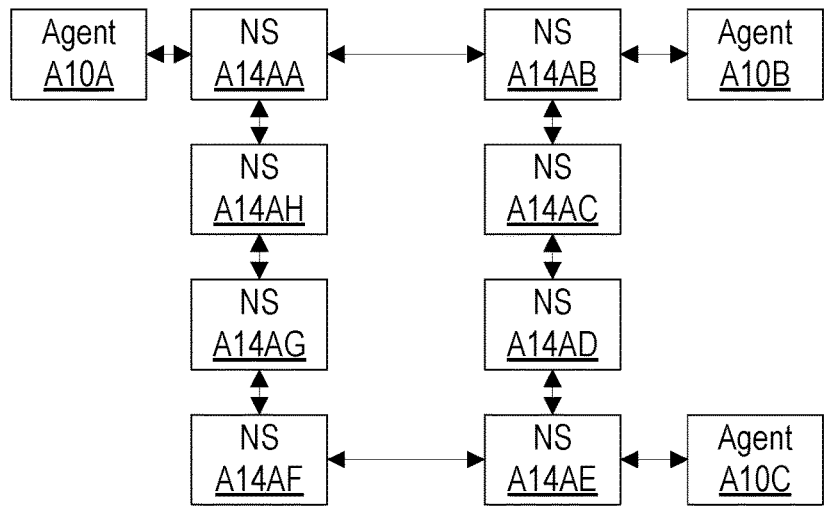
FIG. 3 is a block diagram of one embodiment of a network using a ring topology.
Figure 4:
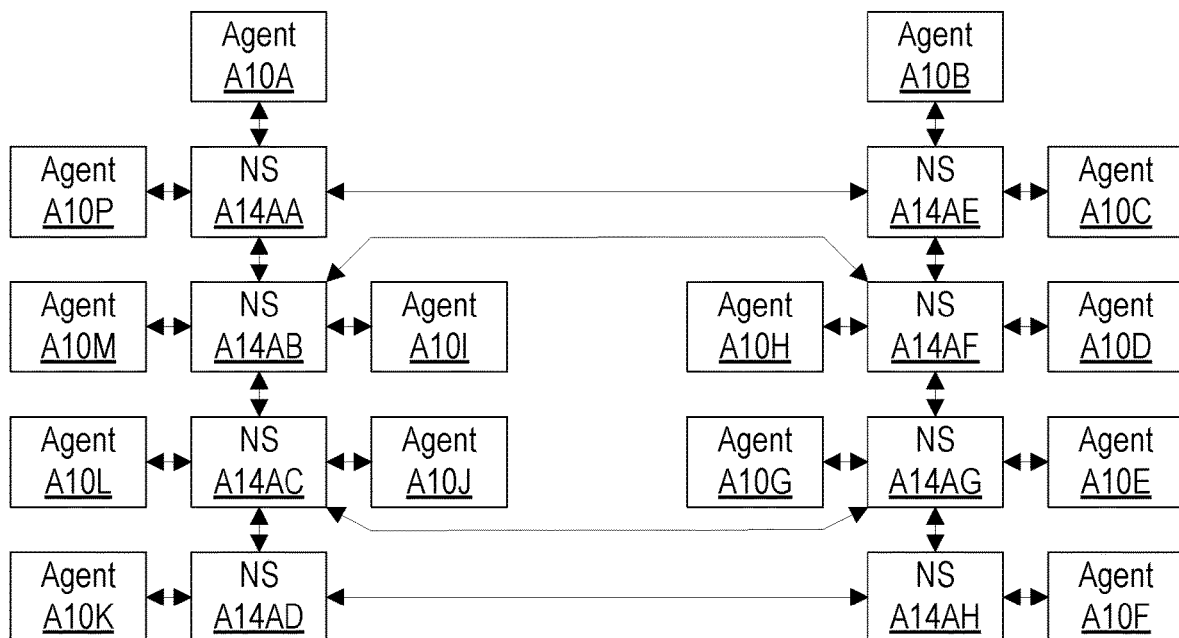
FIG. 4 is a block diagram of one embodiment of a network using a mesh topology.
Figure 5:
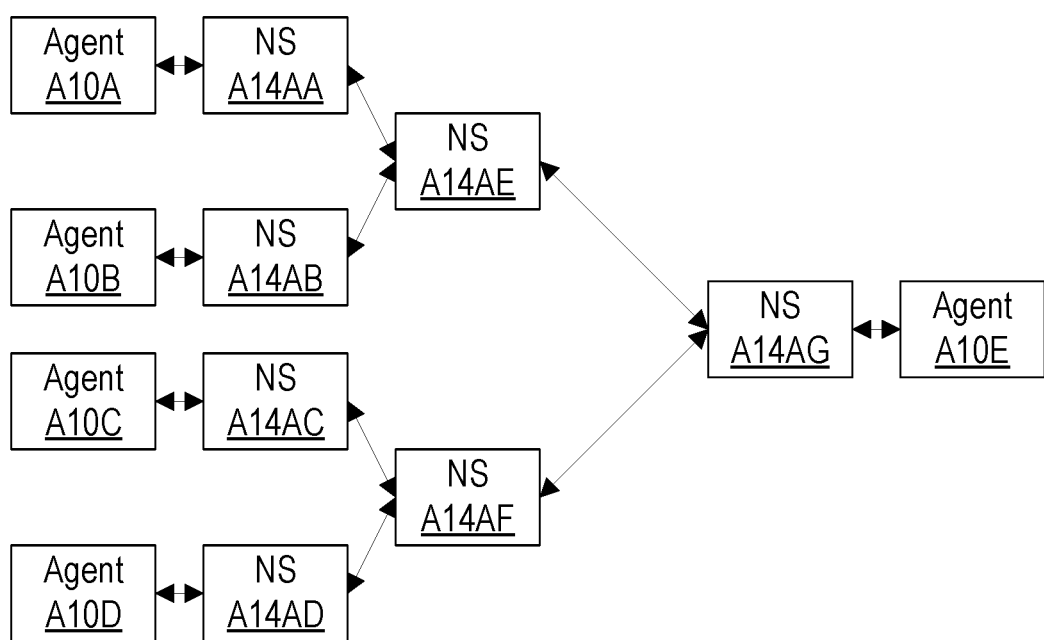
FIG. 5 is a block diagram of one embodiment of a network using a tree topology.
Figure 6:
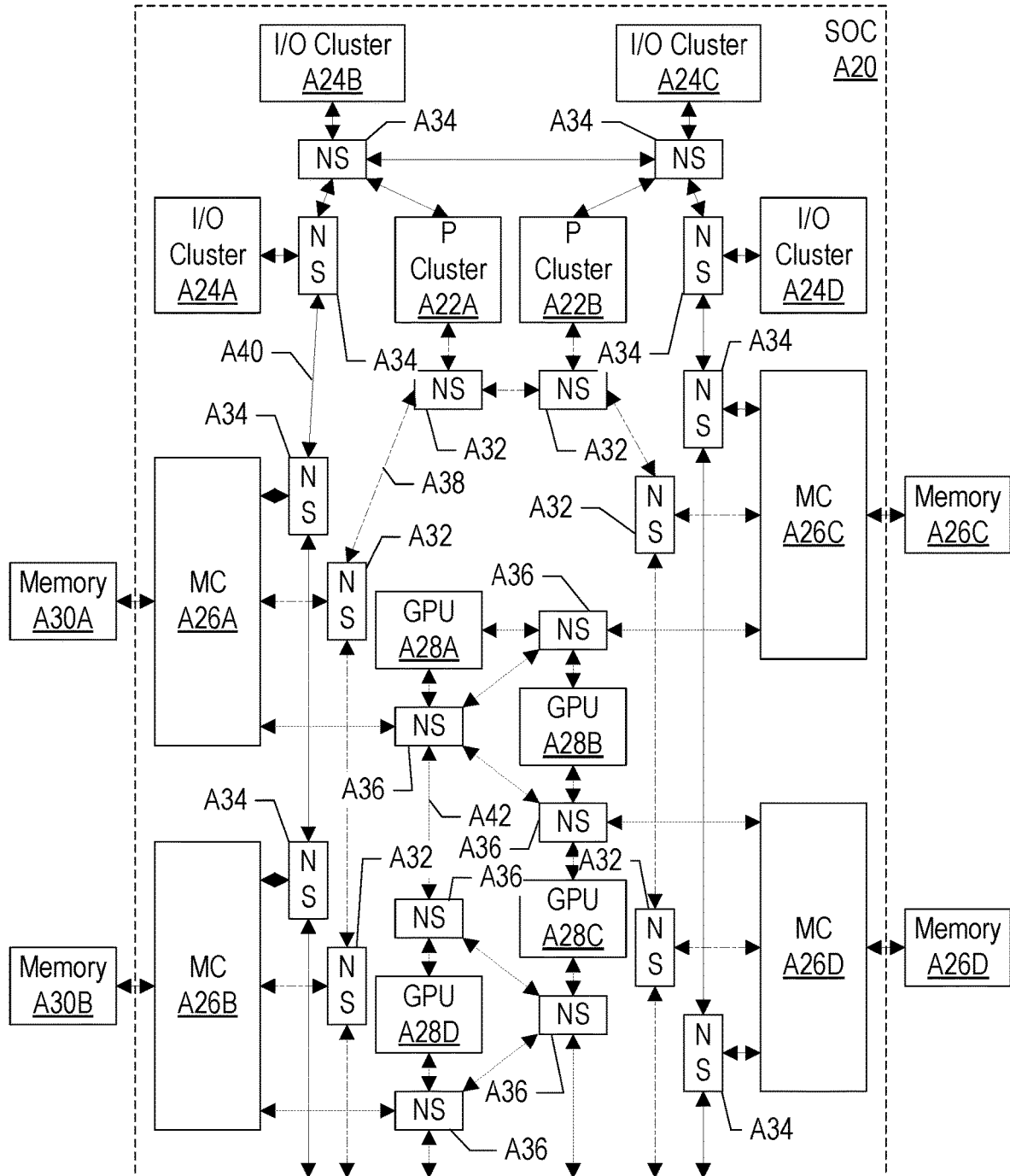
FIG. 6 is a block diagram of one embodiment of a system on a chip (SOC) having multiple networks for one embodiment.
Figure 7:
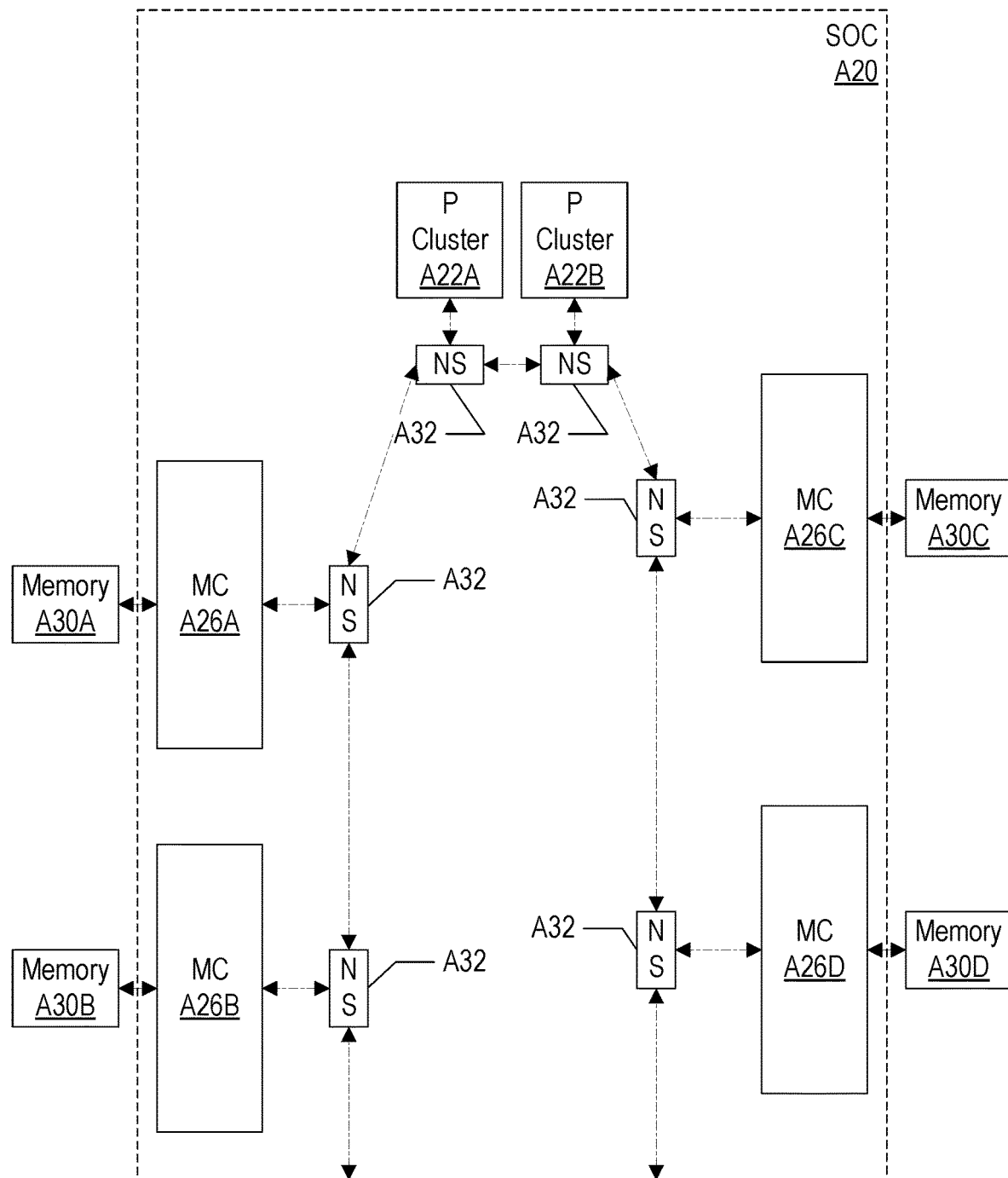
FIG. 7 is a block diagram of one embodiment of a system on a chip (SOC) illustrating one of the independent networks shown in FIG. 6 for one embodiment.
Figure 8:
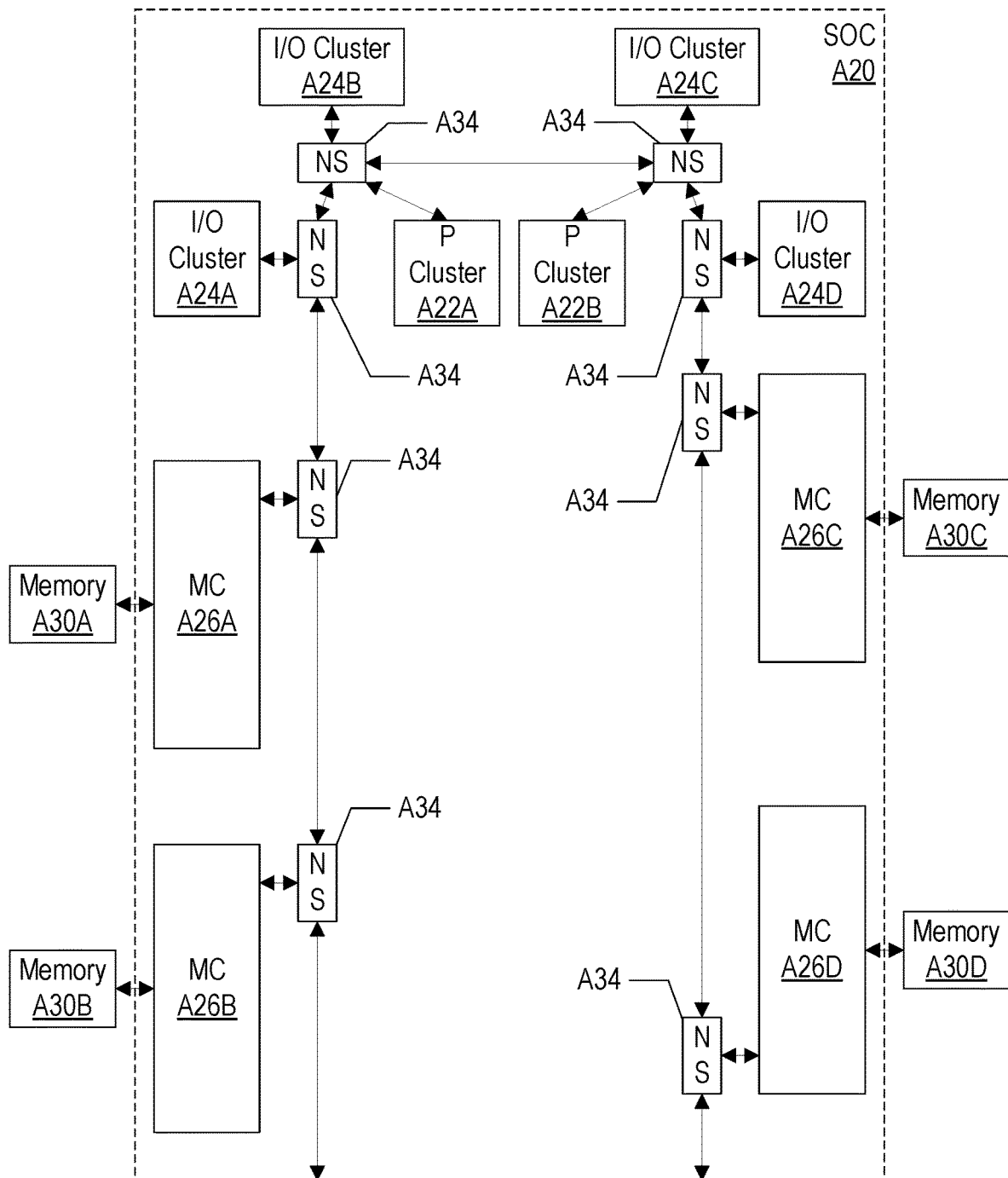
FIG. 8 is a block diagram of one embodiment of a system on a chip (SOC) illustrating another one of the independent networks shown in FIG. 6 for one embodiment.
Figure 9:
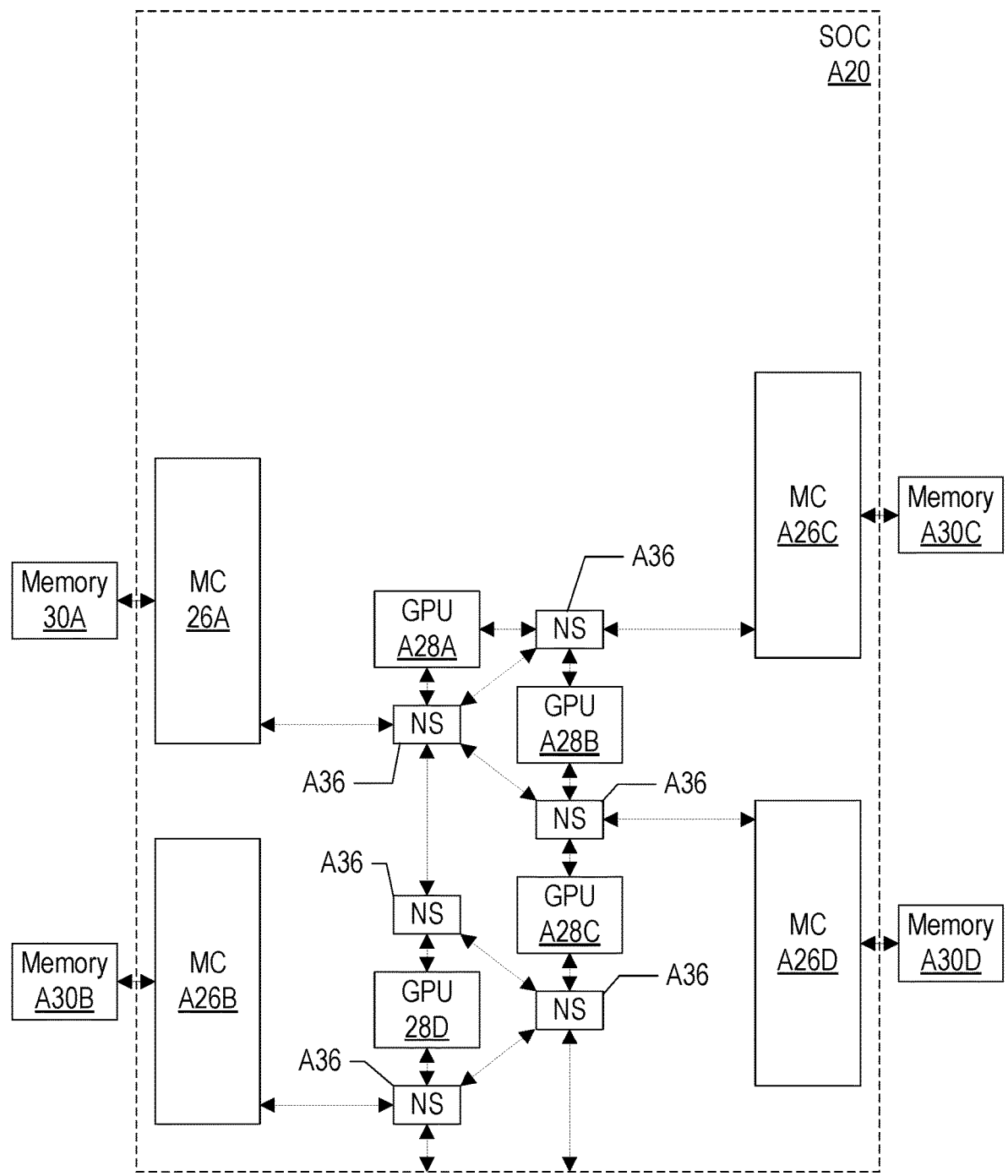
FIG. 9 is a block diagram of one embodiment of a system on a chip (SOC) illustrating yet another one of the independent networks shown in FIG. 6 for one embodiment.
Figure 10:
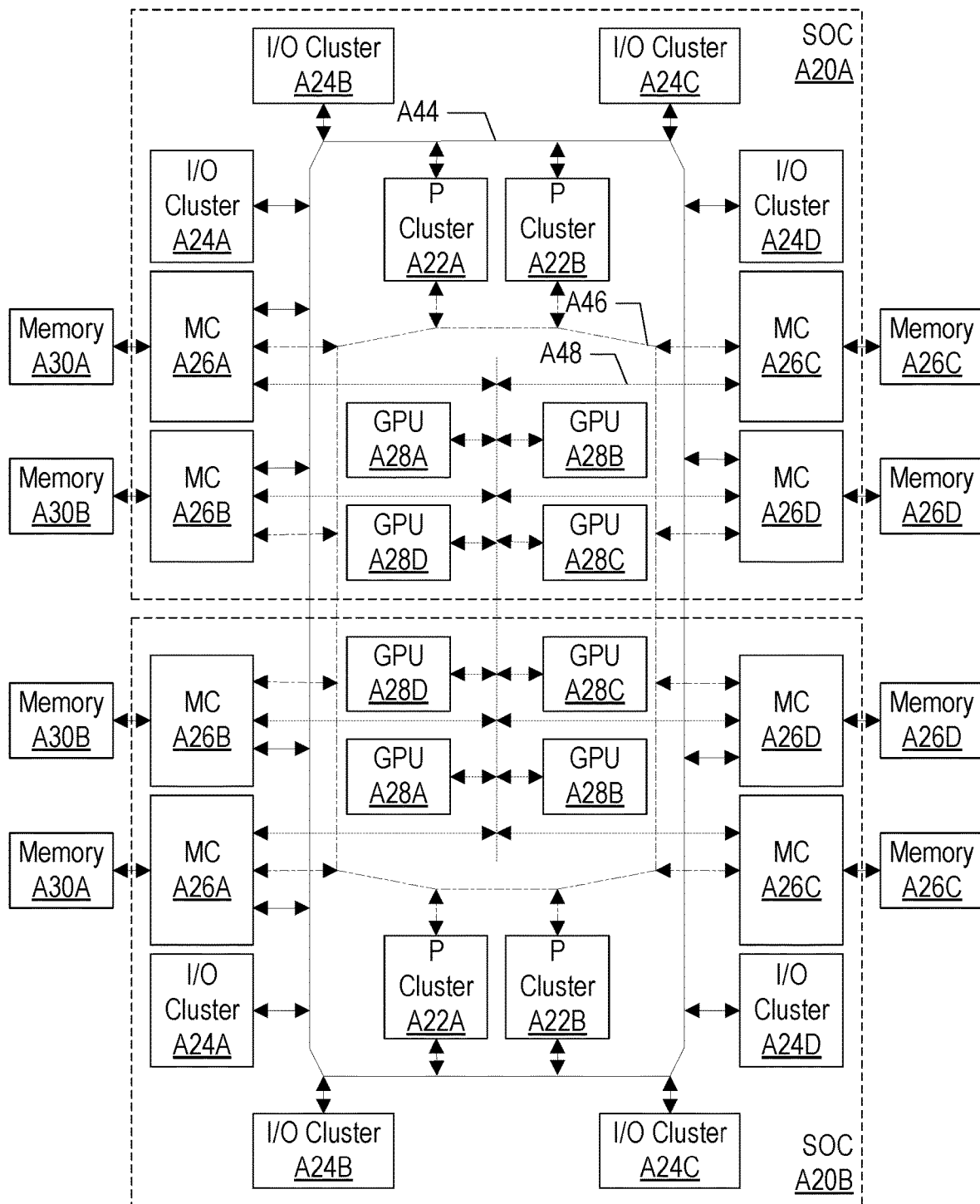
FIG. 10 is a block diagram of one embodiment of a multi-die system including two semiconductor die.
Figure 11:
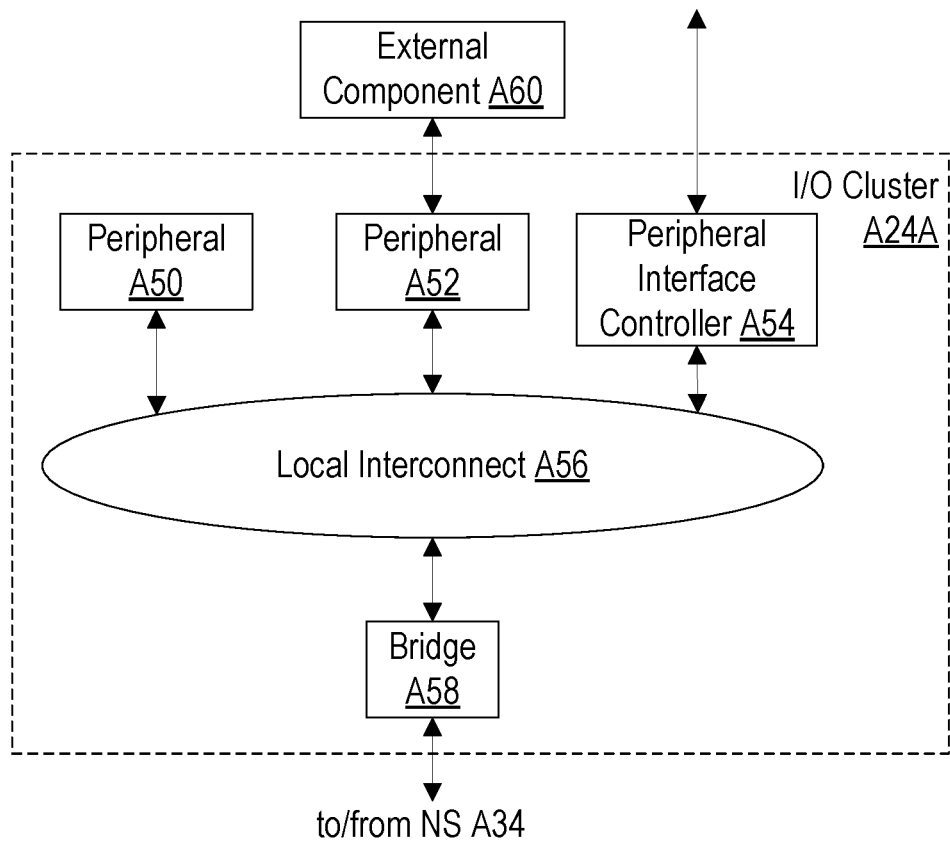
FIG. 11 is a block diagram of one embodiment of an input/output (I/O) cluster.
Figure 12:
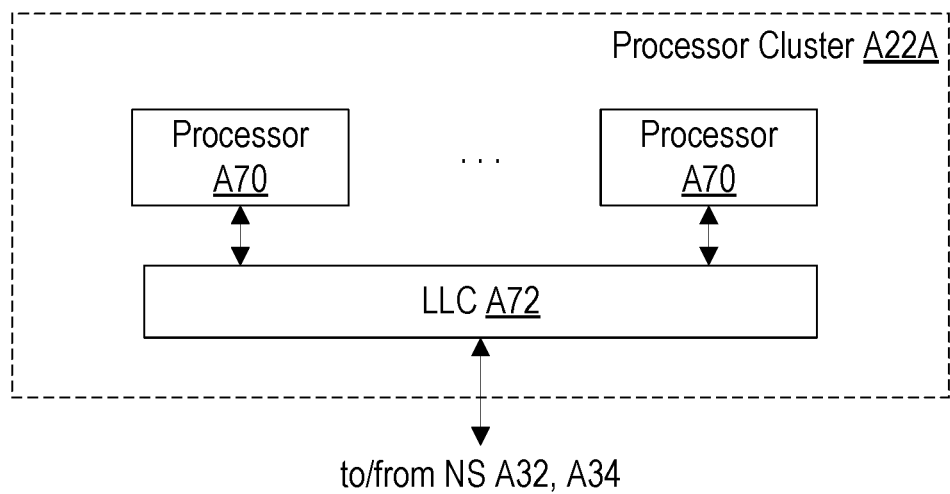
FIG. 12 is a block diagram of one embodiment of a processor cluster.
Figures 13, 14:
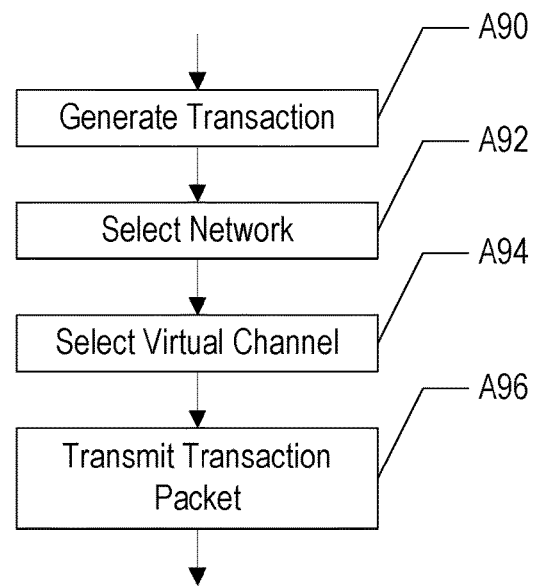
FIG. 13 is a pair of tables illustrating virtual channels and traffic types and networks shown in FIGS. 6 to 9 in which they are used for one embodiment.
FIG. 14 is a flowchart illustrating one embodiment of initiating a transaction on a network.

Turning now to the figures, FIG. 2 is a generic diagram illustrating physically and logically independent networks. FIGS. 3-5 are examples of various network topologies. FIG. 6 is an example of an SOC with a plurality of physically and logically independent networks. FIGS. 7-9 illustrate the various networks of FIG. 6 separately for additional clarity. FIG. 10 is a block diagram of a system including two semiconductor die, illustrating scalability of the networks to multiple instances of the SOC. FIGS. 11 and 12 are example agents shown in greater detail. FIG. 13 shows various virtual channels and communication types and which networks in FIG. 6 to which the virtual channels and communication types apply. FIG. 14 is a flowchart illustrating a method. The description below will provide further details based on the drawings.

FIG. 2 is a block diagram of a system including one embodiment of multiple networks interconnecting agents. In FIG. 1, agents A10A, A10B, and A10C are illustrated, although any number of agents may be included in various embodiments. The agents A10A-A10B are coupled to a network A12A and the agents A10A and A10C are coupled to a network A12B. Any number of networks A12A-A12B may be included in various embodiments as well. The network A12A includes a plurality of network switches including network switches A14A, A14AB, A14AM, and A14AN (collectively network switches A14A); and, similarly, the network A12B includes a plurality of network switches including network switches A14BA, A14BB, A14BM, and A14BN (collectively network switches A14B). Different networks A12A-A12B may include different numbers of network switches A14A, 12A-A12B include physically separate connections ("wires," "busses," or "interconnect"), illustrated as various arrows in FIG. 2.

Since each network A12A-A12B has its own physically and logically separate interconnect and network switches, the networks A12A-A12B are physically and logically separate. A communication on network A12A is unaffected by a communication on network A12B, and vice versa. Even the bandwidth on the interconnect in the respective networks A12A-A12B is separate and independent.

Optionally, an agent A10A-A10C may include or may be coupled to a network interface circuit (reference numerals A16A-A16C, respectively). Some agents A10A-A10C may include or may be coupled to network interfaces A16A-A16C while other agents A10A-A10C may not including or may not be coupled to network interfaces A16A-A16C. The network interfaces A16A-A16C may be configured to transmit and receive traffic on the networks A12A-A12B on behalf of the corresponding agents A10A-A10C. The network interfaces A16A-A16C may be configured to convert or modify communications issued by the corresponding agents A10A-A10C to conform to the protocol/format of the networks A12A-A12B, and to remove modifications or convert received communications to the protocol/format used by the agents A10A-A10C. Thus, the network interfaces A16A-A16C may be used for agents A10A-A10C that are not specifically designed to interface to the networks A12A-A12B directly. In some cases, an agent A10A-A10C may communicate on more than one network (e.g., agent A10A communicates on both networks A12A-A12B in FIG. 1). The corresponding network interface A16A may be configured to separate traffic issued by the agent A10A to the networks A12A-A12B according to which network A12A-A12B each communication is assigned; and the network interface A16A may be configured to combine traffic received from the networks A12A-A12B for the corresponding agent A10A. Any mechanism for determining with network A12A-A12B is to carry a given communication may be used (e.g., based on the type of communication, the destination agent A10B-A10C for the communication, address, etc. in various embodiments).

Since the network interface circuits are optional and many not be needed for agents the support the networks A12A-A12B directly, the network interface circuits will be omitted from the remainder of the drawings for simplicity. However, it is understood that the network interface circuits may be employed in any of the illustrated embodiments by any agent or subset of agents, or even all of the agents.

In an embodiment, the system of FIG. 2 may be implemented as an SOC and the components illustrated in FIG. 2 may be formed on a single semiconductor substrate die. The circuitry included in the SOC may include the plurality of agents A10C and the plurality of network switches A14A-A14B coupled to the plurality of agents A10A-A10C. The plurality of network switches A14A-A14B are interconnected to form a plurality of physical and logically independent networks A12A-A12B.

Since networks A12A-A12B are physically and logically independent, different networks may have different topologies. For example, a given network may have a ring, mesh, a tree, a star, a fully connected set of network switches (e.g., switch connected to each other switch in the network directly), a shared bus with multiple agents coupled to the bus, etc. or hybrids of any one or more of the topologies. Each network A12A-A12B may employ a topology that provides the bandwidth and latency attributes desired for that network, for example, or provides any desired attribute for the network. Thus, generally, the SOC may include a first network constructed according to a first topology and a second network constructed according to a second topology that is different from the first topology.

FIGS. 3-5 illustrate example topologies. FIG. 3 is a block diagram of one embodiment of a network using a ring topology to couple agents A10A-A10C. In the example of FIG. 3, the ring is formed from network switches A14AA-A14AH. The agent A10A is coupled to the network switch A14AA; the agent A10B is coupled to the network switch A14AB; and the agent A10C is coupled to the network switch A14AE.

In a ring topology, each network switch A14AA-A14AH may be connected to two other network switches A14AA-A14AH, and the switches form a ring such that any network switch A14AA-A14AH may reach any other network switch in the ring by transmitting a communication on the ring in the direction of the other network switch. A given communication may pass through one or more intermediate network switches in the ring to reach the targeted network switch. When a given network switch A14AA-A14AH receives a communication from an adjacent network switch A14AA-A14AH on the ring, the given network switch may examine the communication to determine in an agent A10A-A10C to which the given network switch is coupled is the destination of the communication. If so, the given network switch may terminate the communication and forward the communication to the agent. If not, the given network switch may forward the communication to the next network switch on the ring (e.g., the other network switch A14AA-A14AH that is adjacent to the given network switch and is not the adjacent network switch from which the given network switch received the communication). An adjacent network switch to a given network switch may be network switch to when the given network switch may directly transmit a communication, without the communication traveling through any intermediate network switches.

FIG. 4 is a block diagram of one embodiment of a network using a mesh topology to couple agents A10A-A10P. As shown in FIG. 4, the network may include network switches A14AA-A14AH. Each network switch A14AA-A14AH is coupled to two or more other network switches. For example, network switch A14AA is coupled to network switches A14AB and A14AE; network switch A14AB is coupled to network switches A14AA, A14AF, and A14AC; etc. as illustrated in FIG. 4. Thus, different network switches in a mesh network may be coupled to different numbers of other network switches. Furthermore, while the embodiment of FIG. 4 has a relatively symmetrical structure, other mesh networks may be asymmetrical dependent, e.g., on the various traffic patterns that are expected to be prevalent on the network. At each network switch A14AA-A14AH, one or more attributes of a received communication may be used to determine the adjacent network switch A14AA-A14AH to which the receiving network switch A14AA-A14AH will transmit the communication (unless an agent A10A-A10P to which the receiving network switch A14AA-A14AH is coupled is the destination of the communication, in which case the receiving network switch A14AA-A14AH may terminate the communication on the network and provide it to the destination agent A10A-A10P). For example, in an embodiment, the network switches A14AA-A14AH may be programmed at system initialization to route communications based on various attributes.

In an embodiment, communications may be routed based on the destination agent. The routings may be configured to transport the communications through the fewest number of network switches (the "shortest path") between the source and destination agent that may be supported in the mesh topology. Alternatively, different communications for a given source agent to a given destination agent may take different paths through the mesh. For example, latency-sensitive communications may be transmitted over a shorter path while less critical communications may take a different path to avoid consuming bandwidth on the short path, where the different path may be less heavily loaded during use, for example.

FIG. 4 may be an example of a partially-connected mesh: at least some communications may pass through one or more intermediate network switches in the mesh. A fully-connected mesh may have a connection from each network switch to each other network switch, and thus any communication may be transmitted without traversing any intermediate network switches. Any level of interconnectedness may be used in various embodiments.

FIG. 5 is a block diagram of one embodiment of a network using a tree topology to couple agents A10A-A10E. The network switches A14A-A14AG are interconnected to form the tree in this example. The tree is a form of hierarchical network in which there are edge network switches (e.g., A14A, A14AB, A14AC, A14AD, and A14AG in FIG. 5) that couple to agents A10A-A10E and intermediate network switches (e.g., A14AE and A14AF in FIG. 5) that couple only to other network switches. A tree network may be used, e.g., when a particular agent is often a destination for communications issued by other agents or is often a source agent for communications. Thus, for example, the tree network of FIG. 5 may be used for agent A10E being a principal source or destination for communications. For example, the agent A10E may be a memory controller which would frequently be a destination for memory transactions.

There are many other possible topologies that may be used in other embodiments. For example, a star topology has a source/destination agent in the "center" of a network and other agents may couple to the center agent directly or through a series of network switches. Like a tree topology, a star topology may be used in a case where the center agent is frequently a source or destination of communications. A shared bus topology may be used, and hybrids of two or more of any of the topologies may be used.

FIG. 6 is a block diagram of one embodiment of a system on a chip (SOC) A20 having multiple networks for one embodiment. For example, the SOC A20 may be an instance of the SOC 10 in FIG. 1. In the embodiment of FIG. 6, the SOC A20 includes a plurality of processor clusters (P clusters) A22A-A22B, a plurality of input/output (I/O) clusters A24A-A24D, a plurality of memory controllers A26A-A26D, and a plurality of graphics processing units (GPUs) A28A-A28D. As implied by the name (SOC), the components illustrated in FIG. 6 (except for the memories A30A-A30D in this embodiment) may be integrated onto a single semiconductor die or "chip." However, other embodiments may employ two or more die coupled or packaged in any desired fashion. Additionally, while specific numbers of P clusters A22A-A22B, I/O clusters A24-A24D, memory controllers A26A-A26D, and GPUs A28A-A28D are shown in the example of FIG. 6, the number and arrangement of any of the above components may be varied and may be more or less than the number shown in FIG. 6. The memories A30A-A30D are coupled to the SOC A20, and more specifically to the memory controllers A26A-A26D respectively as shown in FIG. 6.

In the illustrated embodiment, the SOC A20 includes three physically and logically independent networks formed from a plurality of network switches A32, A34, and A36 as shown in FIG. 6 and interconnect therebetween, illustrated as arrows between the network switches and other components. Other embodiments may include more or fewer networks. The network switches A32, A34, and A36 may be instances of network switches similar to the network switches A14A-A14B as described above with regard to FIGS. 2-5, for example. The plurality of network switches A32, A34, and A36 are coupled to the plurality of P clusters A22A-A22B, the plurality of GPUs A28A-A28D, the plurality of memory controllers A26-A25B, and the plurality of I/O clusters A24A-A24D as shown in FIG. 6. The P clusters A22A-A22B, the GPUs A28A-A28B, the memory controllers A26A-A26B, and the I/O clusters A24A-A24D may all be examples of agents that communicate on the various networks of the SOC A20. Other agents may be included as desired.

In FIG. 6, a central processing unit (CPU) network is formed from a first subset of the plurality of network switches (e.g., network switches A32) and interconnect therebetween illustrated as short dash/long dash lines such as reference numeral A38. The CPU network couples the P clusters A22A-A22B and the memory controllers 26A-A26D. An I/O network is formed from a second subset of the plurality of network switches (e.g., network switches A34) and interconnect therebetween illustrated as solid lines such as reference numeral A40. The I/O network couples the P clusters A22A-A22B, the I/O clusters A24A-A24D, and the memory controllers A26A-A26B. A relaxed order network is formed from a third subset of the plurality of network switches (e.g., network switches A36) and interconnect therebetween illustrated as short dash lines such as reference numeral A42. The relaxed order network couples the GPUs 2A8A-A28D and the memory controllers A26A-A26D. In an embodiment, the relaxed order network may also couple selected ones of the I/O clusters A24A-A24D as well. As mentioned above, the CPU network, the I/O network, and the relaxed order network are independent of each other (e.g., logically and physically independent). In an embodiment, the protocol on the CPU network and the I/O network supports cache coherency (e.g., the networks are coherent).

The relaxed order network may not support cache coherency (e.g., the network is non-coherent). The relaxed order network also has reduced ordering constraints compared to the CPU network and I/O network. For example, in an embodiment, a set of virtual channels and subchannels within the virtual channels are defined for each network. For the CPU and I/O networks, communications that are between the same source and destination agent, and in the same virtual channel and subchannel, may be ordered. For the relaxed order network, communications between the same source and destination agent may be ordered. In an embodiment, only communications to the same address (at a given granularity, such as a cache block) between the same source and destination agent may be ordered. Because less strict ordering is enforced on the relaxed-order network, higher bandwidth may be achieved on average since transactions may be permitted to complete out of order if younger transactions are ready to complete before older transactions, for example.

The interconnect between the network switches A32, A34, and A36 may have any form and configuration, in various embodiments. For example, in one embodiment, the interconnect may be point-to-point, unidirectional links (e.g., busses or serial links). Packets may be transmitted on the links, where the packet format may include data indicating the virtual channel and subchannel that a packet is travelling in, memory address, source and destination agent identifiers, data (if appropriate), etc. Multiple packets may form a given transaction. A transaction may be a complete communication between a source agent and a target agent. For example, a read transaction may include a read request packet from the source agent to the target agent, one or more coherence message packets among caching agents and the target agent and/or source agent if the transaction is coherent, a data response packet from the target agent to the source agent, and possibly a completion packet from the source agent to the target agent, depending on the protocol. A write transaction may include a write request packet from the source agent to the target agent, one or more coherence message packets as with the read transaction if the transaction is coherent, and possibly a completion packet from the target agent to the source agent. The write data may be included in the write request packet or may be transmitted in a separate write data packet from the source agent to the target agent, in an embodiment.

The arrangement of agents in FIG. 6 may be indicative of the physical arrangement of agents on the semiconductor die forming the SOC A20, in an embodiment. That is, FIG. 6 may be viewed as the surface area of the semiconductor die, and the locations of various components in FIG. 6 may approximate their physical locations with the area. Thus, for example, the I/O clusters A24A-A24D may be arranged in the semiconductor die area represented by the top of SOC A20 (as oriented in FIG. 6). The P clusters A22A-A22B may be arranged in the area represented by the portion of the SOC A20 below and in between the arrangement of I/O clusters A24A-A24D, as oriented in FIG. 6. The GPUs A24A-A28D may be centrally located and extend toward the area represented by the bottom of the SOC A20 as oriented in FIG. 6. The memory controllers A26A-A26D may be arranged on the areas represented by the right and the left of the SOC A20, as oriented in FIG. 6.

In an embodiment, the SOC A20 may be designed to couple directly to one or more other instances of the SOC A20, coupling a given network on the instances as logically one network on which an agent on one die may communicate logically over the network to an agent on a different die in the same way that the agent communicates within another agent on the same die. While the latency may be different, the communication may be performed in the same fashion. Thus, as illustrated in FIG. 6, the networks extend to the bottom of the SOC A20 as oriented in FIG. 6. Interface circuitry (e.g., serializer/deserializer (SERDES) circuits), not shown in FIG. 6, may be used to communicate across the die boundary to another die. Thus, the networks may be scalable to two or more semiconductor dies. For example, the two or more semiconductor dies may be configured as a single system in which the existence of multiple semiconductor dies is transparent to software executing on the single system. In an embodiment, the delays in a communication from die to die may be minimized, such that a die-to-die communication typically does not incur significant additional latency as compared to an intra-die communication as one aspect of software transparency to the multi-die system. In other embodiments, the networks may be closed networks that communicate only intra-die.

As mentioned above, different networks may have different topologies. In the embodiment of FIG. 6, for example, the CPU and I/O networks implement a ring topology, and the relaxed order may implement a mesh topology. However, other topologies may be used in other embodiments. FIGS. 7, 8, and 9 illustrate portions of the SOC A30 including the different networks: CPU (FIG. 7), I/O (FIG. 8), and relaxed order (FIG. 9). As can be seen in FIGS. 7 and 8, the network switches A32 and A34, respectively, form a ring when coupled to the corresponding switches on another die. If only a single die is used, a connection may be made between the two network switches A32 or A34 at the bottom of the SOC A20 as oriented in FIGS. 7 and 8 (e.g., via an external connection on the pins of the SOC A20). Alternatively, the two network switches A32 or A34 at the bottom may have links between them that may be used in a single die configuration, or the network may operate with a daisy-chain topology.

Similarly, in FIG. 9, the connection of the network switches A36 in a mesh topology between the GPUs A28A-A28D and the memory controllers A26A-A26D is shown. As previously mentioned, in an embodiment, one or more of the I/O clusters A24A-A24D may be coupled to the relaxed order network was well. For example, I/O clusters A24A-A24D that include video peripherals (e.g., a display controller, a memory scaler/rotator, video encoder/decoder, etc.) may have access to the relaxed order network for video data.

The network switches A36 near the bottom of the SOC A30 as oriented in FIG. 9 may include connections that may be routed to another instance of the SOC A30, permitting the mesh network to extend over multiple dies as discussed above with respect to the CPU and I/O networks. In a single die configuration, the paths that extend off chip may not be used. FIG. 10 is a block diagram of a two die system in which each network extends across the two SOC dies A20A-A20B, forming networks that are logically the same even though they extend over two die. The network switches A32, A34, and A36 have been removed for simplicity in FIG. 10, and the relaxed order network has been simplified to a line, but may be a mesh in one embodiment. The I/O network A44 is shown as a solid line, the CPU network A46 is shown as an alternating long and short dashed line, and the relaxed order network A48 is shown as a dashed line. The ring structure of the networks A44 and A46 is evident in FIG. 10 as well. While two dies are shown in FIG. 10, other embodiments may employ more than two die. The networks may daisy chained together, fully connected with point-to-point links between teach die pair, or any another connection structure in various embodiments.

In an embodiment, the physical separation of the I/O network from the CPU network may help the system provide low latency memory access by the processor clusters A22A-A22B, since the I/O traffic may be relegated to the I/O network. The networks use the same memory controllers to access memory, so the memory controllers may be designed to favor the memory traffic from the CPU network over the memory traffic from the I/O network to some degree. The processor clusters A22-A22B may be part of the I/O network as well in order to access device space in the I/O clusters A24A-A24D (e.g., with programmed input/output (PIO) transactions). However, memory transactions initiated by the processor clusters A22A-A22B may be transmitted over the CPU network. Thus, CPU clusters A22A-A22B may be examples of an agent coupled to at least two of the plurality of physically and logically independent networks. The agent may be configured to generate a transaction to be transmitted, and to select one of the at least two of the plurality of physically and logically independent networks on which to transmit the transaction based on a type of the transaction (e.g., memory or PIO).

Various networks may include different numbers of physical channels and/or virtual channels. For example, the I/O network may have multiple request channels and completion channels, while the CPU network may have one request channel and one completion channel (or vice-versa). The requests transmitted on a given request channel when there are more than one may be determined in any desired fashion (e.g., by type of request, by priority of request, to balance bandwidth across the physical channels, etc.). Similarly, the I/O and CPU networks may include a snoop virtual channel to carry snoop requests, but the relaxed order network may not include the snoop virtual channel since it is non-coherent in this embodiment.

FIG. 11 is a block diagram of one embodiment of an input/output (I/O) cluster A24A illustrated in further detail. Other I/O clusters A24B-A24D may be similar. In the embodiment of FIG. 11, the I/O cluster A24A includes peripherals A50 and A52, a peripheral interface controller A54, a local interconnect A56, and a bridge A58. The peripheral A52 may be coupled to an external component A60. The peripheral interface controller A54 may be coupled to a peripheral interface A62. The bridge A58 may be coupled to a network switch A34 (or to a network interface that couples to the network switch A34).

The peripherals A50 and A52 may include any set of additional hardware functionality (e.g., beyond CPUs, GPUs, and memory controllers) included in the SOC A20. For example, the peripherals A50 and A52 may include video peripherals such as an image signal processor configured to process image capture data from a camera or other image sensor, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include networking peripherals such as media access controllers (MACs). The peripherals may include other types of memory controllers such as non-volatile memory controllers. Some peripherals A52 may include on on-chip component and an off-chip component A60. The peripheral interface controller A54 may include interface controllers for various interfaces A62 external to the SOC A20 including interfaces such as Universal Serial Bus (USB), peripheral component interconnect (PCI) including PCI Express (PCIe), serial and parallel ports, etc.

The local interconnect A56 may be an interconnect on which the various peripherals A50, A52, and A54 communicate. The local interconnect A56 may be different from the system-wide interconnect shown in FIG. 6 (e.g., the CPU, I/O, and relaxed networks). The bridge A58 may be configured to convert communications on the local interconnect to communications on the system wide interconnect and vice-versa. The bridge A58 may be coupled to one of the network switches A34, in an embodiment. The bridge A58 may also manage ordering among the transactions issued from the peripherals A50, A52, and A54. For example, the bridge A58 may use a cache coherency protocol supported on the networks to ensure the ordering of the transactions on behalf of the peripherals A50, A52, and A54, etc. Different peripherals A50, A52, and A54 may have different ordering requirements, and the bridge A58 may be configured to adapt to the different requirements. The bridge A58 may implement various performance-enhancing features as well, in some embodiments. For example, the bridge A58 may prefetch data for a given request. The bridge A58 may capture a coherent copy of a cache block (e.g., in the exclusive state) to which one or more transactions from the peripherals A50, A52, and A54 are directed, to permit the transactions to complete locally and to enforce ordering. The bridge A58 may speculatively capture an exclusive copy of one or more cache blocks targeted by subsequent transactions, and may use the cache block to complete the subsequent transactions if the exclusive state is successfully maintained until the subsequent transactions can be completed (e.g., after satisfying any ordering constraints with earlier transactions). Thus, in an embodiment, multiple requests within a cache block may be serviced from the cached copy. Various details may be found in U.S. Provisional Patent Application Ser. Nos. 63/170,868, filed on Apr. 5, 2021, 63/175,868, filed on Apr. 16, 2021, and 63/175,877, filed on Apr. 16, 2021. These patent applications are incorporated herein by reference in their entireties. To the extent that any of the incorporated material conflicts with the material expressly set forth herein, the material expressly set forth herein controls.

FIG. 12 is a block diagram of one embodiment of a processor cluster A22A. Other embodiments may be similar. In the embodiment of FIG. 12, the processor cluster A22A includes one or more processors A70 coupled to a last level cache (LLC) A72. The LLC A72 may include interface circuitry to interface to the network switches A32 and A34 to transmit transactions on the CPU network and the I/O network, as appropriate.

The processors A70 may include any circuitry and/or microcode configured to execute instructions defined in an instruction set architecture implemented by the processors A70. The processors A70 may have any microarchitectural implementation, performance and power characteristics, etc. For example, processors may be in order execution, out of order execution, superscalar, superpipelined, etc.

The LLC A72 and any caches within the processors A70 may have any capacity and configuration, such as set associative, direct mapped, or fully associative. The cache block size may be any desired size (e.g., 32 bytes, 64 bytes, 128 bytes, etc.). The cache block may be the unit of allocation and deallocation in the LLC A70. Additionally, the cache block may be the unit over which coherency is maintained in this embodiment. The cache block may also be referred to as a cache line in some cases. In an embodiment, a distributed, directory-based coherency scheme may be implemented with a point of coherency at each memory controller A26 in the system, where the point of coherency applies to memory addresses that are mapped to the at memory controller. The directory may track the state of cache blocks that are cached in any coherent agent. The coherency scheme may be scalable to many memory controllers over possibly multiple semiconductor dies. For example, the coherency scheme may employ one or more of the following features: Precise directory for snoop filtering and race resolution at coherent and memory agents; ordering point (access order) determined at memory agent, serialization point migrates amongst coherent agents and memory agent; secondary completion (invalidation acknowledgement) collection at requesting coherent agent, tracked with completion-count provided by memory agent; Fill/snoop and snoop/victim-ack race resolution handled at coherent agent through directory state provided by memory agent; Distinct primary/secondary shared states to assist in race resolution and limiting in flight snoops to same address/target; Absorption of conflicting snoops at coherent agent to avoid deadlock without additional nack/conflict/retry messages or actions; Serialization minimization (one additional message latency per accessor to transfer ownership through a conflict chain); Message minimization (messages directly between relevant agents and no additional messages to handle conflicts/races (e.g., no messages back to memory agent); Store-conditional with no over-invalidation in failure due to race; Exclusive ownership request with intent to modify entire cache-line with minimized data transfer (only in dirty case) and related cache/directory states; Distinct snoop-back and snoop-forward message types to handle both cacheable and non-cacheable flows (e.g. 3 hop and 4 hop protocols). Additional details may be found in U.S. Provisional Patent Application Ser. No. 63/077,371, filed on Sep. 11, 2020. This patent application is incorporated herein by reference in its entirety. To the extent that any of the incorporated material conflicts with the material expressly set forth herein, the material expressly set forth herein controls.

FIG. 13 is a pair of tables A80 and A82 illustrating virtual channels and traffic types and the networks shown in FIGS. 6 to 9 on which they are used for one embodiment. As shown in table A80, the virtual channels may include the bulk virtual channel, the low latency (LLT) virtual channel, the real time (RT virtual channel) and the virtual channel for non-DRAM messages (VCP). The bulk virtual channel may be the default virtual channel for memory accesses. The bulk virtual channel may receive a lower quality of service than the LLT and RT virtual channels, for example. The LLT virtual channel may be used for memory transactions for which low latency is needed for high performance operation. The RT virtual channel may be used for memory transactions that have latency and/or bandwidth requirements for correct operation (e.g., video streams). The VCP channel may be used to separate traffic that is not directed to memory, to prevent interference with memory transactions.

In an embodiment, the bulk and LLT virtual channels may be supported on all three networks (CPU, I/O, and relaxed order). The RT virtual channel may be supported on the I/O network but not the CPU or relaxed order networks. Similarly, the VCP virtual channel may be supported on the I/O network but not the CPU or relaxed order networks. In an embodiment, the VCP virtual channel may be supported on the CPU and relaxed order network only for transactions targeting the network switches on that network (e.g., for configuration) and thus may not be used during normal operation. Thus, as table A80 illustrates, different networks may support different numbers of virtual channels.

Table A82 illustrates various traffic types and which networks carry that traffic type. The traffic types may include coherent memory traffic, non-coherent memory traffic, real time (RT) memory traffic, and VCP (non-memory) traffic. The CPU and I/O networks may be both carry coherent traffic. In an embodiment, coherent memory traffic sourced by the processor clusters A22A-A22B may be carried on the CPU network, while the I/O network may carry coherent memory traffic sourced by the I/O clusters A24A-A24D. Non-coherent memory traffic may be carried on the relaxed order network, and the RT and VCP traffic may be carried on the I/O network.

FIG. 14 is a flowchart illustrating one embodiment of a method of initiating a transaction on a network. In one embodiment, an agent may generate a transaction to be transmitted (block A90). The transaction is to be transmitted on one of a plurality of physically and logically independent networks. A first network of the plurality of physically and logically independent networks is constructed according to a first topology and a second network of the plurality of physically and logically independent networks is constructed according to a second topology that is different from the first topology. One of the plurality of physically and logically independent networks is selected on which to transmit the transaction based on a type of the transaction (block A92). For example, the processor clusters A22A-A22B may transmit coherent memory traffic on the CPU network and PIO traffic on the I/O network. In an embodiment, the agent may select a virtual channel of a plurality of virtual channels supported on the selected network of the plurality of physically and logically independent networks (block A94) based one or more attributes of the transaction other than the type. For example, a CPU may select the LLT virtual channel for a subset of memory transactions (e.g., the oldest memory transactions that are cache misses, or a number of cache misses up to a threshold number, after which the bulk channel may be selected). A GPU may select between the LLT and bulk virtual channels based on the urgency at which the data is needed. Video devices may use the RT virtual channel as needed (e.g., the display controller may issue frame data reads on the RT virtual channel). The VCP virtual channel may be selected for transactions that are not memory transactions. The agent may transmit a transaction packet on the selected network and virtual channel. In an embodiment, transaction packets in different virtual channels may take different paths through the networks. In an embodiment, transaction packets may take different paths based a type of the transaction packet (e.g., request vs. response). In an embodiment, different paths may be supported for both different virtual channels and different types of transactions. Other embodiments may employ one or more additional attributes of transaction packets to determine a path through the network for those packets. Viewed in another way, the network switches form the network may route packets different based on the virtual channel, the type, or any other attributes. A different path may refer to traversing at least one segment between network switches that is not traversed on the other path, even though the transaction packets using the different paths are travelling from a same source to a same destination. Using different paths may provide for load balancing in the networks and/or reduced latency for the transactions.

In an embodiment, a system comprises a plurality of processor clusters, a plurality of memory controllers, a plurality of graphics processing units, a plurality of agents, and a plurality of network switches coupled to the plurality of processor clusters, the plurality of graphics processing units, the plurality of memory controllers, and the plurality of agents. A given processor cluster comprises one or more processors. The memory controllers are configured to control access to memory devices. A first subset of the plurality of network switches are interconnected to form a central processing unit (CPU) network between the plurality of processor clusters and the plurality of memory controllers. A second subset of the plurality of network switches are interconnected to form an input/output (I/O) network between the plurality of processor clusters, the plurality of agents, and the plurality of memory controllers. A third subset of the plurality of network switches are interconnected to form a relaxed order network between the plurality of graphics processing units, selected ones of the plurality of agents, and the plurality of memory controllers. The CPU network, the I/O network, and the relaxed order network are independent of each other. The CPU network and the I/O network are coherent. The relaxed order network is non-coherent and has reduced ordering constraints compared to the CPU network and I/O network. In an embodiment, at least one of the CPU network, the I/O network, and the relaxed order network has a number of physical channels that differs from a number of physical channels on another one of the CPU network, the I/O network, and the relaxed order network. In an embodiment, the CPU network is a ring network. In an embodiment, the I/O network is a ring network. In an embodiment, the relaxed order network is a mesh network. In an embodiment, a first agent of the plurality of agents comprises an I/O cluster comprising a plurality of peripheral devices. In an embodiment, the I/O cluster further comprises a bridge coupled to the plurality of peripheral devices and further coupled to a first network switch in the second subset. In an embodiment, the system further comprises a network interface circuit configured to convert communications from a given agent to communications for a given network of CPU network, the I/O network, and the relaxed order network, wherein the network interface circuit is coupled to one of the plurality of network switches in the given network.

In an embodiment, a system on a chip (SOC) comprises a semiconductor die on which circuitry is formed. The circuitry comprises a plurality of agents and a plurality of network switches coupled to the plurality of agents. The plurality of network switches are interconnected to form a plurality of physical and logically independent networks. A first network of the plurality of physically and logically independent networks is constructed according to a first topology and a second network of the plurality of physically and logically independent networks is constructed according to a second topology that is different from the first topology. In an embodiment, the first topology is a ring topology. In an embodiment, the second topology is a mesh topology. In an embodiment, coherency is enforced on the first network. In an embodiment, the second network is a relaxed order network. In an embodiment, at least one of the plurality of physically and logically independent networks implements a first number of physical channels and at least one other one of the plurality of physically and logically independent networks implements a second number of physical channels, wherein the first number differs from the second number. In an embodiment, the first network includes one or more first virtual channels and the second network includes one or more second virtual channels. At least one of the one or more first virtual channels differs from the one or more second virtual channels. In an embodiment, the SOC further comprises a network interface circuit configured to convert communications from a given agent of the plurality of agents to communications for a given network of the plurality of physically and logically independent networks. The network interface circuit is coupled to one of the plurality of network switches in the given network. In an embodiment, a first agent of the plurality of agents is coupled to at least two of the plurality of physically and logically independent networks. The first agent is configured to generate a transaction to be transmitted. The first agent is configured to select one of the at least two of the plurality of physically and logically independent networks on which to transmit the transaction based on a type of the transaction. In an embodiment, one of the at least two networks is an I/O network on which I/O transactions are transmitted.

In an embodiment, a method comprises generating a transaction in an agent that is coupled to a plurality of physically and logically independent networks, wherein a first network of the plurality of physically and logically independent networks is constructed according to a first topology and a second network of the plurality of physically and logically independent networks is constructed according to a second topology that is different from the first topology; and selecting one of the plurality of physically and logically independent networks on which to transmit the transaction based on a type of the transaction. In an embodiment, the method further comprises selecting a virtual channel of a plurality of virtual channels supported on the one of the plurality of physically and logically independent networks based one or more attributes of the transaction other than the type.

Interrupts

FIGS. 15-26 illustrate various embodiments of a scalable interrupt structure. For example, in a system including two or more integrated circuit dies, a given integrated circuit die may include a local interrupt distribution circuit to distribute interrupts among processor cores in the given integrated circuit die. At least one of the two or more integrated circuit dies may include a global interrupt distribution circuit, wherein the local interrupt distribution circuits and the global interrupt distribution circuit implement a multi-level interrupt distribution scheme. In an embodiment, the global interrupt distribution circuit is configured to transmit an interrupt request to the local interrupt distribution circuits in a sequence, and wherein the local interrupt distribution circuits are configured to transmit the interrupt request to local interrupt destinations in a sequence before replying to the interrupt request from the global interrupt distribution circuit.

Computing systems generally include one or more processors that serve as central processing units (CPUs), along with one or more peripherals that implement various hardware functions. The CPUs execute the control software (e.g., an operating system) that controls operation of the various peripherals. The CPUs can also execute applications, which provide user functionality in the system. Additionally, the CPUs can execute software that interacts with the peripherals and performs various services on the peripheral's behalf. Other processors that are not used as CPUs in the system (e.g., processors integrated into some peripherals) can also execute such software for peripherals.

The peripherals can cause the processors to execute software on their behalf using interrupts. Generally, the peripherals issue an interrupt, typically by asserting an interrupt signal to an interrupt controller that controls the interrupts going to the processors. The interrupt causes the processor to stop executing its current software task, saving state for the task so that it can be resumed later. The processor can load state related to the interrupt, and begin execution of an interrupt service routine. The interrupt service routine can be driver code for the peripheral, or may transfer execution to the driver code as needed. Generally, driver code is code provided for a peripheral device to be executed by the processor, to control and/or configure the peripheral device.

The latency from assertion of the interrupt to the servicing of the interrupt can be important to performance and even functionality in a system. Additionally, efficient determination of which CPU will service the interrupt and delivering the interrupt with minimal perturbation of the rest of the system may be important to both performance and maintaining low power consumption in the system. As the number or processors in a system increases, efficiently and effectively scaling the interrupt delivery is even more important.

Figure 15:
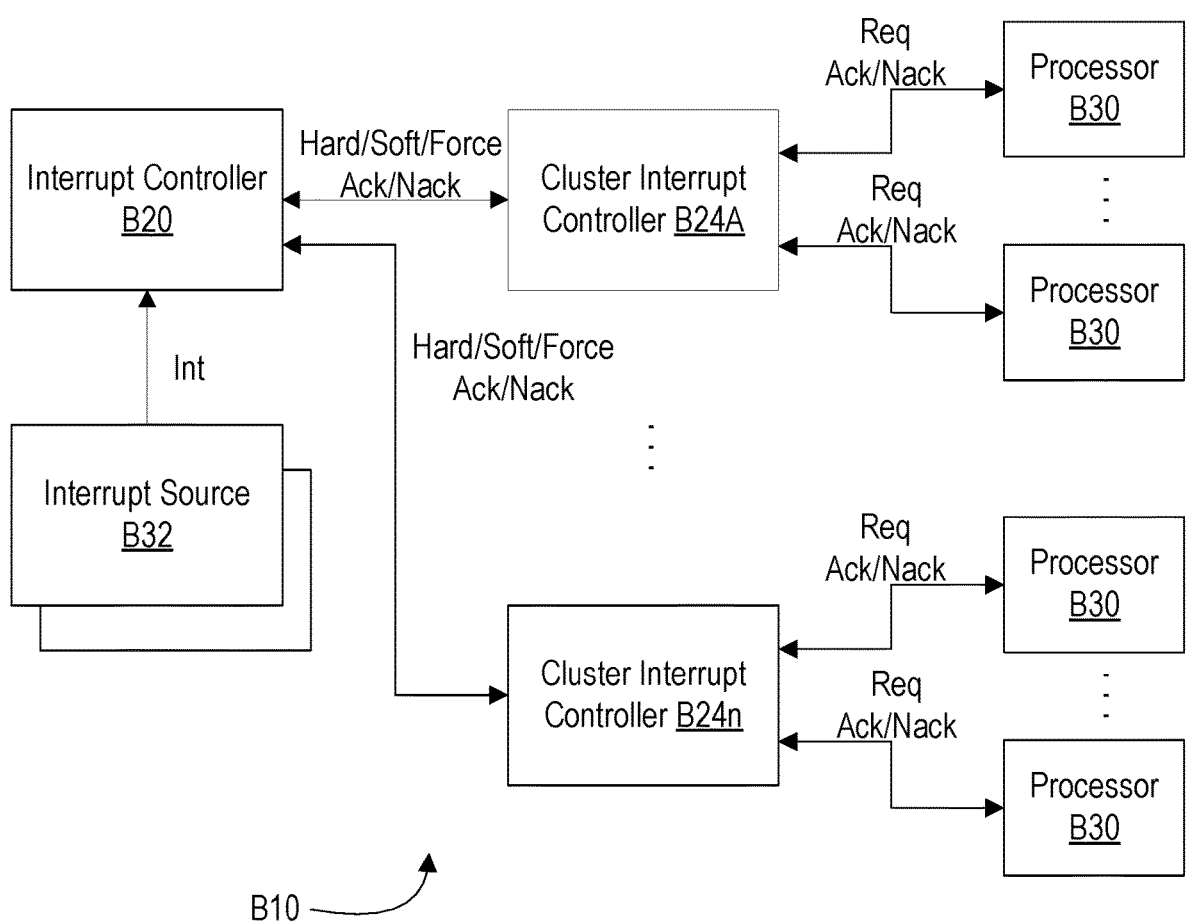
FIG. 15 is a block diagram of one embodiment of a system including an interrupt controller and a plurality of cluster interrupt controllers corresponding a plurality of clusters of processors.

Turning now to FIG. 15, a block diagram of one embodiment of a portion of a system B10 including an interrupt controller B20 coupled to a plurality of cluster interrupt controllers B24A-B24n is shown. Each of the plurality of cluster interrupt controllers B24A-B24n is coupled to a respective plurality of processors B30 (e.g., a processor cluster). The interrupt controller B20 is coupled to a plurality of interrupt sources B32.

When at least one interrupt has been received by the interrupt controller B20, the interrupt controller B20 may be configured to attempt to deliver the interrupt (e.g., to a processor B30 to service the interrupt by executing software to record the interrupt for further servicing by an interrupt service routine and/or to provide the processing requested by the interrupt via the interrupt service routine). In system B10, the interrupt controller B20 may attempt to deliver interrupts through the cluster interrupt controllers B24A-B24n. Each cluster controller B24A-B24n is associated with a processor cluster, and may attempt to deliver the interrupt to processors B30 in the respective plurality of processors forming the cluster.

More particularly, the interrupt controller B20 may be configured to attempt to deliver the interrupt in a plurality of iterations over the cluster interrupt controllers B24A-B24n. The interface between the interrupt controller B20 and each interrupt controller B24A-B24n may include a request/acknowledge (Ack)/non-acknowledge (Nack) structure. For example, the requests may be identified by iteration: soft, hard, and force in the illustrated embodiment. An initial iteration (the "soft" iteration) may be signaled by asserting the soft request. The next iteration (the "hard" iteration) may be signaled by asserting the hard request. The last iteration (the "force" iteration) may be signaled by asserting the force request. A given cluster interrupt controller B24A-B24n may respond to the soft and hard iterations with an Ack response (indicating that a processor B30 in the processor cluster associated with the given cluster interrupt controller B24A-B24n has accepted the interrupt and will process at least one interrupt) or a Nack response (indicating that the processors B30 in the processor cluster have refused the interrupt). The force iteration may not use the Ack/Nack responses, but rather may continue to request interrupts until the interrupts are serviced as will be discussed in more detail below.

The cluster interrupt controllers B24A-B24n may use a request/Ack/Nack structure with the processors B30 as well, attempting to deliver the interrupt to a given processor B30. Based on the request from the cluster interrupt controller B24A-B24n, the given processor B30 may be configured to determine if the given processor B30 is able to interrupt current instruction execution within a predetermined period of time. If the given processor B30 is able to commit to interrupt within the period of time, the given processor B30 may be configured to assert an Ack response. If the given processor B30 is not able to commit to the interrupt, the given processor B30 may be configured to assert a Nack response. The cluster interrupt controller B24A-B24n may be configured to assert the Ack response to the interrupt controller B20 if at least one processor asserts the Ack response to the cluster interrupt controller B24A-B24n, and may be configured to assert the Nack response if the processors B30 assert the Nack response in a given iteration.

Using the request/Ack/Nack structure may provide a rapid indication of whether or not the interrupt is being accepted by the receiver of the request (e.g., the cluster interrupt controller B24A-B24n or the processor B30, depending on the interface), in an embodiment. The indication may be more rapid than a timeout, for example, in an embodiment. Additionally, the tiered structure of the cluster interrupt controllers B24A-B24n and the interrupt controller B20 may be more scalable to larger numbers of processors in a system B10 (e.g., multiple processor clusters), in an embodiment.

An iteration over the cluster interrupt controllers B24A-B24n may include an attempt to deliver the interrupt through at least a subset of the cluster interrupt controllers B24A-B24n, up to all of the cluster interrupt controllers B24A-B24n. An iteration may proceed in any desired fashion. For example, in one embodiment, the interrupt controller B20 may be configured to serially assert interrupt requests to respective cluster interrupt controllers B24A-B24n, terminated by an Ack response from one of the cluster interrupt controllers B24A-B24n (and a lack of additional pending interrupts, in an embodiment) or by a Nack response from all of the cluster interrupt controllers B24A-B24n. That is, the interrupt controller may select one of the cluster interrupt controllers B24A-B24n, and assert an interrupt request to the selected cluster interrupt controller B24A-B24n (e.g., by asserting the soft or hard request, depending on which iteration is being performed). The selected cluster interrupt controller B24A-B24n may respond with an Ack response, which may terminate the iteration. On the other hand, if the selected cluster interrupt controller B24A-B24n asserts the Nack response, the interrupt controller may be configured to select another cluster interrupt controller B24A-B24n and may assert the soft or hard request to the selected cluster interrupt controller B24A-B24n. Selection and assertion may continue until either an Ack response is received or each of the cluster interrupt controllers B24A-B24n have been selected and asserted the Nack response. Other embodiments may perform an iteration over the cluster interrupt controllers B24A-B24n in other fashions. For example, the interrupt controller B20 may be configured to assert an interrupt request to a subset of two or more cluster interrupt controllers B24A-B24n concurrently, continuing with other subsets if each cluster interrupt controller B24A-B24n in the subset provides a Nack response to the interrupt request. Such an implementation may cause spurious interrupts if more than one cluster interrupt controller B24A-B24n in a subset provides an Ack response, and so the code executed in response to the interrupt may be designed to handle the occurrence of a spurious interrupt.

The initial iteration may be the soft iteration, as mentioned above. In the soft iteration, a given cluster interrupt controller B24A-B24n may attempt to deliver the interrupt to a subset of the plurality of processors B30 that are associated with the given cluster interrupt controller B24A-B24n. The subset may be the processors B30 that are powered on, where the given cluster interrupt controller B24A-B24n may not attempt to deliver the interrupt to the processors B30 that are powered off (or sleeping). That is, the powered-off processors are not included in the subset to which the cluster interrupt controller B24A-B24n attempts to deliver the interrupt. Thus, the powered-off processors B30 may remain powered off in the soft iteration.

Based on a Nack response from each cluster interrupt controller B24A-B24n during the soft iteration, the interrupt controller B20 may perform a hard iteration. In the hard iteration, the powered-off processors B30 in a given processor cluster may be powered on by the respective cluster interrupt controller B24A-B24n and the respective interrupt controller B24A-B24n may attempt to deliver the interrupt to each processor B30 in the processor cluster. More particularly, if a processor B30 was powered on to perform the hard iteration, that processor B30 may be rapidly available for interrupts and may frequently result in Ack responses, in an embodiment.

If the hard iteration terminates with one or more interrupts still pending, or if a timeout occurs prior to completing the soft and hard iterations, the interrupt controller may initiate a force iteration by asserting the force signal. In an embodiment, the force iteration may be performed in parallel to the cluster interrupt controllers B24A-B24n, and Nack responses may not be allowed. The force iteration may remain in progress until no interrupts remain pending, in an embodiment.

A given cluster interrupt controller B24A-B24n may attempt to deliver interrupts in any desired fashion. For example, the given cluster interrupt controller B24A-B24n may serially assert interrupt requests to respective processors B30 in the processor cluster, terminated by an Ack response from one of the respective processors B30 or by a Nack response from each of the respective processors B30 to which the given cluster interrupt controller B24A-B24n is to attempt to deliver the interrupt. That is, the given cluster interrupt controller B24A-B4n may select one of respective processors B30, and assert an interrupt request to the selected processor B30 (e.g., by asserting the request to the selected processor B30). The selected processor B30 may respond with an Ack response, which may terminate the attempt. On the other hand, if the selected processor B30 asserts the Nack response, the given cluster interrupt controller B24A-B24n may be configured to select another processor B30 and may assert the interrupt request to the selected processor B30. Selection and assertion may continue until either an Ack response is received or each of the processors B30 have been selected and asserted the Nack response (excluding powered-off processors in the soft iteration). Other embodiments may assert the interrupt request to multiple processors B30 concurrently, or to the processors B30 in parallel, with the potential for spurious interrupts as mentioned above. The given cluster interrupt controller B24A-B24n may respond to the interrupt controller B20 with an Ack response based on receiving an Ack response from one of the processors B30, or may respond to the interrupt controller B20 with an Nack response if each of the processors B30 responded with a Nack response.

The order in which the interrupt controller B20 asserts interrupt requests to the cluster interrupt controllers B24A-B24n may be programmable, in an embodiment. More particularly, in an embodiment, the order may vary based on the source of the interrupt (e.g., interrupts from one interrupt source B32 may result in one order, and interrupts from another interrupt source B32 may result in a different order). For example, in an embodiment, the plurality of processors B30 in one cluster may differ from the plurality of processors B30 in another cluster. One processor cluster may have processors that are optimized for performance but may be higher power, while another processor cluster may have processors optimized for power efficiency. Interrupts from sources that require relatively less processing may favor clusters having the power efficient processors, while interrupts from sources that require significant processing may favor clusters having the higher performance processors.

The interrupt sources B32 may be any hardware circuitry that is configured to assert an interrupt in order to cause a processor B30 to execute an interrupt service routine. For example, various peripheral components (peripherals) may be interrupt sources, in an embodiment. Examples of various peripherals are described below with regard to FIG. 16. The interrupt is asynchronous to the code being executed by the processor B30 when the processor B30 receives the interrupt. Generally, the processor B30 may be configured to take an interrupt by stopping the execution of the current code, saving processor context to permit resumption of execution after servicing the interrupt, and branching to a predetermined address to begin execution of interrupt code. The code at the predetermined address may read state from the interrupt controller to determine which interrupt source B32 asserted the interrupt and a corresponding interrupt service routine that is to be executed based on the interrupt. The code may queue the interrupt service routine for execution (which may be scheduled by the operating system) and provide the data expected by the interrupt service routine. The code may then return execution to the previously executing code (e.g., the processor context may be reloaded and execution may be resumed at the instruction at which execution was halted).

Interrupts may be transmitted in any desired fashion from the interrupt sources B32 to the interrupt controller B20. For example, dedicated interrupt wires may be provided between interrupt sources and the interrupt controller B20. A given interrupt source B32 may assert a signal on its dedicated wire to transmit an interrupt to the interrupt controller B20. Alternatively, message-signaled interrupts may be used in which a message is transmitted over an interconnect that is used for other communications in the system B10. The message may be in the form of a write to a specified address, for example. The write data may be the message identifying the interrupt. A combination of dedicated wires from some interrupt sources B32 and message-signaled interrupts from other interrupt sources B32 may be used.

The interrupt controller B20 may receive the interrupts and record them as pending interrupts in the interrupt controller B20. Interrupts from various interrupt sources B32 may be prioritized by the interrupt controller B20 according to various programmable priorities arranged by the operating system or other control code.

Figure 16:
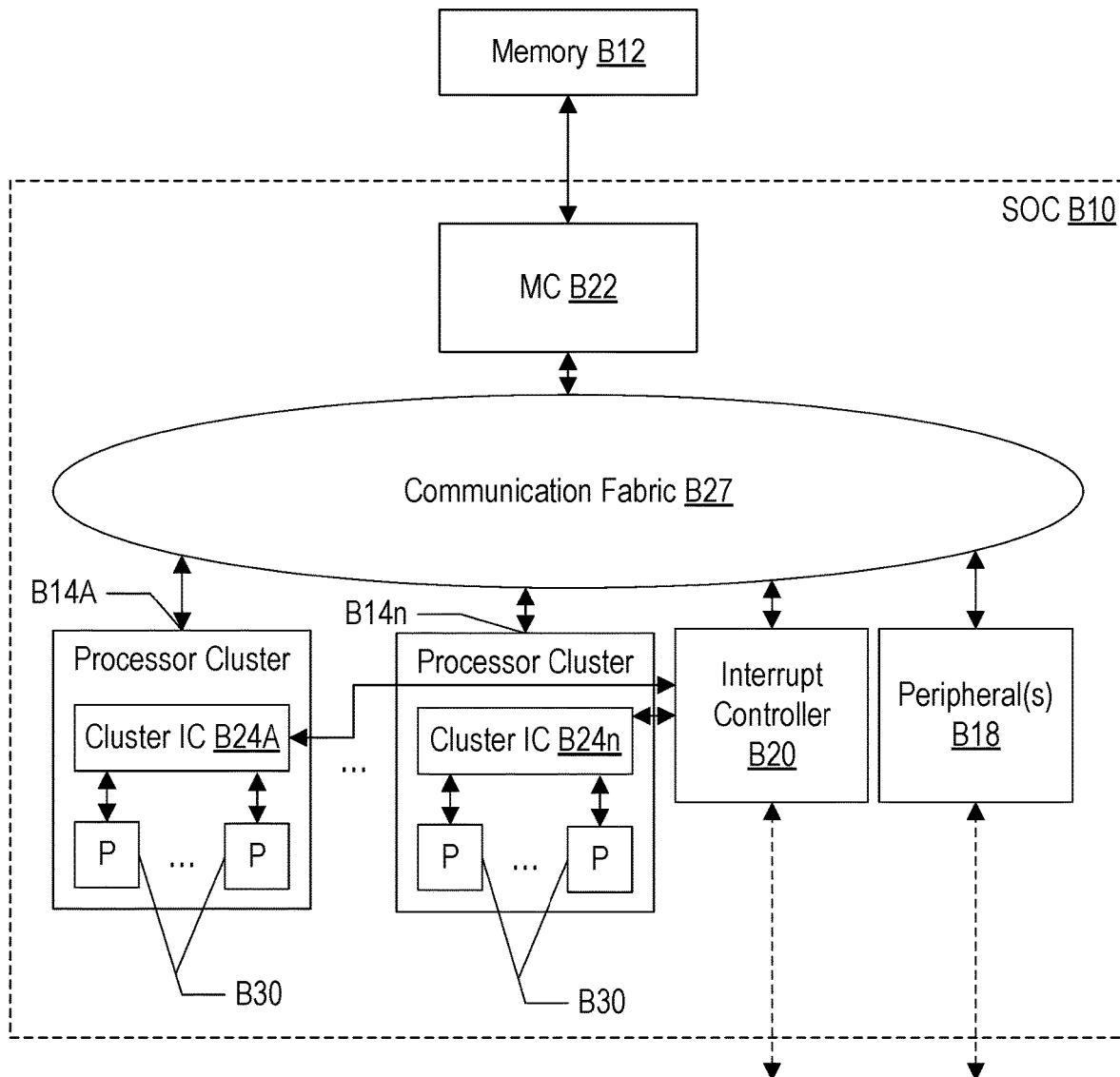
FIG. 16 is a block diagram of one embodiment of a system on a chip (SOC) that may implement one embodiment of the system shown in FIG. 15.

Turning now to FIG. 16, a block diagram one embodiment of the system B10 implemented as a system on a chip (SOC) B10 is shown coupled to a memory B12. In an embodiment, the SOC B10 may be an instance of the SOC 10 shown in FIG. 1. As implied by the name, the components of the SOC B10 may be integrated onto a single semiconductor substrate as an integrated circuit "chip." In some embodiments, the components may be implemented on two or more discrete chips in a system. However, the SOC B10 will be used as an example herein. In the illustrated embodiment, the components of the SOC B10 include a plurality of processor clusters B14A-B14n, the interrupt controller B20, one or more peripheral components B18 (more briefly, "peripherals"), a memory controller B22, and a communication fabric B27. The components BB14A-14n, B18, B20, and B22 may all be coupled to the communication fabric B27. The memory controller B22 may be coupled to the memory B12 during use. In some embodiments, there may be more than one memory controller coupled to corresponding memory. The memory address space may be mapped across the memory controllers in any desired fashion. In the illustrated embodiment, the processor clusters B14A-B14n may include the respective plurality of processors (P) B30 and the respective cluster interrupt controllers (ICs) B24A-B24n as shown in FIG. 16. The processors B30 may form the central processing units (CPU(s)) of the SOC B10. In an embodiment, one or more processor clusters B14A-B14n may not be used as CPUs.

The peripherals B18 may include peripherals that are examples of interrupt sources BB32, in an embodiment. Thus, one or more peripherals B18 may have dedicated wires to the interrupt controller B20 to transmit interrupts to the interrupt controller B20. Other peripherals B18 may use message-signaled interrupts transmitted over the communication fabric B27. In some embodiments, one or more off-SOC devices (not shown in FIG. 16) may be interrupt sources as well. The dotted line from the interrupt controller B20 to off-chip illustrates the potential for off-SOC interrupt sources.

The hard/soft/force Ack/Nack interfaces between the cluster ICs B24A-B24n shown in FIG. 15 are illustrated in FIG. 16 via the arrows between the cluster ICs B24A-B24n and the interrupt controller B20. Similarly, the Req Ack/Nack interfaces between the processors B30 and the cluster ICs B24A-B24n in FIG. 1 are illustrated by the arrows between the cluster ICs B24A-B24n and the processors B30 in the respective clusters B14A-B14n.

As mentioned above, the processor clusters B14A-B14n may include one or more processors B30 that may serve as the CPU of the SOC B10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (SOC B10) or other levels of integration. Processors may further encompass discrete microprocessors, processor cores and/or microprocessors integrated into multichip module implementations, processors implemented as multiple integrated circuits, etc.

The memory controller B22 may generally include the circuitry for receiving memory operations from the other components of the SOC B10 and for accessing the memory B12 to complete the memory operations. The memory controller B22 may be configured to access any type of memory B12. For example, the memory B12 may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller B22 may include queues for memory operations, for ordering (and potentially reordering) the operations and presenting the operations to the memory B12. The memory controller B22 may further include data buffers to store write data awaiting write to memory and read data awaiting return to the source of the memory operation. In some embodiments, the memory controller B22 may include a memory cache to store recently accessed memory data. In SOC implementations, for example, the memory cache may reduce power consumption in the SOC by avoiding reaccess of data from the memory B12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller B22.

The peripherals B18 may be any set of additional hardware functionality included in the SOC B10. For example, the peripherals 18 may include video peripherals such as an image signal processor configured to process image capture data from a camera or other image sensor, GPUs, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SOC B10 including interfaces such as Universal Serial Bus (USB), peripheral component interconnect (PCI) including PCI Express (PCIe), serial and parallel ports, etc. The interconnection to external device is illustrated by the dashed arrow in FIG. 15 that extends external to the SOC B10. The peripherals may include networking peripherals such as media access controllers (MACs). Any set of hardware may be included.

The communication fabric B27 may be any communication interconnect and protocol for communicating among the components of the SOC B10. The communication fabric B27 may be bus-based, including shared bus configurations, cross bar configurations, and hierarchical buses with bridges. The communication fabric B27 may also be packet-based, and may be hierarchical with bridges, cross bar, point-to-point, or other interconnects.

It is noted that the number of components of the SOC B10 (and the number of subcomponents for those shown in FIG. 16, such as the processors B30 in each processor cluster B14A-B14n) may vary from embodiment to embodiment. Additionally, the number of processors B30 in one processor cluster B14A-B14n may differ from the number of processors B30 in another processor cluster B14A-B14n. There may be more or fewer of each component/subcomponent than the number shown in FIG. 16.

Figure 17:
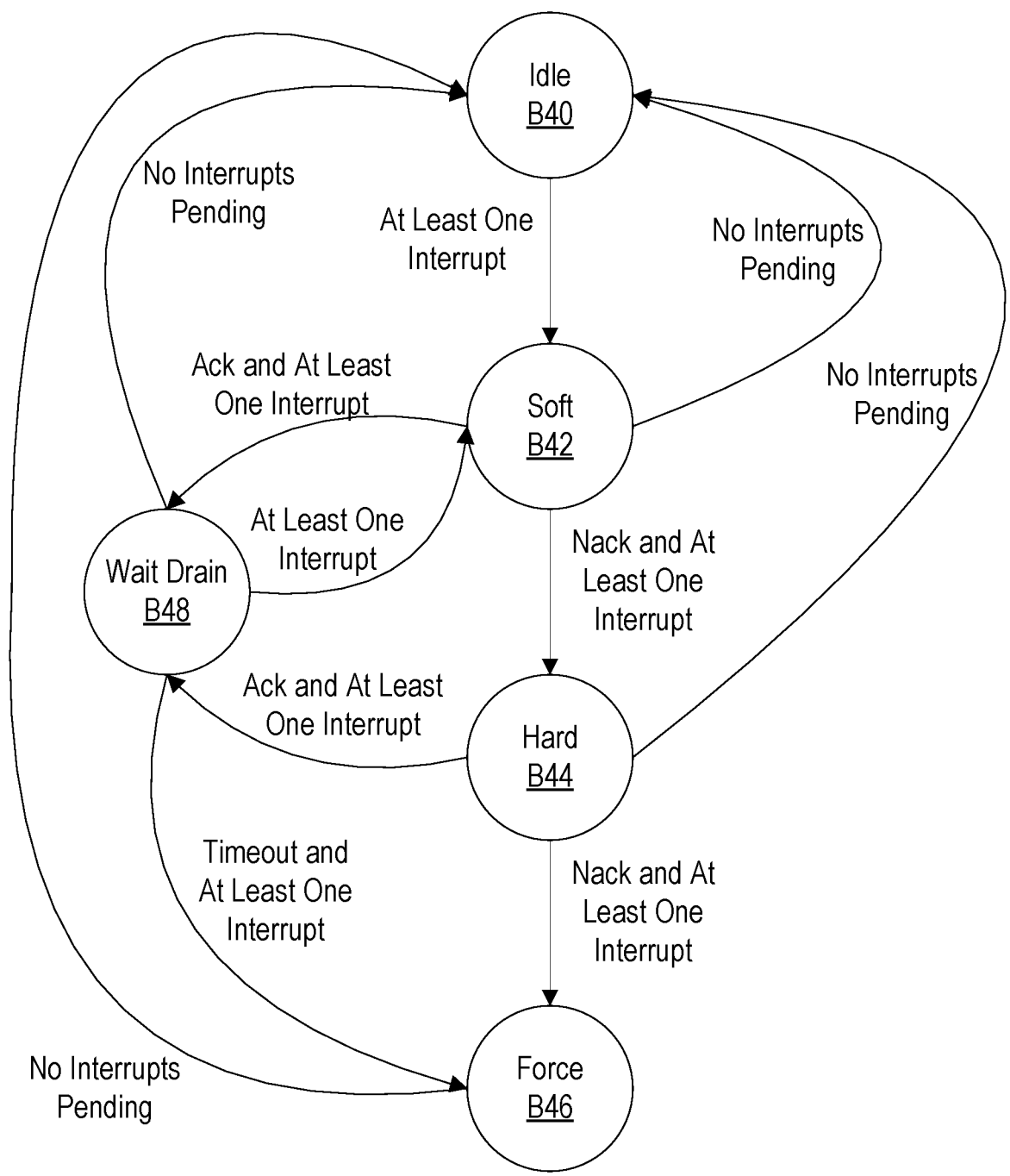
FIG. 17 is a block diagram of one embodiment of a state machine that may be implemented in one embodiment of the interrupt controller.

FIG. 17 is a block diagram illustrating one embodiment of a state machine that may be implemented by the interrupt controller B20 in an embodiment. In the illustrated embodiment, the states include an idle state B40, a soft state BB42, a hard state B44, a force state B46, and a wait drain state B48.

In the idle state B40, no interrupts may be pending. Generally, the state machine may return to the idle state B40 whenever no interrupts are pending, from any of the other states as shown in FIG. 17. When at least one interrupt has been received, the interrupt controller B20 may transition to the soft state B42. The interrupt controller B20 may also initialize a timeout counter to begin counting a timeout interval which can cause the state machine to transition to the force state B46. The timeout counter may be initialized to zero and may increment and be compared to a timeout value to detect timeout. Alternatively, the timeout counter may be initialized to the timeout value and may decrement until reaching zero. The increment/decrement may be performed each clock cycle of the clock for the interrupt controller B20, or may increment/decrement according to a different clock (e.g., a fixed frequency clock from a piezo-electric oscillator or the like).

In the soft state B42, the interrupt controller B20 may be configured initiate a soft iteration of attempting to deliver an interrupt. If one of the cluster interrupt controllers B24A-B24n transmits the Ack response during the soft iteration and there is at least one interrupt pending, the interrupt controller B20 may transition to the wait drain state B48. The wait drain state B48 may be provided because a given processor may take an interrupt, but may actually capture multiple interrupts from the interrupt controller, queueing them up for their respective interrupt service routines. The processor may continue to drain interrupts until all interrupts have been read from the interrupt controller B20, or may read up to a certain maximum number of interrupts and return to processing, or may read interrupts until a timer expires, in various embodiments. If the timer mentioned above times out and there are still pending interrupts, the interrupt controller B20 may be configured to transition to the force state B46 and initiate a force iteration for delivering interrupts. If the processor stops draining interrupts and there is at least one interrupt pending, or new interrupts are pending, the interrupt controller B20 may be configured to return to the soft state B42 and continue the soft iteration.

If the soft iteration completes with Nack responses from each cluster interrupt controller B24A-B24n (and at least one interrupt remains pending), the interrupt controller B20 may be configured to transition to the hard state B44 and may initiate a hard iteration. If a cluster interrupt controller B24A-B24n provides the Ack response during the hard iteration and there is at least one pending interrupt, the interrupt controller B20 may transition to the wait drain state B48 similar to the above discussion. If the hard iteration completes with Nack responses from each cluster interrupt controller B24A-B24n and there is at least one pending interrupt, the interrupt controller B20 may be configured to transition to the force state B46 and may initiate a force iteration. The interrupt controller B20 may remain in the force state B46 until there are no more pending interrupts.

Figure 18:
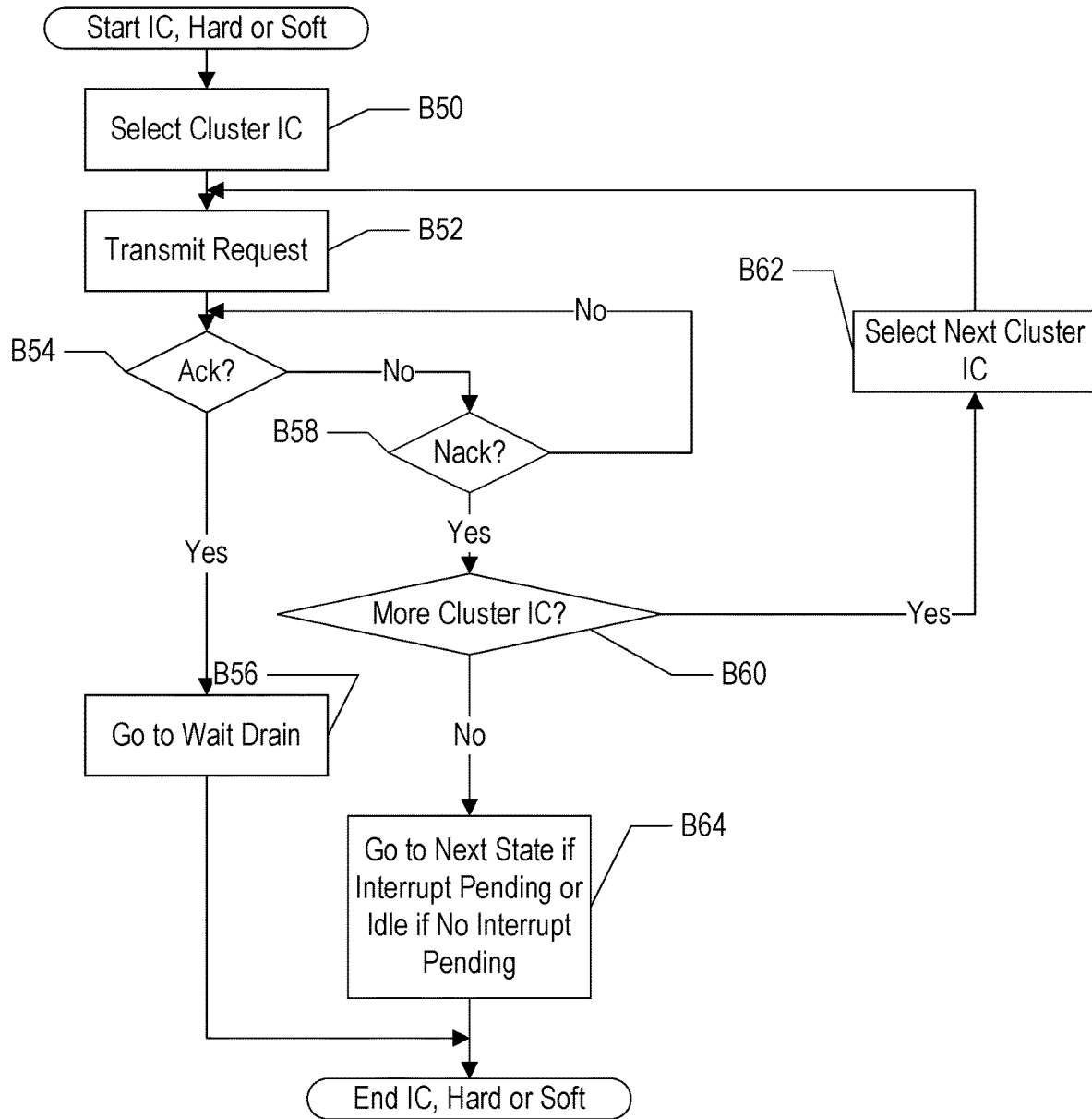
FIG. 18 is a flowchart illustrating operation of one embodiment of the interrupt controller to perform a soft or hard iteration of interrupt delivery.

FIG. 18 is a flowchart illustrating operation of one embodiment of the interrupt controller B20 when performing a soft or hard iteration (e.g., when in the states B42 or B44 in FIG. 17). While the blocks are shown in a particular order for ease of understanding, other orders may be used. Blocks may be performed in parallel in combinatorial logic circuitry in the interrupt controller B20. Blocks, combinations of blocks, and/or the flowchart as a whole may pipelined over multiple clock cycles. The interrupt controller B20 may be configured to implement the operation illustrated in FIG. 18.

The interrupt controller may be configured to select a cluster interrupt controller B24A-B24n (block B50). Any mechanism for selecting the cluster interrupt controller B24A-B24n from the plurality of interrupt controllers B24A-B24n may be used. For example, a programmable order of the cluster of interrupt controllers B24A-B24n may indicate which cluster of interrupt controllers B24A-B24n is selected. In an embodiment, the order may be based on the interrupt source of a given interrupt (e.g., there may be multiple orders available a particular order may be selected based on the interrupt source). Such an implementation may allow different interrupt sources to favor processors of a given type (e.g., performance-optimized or efficiency-optimized) by initially attempting to deliver the interrupt to processor clusters of the desired type before moving on to processor clusters of a different type. In another embodiment, a least recently delivered algorithm may be used to select the most recent cluster interrupt controller B24A-B24n (e.g., the cluster interrupt controller B24A-B24n that least recently generated an Ack response for an interrupt) to spread the interrupts across different processor clusters. In another embodiment, a most recently delivered algorithm may be used to select a cluster interrupt controller (e.g., the cluster interrupt controller B24A-B24n that most recently generated an Ack response for an interrupt) to take advantage of the possibility that interrupt code or state is still cached in the processor cluster. Any mechanism or combination of mechanisms may be used.

The interrupt controller B20 may be configured to transmit the interrupt request (hard or soft, depending on the current iteration) to the selected cluster interrupt controller B24A-B24n (block B52). For example, the interrupt controller B20 may assert a hard or soft interrupt request signal to the selected cluster interrupt controller B24A-B24n. If the selected cluster interrupt controller B24A-B24n provides an Ack response to the interrupt request (decision block B54, "yes" leg), the interrupt controller B20 may be configured to transition to the wait drain state B48 to allow the processor B30 in the processor cluster B14A-B14n associated with the selected cluster interrupt controller B24A-B24n to service one or more pending interrupts (block B56). If the selected cluster interrupt controller provides a Nack response (decision block B58, "yes" leg) and there is at least one cluster interrupt controller B24A-B24n that has not been selected in the current iteration (decision block B60, "yes" leg), the interrupt controller B20 may be configured to select the next cluster interrupt controller B24A-B24n according to the implemented selection mechanism (block B62), and return to block B52 to assert the interrupt request to the selected cluster interrupt controller B24A-B24n. Thus, the interrupt controller B20 may be configured to serially attempt to deliver the interrupt controller to the plurality of cluster interrupt controllers B24A-B24n during an iteration over the plurality of cluster interrupt controllers B24A-B24n in this embodiment. If the selected cluster interrupt controller B24A-B24n provides the Nack response (decision block B58, "yes" leg) and there are no more cluster interrupt controllers B24A-B24n remaining to be selected (e.g. all cluster interrupt controllers B24A-B24n have been selected), the cluster interrupt controller B20 may be configured to transition to the next state in the state machine (e.g. to the hard state B44 if the current iteration is the soft iteration or to the force state B46 if the current iteration is the hard iteration) (block B64). If a response has not yet been received for the interrupt request (decision blocks B54 and B58, "no" legs), the interrupt controller B20 may be configured to continue waiting for the response.

As mentioned above, there may be a timeout mechanism that may be initialized when the interrupt delivery process begins. If the timeout occurs during any state, in an embodiment, the interrupt controller B20 may be configured to move to the force state B46. Alternatively, timer expiration may only be considered in the wait drain state B48.

Figure 19:
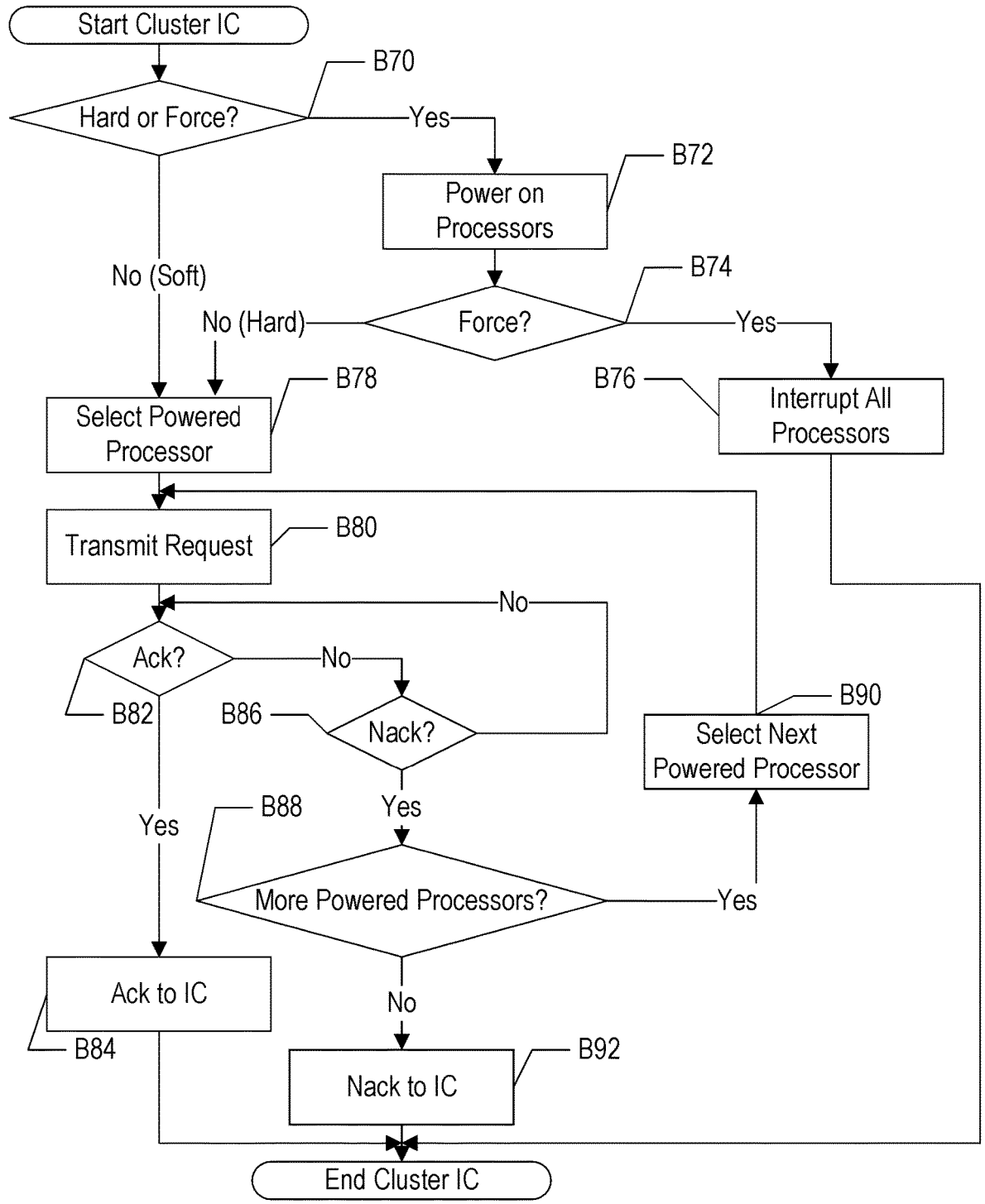
FIG. 19 is a flowchart illustrating operation of one embodiment of a cluster interrupt controller.

FIG. 19 is a flowchart illustrating operation of one embodiment of a cluster interrupt controller B24A-B24n based on an interrupt request from the interrupt controller B20. While the blocks are shown in a particular order for ease of understanding, other orders may be used. Blocks may be performed in parallel in combinatorial logic circuitry in the cluster interrupt controller B24A-B24n. Blocks, combinations of blocks, and/or the flowchart as a whole may be pipelined over multiple clock cycles. The cluster interrupt controller B24A-B24n may be configured to implement the operation illustrated in FIG. 19.

If the interrupt request is a hard or force request (decision block B70, "yes" leg), the cluster interrupt controller B24A-B24n may be configured to power up any powered-down (e.g., sleeping) processors B30 (block B72). If the interrupt request is a force interrupt request (decision block B74, "yes" leg), the cluster interrupt controller B24A-B24n may be configured to interrupt all processors in parallel B30 (block B76). Ack/Nack may not apply in the force case, so the cluster interrupt controller B24A-B24n may continue asserting the interrupt requests until at least one processor takes the interrupt. Alternatively, the cluster interrupt controller B24A-B24n may be configured to receive an Ack response from a processor indicating that it will take the interrupt, and may terminate the force interrupt and transmit an Ack response to the interrupt controller B20.

If the interrupt request is a hard request (decision block B74, "no" leg) or is a soft request (decision block B70, "no" leg), the cluster interrupt controller may be configured to select a powered-on processor B30 (block B78). Any selection mechanism may be used, similar to the mechanisms mentioned above for selecting cluster interrupt controllers B24A-B24n by the interrupt controller B20 (e.g., programmable order, least recently interrupted, most recently interrupted, etc.). In an embodiment, the order may be based on the processor IDs assigned to the processors in the cluster. The cluster interrupt controller B24A-B24n may be configured to assert the interrupt request to the selected processor B30, transmitting the request to the processor B30 (block B80). If the selected processor B30 provides the Ack response (decision block B82, "yes" leg), the cluster interrupt controller B24A-B24n may be configured to provide the Ack response to the interrupt controller B20 (block B84) and terminate the attempt to deliver the interrupt within the processor cluster. If the selected processor 30 provides the Nack response (decision block B86, "yes" leg) and there is at least one powered-on processor B30 that has not been selected yet (decision block B88, "yes" leg), the cluster interrupt controller B24A-B24n may be configured to select the next powered-on processor (e.g., according to the selection mechanism described above) (block B90) and assert the interrupt request to the selected processor B30 (block B80). Thus, the cluster interrupt controller B24A-B24n may serially attempt to deliver the interrupt to the processors B30 in the processor cluster. If there are no more powered-on processors to select (decision block B88, "no" leg), the cluster interrupt controller B24A-B24n may be configured to provide the Nack response to the interrupt controller B20 (block B92). If the selected processor B30 has not yet provided a response (decision blocks B82 and B86, "no" legs), the cluster interrupt controller B24A-B24n may be configured to wait for the response.

In an embodiment, in a hard iteration, if a processor B30 has been powered-on from the powered-off state then it may be quickly available for an interrupt since it has not yet been assigned a task by the operating system or other controlling software. The operating system may be configured to unmask interrupts in processor B30 that has been powered-on from a powered-off state as soon as practical after initializing the processor. The cluster interrupt controller B24A-B24n may select a recently powered-on processor first in the selection order to improve the likelihood that the processor will provide an Ack response for the interrupt.

Figure 20:
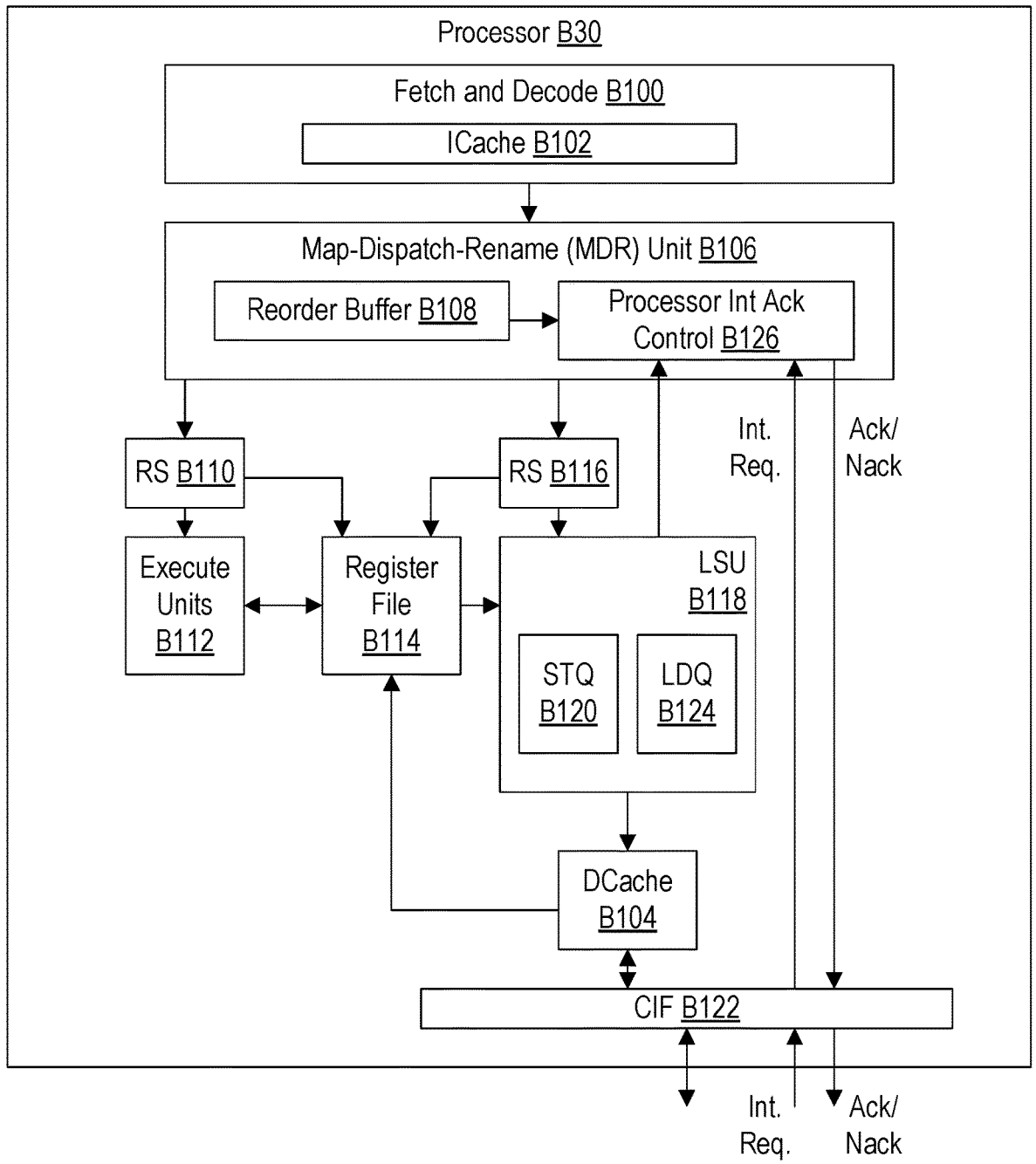
FIG. 20 is a block diagram of one embodiment of a processor.

FIG. 20 is a block diagram of one embodiment of a processor B30 in more detail. In the illustrated embodiment, the processor B30 includes a fetch and decode unit B100 (including an instruction cache, or ICache, B102), a map-dispatch-rename (MDR) unit B106 (including a processor interrupt acknowledgement (Int Ack) control circuit B126 and a reorder buffer B108), one or more reservation stations B110, one or more execute units B112, a register file B114, a data cache (DCache) B104, a load/store unit (LSU) B118, a reservation station (RS) for the load/store unit B116, and a core interface unit (CIF) B122. The fetch and decode unit B100 is coupled to the MDR unit B106, which is coupled to the reservation stations B110, the reservation station B116, and the LSU B118. The reservation stations B110 are coupled to the execution units B28. The register file B114 is coupled to the execute units B112 and the LSU B118. The LSU B118 is also coupled to the DCache B104, which is coupled to the CIF B122 and the register file B114. The LSU B118 includes a store queue B120 (STQ B120) and a load queue (LDQ B124). The CIF B122 is coupled to the processor Int Ack control circuit BB126 to convey and interrupt request (Int Req) asserted to the processor B30 and to convey an Ack/Nack response from the processor Int Ack control circuit B126 to the interrupt requester (e.g., a cluster interrupt controller B24A-B24n).

The processor Int Ack control circuit B126 may be configured to determine whether or not the processor B30 may accept an interrupt request transmitted to the processor B30, and may provide Ack and Nack indications to the CIF B122 based on the determination. If the processor B30 provides the Ack response, the processor B30 is committing to taking the interrupt (and starting execution of the interrupt code to identify the interrupt and the interrupt source) within a specified period of time. That is, the processor Int Ack control circuit B126 may be configured to generate an acknowledge (Ack) response to the interrupt request received based on a determination that the reorder buffer B108 will retire instruction operations to an interruptible point and the LSU B118 will complete load/store operations to the interruptible point within the specified period of time. If the determination is that at least one of the reorder buffer B108 and the LSU B118 will not reach (or might not reach) the interruptible point within the specified period of time, the processor Int Ack control circuit B126 may be configured to generate a non-acknowledge (Nack) response to the interrupt request. For example, the specified period of time may be on the order of 5 microseconds in one embodiment, but may be longer or shorter in other embodiments.

In an embodiment, the processor Int Ack control circuit B126 may be configured to examine the contents of the reorder buffer 108 to make an initial determination of Ack/Nack. That is, there may be one or more cases in which the processor Int Ack control circuit B126 may be able to determine that the Nack response will be generated based on state within the MDR unit B106. For example, the reorder buffer B108 includes one or more instruction operations that have not yet executed and that have a potential execution latency greater than a certain threshold, the processor Int Ack control circuit B126 may be configured to determine that the Nack response is to be generated. The execution latency is referred to as "potential" because some instruction operations may have a variable execution latency that may be data dependent, memory latency dependent, etc. Thus, the potential execution latency may be the longest execution latency that may occur, even if it does not always occur. In other cases, the potential execution latency may be the longest execution latency that occurs above a certain probability, etc. Examples of such instructions may include certain cryptographic acceleration instructions, certain types of floating point or vector instructions, etc. The instructions may be considered potentially long latency if the instructions are not interruptible. That is, the uninterruptible instructions are required to complete execution once they begin execution.

Another condition that may be considered in generating the Ack/Nack response is the state of interrupt masking in the processor 30. When interrupts are masked, the processor B30 is prevented from taking interrupts. The Nack response may be generated if the processor Int Ack control circuit B126 detects that interrupts are masked in the processor (which may be state maintained in the MDR unit B106 in one embodiment). More particularly, in an embodiment, the interrupt mask may have an architected current state corresponding to the most recently retired instructions and one or more speculative updates to the interrupt mask may be queued as well. In an embodiment, the Nack response may be generated if the architected current state is that interrupts are masked. In another embodiment, the Nack response may be generated if the architected current state is that interrupts are masked, or if any of the speculative states indicate that interrupts are masked.

Other cases may be considered Nack response cases as well in the processor Int Ack control circuit B126. For example, if there is a pending redirect in the reorder buffer that is related to exception handling (e.g., no microarchitectural redirects like branch mispredictions or the like), a Nack response may be generated. Certain debug modes (e.g., single step mode) and high priority internal interrupts may be considered Nack response cases.

If the processor Int Ack control circuit B126 does not detect a Nack response based on examining the reorder buffer B108 and the processor state in the MDR unit B106, the processor Int Ack control circuit B126 may interface with the LSU B118 to determine if there are long-latency load/store ops that have been issued (e.g., to the CIF B122 or external to the processor B30) and that have not completed yet coupled to the reorder buffer and the load/store unit. For example, loads and stores to device space (e.g., loads and stores that are mapped to peripherals instead of memory) may be potentially long-latency. If the LSU B118 responds that there are long-latency load/store ops (e.g., potentially greater than a threshold, which may be different from or the same as the above-mentioned threshold used internal to the MDR unit B106), then the processor Int Ack control circuit B126 may determine that the response is to be Nack. Other potentially-long latency ops may be synchronization barrier operations, for example.

In one embodiment, if the determination is not the Nack response for the above cases, the LSU B118 may provide a pointer to the reorder buffer B108, identifying an oldest load/store op that the LSU B118 is committed to completing (e.g., it has been launched from the LDQ B124 or the STQ B120, or is otherwise non-speculative in the LSU B118). The pointer may be referred to as the "true load/store (LS) non-speculative (NS) pointer." The MDR B106/reorder buffer B108 may attempt to interrupt at the LS NS pointer, and if it is not possible within the specified time period, the processor Int Ack control circuit B126 may determine that the Nack response is to be generated. Otherwise, the Ack response may be generated.

The fetch and decode unit B100 may be configured to fetch instructions for execution by the processor B30 and decode the instructions into ops for execution. More particularly, the fetch and decode unit B100 may be configured to cache instructions previously fetched from memory (through the CIF B122) in the ICache B102, and may be configured to fetch a speculative path of instructions for the processor B30. The fetch and decode unit B100 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. The fetch and decode unit 100 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor B30 may be decoded into a single instruction operation, and thus the instruction operation may be essentially synonymous with instruction (although it may be modified in form by the decoder). The term "instruction operation" may be more briefly referred to herein as "op."

The MDR unit B106 may be configured to map the ops to speculative resources (e.g., physical registers) to permit out-of-order and/or speculative execution, and may dispatch the ops to the reservation stations B110 and B116. The ops may be mapped to physical registers in the register file B114 from the architectural registers used in the corresponding instructions. That is, the register file B114 may implement a set of physical registers that may be greater in number than the architected registers specified by the instruction set architecture implemented by the processor B30. The MDR unit B106 may manage the mapping of the architected registers to physical registers. There may be separate physical registers for different operand types (e.g., integer, media, floating point, etc.) in an embodiment. In other embodiments, the physical registers may be shared over operand types. The MDR unit B106 may also be responsible for tracking the speculative execution and retiring ops or flushing misspeculated ops. The reorder buffer B108 may be used to track the program order of ops and manage retirement/flush. That is, the reorder buffer B108 may be configured to track a plurality of instruction operations corresponding to instructions fetched by the processor and not retired by the processor.

Ops may be scheduled for execution when the source operands for the ops are ready. In the illustrated embodiment, decentralized scheduling is used for each of the execution units B28 and the LSU B118, e.g., in reservation stations B116 and B110. Other embodiments may implement a centralized scheduler if desired.

The LSU B118 may be configured to execute load/store memory ops. Generally, a memory operation (memory op) may be an instruction operation that specifies an access to memory (although the memory access may be completed in a cache such as the DCache B104). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. In an embodiment, store ops may be executed as a store address op and a store data op. The store address op may be defined to generate the address of the store, to probe the cache for an initial hit/miss determination, and to update the store queue with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data. In some embodiments, it may be possible for the store data op to be executed before the corresponding store address op, e.g., if the store data operand is provided before one or more of the store address operands. While store ops may be executed as store address and store data ops in some embodiments, other embodiments may not implement the store address/store data split. The remainder of this disclosure will often use store address ops (and store data ops) as an example, but implementations that do not use the store address/store data optimization are also contemplated. The address generated via execution of the store address op may be referred to as an address corresponding to the store op.

Load/store ops may be received in the reservation station B116, which may be configured to monitor the source operands of the operations to determine when they are available and then issue the operations to the load or store pipelines, respectively. Some source operands may be available when the operations are received in the reservation station B116, which may be indicated in the data received by the reservation station B116 from the MDR unit B106 for the corresponding operation. Other operands may become available via execution of operations by other execution units B112 or even via execution of earlier load ops. The operands may be gathered by the reservation station B116, or may be read from a register file B114 upon issue from the reservation station B116 as shown in FIG. 20.

In an embodiment, the reservation station B116 may be configured to issue load/store ops out of order (from their original order in the code sequence being executed by the processor B30, referred to as "program order") as the operands become available. To ensure that there is space in the LDQ B124 or the STQ B120 for older operations that are bypassed by younger operations in the reservation station B116, the MDR unit B106 may include circuitry that preallocates LDQ B124 or STQ B120 entries to operations transmitted to the load/store unit B118. If there is not an available LDQ entry for a load being processed in the MDR unit B106, the MDR unit B106 may stall dispatch of the load op and subsequent ops in program order until one or more LDQ entries become available. Similarly, if there is not a STQ entry available for a store, the MDR unit B106 may stall op dispatch until one or more STQ entries become available. In other embodiments, the reservation station B116 may issue operations in program order and LRQ B46/STQ B120 assignment may occur at issue from the reservation station B116.

The LDQ B124 may track loads from initial execution to retirement by the LSU B118. The LDQ B124 may be responsible for ensuring the memory ordering rules are not violated (between out of order executed loads, as well as between loads and stores). If a memory ordering violation is detected, the LDQ B124 may signal a redirect for the corresponding load. A redirect may cause the processor B30 to flush the load and subsequent ops in program order, and refetch the corresponding instructions. Speculative state for the load and subsequent ops may be discarded and the ops may be refetched by the fetch and decode unit B100 and reprocessed to be executed again.

When a load/store address op is issued by the reservation station B116, the LSU B118 may be configured to generate the address accessed by the load/store, and may be configured to translate the address from an effective or virtual address created from the address operands of the load/store address op to a physical address actually used to address memory. The LSU B118 may be configured to generate an access to the DCache B104. For load operations that hit in the DCache B104, data may be speculatively forwarded from the DCache B104 to the destination operand of the load operation (e.g., a register in the register file B114), unless the address hits a preceding operation in the STQ B120 (that is, an older store in program order) or the load is replayed. The data may also be forwarded to dependent ops that were speculatively scheduled and are in the execution units B28. The execution units B28 may bypass the forwarded data in place of the data output from the register file B114, in such cases. If the store data is available for forwarding on a STQ hit, data output by the STQ B120 may forwarded instead of cache data. Cache misses and STQ hits where the data cannot be forwarded may be reasons for replay and the load data may not be forwarded in those cases. The cache hit/miss status from the DCache B104 may be logged in the STQ B120 or LDQ B124 for later processing.

The LSU B118 may implement multiple load pipelines. For example, in an embodiment, three load pipelines ("pipes") may be implemented, although more or fewer pipelines may be implemented in other embodiments. Each pipeline may execute a different load, independent and in parallel with other loads. That is, the RS B116 may issue any number of loads up to the number of load pipes in the same clock cycle. The LSU B118 may also implement one or more store pipes, and in particular may implement multiple store pipes. The number of store pipes need not equal the number of load pipes, however. In an embodiment, for example, two store pipes may be used. The reservation station B116 may issue store address ops and store data ops independently and in parallel to the store pipes. The store pipes may be coupled to the STQ B120, which may be configured to hold store operations that have been executed but have not committed.

The CIF B122 may be responsible for communicating with the rest of a system including the processor B30, on behalf of the processor B30. For example, the CIF B122 may be configured to request data for DCache B104 misses and ICache B102 misses. When the data is returned, the CIF B122 may signal the cache fill to the corresponding cache. For DCache fills, the CIF B122 may also inform the LSU B118. The LDQ B124 may attempt to schedule replayed loads that are waiting on the cache fill so that the replayed loads may forward the fill data as it is provided to the DCache B104 (referred to as a fill forward operation). If the replayed load is not successfully replayed during the fill, the replayed load may subsequently be scheduled and replayed through the DCache B104 as a cache hit. The CIF B122 may also writeback modified cache lines that have been evicted by the DCache B104, merge store data for non-cacheable stores, etc.

The execution units B112 may include any types of execution units in various embodiments. For example, the execution units B112 may include integer, floating point, and/or vector execution units. Integer execution units may be configured to execute integer ops. Generally, an integer op is an op which performs a defined operation (e.g., arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g., base 2, in an embodiment).

Vector execution units may be configured to execute vector ops. Vector ops may be used, e.g., to process media data (e.g., image data such as pixels, audio data, etc.). Media processing may be characterized by performing the same processing on significant amounts of data, where each datum is a relatively small value (e.g., 8 bits, or 16 bits, compared to 32 bits to 64 bits for an integer). Thus, vector ops include single instruction-multiple data (SIMD) or vector operations on an operand that represents multiple media data.

Thus, each execution unit B112 may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of depend ops occurs based on a load op may vary based on the type of op and execution unit B28 that will be executing the op.

It is noted that any number and type of execution units B112 may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g., 32 bytes, 64 bytes, 128 bytes, or larger or smaller cache lines). Different caches may have different cache line sizes. The ICache B102 and DCache B104 may each be a cache having any desired capacity, cache line size, and configuration. There may be more additional levels of cache between the DCache B104/ICache B102 and the main memory, in various embodiments.

At various points, load/store operations are referred to as being younger or older than other load/store operations. A first operation may be younger than a second operation if the first operation is subsequent to the second operation in program order. Similarly, a first operation may be older than a second operation if the first operation precedes the second operation in program order.

Figure 21:
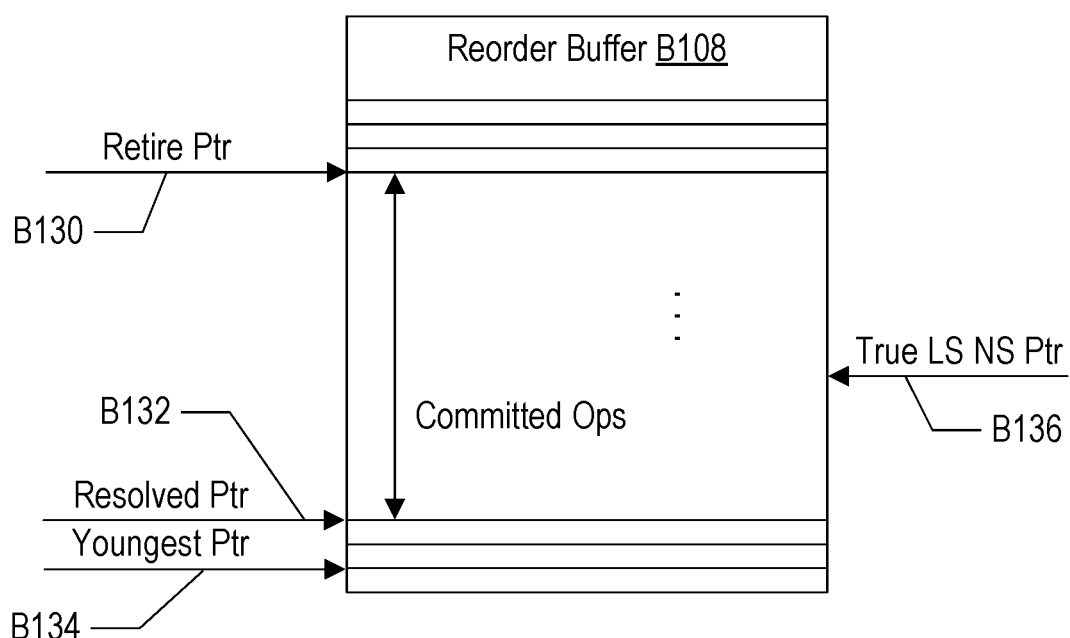
FIG. 21 is a block diagram of one embodiment of a reorder buffer.

FIG. 21 is a block diagram of one embodiment of the reorder buffer B108. In the illustrated embodiment, the reorder buffer 108 includes a plurality of entries. Each entry may correspond to an instruction, an instruction operation, or a group of instruction operations, in various embodiments. Various state related to the instruction operations may be stored in the reorder buffer (e.g., target logical and physical registers to update the architected register map, exceptions or redirects detected during execution, etc.).

Several pointers are illustrated in FIG. 21. The retire pointer B130 may point to the oldest non-retired op in the processor B30. That is, ops prior to the op at the retire B130 have been retired from the reorder buffer B108, the architected state of the processor B30 has been updated to reflect execution of the retired ops, etc. The resolved pointer B132 may point to the oldest op for which preceding branch instructions have been resolved as correctly predicted and for which preceding ops that might cause an exception have been resolved to not cause an exception. The ops between the retire pointer B130 and the resolve pointer B132 may be committed ops in the reorder buffer B108. That is, the execution of the instructions that generated the ops will complete to the resolved pointer B132 (in the absence of external interrupts). The youngest pointer B134 may point to the mostly recently fetched and dispatched op from the MDR unit B106. Ops between the resolved pointer B132 and the youngest pointer B134 are speculative and may be flushed due to exceptions, branch mispredictions, etc.

The true LS NS pointer B136 is the true LS NS pointer described above. The true LS NS pointer may only be generated when an interrupt request has been asserted and the other tests for Nack response have been negative (e.g., an Ack response is indicated by those tests). The MDR unit B106 may attempt to move the resolved pointer B132 back to the true LS NS pointer B136. There may be committed ops in the reorder buffer B108 that cannot be flushed (e.g., once they are committed, they must be completed and retired). Some groups of instruction operations may not be interruptible (e.g., microcode routines, certain uninterruptible exceptions, etc.). In such cases, the processor Int Ack controller B126 may be configured to generate the Nack response. There may be ops, or combinations of ops, that are too complex to "undo" in the processor B30, and the existence of such ops in between the resolve pointer and the true LS NS pointer B136 may cause the processor Int Ack controller B126 to generate the Nack response. If the reorder buffer B108 is successful in moving the resolve pointer back to the true LS NS pointer B136, the processor Int Ack control circuit B126 may be configured to generate the Ack response.

Figure 22:
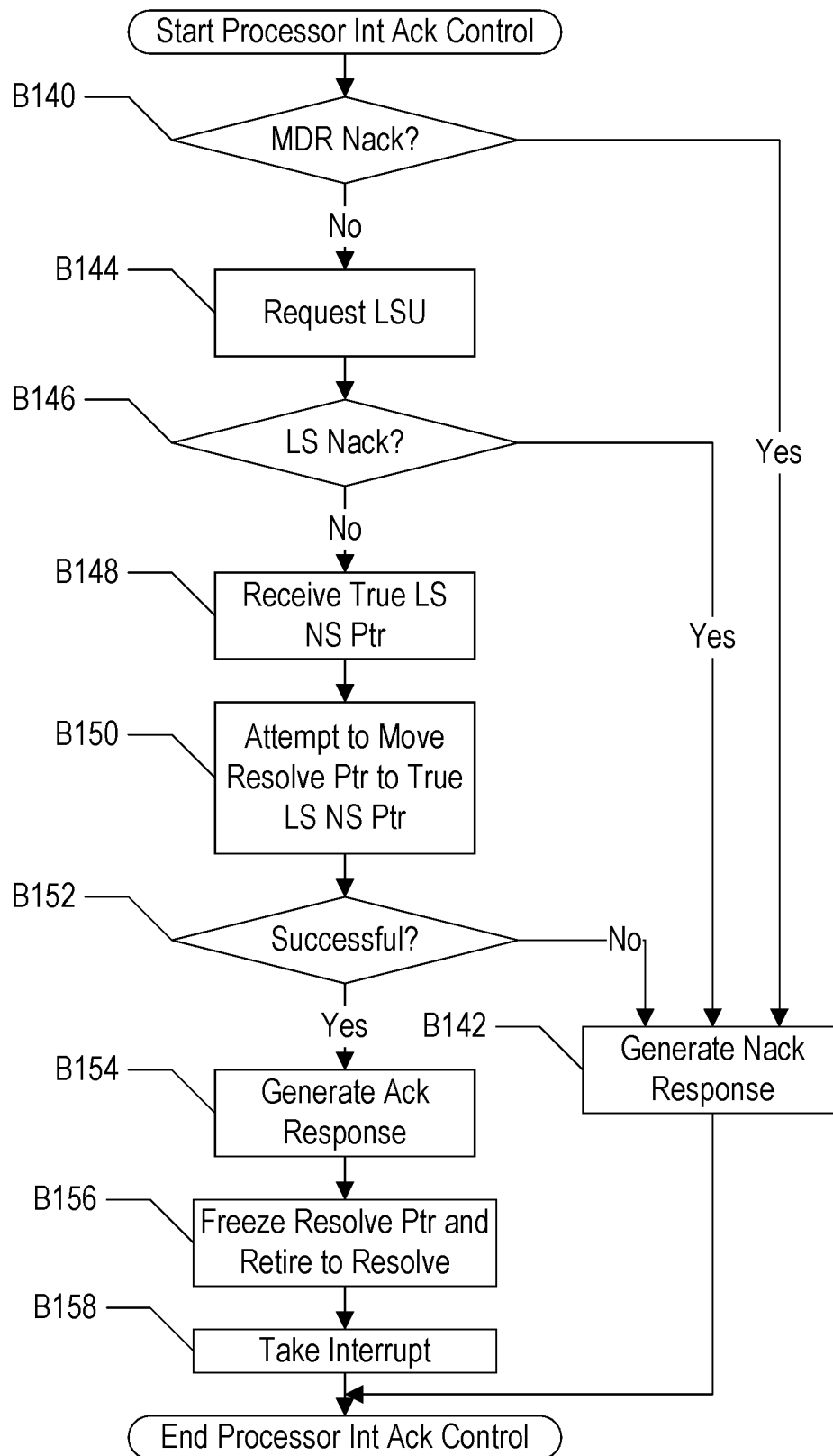
FIG. 22 is a flowchart illustrating operation of one embodiment of an interrupt acknowledgement control circuit shown in FIG. 20.

FIG. 22 is a flowchart illustrating operation of one embodiment of the processor Int Ack control circuit B126 based on receipt of an interrupt request by the processor B30. While the blocks are shown in a particular order for ease of understanding, other orders may be used. Blocks may be performed in parallel in combinatorial logic circuitry in the processor Int Ack control circuit B126. Blocks, combinations of blocks, and/or the flowchart as a whole may pipelined over multiple clock cycles. The processor Int Ack control circuit B126 may be configured to implement the operation illustrated in FIG. 22.

The processor Int Ack control circuit B126 may be configured to determine if there are any Nack conditions detected in the MDR unit B106 (decision block B140). For example, potentially long-latency operations that have not completed, interrupts are masked, etc. may be Nack conditions detected in the MDR unit B106. If so (decision block B140, "yes" leg), the processor Int Ack control circuit B126 may be configured to generate the Nack response (block B142). If not (decision block B140, "no" leg), the processor Int Ack control circuit B126 may communicate with the LSU to request Nack conditions and/or the true LS NS pointer (block B144). If the LSU B118 detects a Nack condition (decision block B146, "yes" leg), the processor Int Ack control circuit B126 may be configured to generate the Nack response (block B142). If the LSU B118 does not detect a Nack condition (decision block B146, "no" leg), the processor Int Ack control circuit B126 may be configured to receive the true LS NS pointer from the LSU B118 (block B148) and may attempt to move the resolve pointer in the reorder buffer B108 back to the true LS NS pointer (block B150). If the move is not successful (e.g., there is at least one instruction operation between the true LS NS pointer and the resolve pointer that cannot be flushed) (decision block B152, "no" leg), the processor Int Ack control circuit B126 may be configured to generate the Nack response (block B142). Otherwise (decision block B152, "yes" leg), the processor Int Ack control circuit B126 may be configured to generate the Ack response (block B154). The processor Int Ack control circuit B126 may be configured to freeze the resolve pointer at the true LS NS pointer, and retire ops until the retire pointer reaches the resolve pointer (block B156). The processor Int Ack control circuit B126 may then be configured to take the interrupt (block B158). That is, the processor B30 may begin fetching the interrupt code (e.g., from a predetermined address associate with interrupts according to instruction set architecture implemented by the processor B30).

In another embodiment, the SOC B10 may be one of the SOCs in a system. More particularly, in one embodiment, multiple instances of the SOC B10 may be employed. Other embodiments may have asymmetrical SOCs. Each SOC may be a separate integrated circuit chip (e.g., implemented on a separate semiconductor substrate or "die"). The die may be packaged and connected to each other via an interposer, package on package solution, or the like. Alternatively, the die may be packaged in a chip-on-chip package solution, a multichip module, etc.

Figure 23:
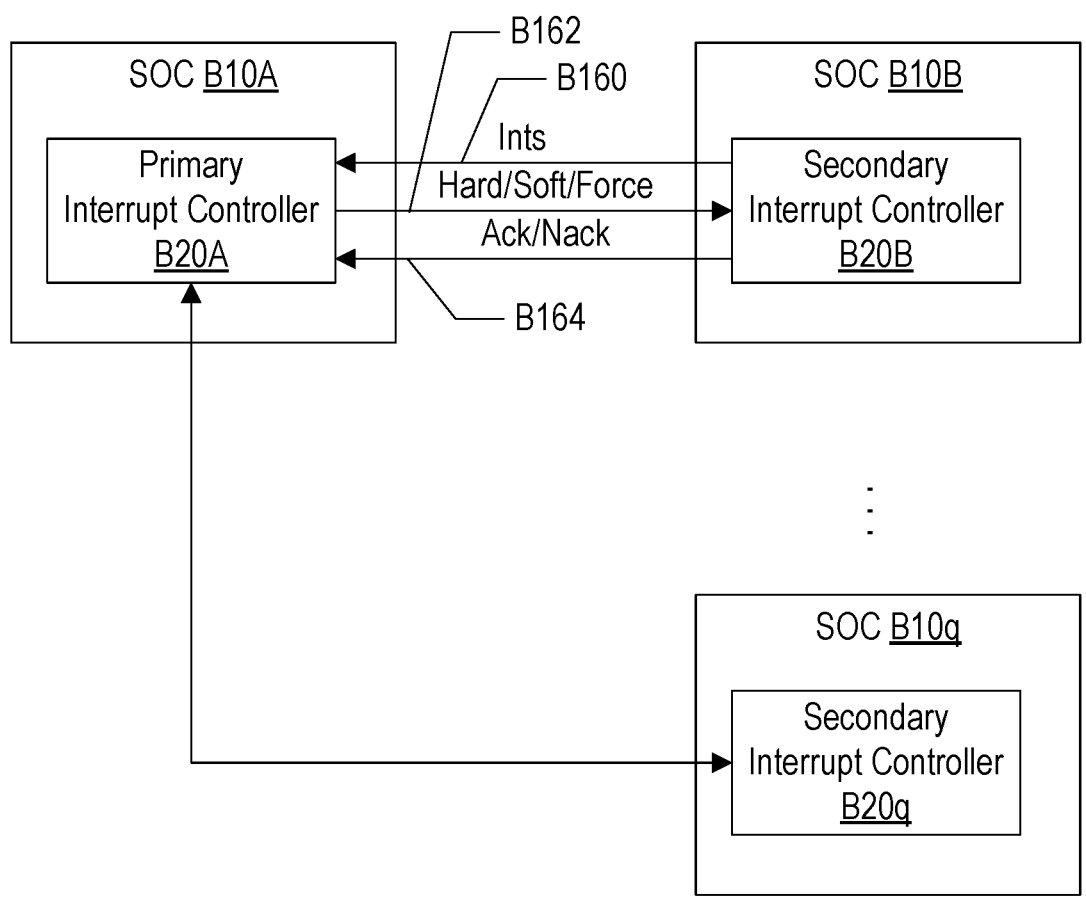
FIG. 23 is a block diagram of a plurality of SOCs that may implement one embodiment of the system shown in FIG. 15.

FIG. 23 is a block diagram illustrating one embodiment of a system including multiple instances of the SOC B10. For example, the SOC B10A, the SOC B10B, etc. to the SOC B10$q$ may be coupled together in a system. Each SOC B10A-B10$q$ includes an instance of the interrupt controller B20 (e.g., interrupt controller B20A, interrupt controller B20B, and interrupt controller B20$q$ in FIG. 23). One interrupt controller, interrupt controller B20A in this example, may serve as the primary interrupt controller for the system. Other interrupt controllers B20B to B20$q$ may serve as secondary interrupt controllers.

The interface between the primary interrupt controller B20A and the secondary controller B20B is shown in more detail in FIG. 23, and the interface between the primary interrupt controller B20A and other secondary interrupt controllers, such as the interrupt controller B20$q$, may be similar. In the embodiment of FIG. 23, the secondary controller B20B is configured to provide interrupt information identifying interrupts issued from interrupt sources on the SOC B10B (or external devices coupled to the SOC B10B, not shown in FIG. 23) as Ints B160. The primary interrupt controller B20A is configured to signal hard, soft, and force iterations to the secondary interrupt controller 20B (reference numeral B162) and is configured to receive Ack/Nack responses from the interrupt controller B20B (reference numeral B164). The interface may be implemented in any fashion. For example, dedicated wires may be coupled between the SOC B10A and the SOC B10B to implement reference numerals B160, B162, and/or B164. In another embodiment, messages may be exchanged between the primary interrupt controller B20A and the secondary interrupt controllers B20B-B20$q$ over a general interface between the SOCs B10A-B10$q$ that is also used for other communications. In an embodiment, programmed input/ output (PIO) writes may be used with the interrupt data, hard/soft/force requests, and Ack/Nack responses as data, respectively.

The primary interrupt controller B20A may be configured to collect the interrupts from various interrupt sources, which may be on the SOC B10A, one of the other SOCs B10B-B10q, which may be off-chip devices, or any combination thereof. The secondary interrupt controllers B20B-B20q may be configured to transmit interrupts to the primary interrupt controller B20A (Ints in FIG. 23), identifying the interrupt source to the primary interrupt controller B20A. The primary interrupt controller B20A may also be responsible for ensuring the delivery of interrupts. The secondary interrupt controllers B20B-B20q may be configured to take direction from the primary interrupt controller B20A, receiving soft, hard, and force iteration requests from the primary interrupt controller B20A and performing the iterations over the cluster interrupt controllers B24A-B24n embodied on the corresponding SOC B10B-B10q. Based on the Ack/Nack responses from the cluster interrupt controllers B24A-B24n, the secondary interrupt controllers B20B-B20q may provide Ack/Nack responses. In an embodiment, the primary interrupt controller B20A may serially attempt to deliver interrupts over the secondary interrupt controllers B20B-B20q in the soft and hard iterations, and may deliver in parallel to the secondary interrupt controllers B20B-B20q in the force iteration.

In an embodiment, the primary interrupt controller B20A may be configured to perform a given iteration on a subset of the cluster interrupt controllers that are integrated into the same SOC B10A as the primary interrupt controller B20A prior to performing the given iteration on subsets of the cluster interrupt controllers on other SOCs B10B-B10q (with the assistance of the secondary interrupt controllers B20B-B20q) on other SOCs BB10-B10q. That is the primary interrupt controller B20A may serially attempt to deliver the interrupt through the cluster interrupt controllers on the SOC B10A, and then may communicate to the secondary interrupt controllers BB20B-20q. The attempts to deliver through the secondary interrupt controllers B20B-B20q may be performed serially as well. The order of attempts through the secondary interrupt controllers BB20-B20q may be determined in any desire fashion, similar to the embodiments described above for cluster interrupt controllers and processors in a cluster (e.g., programmable order, most recently accepted, least recently accepted, etc.). Accordingly, the primary interrupt controller B20A and secondary interrupt controllers B20B-B20q may largely insulate the software from the existence of the multiple SOCs B10A-B10q. That is, the SOCs B10A-B10q may be configured as a single system that is largely transparent to software execution on the single system. During system initialization, some embodiments may be programmed to configure the interrupt controllers B20A-B20q as discussed above, but otherwise the interrupt controllers B20A-B20q may manage the delivery of interrupts across possibly multiple SOCs B10A-B10q, each on a separate semiconductor die, without software assistance or particular visibility of software to the multiple-die nature of the system. For example, delays due to inter-die communication may be minimized in the system. Thus, during execution after initialization, the single system may appear to software as a single system and the multi-die nature of the system may be transparent to software.

It is noted that the primary interrupt controller B20A and the secondary interrupt controllers B20B-B20q may operate in a manner that is also referred to as "master" (i.e., primary) and "slave" (i.e., secondary) by those of skill in the art. While the primary/secondary terminology is used herein, it is expressly intended that the terms "primary" and "secondary" be interpreted to encompass these counterpart terms.

In an embodiment, each instance of the SOC B10A-B10q may have both the primary interrupt controller circuitry and the secondary interrupt controller circuitry implemented in its interrupt controller B20A-B20q. One interrupt controller (e.g., interrupt controller B20A) may be designated the primary during manufacture of the system (e.g., via fuses on the SOCs B10A-B10q, or pin straps on one or more pins of the SOCs B10A-B10q). Alternatively, the primary and secondary designations may be made during initialization (or boot) configuration of the system.

Figure 24:
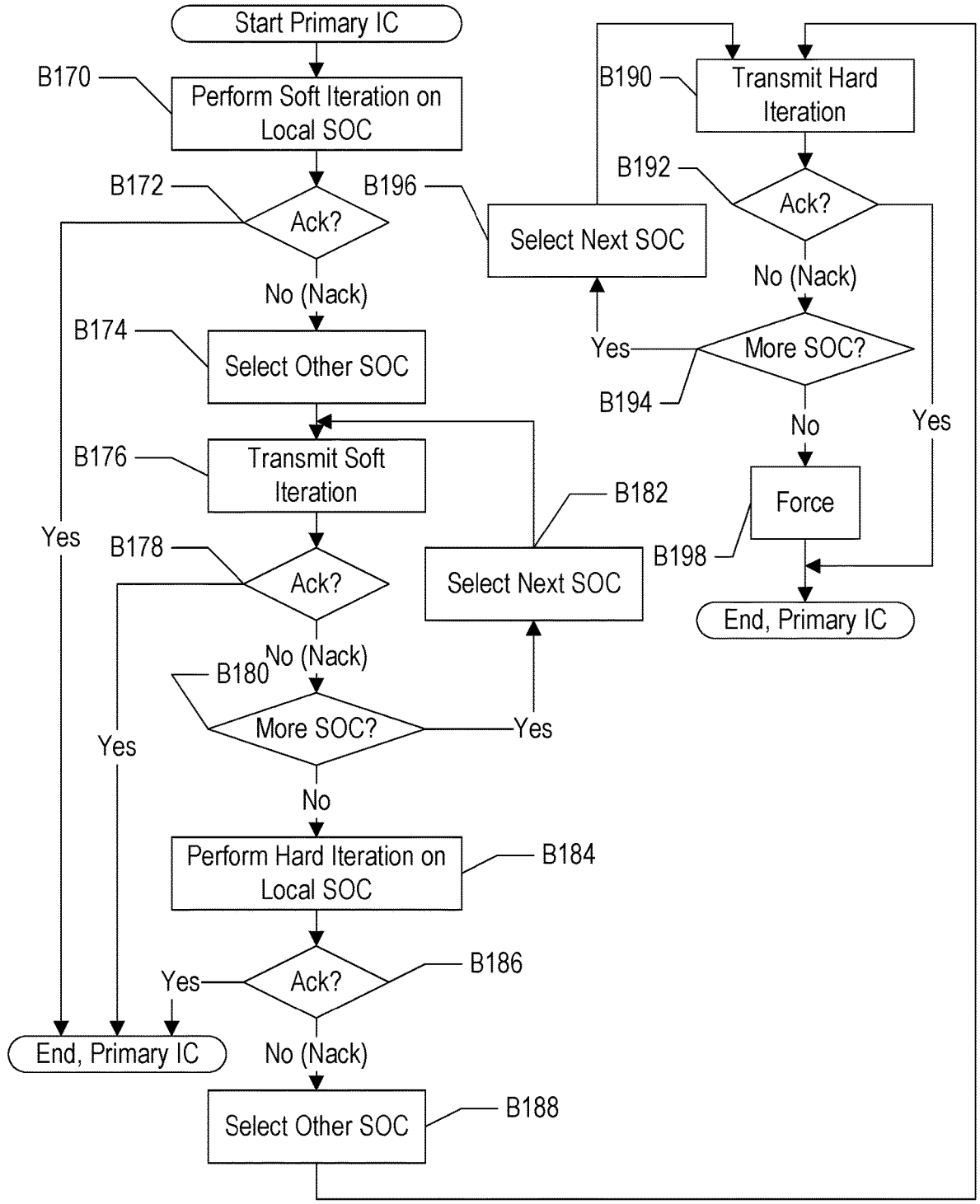
FIG. 24 is a flowchart illustrating operation of one embodiment of a primary interrupt controller shown in FIG. 23.

FIG. 24 is a flowchart illustrating operation of one embodiment of the primary interrupt controller B20A based on receipt of one or more interrupts from one or more interrupt sources. While the blocks are shown in a particular order for ease of understanding, other orders may be used. Blocks may be performed in parallel in combinatorial logic circuitry in the primary interrupt controller B20A. Blocks, combinations of blocks, and/or the flowchart as a whole may pipelined over multiple clock cycles. The primary interrupt controller B20A may be configured to implement the operation illustrated in FIG. 24.

The primary interrupt controller B20A may be configured to perform a soft iteration over the cluster interrupt controllers integrated on to the local SOC B10A (block B170). For example, the soft iteration may be similar to the flowchart of FIG. 18. If the local soft iteration results in an Ack response (decision block B172, "yes" leg), the interrupt may be successfully delivered and the primary interrupt controller B20A may be configured to return to the idle state B40 (assuming there are no more pending interrupts). If the local soft iteration results in a Nack response (decision block B172, "no" leg), the primary interrupt controller B20A may be configured to select one of the other SOCs B10B-B10q using any desired order as mentioned above (block B174). The primary interrupt controller B20A may be configured to assert a soft iteration request to the secondary interrupt controller B20B-B20q on the selected SOC B10B-B10q (block B176). If the secondary interrupt controller B20B-B20q provides an Ack response (decision block B178, "yes" leg), the interrupt may be successfully delivered and the primary interrupt controller B20A may be configured to return to the idle state B40 (assuming there are no more pending interrupts). If the secondary interrupt controller B20B-B20q provides a Nack response (decision block B178, "no" leg) and there are more SOCs B10B-B10q that have not yet been selected in the soft iteration (decision block B180, "yes" leg), the primary interrupt controller B20A may be configured to select the next SOC B10B-B10q according to the implemented ordering mechanism (block B182) and may be configured to transmit the soft iteration request to the secondary interrupt controller B20B-B20q on the selected SOC (block B176) and continue processing. On the other hand, if each SOC B10B-B10q has been selected, the soft iteration may be complete since the serial attempt to deliver the interrupt over the secondary interrupt controllers B20B-B20q is complete.

Based on completing the soft iteration over the secondary interrupt controllers B20B-B20q without successfully interrupt deliver (decision block B180, "no" leg), the primary interrupt controller B20A may be configured to perform a hard iteration over the local cluster interrupt controllers integrated on to the local SOC B10A (block B184). For example, the soft iteration may be similar to the flowchart of FIG. 18. If the local hard iteration results in an Ack response (decision block B186, "yes" leg), the interrupt may be successfully delivered and the primary interrupt controller B20A may be configured to return to the idle state B40 (assuming there are no more pending interrupts). If the local hard iteration results in a Nack response (decision block B186, "no" leg), the primary interrupt controller B20A may be configured to select one of the other SOCs B10B-B10q using any desired order as mentioned above (block B188). The primary interrupt controller B20A may be configured to assert a hard iteration request to the secondary interrupt controller B20B-B20q on the selected SOC B10B-B10q (block B190). If the secondary interrupt controller B20B-B20q provides an Ack response (decision block B192, "yes" leg), the interrupt may be successfully delivered and the primary interrupt controller B20A may be configured to return to the idle state B40 (assuming there are no more pending interrupts). If the secondary interrupt controller B20B-B20q provides a Nack response (decision block B192, "no" leg) and there are more SOCs B10B-B10q that have not yet been selected in the hard iteration (decision block B194, "yes" leg), the primary interrupt controller B20A may be configured to select the next SOC B10B-B10q according to the implemented ordering mechanism (block B196) and may be configured to transmit the hard iteration request to the secondary interrupt controller B20B-B20q on the selected SOC (block B190) and continue processing. On the other hand, if each SOC B10B-B10q has been selected, the hard iteration may be complete since the serial attempt to deliver the interrupt over the secondary interrupt controllers B20B-B20q is complete (decision block B194, "no" leg). The primary interrupt controller B20A may be configured proceed with a force iteration (block B198). The force iteration may be performed locally, or may be performed in parallel or serially over the local SOC B10A and the other SOCs B10B-B10q.

As mentioned above, there may be a timeout mechanism that may be initialized when the interrupt delivery process begins. If the timeout occurs during any state, in an embodiment, the interrupt controller B20 may be configured to move to the force iteration. Alternatively, timer expiration may only be considered in the wait drain state B48, again as mentioned above.

Figure 25:
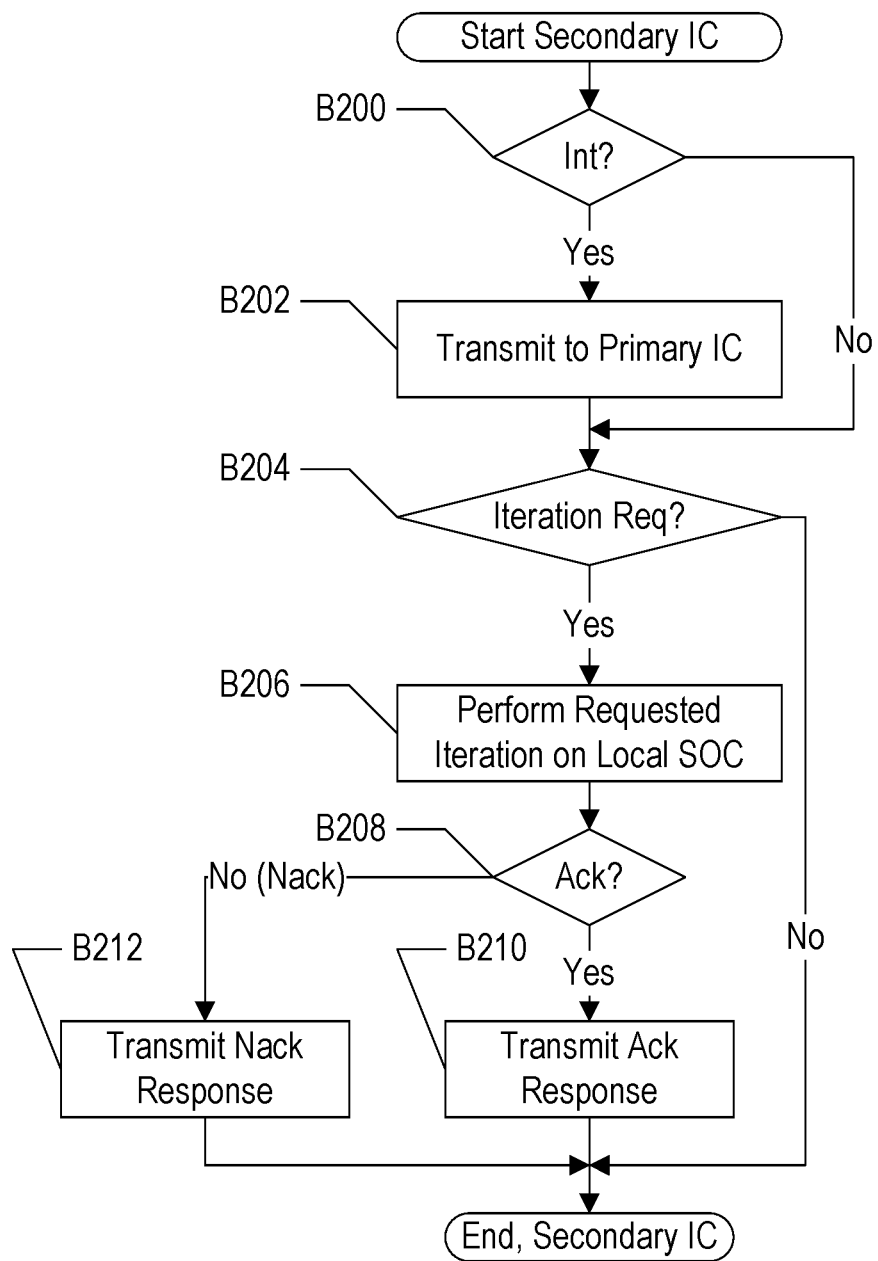
FIG. 25 is a flowchart illustrating operation of one embodiment of a secondary interrupt controller shown in FIG. 23.

FIG. 25 is a flowchart illustrating operation of one embodiment of the secondary interrupt controller B20B-B20q. While the blocks are shown in a particular order for ease of understanding, other orders may be used. Blocks may be performed in parallel in combinatorial logic circuitry in the secondary interrupt controller B20B-B20q. Blocks, combinations of blocks, and/or the flowchart as a whole may pipelined over multiple clock cycles. The secondary interrupt controller B20B-B20q may be configured to implement the operation illustrated in FIG. 25.

If an interrupt source in the corresponding SOC B10B-B10q (or coupled to the SOC B10B-B10q) provides an interrupt to the secondary interrupt controller B20B-B20q (decision block B200, "yes" leg), the secondary interrupt controller B20B-B20q may be configured to transmit the interrupt to the primary interrupt controller B20A for handling along with other interrupts from other interrupt sources (block B202).

If the primary interrupt controller B20A has transmitted an iteration request (decision block B204, "yes" leg), the secondary interrupt controller B20B-B20q may be configured to perform the requested iteration (hard, soft, or force) over the cluster interrupt controllers in the local SOC B10B-B10q (block B206). For example, hard and soft iterations may be similar to FIG. 18, and force may be performed in parallel to the cluster interrupt controllers in the local SOC B10B-B10q. If the iteration results in an Ack response (decision block B208, "yes" leg), the secondary interrupt controller B20B-B20q may be configured to transmit an Ack response to the primary interrupt controller B20A (block B210). If the iteration results in a Nack response (decision block B208, "no" leg), the secondary interrupt controller B20B-B20q may be configured to transmit a Nack response to the primary interrupt controller B20A (block B212).

Figure 26:
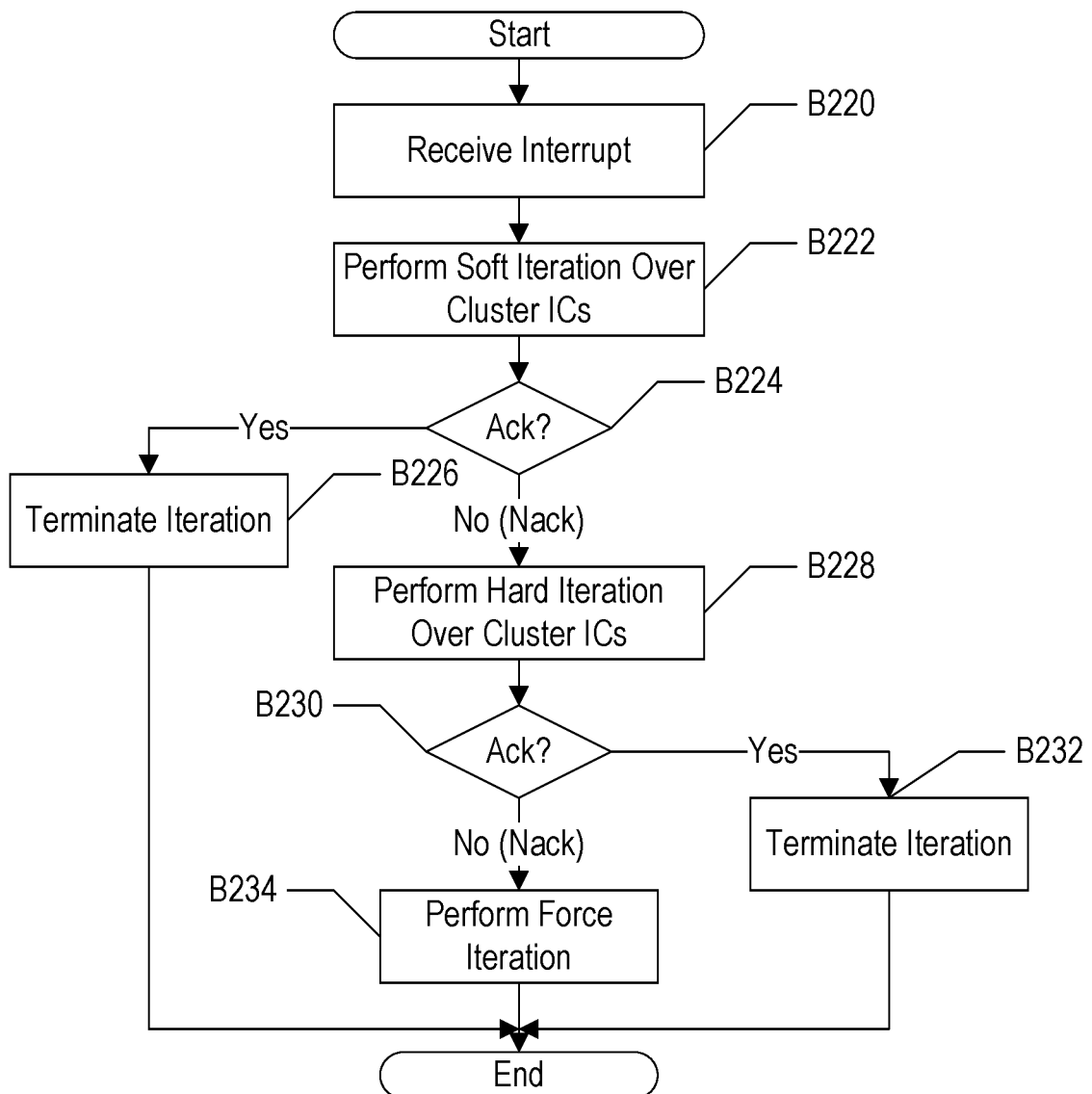
FIG. 26 is a flowchart illustrating one embodiment of a method for handling interrupts.

FIG. 26 is a flowchart illustrating one embodiment of a method for handling interrupts. While the blocks are shown in a particular order for ease of understanding, other orders may be used. Blocks may be performed in parallel in combinatorial logic circuitry in the systems describe herein. Blocks, combinations of blocks, and/or the flowchart as a whole may pipelined over multiple clock cycles. The systems described herein may be configured to implement the operation illustrated in FIG. 26.

An interrupt controller B20 may receive an interrupt from an interrupt source (block B220). In embodiments having primary and secondary interrupt controllers B20A-B20q, the interrupt may be received in any interrupt controller B20A-B20q and provided to the primary interrupt controller B20A as part of receiving the interrupt from the interrupt source. The interrupt controller B20 may be configured to perform a first iteration (e.g., a soft iteration) of serially attempting to deliver the interrupt to a plurality of cluster interrupt controllers (block B222). A respective cluster interrupt controller of the plurality of cluster interrupt controllers is associated with a respective processor cluster comprising a plurality of processors. A given cluster interrupt controller of the plurality of cluster interrupt controllers, in the first iteration, may be configured to attempt to deliver the interrupt to a subset of the respective plurality of processors that are powered on without attempting to deliver the interrupt to ones of the respective plurality of processors that are not included in the subset. If an Ack response is received, the iteration may be terminated by the interrupt controller B20 (decision block B224, "yes" leg and block B226). On the other hand (decision block B224, "no" leg), based on non-acknowledge (Nack) responses from the plurality of cluster interrupt controllers in the first iteration, the interrupt controller may be configured to perform a second iteration over the plurality of cluster interrupt controllers (e.g., a hard iteration) (block B228). The given cluster interrupt controller, in the second iteration, may be configured to power on the ones of the respective plurality of processors that are powered off and attempt to deliver the interrupt to the respective plurality of processors. If an Ack response is received, the iteration may be terminated by the interrupt controller B20 (decision block B230, "yes" leg and block B232). On the other hand (decision block B230, "no" leg), based on non-acknowledge (Nack) responses from the plurality of cluster interrupt controllers in the second iteration, the interrupt controller may be configured to perform a third iteration over the plurality of cluster interrupt controllers (e.g., a force iteration) (block B234).

Based on this disclosure, a system may comprise a plurality of cluster interrupt controllers and an interrupt controller coupled to the plurality of cluster interrupt controllers. A respective cluster interrupt controller of the plurality of cluster interrupt controllers may be associated with a respective processor cluster comprising a plurality of processors. The interrupt controller may be configured to receive an interrupt from a first interrupt source and may be configured, based on the interrupt, to: perform a first iteration over the plurality of cluster interrupt controllers to attempt to deliver the interrupt; and based on non-acknowledge (Nack) responses from the plurality of cluster interrupt controllers in the first iteration, perform a second iteration over the plurality of cluster interrupt controllers. A given cluster interrupt controller of the plurality of cluster interrupt controllers, in the first iteration, may be configured to attempt to deliver the interrupt to a subset of the plurality of processors in the respective processor cluster that are powered on without attempting to deliver the interrupt to ones of the respective plurality of processors in the respective cluster that are not included in the subset. In the second iteration, the given cluster interrupt controller may be configured to power on the ones of the respective plurality of processors that are powered off and attempt to deliver the interrupt to the respective plurality of processors. In an embodiment, during the attempt to deliver the interrupt over the plurality of cluster interrupt controllers: the interrupt controller may be configured to assert a first interrupt request to a first cluster interrupt controller of the plurality of cluster interrupt controllers; and based on the Nack response from the first cluster interrupt controller, the interrupt controller may be configured to assert a second interrupt request to a second cluster interrupt controller of the plurality of cluster interrupt controllers. In an embodiment, during the attempt to deliver the interrupt over the plurality of cluster interrupt controllers, based on a second Nack response from the second cluster interrupt controller, the interrupt controller may be configured to assert a third interrupt request to a third cluster interrupt controller of the plurality of cluster interrupt controllers. In an embodiment, during the attempt to deliver the interrupt over the plurality of cluster interrupt controllers and based on an acknowledge (Ack) response from the second cluster interrupt controller and a lack of additional pending interrupts, the interrupt controller may be configured to terminate the attempt. In an embodiment, during the attempt to deliver the interrupt over the plurality of cluster interrupt controllers: the interrupt controller may be configured to assert an interrupt request to a first cluster interrupt controller of the plurality of cluster interrupt controllers; and based on an acknowledge (Ack) response from the first cluster interrupt controller and a lack of additional pending interrupts, the interrupt controller may be configured to terminate the attempt. In an embodiment, during the attempt to deliver the interrupt over the plurality of cluster interrupt controllers, the interrupt controller may be configured to serially assert interrupt requests to one or more cluster interrupt controllers of the plurality of cluster interrupt controllers, terminated by an acknowledge (Ack) response from a first cluster interrupt controller of the one or more cluster interrupt controllers. In an embodiment, the interrupt controller may be configured to serially assert in a programmable order. In an embodiment, the interrupt controller may be configured to serially assert the interrupt request based on the first interrupt source. A second interrupt from a second interrupt source may result in a different order of the serial assertion. In an embodiment, during the attempt to deliver the interrupt over the plurality of cluster interrupt controllers: the interrupt controller may be configured to assert an interrupt request to a first cluster interrupt controller of the plurality of cluster interrupt controllers; and the first cluster interrupt controller may be configured to serially assert processor interrupt requests to the plurality of processors in the respective processor cluster based on the interrupt request to the first cluster interrupt controller. In an embodiment, the first cluster interrupt controller is configured to terminate serial assertion based on an acknowledge (Ack) response from a first processor of the plurality of processors. In an embodiment, the first cluster interrupt controller may be configured to transmit the Ack response to the interrupt controller based on the Ack response from the first processor. In an embodiment, the first cluster interrupt controller may be configured to provide the Nack response to the interrupt controller based on Nack responses from the plurality of processors in the respective cluster during the serial assertion of processor interrupts. In an embodiment, the interrupt controller may be included on a first integrated circuit on a first semiconductor substrate that includes a first subset of the plurality of cluster interrupt controllers. A second subset of the plurality of cluster interrupt controllers may be implemented on a second integrated circuit on second, separate semiconductor substrate. The interrupt controller may be configured to serially assert interrupt requests to the first subset prior to attempting to deliver to the second subset. In an embodiment, the second integrated circuit includes a second interrupt controller, and the interrupt controller may be configured to communicate the interrupt request to the second interrupt controller responsive to the first subset refusing the interrupt. The second interrupt controller may be configured to attempt to deliver the interrupt to the second subset.

In an embodiment, a processor comprises a reorder buffer, a load/store unit, and a control circuit coupled to the reorder buffer and the load/store unit. The reorder buffer may be configured to track a plurality of instruction operations corresponding to instructions fetched by the processor and not retired by the processor. The load/store unit may be configured to execute load/store operations. The control circuit may be configured to generate an acknowledge (Ack) response to an interrupt request received by the processor based on a determination that the reorder buffer will retire instruction operations to an interruptible point and the load/store unit will complete load/store operations to the interruptible point within a specified period of time. The control circuit may be configured to generate a non-acknowledge (Nack) response to the interrupt request based on a determination that at least one of the reorder buffer and the load/store unit will not reach the interruptible point within the specified period of time. In an embodiment, the determination may be the Nack response based on the reorder buffer having at least one instruction operation that has a potential execution latency greater than a threshold. In an embodiment, the determination may be the Nack response based on the reorder buffer having at least one instruction operation that causes interrupts to be masked. In an embodiment, the determination is the Nack response based on the load/store unit having at least one load/store operation to a device address space outstanding.

In an embodiment, a method comprises receiving an interrupt from a first interrupt source in an interrupt controller. The method may further comprise performing a first iteration of serially attempting to deliver the interrupt to a plurality of cluster interrupt controllers. A respective cluster interrupt controller of the plurality of cluster interrupt controllers associated with a respective processor cluster comprising a plurality of processors, in the first iteration, may be configured to attempt to deliver the interrupt to a subset of the plurality of processors in the respective processor cluster that are powered on without attempting to deliver the interrupt to ones of the plurality of processors in the respective processor cluster that are not included in the subset. The method may further comprise, based on non-acknowledge (Nack) responses from the plurality of cluster interrupt controllers in the first iteration, performing a second iteration over the plurality of cluster interrupt controllers by the interrupt controller. In the second iteration, the given cluster interrupt controller may be configured to power on the ones of the plurality of processors that are powered off in the respective processor cluster and attempt to deliver the interrupt to the plurality of processors. In an embodiment, serially attempting to deliver the interrupt to the plurality of cluster interrupt controllers is terminated based on an acknowledge response from one of the plurality of cluster interrupt controllers.

Coherency

Turning now to FIGS. 27-43, various embodiments of a cache coherency mechanism that may be implemented in embodiments of the SOC 10 are shown. In an embodiment, the coherency mechanism may include a plurality of directories configured to track a coherency state of subsets of the unified memory address space. The plurality of directories are distributed in the system. In embodiment, the plurality of directories are distributed to the memory controllers. In an embodiment, a given memory controller of the one or more memory controller circuits comprises a directory configured to track a plurality of cache blocks that correspond to data in a portion of the system memory to which the given memory controller interfaces, wherein the directory is configured to track which of a plurality of caches in the system are caching a given cache block of the plurality of cache blocks, wherein the directory is precise with respect to memory requests that have been ordered and processed at the directory even in the event that the memory requests have not yet completed in the system. In an embodiment, the given memory controller is configured to issue one or more coherency maintenance commands for the given cache block based on a memory request for the given cache block, wherein the one or more coherency maintenance commands include a cache state for the given cache block in a corresponding cache of the plurality of caches, wherein the corresponding cache is configured to delay processing of a given coherency maintenance command based on the cache state in the corresponding cache not matching the cache state in the a given coherency maintenance command. In an embodiment, a first cache is configured to store the given cache block in a primary shared state and a second cache is configured to store the given cache block in a secondary shared state, and wherein the given memory controller is configured to cause the first cache transfer the given cache block to a requestor based on the memory request and the primary shared state in the first cache. In an embodiment, the given memory controller is configured to issue one of a first coherency maintenance command and a second coherency maintenance command to a first cache of the plurality of caches based on a type of a first memory request, wherein the first cache is configured to forward a first cache block to a requestor that issued the first memory request based on the first coherency maintenance command, and wherein the first cache is configured to return the first cache block to the given memory controller based on the second coherency maintenance command.

A scalable cache coherency protocol for a system including a plurality of coherent agents coupled to one or more memory controllers is described. A coherent agent may generally include any circuitry that includes a cache to cache memory data or that otherwise may take ownership of one or more cache blocks and potentially modify the cache blocks locally. The coherent agents participate in the cache coherency protocol to ensure that modifications made by one coherent agent are visible to other agents that subsequently read the same data, and that modifications made in a particular order by two or more coherent agents (as determined at an ordering point in the system, such as the memory controller for the memory that stores the cache block) are observed in that order in each of the coherent agents.

The cache coherency protocol may specify a set of messages, or commands, that may be transmitted among agents and memory controllers (or coherency controllers within the memory controllers) to complete coherent transactions. The messages may include requests, snoops, snoop responses, and completions. A "request" is a message that initiates a transaction, and specifies the requested cache block (e.g., with an address of the cache block) and the state in which the requestor is to receive the cache block (or the minimum state, in some cases a more permissive state may be provided). A "snoop" or "snoop message," as used herein, refers to a message transmitted to a coherent agent to request a state change in a cache block and, if the coherent agent has an exclusive copy of the cache block or is otherwise responsible for the cache block, may also request that the cache block be provided by the coherent agent. A snoop message may be an example of a coherency maintenance command, which may be any command transmitted to a specific coherent agent to cause a change in the coherent state of the cache line in the specific coherence agent. Another term that is an example of a coherency maintenance command is a probe. The coherency maintenance command is not intended to refer to a broadcast command sent to all coherency agents, e.g., as sometimes used in shared bus systems. The term "snoop" is used as an example below, but it is understood that the term refers generally to a coherency maintenance command. A "completion" or "snoop response" may be a message from the coherent agent indicating that the state change has been made and providing the copy of the cache block, if applicable. In some cases, a completion may also be provided by a source of the request for certain requests.

A "state" or "cache state" may generally refer to a value that indicates whether or not a copy of a cache block is valid in a cache, and may also indicate other attributes of the cache block. For example, the state may indicate whether or not the cache block is modified with respect to the copy in memory. The state may indicate a level of ownership of the cache block (e.g., whether the agent having the cache is permitted to modify the cache block, whether or not the agent is responsible for providing the cache block or returning the cache block to the memory controller if evicted from the cache, etc.). The state may also indicate the possible presence of the cache block in other coherent agents (e.g., the "shared" state may indicate that a copy of the cache block may be stored in one or more other cacheable agents).

A variety of features may be included in various embodiments of the cache coherency protocol. For example, the memory controller(s) may each implement a coherency controller and a directory for cache blocks corresponding to the memory controlled by that memory controller. The directory may track the states of the cache blocks in the plurality of cacheable agents, permitting the coherency controller to determine which cacheable agents are to be snooped to change the state of the cache block and possibly provide a copy of the cache block. That is, snoops need not be broadcast to all cacheable agents based on a request received at the cache controller, but rather the snoops may be transmitted to those agents that have a copy of the cache block affected by the request. Once the snoops have been generated, the directory may be updated to reflect the state of the cache block in each coherent agent after the snoops are processed and the data is provided to the source of the request. Thus, the directory may be precise for the next request that is processed to the same cache block. Snoops may be minimized, reducing traffic on the interconnect between the coherent agents and the memory controller when compared to a broadcast solution, for example. In one embodiment, a "3 hop" protocol may be supported in which one of the caching coherent agents provides a copy of the cache block to the source of the request, or if there is no caching agent, the memory controller provides the copy. Thus, the data is provided in three "hops" (or messages transmitted over the interface): the request from the source to the memory controller, the snoop to the coherent agent that will respond to the request, and the completion with the cache block of data from the coherent agent to the source of the request. In cases where there is no cached copy, there may be two hops: the request from the source to the memory controller and the completion with the data from the memory controller to the source. There may be additional messages (e.g., completions from other agents indicating that a requested state change has been made, when there are multiple snoops for a request), but the data itself may be provided in the three hops. In contrast, many cache coherency protocols are four hop protocols in which the coherent agent responds to a snoop by returning the cache block to the memory controller, and the memory controller forwards the cache block to the source. In an embodiment, four hop flows may be supported by the protocol in addition to three hop flows.

In an embodiment, a request for a cache block may be handled by the coherency controller and the directory may be updated once the snoops (and/or a completion from the memory controller for the case where there is no cached copy) have been generated. Another request for the same cache block may then be serviced. Thus, requests for the same cache block may not be serialized, as is the case is some other cache coherence protocols. There may be various race conditions that occur when there are multiple requests outstanding to a cache block, because messages related to the subsequent request may arrive at a given coherent agent prior to messages related to the prior request (where "subsequent" and "prior" refer to the requests as ordered at the coherency controller in the memory controller). To permit agents to sort the requests, the messages (e.g., snoops and completions) may include an expected cache state at the receiving agent, as indicated by the directory when the request was processed. Thus, if a receiving agent does not have the cache block in the state indicated in a message, the receiving agent may delay the processing of the message until the cache state changes to the expected state. The change to the expected state may occur via messages related to the prior request. Additional description of the race conditions and using the expected cache state to resolve them are provided below with respect to FIGS. 29-30 and 32-34.

In an embodiment, the cache states may include a primary shared and a secondary shared state. The primary shared state may apply to a coherent agent that bears responsibility for transmitting a copy of the cache block to a requesting agent. The secondary shared agents may not even need to be snooped during processing of a given request (e.g., a read for the cache block that is permitted to return in shared state). Additional details regarding the primary and secondary shared states will be described with respect to FIGS. 40 and 42.

In an embodiment, at least two types of snoops may be supported: snoop forward and snoop back. The snoop forward messages may be used to cause a coherent agent to forward a cache block to the requesting agent, whereas the snoop back messages may be used to cause the coherent agent to return the cache block to the memory controller. In an embodiment, snoop invalidate messages may also be supported (and may include forward and back variants as well to specify a destination for completions). The snoop invalidate message causes the caching coherent agent to invalidate the cache block. Supporting snoop forward and snoop back flows may provide for both cacheable (snoop forward) and non-cacheable (snoop back) behaviors, for example. The snoop forward may be used to minimize the number of messages when a cache block is provided to a caching agent, since the cache agent may store the cache block and potentially use the data therein. On the other hand, a non-coherent agent may not store the entire cache block, and thus the copy back to memory may ensure that the full cache block is captured in the memory controller. Thus, the snoop forward and snoop back variants, or types, may be selected based on the capabilities of a requesting agent (e.g., based on the identity of the requesting agent) and/or based on a type of request (e.g., cacheable or non-cacheable). Additional details regarding snoop forward and snoop back messages are provided below with regard to FIGS. 37, 38 and 40. Various other features are illustrated in the remaining figures and will be described in more detail below.

Figure 27:
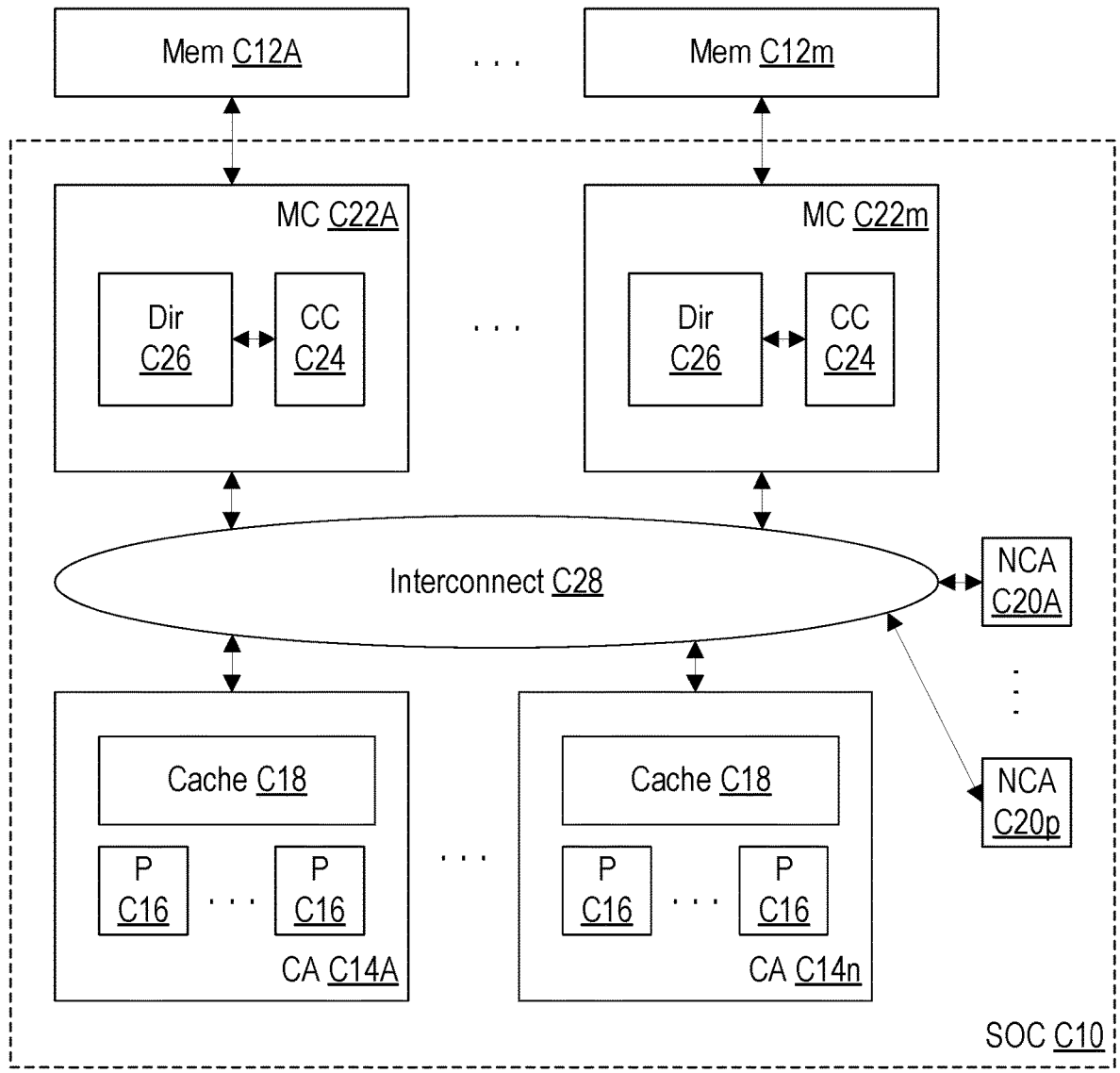
FIG. 27 is a block diagram of one embodiment of a cache coherent system implemented as a system on a chip (SOC).

FIG. 27 is a block diagram of embodiment of a system including a system on a chip (SOC) C10 coupled to one or more memories such as memories C12A-C12m. The SOC C10 may be an instance of the SOC 10 shown in FIG. 1, for example. The SOC C10 may include a plurality of coherent agents (CAs) C14A-C14n. The coherent agents may include one or processors (P) C16 coupled one or more caches (e.g., cache C18). The SOC C10 may include one or more noncoherent agents (NCAs) C20A-C20p. The SOC C10 may include one or more memory controllers C22A-C22m, each coupled to a respective memory C12A-C12m during use. Each memory controller C22A-C22m may include a coherency controller circuit C24 (more briefly "coherency controller", or "CC") coupled to a directory C26. The memory controllers C22A-C22m, the non-coherent agents C20A-C20p, and the coherent agents C14A-C14n may be coupled to an interconnect C28 to communicate between the various components C22A-C22m, C20A-C20p, and C14A-C14n. As indicated by the name, the components of the SOC C10 may be integrated onto a single integrated circuit "chip" in one embodiment. In other embodiments, various components may be external to the SOC C10 on other chips or otherwise discrete components. Any amount of integration or discrete components may be used. In one embodiment, subsets of coherent agents C14A-C14n and memory controllers C22A-C22m may be implemented in one of multiple integrated circuit chips that are coupled together to form the components illustrated in the SOC C10 of FIG. 27.

The coherency controller C24 may implement the memory controller portion of the cache coherency protocol. Generally, the coherency controller C24 may be configured to receive requests from the interconnect C28 (e.g., through one or more queues, not shown, in the memory controllers C22A-C22m) that are targeted at cache blocks mapped to the memory C12A-C12m to which the memory controller C22A-C22m is coupled. The directory may comprise a plurality of entries, each of which may track the coherency state of a respective cache block in the system. The coherency state may include, e.g., a cache state of the cache block in the various coherent agents C14A-C14N (e.g., in the caches C18, or in other caches such as caches in the processors C16, not shown). Thus, based on the directory entry for the cache block corresponding to a given request and the type of the given request, the coherency controller C24 may be configured to determine which coherent agents C14A-C14n are to receive snoops and the type of snoop (e.g., snoop invalidate, snoop shared, change to shared, change to owned, change to invalid, etc.). The coherency controller C24 may also independently determine whether a snoop forward or snoop back will be transmitted. The coherent agents C14A-C14n may receive the snoops, process the snoops to update the cache block state in the coherent agents C14A-C14n, and provide a copy of the cache block (if specified by the snoop) to the requesting coherent agent C14A-14n or the memory controller C22A-22m that transmitted the snoop. Additional details will be provided further below.

As mentioned above, the coherent agents C14A-C14n may include one or more processors C16. The processors C16 may serve as the central processing units (CPUs) of the SOC C10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors. The coherent agents C14A-C14n may further include other hardware such as the cache C18 and/or an interface to the other components of the system (e.g., an interface to the interconnect C28). Other coherent agents may include processors that are not CPUs. Still further, other coherent agents may not include processors (e.g., fixed function circuitry such as a display controller or other peripheral circuitry, fixed function circuitry with processor assist via an embedded processor or processors, etc. may be coherent agents).

Generally, a processor may include any circuitry and/or microcode configured to execute instructions defined in an instruction set architecture implemented by the processor. Processors may encompass processor cores implemented on an integrated circuit with other components as a system on a chip (SOC C10) or other levels of integration. Processors may further encompass discrete microprocessors, processor cores and/or microprocessors integrated into multichip module implementations, processors implemented as multiple integrated circuits, etc. The number of processors C16 in a given coherent agent C14A-C14n may differ from the number of processors C16 in another coherent agent C14A-C14n. In general, one or more processors may be included. Additionally, the processors C16 may differ in microarchitectural implementation, performance and power characteristics, etc. In some cases, processors may differ even in the instruction set architecture that they implement, their functionality (e.g., CPU, graphics processing unit (GPU) processors, microcontrollers, digital signal processors, image signal processors, etc.), etc.

The caches C18 may have any capacity and configuration, such as set associative, direct mapped, or fully associative. The cache block size may be any desired size (e.g., 32 bytes, 64 bytes, 128 bytes, etc.). The cache block may be the unit of allocation and deallocation in the cache C18. Additionally, the cache block may be the unit over which coherency is maintained in this embodiment (e.g., an aligned, coherence-granule-sized segment of the memory address space). The cache block may also be referred to as a cache line in some cases.

In addition to the coherency controller C24 and the directory C26, the memory controllers C22A-C22m may generally include the circuitry for receiving memory operations from the other components of the SOC C10 and for accessing the memories C12A-C12m to complete the memory operations. The memory controllers C22A-C22m may be configured to access any type of memories C12A-C12m. For example, the memories C12A-C12m may be static random access memory (SRAM), dynamic RAM (DRAM) such as synchronous DRAM (SDRAM) including double data rate (DDR, DDR2, DDR3, DDR4, etc.) DRAM, non-volatile memories, graphics DRAM such as graphics DDR DRAM (GDDR), and high bandwidth memories (HBM). Low power/mobile versions of the DDR DRAM may be supported (e.g., LPDDR, mDDR, etc.). The memory controllers C22A-C22m may include queues for memory operations, for ordering (and potentially reordering) the operations and presenting the operations to the memories C12A-C12m. The memory controllers C22A-C22m may further include data buffers to store write data awaiting write to memory and read data awaiting return to the source of the memory operation (in the case where the data is not provided from a snoop). In some embodiments, the memory controllers C22A-C22m may include a memory cache to store recently accessed memory data. In SOC implementations, for example, the memory cache may reduce power consumption in the SOC by avoiding reaccess of data from the memories C12A-C12m if it is expected to be accessed again soon. In some cases, the memory cache may also be referred to as a system cache, as opposed to private caches such as the cache C18 or caches in the processors C16, which serve only certain components. Additionally, in some embodiments, a system cache need not be located within the memory controllers C22A-C22m.

The non-coherent agents C20A-C20p may generally include various additional hardware functionality included in the SOC C10 (e.g., "peripherals"). For example, the peripherals may include video peripherals such as an image signal processor configured to process image capture data from a camera or other image sensor, GPUs, video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC C10 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included. The non-coherent agents C20A-C20p may also include bridges to a set of peripherals, in an embodiment.

The interconnect C28 may be any communication interconnect and protocol for communicating among the components of the SOC C10. The interconnect C28 may be bus-based, including shared bus configurations, cross bar configurations, and hierarchical buses with bridges. The interconnect C28 may also be packet-based or circuit-switched, and may be hierarchical with bridges, cross bar, point-to-point, or other interconnects. The interconnect C28 may include multiple independent communication fabrics, in an embodiment.

Generally, the number of each component C22A-C22*m*, C20A-C20*p*, and C14A-C14*n* may vary from embodiment to embodiment, and any number may be used. As indicated by the "m", "p", and "n" post-fixes, the number of one type of component may differ from the number of another type of component. However, the number of a given type may be the same as the number of another type as well. Additionally, while the system of FIG. 27 is illustrated with multiple memory controllers C22A-C22*m*, embodiments having one memory controller C22A-C22*m* are contemplated as well and may implement the cache coherency protocol described herein.

Figure 28:
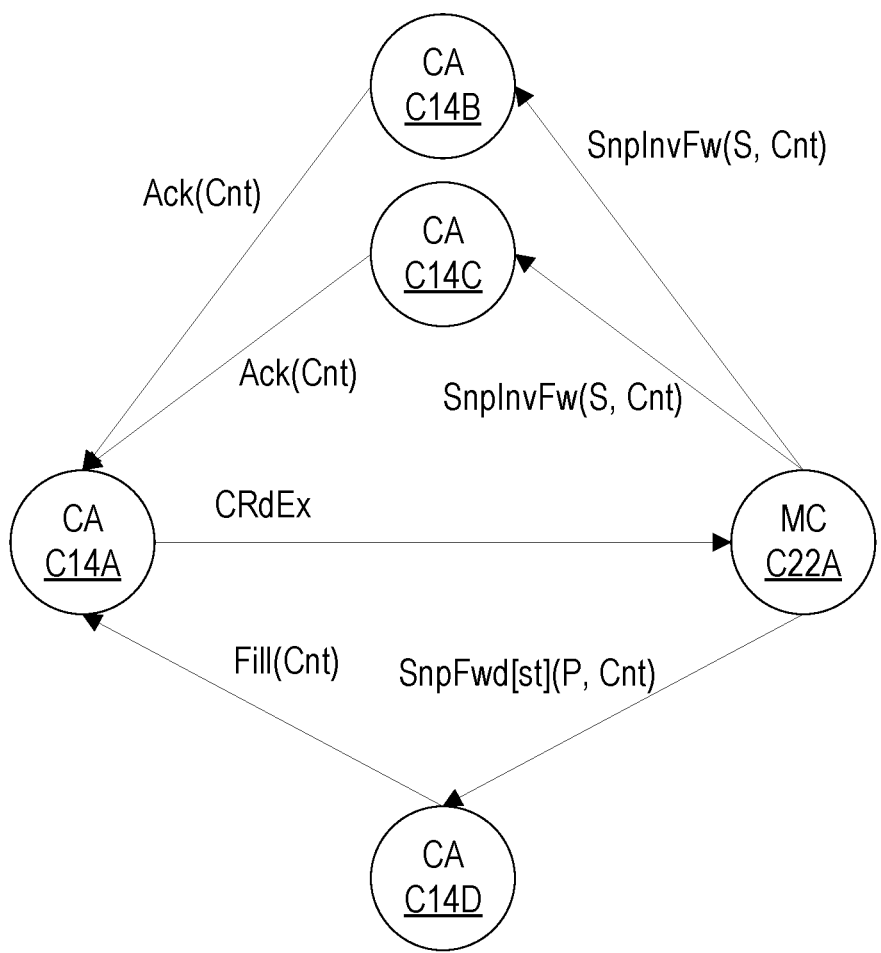
FIG. 28 is a block diagram illustrating one embodiment of a three hop protocol for coherent transfer of a cache block.

Turning next to FIG. 28, a block diagram is shown illustrating a plurality of coherent agents C12A-12D and the memory controller C22A performing a coherent transaction for a cacheable read exclusive request (CRdEx) according to an embodiment of the scalable cache coherency protocol. A read exclusive request may be a request for an exclusive copy of the cache block, so any other copies that coherent agents C14A-C14D are invalidated and the requestor, when the transaction is complete, has the only valid copy. The memory C12A-C12*m* that has the memory locations assigned to the cache block has data at the location assigned to the cache block in the memory C12A-C12*m*, but that data will also be "stale" if the requestor modifies the data. The read exclusive request may be used, e.g., so that the requestor has the ability to modify the cache block without transmitting an additional request in the cache coherency protocol. Other requests may be used if an exclusive copy is not needed (e.g., a read shared request, CRdSh, may be used if a writeable copy is not necessarily needed by the requestor). The "C" in the "CRdEx" label may refer to "cacheable." Other transactions may be issued by non-coherent agents (e.g., agents C20A-C20*p* in FIG. 27), and such transactions may be labeled "NC" (e.g., NCRd). Additional discussion of request types and other messages in a transaction is provided further below with regard to FIG. 40 for one embodiment, and further discussion of cache states is provided further below with regard to FIG. 39, for an embodiment.

In the example of FIG. 28, the coherent agent C14A may initiate a transaction by transmitting the read exclusive request to the memory controller C22A (which controls the memory locations assigned to the address in the read exclusive request). The memory controller C22A (and more particularly the coherency controller C24 in the memory controller C22A) may read an entry in the directory C26 and determine that the coherent agent C14D has the cache block in the primary shared state (P), and thus may be the coherent agent that is to provide the cache block to the requesting coherent agent C14D. The coherency controller C24 may generate a snoop forward (SnpFwd[st]) message to the coherent agent C14D, and may issue the snoop forward message to the coherent agent C14D. The coherency controller C24 may include an identifier of the current state in the coherent agent that receives the snoop, according to the directory C26. For example, in this case, the current state is "P" in the coherent agent C14D according to the directory C26. Based on the snoop, the coherent agent C14D may access the cache that is storing the cache block and generate a fill completion (Fill in FIG. 28) with data corresponding to the cache block. The coherent agent C14D may transmit the fill completion to the coherent agent C14A. Accordingly, the system implements a "3 hop" protocol for delivering the data to the requestor: CRdEx, SnpFwd[st], and Fill. As indicated by "[st]" in the SnpFwd[st] message, the snoop forward message may also be coded with the state of the cache block to which the coherent agent is to transition after processing the snoop. There may be different variations of the message, or the state may be carried as a field in the message, in various embodiments. In the example of FIG. 28, the new state of the cache block in the coherent agent may be invalid, because the request is a read exclusive request. Other requests may permit a new state of shared.

Additionally, the coherency controller C24 may determine from the directory entry for the cache block that the coherent agents C14B-C14C have the cache block in the secondary shared state (S). Thus, snoops may be issued to each coherent agent that: (i) has a cached copy of the cache block; and (ii) the state of the block in the coherent agent is to change based on the transaction. Since the coherent agent C14A is obtaining an exclusive copy, the shared copies are to be invalidated and thus the coherency controller C24 may generate snoop invalidate (SnpInvFw) messages for the coherent agents C14B-C14C and may issue the snoops to the coherent agents C14B-C14C. The snoop invalidate messages include identifiers that indicate that the current state in the coherent agents C14B-C14C is shared. The coherent agents C14B-C14C may process the snoop invalidate requests and provide acknowledgement (Ack) completions to the coherent agent C14A. Note that, in the illustrated protocol, messages from the snooping agents to the coherency controller C24 are not implemented in this embodiment. The coherency controller C24 may update the directory entry based on issuance of the snoops, and may process the next transaction. Thus, as mentioned previously, transactions to the same cache block may not be serialized in this embodiment. The coherency controller C24 may allow additional transactions to the same cache block to start and may rely on the current state indication in the snoops to identify which snoops belong to which transactions (e.g., the next transaction to the same cache block will detect the cache states that correspond to the completed prior transaction). In the illustrated embodiment, the snoop invalidate message is a SnpInvFw message, because the completion is sent to the initiating coherent agent C14A as part of the three hop protocol. In an embodiment, a four hop protocol is also supported for certain agents. In such an embodiment, a SnpInvBk message may be used to indicate that the snooping agent is to transmit the completion back to the coherency controller C24.

Thus, the cache state identifiers in the snoops may allow the coherent agents to resolve races between the messages forming different transactions to the same cache block. That is, the messages may be received out of order from the order in which the corresponding requests were processed by the coherency controller. The order that the coherency controller C24 processes requests to the same cache block though the directory C26 may define the order of the requests. That is, the coherency controller C24 may be the ordering point for transactions received in a given memory controller C22A-C22*m*. Serialization of the messages, on the other hand, may be managed in the coherent agents C14A-C14*n* based on the current cache state corresponding to each message and the cache state in the coherent agents C14A-C14*n*. A given coherent agent may access the cache block within the coherent agent based on a snoop and may be configured to compare the cache state specified in the snoop to the cache state currently in the cache. If the states do not match, then the snoop belongs to a transaction that is ordered after another transaction which changes the cache state in the agent to the state specified in the snoop. Thus, the snooping agent may be configured to delay processing of the snoop based on the first state not matching the second state until the second state is changed to the first state in response to a different communication related to a different request than the first request. For example, the state may change based on a fill completion received by the snooping agent from a different transaction, etc.

In an embodiment, the snoops may include a completion count (Cnt) indicating the number of completions that correspond to the transaction, so the requestor may determine when all of the completions related to a transaction have been received. The coherency controller C24 may determine the completion count based on the states indicated in the directory entry for the cache block. The completion count may be, for example, the number of completions minus one (e.g., 2 in the example of FIG. 28, since there are three completions). This implementation may permit the completion count to be used as an initialization for a completion counter for the transaction when an initial completion for the transaction is received by the requesting agent (e.g., it a has already been decremented to reflect receipt of the completion that carries the completion count). Once the count has been initialized, further completions for the transaction may cause the requesting agent to update the completion counter (e.g., decrement the counter). In other embodiments, the actual completion count may be provided and may be decremented by the requestor to initialize the completion count. Generally, the completion count may be any value that identifies the number of completions that the requestor is to observe before the transaction is fully completed. That is, the requesting agent may complete the request based on the completion counter.

Figure 29:
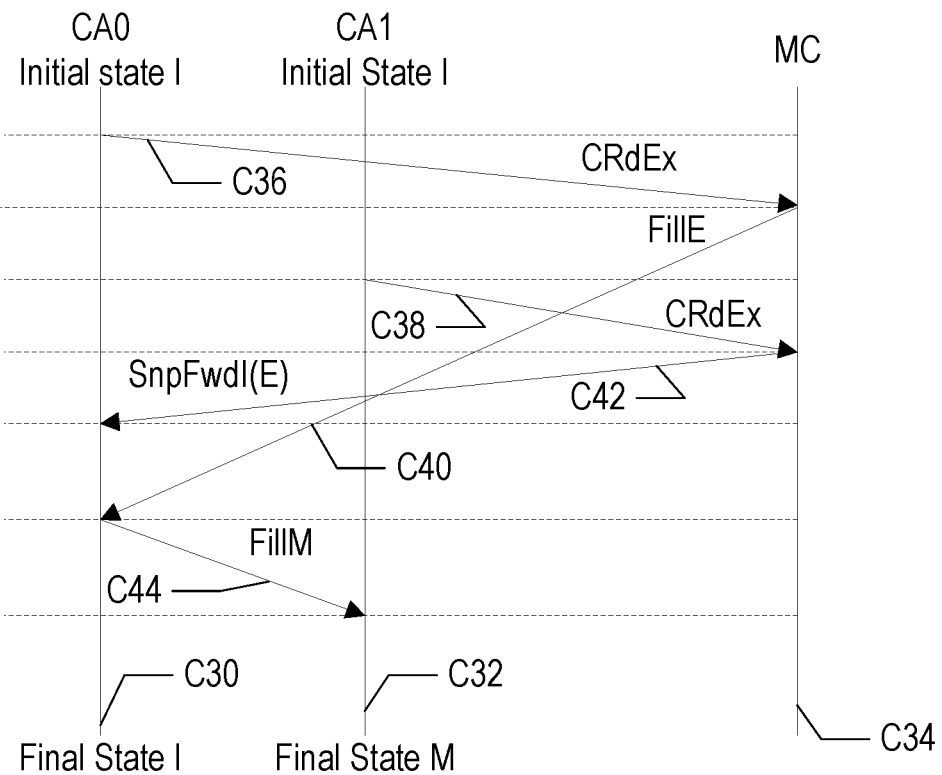
FIG. 29 is a block diagram illustrating one embodiment of managing a race between a fill for one coherent transaction and a snoop for another coherent transaction.
Figure 30:
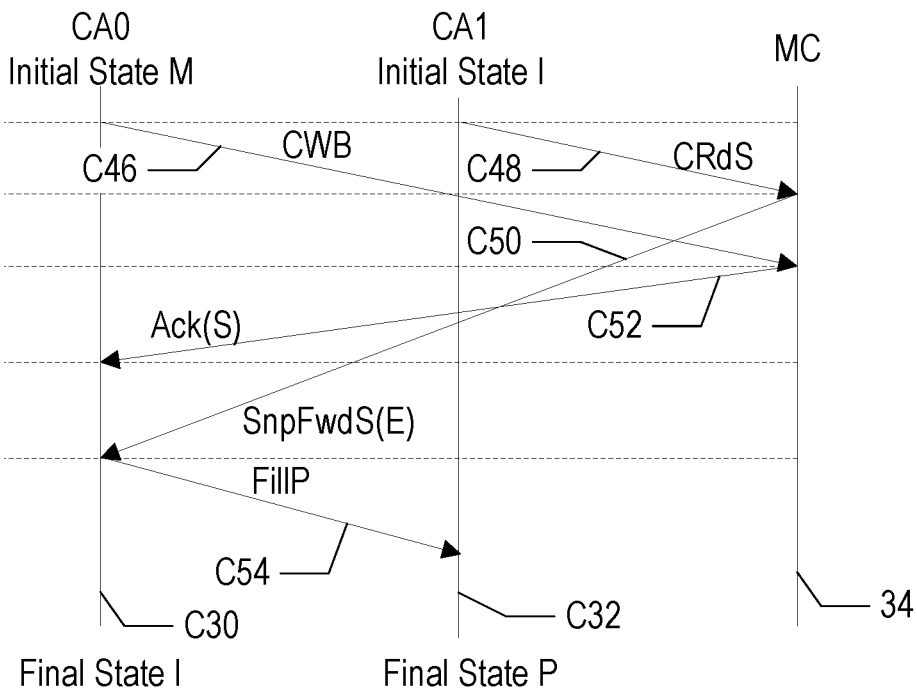
FIG. 30 is a block diagram illustrating one embodiment of managing a race between a snoop for one coherent transaction and an acknowledgement for another coherent transaction.

FIGS. 29 and 30 illustrate example race conditions that may occur with transactions to the same cache block, and the use of the current cache state for a given agent as reflected in the directory at the time the transaction is processed in the memory controller (also referred to as the "expected cache state") and the current cache state in the given agent (e.g., as reflected in the given agent's cache(s) or buffers that may temporarily store cache data). In FIGS. 29 and 30, coherent agents are listed as CA0 and CA1, and the memory controller that is associated with the cache block is shown as MC. Vertical lines 30, 32, and 34 for CA0, CA1, and MC illustrating the source of various messages (base of an arrow) and destination of the messages (head of an arrow) corresponding to transactions. Time progresses from top to bottom in FIGS. 29 and 30. A memory controller may be associated with a cache block if the memory to which the memory controller is coupled includes the memory locations assigned to the address of the cache block.

FIG. 29 illustrates a race condition between a fill completion for one transaction and a snoop for a different transaction to the same cache block. In the example of FIG. 29, CA0 initiates a read exclusive transaction with a CRdEx request to the MC (arrow 36). CA1 initiates a read exclusive transaction with a CRdEx request as well (arrow 38). The CA0 transaction is processed by the MC first, establishing the CA0 transaction as ordered ahead of the CA1 request. In this example, the directory indicates that there are no cached copies of the cache block in the system, and thus the MC responds to the CA0 request with a fill in the exclusive state (FillE, arrow 40). The MC updates the directory entry of the cache block with the exclusive state for CA0.

The MC selects the CRdEx respect from CA1 for processing, and detects that CA0 has the cache block in the exclusive state. Accordingly, the MC may generate a snoop forward request to CA0, requesting that CA0 invalidate the cache block in its cache(s) and provide the cache block to CA1 (SnpFwdI). The snoop forward request also includes the identifier of the E state for the cache block in CA0, since that is the cache state reflected in the directory for CA0. The MC may issue the snoop (arrow 42) and may update the directory to indicate that CA1 has an exclusive copy and the CA0 no longer has a valid copy.

The snoop and the fill completion may reach CA0 in either order in time. The messages may travel in different virtual channels and/or other delays in the interconnect may allow the messages to arrive in either order. In the illustrated example, the snoop arrives at CA0 prior to the fill completion. However, because the expected state in the snoop (E) does not match the current state of the cache block in CA0 (I), CA0 may delay the processing of the snoop. Subsequently, the fill completion may arrive at CA0. CA0 may write the cache block into a cache and set the state to exclusive (E). CA0 may also be permitted to perform at least one operation on the cache block to support forward progress of the task in CA0, and that operation may change the state to modified (M). In the cache coherence protocol, the directory C26 may not track the M state separately (e.g., it may be treated as E), but may match the E state as an expected state in a snoop. CA0 may issue a fill completion to CA1, with a state of modified (FillM, arrow 44). Accordingly, the race condition between the snoop and the fill completion for the two transactions has been handled correctly.

While the CRdEx request is issued by CA1 subsequent to the CRdEx request from CA0, in the example of FIG. 29, the CRdEx request may be issued by CA1 prior to the CRdEx request from CA0, and the CRdEx request from CA0 may still be ordered ahead of the CRdEx request from CA1 by the MC, since the MC is the ordering point for transactions.

FIG. 30 illustrates a race condition between a snoop for one coherent transaction and a completion for another coherent transaction to the same cache block. In FIG. 30, CA0 initiates a write back transaction (CWB) to write a modified cache block to memory (arrow 46), although the cache block may actually be tracked as exclusive in the directory as mentioned above. The CWB may be transmitted, e.g., if CA0 evicts the cache block from its caches but the cache block is in the modified state. CA1 initiates a read shared transaction (CRdS) for the same cache block (arrow 48). The CA1 transaction is ordered ahead of the CA0 transaction by the MC, which reads the directory entry for the cache block and determines CA0 has the cache block in the exclusive state. The MC issues a snoop forward request to CA0 and requests a change to secondary shared state (SnpFwdS, arrow 50). The identifier in the snoop indicates a current cache state of exclusive (E) in CA0. The MC updates the directory entry to indicate that CA0 has the cache block in the secondary shared state, and CA1 has the copy in the primary shared state (since a previously exclusive copy is being provided to CA1).

The MC processes the CWB request from CA0, reading the directory entry for the cache block again. The MC issues an Ack completion, indicating the current cache state is secondary shared (S) in CA0 with the identifier of the cache state in the Ack completion (arrow 52). Based on the expected state of secondary shared not matching the current state of modified, CA0 may delay the processing of the Ack completion. Processing the Ack completion would permit CA0 to discard the cache block, and it would not then have the copy of the cache block to provide to CA1 in response to the later-arrived SnpFwdS request. When the SnpFwdS request is received, CA0 may provide a fill completion (arrow 54) to CA1, providing the cache block in the primary shared state (P). CA0 may also change the state of the cache block in CA0 to secondary shared (S). The change in state matches the expected state for the Ack completion, and thus CA0 may invalidate the cache block and complete the CWB transaction.

Figure 31:
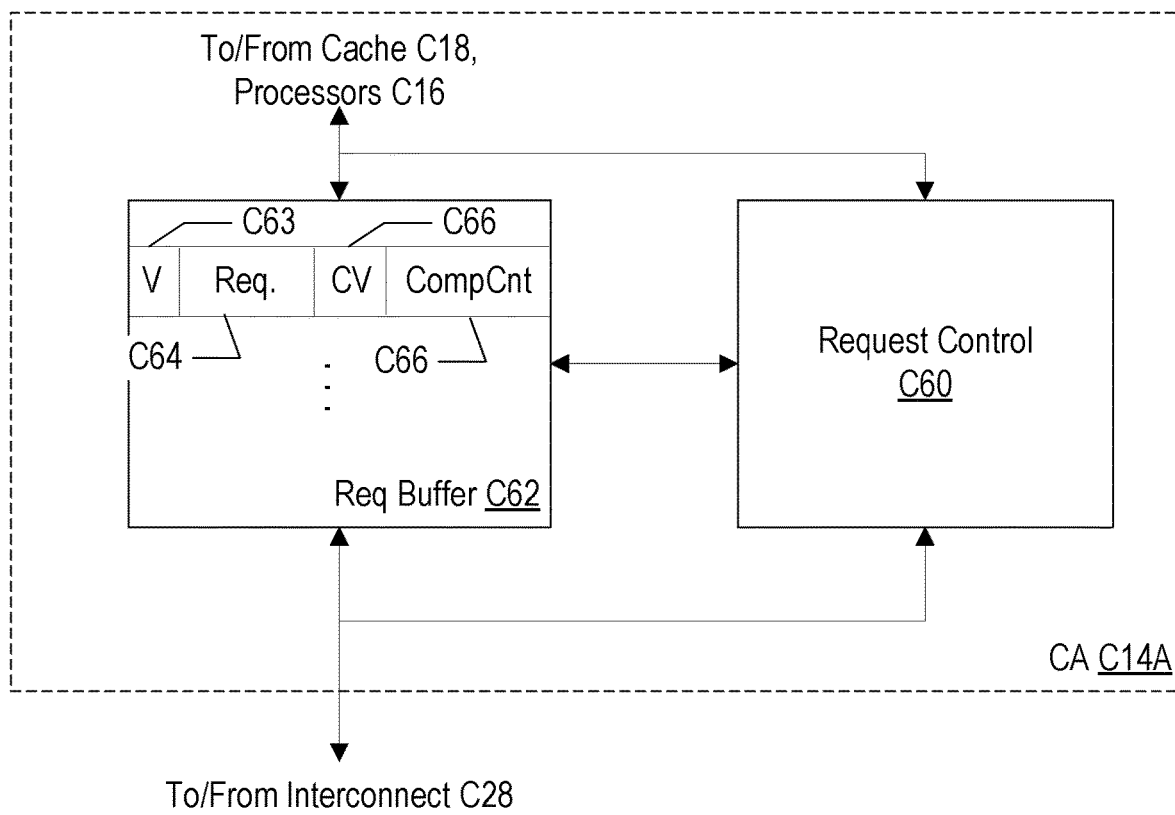
FIG. 31 is a block diagram of a portion of one embodiment of a coherent agent.

FIG. 31 is a block diagram of one embodiment of a portion of one embodiment of coherent agent C14A in greater detail. Other coherent agents C14B-C14n may be similar. In the illustrated embodiment, the coherent agent C14A may include a request control circuit C60 and a request buffer C62. The request buffer C62 is coupled to the request control circuit C60, and both the request buffer C62 and the request control circuit C60 are coupled to the cache C18 and/or processors C16 and the interconnect C28.

The request buffer C62 may be configured to store a plurality of requests generated by the cache C18/processors C16 for coherent cache blocks. That is, the request buffer C62 may store requests that initiate transactions on the interconnect C28. One entry of the request buffer C62 is illustrated in FIG. 31, and other entries may be similar. The entry may include a valid (V) field C63, a request (Req.) field C64, a count valid (CV) field C66, and a completion count (CompCnt) field C68. The valid field C63 may store a valid indication (e.g., a valid bit) indicating whether or not the entry is valid (e.g., storing an outstanding request). The request field C64 may store data defining the request (e.g., the request type, the address of the cache block, a tag or other identifier for the transaction, etc.). The count valid field C66 may store a valid indication for the completion count field C68, indicating that the completion count field C68 has been initialized. The request control circuit C68 may use the count valid field C66 when processing a completion received from the interconnect C28 for the request, to determine if the request control circuit C68 is to initialize the field with the completion count included in the completion (count field not valid) or is to update the completion count, such as decrementing the completion count (count field valid). The completion count field C68 may store the current completion count.

The request control circuit C60 may receive requests from the cache 18/processors 16 and may allocate request buffer entries in the request buffer C62 to the requests. The request control circuit C60 may track the requests in the buffer C62, causing the requests to be transmitted on the interconnect C28 (e.g., according to an arbitration scheme of any sort) and tracking received completions in the request to complete the transaction and forward the cache block to the cache C18/processors C16.

Figure 32:
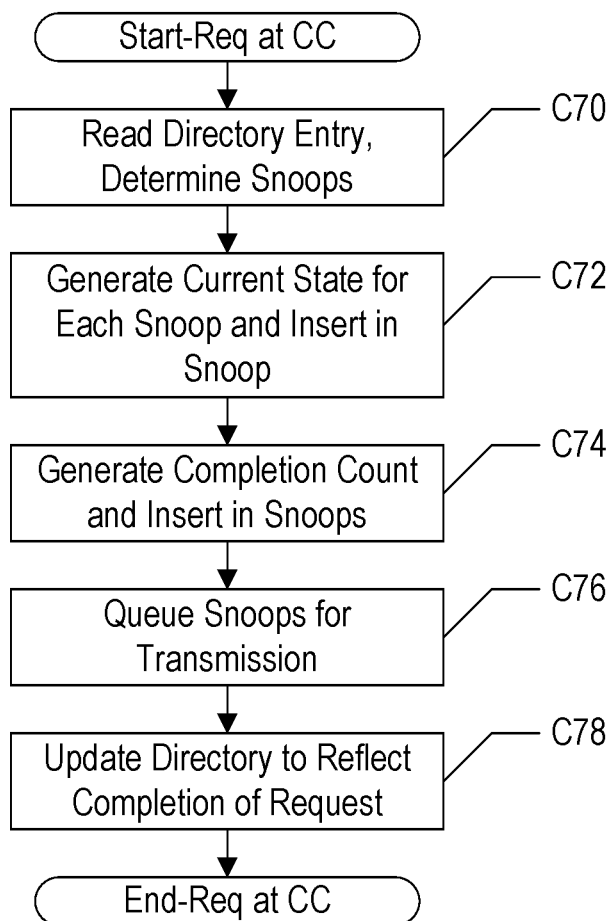
FIG. 32 is a flowchart illustrating operation of one embodiment of processing a request at a coherence controller.

Turning now to FIG. 32, a flowchart is shown illustrating operation of one embodiment of a coherency controller C24 in the memory controllers C22A-C22m based on receiving a request to be processed. The operation of FIG. 32 may be performed when the request has been selected among the received requests for service in the memory controller C22A-C22m via any desired arbitration algorithm. While the blocks are shown in a particular order for ease of understanding, other orders may be used. Blocks may be performed in parallel in combinatorial logic in the coherency controller C24. Blocks, combinations of blocks, and/or the flowchart as a whole may be pipelined over multiple clock cycles. The coherency controller C24 may be configured to implement the operation shown in FIG. 32.

The coherency controller C24 may be configured to read the directory entry from the directory C26 based on the address of the request. The coherency controller C24 may be configured to determine which snoops are to be generated based on the type of request (e.g., the state requested for the cache block by the requestor) and the current state of the cache block in various coherent agents C14A-C14n as indicated in the directory entry (block C70). Also, the coherency controller C24 may generate the current state to be included in each snoop, based on the current state for the coherent agent C14A-C14n that will receive the snoop as indicated in the directory. The coherency controller C24 may be configured to insert the current state in the snoop (block C72). The coherency controller C24 may also be configured to generate the completion count and insert the completion count in each snoop (block C74). As mentioned previously, the completion count may be the number of completions minus one, in an embodiment, or the total number of completions. The number of completions may be the number of snoops, and in the case where the memory controller C22A-C22m will provide the cache block, the fill completion from the memory controller C22A-C22m. In most cases in which there is a snoop for a cacheable request, one of the snooped coherent agents C14A-C14n may provide the cache block and thus the number of completions may be the number of snoops. However, in cases in which no coherent agent C14A-C14n has a copy of the cache block (no snoops), for example, the memory controller may provide the fill completion. The coherency controller C24 may be configured to queue the snoops for transmission to the coherent agents C14A-C14n (block C76). Once the snoops are successfully queued, the coherency controller C24 may be configured to update the directory entry to reflect completion of the request (block C78). For example, the updates may the change the cache states tracked in the directory entry to match the cache states requested by the snoops, change the agent identifier the indicates which agent is to provide the copy of the cache block to the coherent agent C14A-C14n that will have the cache block in exclusive, modified, owned, or primary shared state upon completion of the transaction, etc.

Figure 33:
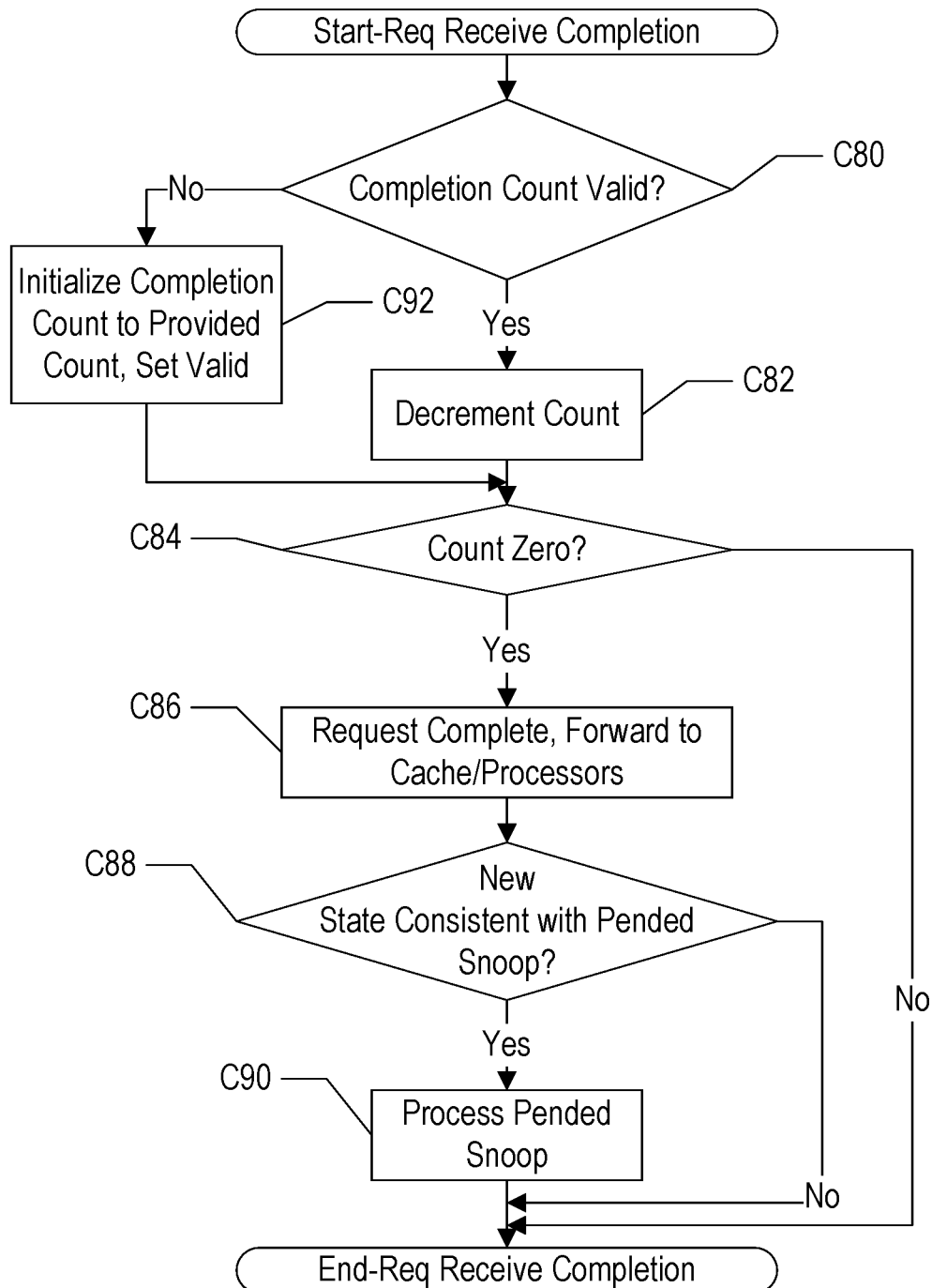
FIG. 33 is flowchart illustrating operation of one embodiment of a coherent agent that transmitted a request to a memory controller to process completions related to the request.

Turning now to FIG. 33, a flowchart is shown illustrating operation of one embodiment of request control circuit C60 in a coherent agent C14A-C14n based on receiving a completion for a request that is outstanding in the request buffer C62. While the blocks are shown in a particular order for ease of understanding, other orders may be used. Blocks may be performed in parallel in combinatorial logic in the request control circuit C60. Blocks, combinations of blocks, and/or the flowchart as a whole may be pipelined over multiple clock cycles. The request control circuit C60 may be configured to implement the operation shown in FIG. 33.

The request control circuit C60 may be configured to access the request buffer entry in the request buffer C62 that is associated with the request with which the received completion is associated. If the count valid field C66 indicates the completion count is valid (decision block C80, "yes" leg), the request control circuit C60 may be configured to decrement the count in the request count field C68 (block C82). If the count is zero (decision block C84, "yes" leg), the request is complete and the request control circuit C60 may be configured to forward an indication of completion (and the received cache block, if applicable) to the cache C18 and/or the processors C16 that generated the request (block C86). The completion may cause the state of the cache block to be updated. If the new state of the cache block after update is consistent with the expected state in a pended snoop (decision block C88, "yes" leg), the request control circuit C60 may be configured to process the pended snoop (block C90). For example, the request control circuit C60 may be configured to pass the snoop to the cache C18/processors C16 to generate the completion corresponding to the pended snoop (and to change the state of the cache block, as indicated by the snoop).

The new state may be consistent with the expected state if the new state is the same as the expected state. Additionally, the new state may be consistent with the expected state if the expected state is the state that is tracked by the directory C26 for the new state. For example, the modified state is tracked as exclusive state in the directory C26 in one embodiment, and thus modified state is consistent with an expected state of exclusive. The new state may be modified if the state is provided in a fill completion that was transmitted by another coherent agent C14A-C14n which had the cache block as exclusive and modified the cache block locally, for example.

If the count valid field C66 indicates that the completion count is valid (decision block C80) and the completion count is not zero after decrement (decision block C84, "no" leg), the request is not complete and the thus remains pending in the request buffer C62 (and any pended snoop that is waiting for the request to complete may remain pended). If the count valid field C66 indicates that the completion count is not valid (decision block C80, "no" leg), the request control circuit C60 may be configured to initialize the completion count field C68 with the completion count provided in the completion (block C92). The request control circuit C60 may still be configured to check for the completion count being zero (e.g., if there is only one completion for a request, the completion count may be zero in the completion) (decision block C84), and processing may continue as discussed above.

Figure 34:
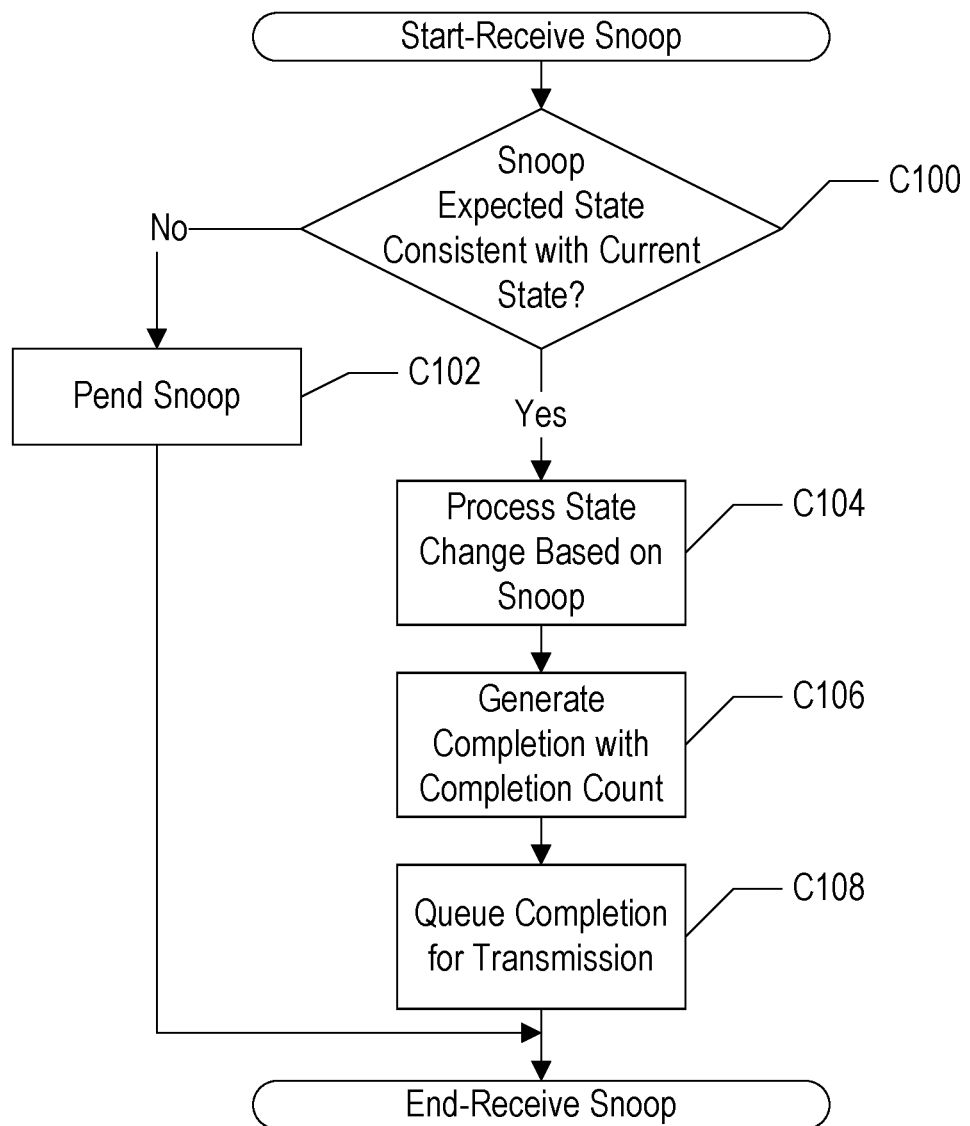
FIG. 34 is a flowchart illustrating operation of one embodiment of a coherent agent receiving a snoop.

FIG. 34 is a flowchart illustrating operation of one embodiment a coherent agent C14A-C14n based on receiving a snoop. While the blocks are shown in a particular order for ease of understanding, other orders may be used. Blocks may be performed in parallel in combinatorial logic in the coherent agent 14CA-C14n. Blocks, combinations of blocks, and/or the flowchart as a whole may be pipelined over multiple clock cycles. The coherent agent 14CA-C14n may be configured to implement the operation shown in FIG. 34.

The coherent agent C14A-C14n may be configured to check the expected state in the snoop against the state in the cache C18 (decision block C100). If the expected state is not consistent with the current state of the cache block (decision block C100, "no" leg), then a completion is outstanding that will change the current state of the cache block to the expected state. The completion corresponds to a transaction that was ordered prior to the transaction corresponding to the snoop. Accordingly, the coherent agent C14A-C14n may be configured to pend the snoop, delaying processing of the snoop until the current state changes to the expected state indicated in the snoop (block C102). The pended snoop may be stored in a buffer provided specifically for the pended snoops, in an embodiment. Alternatively, the pended snoop may be absorbed into an entry in the request buffer C62 that is storing a conflicting request as discussed in more detail below with regard to FIG. 36.

If the expected state is consistent with the current state (decision block C100, "yes" leg), the coherent agent C14A-C14n may be configured to process the state change based on the snoop (block C104). That is, the snoop may indicate the desired state change. The coherent agent C14A-C14n may be configured to generate a completion (e.g., a fill if the snoop is a snoop forward request, a copy back snoop response if the snoop is a snoop back request, or an acknowledge (forward or back, based on the snoop type) if the snoop is a state change request). The coherent agent may be configured to generate a completion with the completion count from the snoop (block C106) and queue the completion for transmission to the requesting coherent agent C14A-C14n (block CC108).

Figure 35:
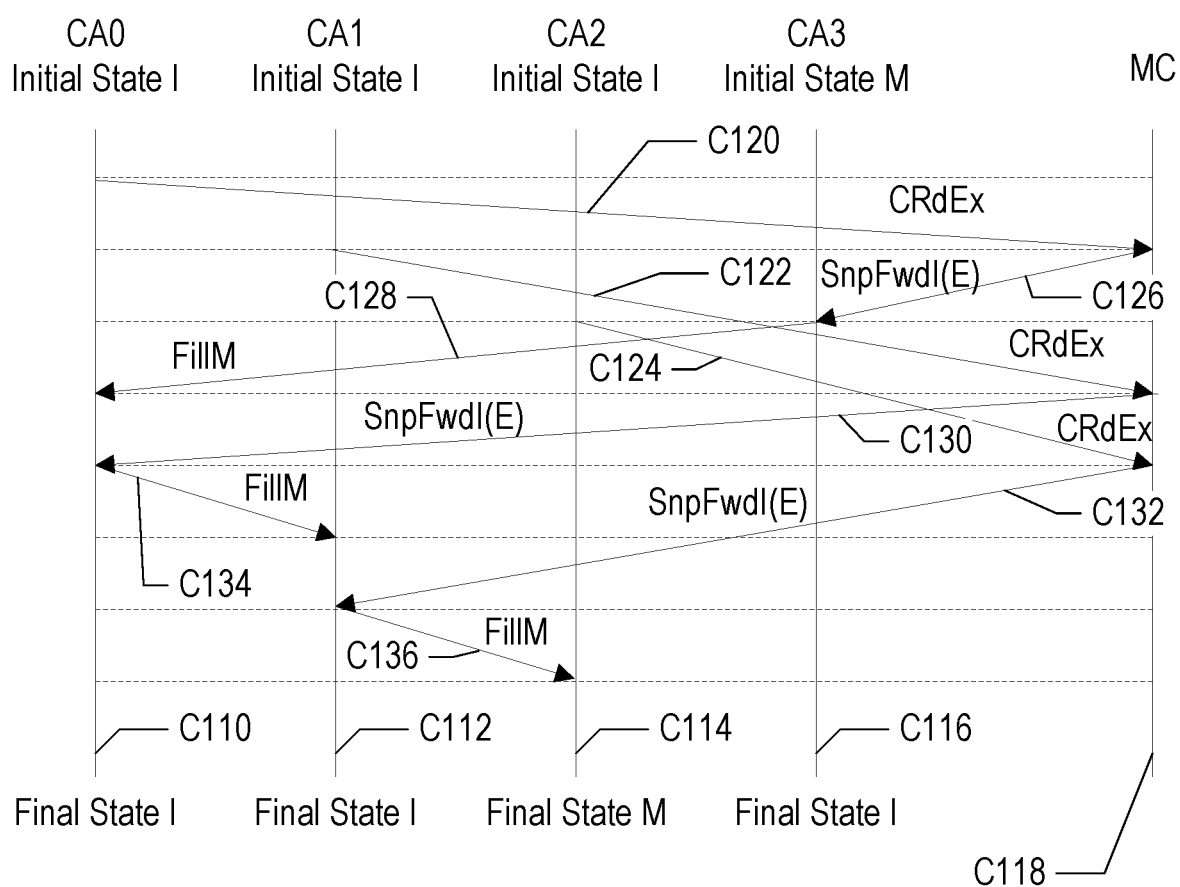
FIG. 35 is a block diagram illustrating a chain of conflicting requests to a cache block according to one embodiment.

Using the cache coherency algorithm described herein, a cache block may be transmitted from one coherent agent C14A-C14n to another through a chain of conflicting requests with low message bandwidth overhead. For example, FIG. 35 is a block diagram illustrating the transmission of a cache block among 4 coherent agents CA0 to CA3. Similar to FIGS. 29 and 30, coherent agents are listed as CA0 to CA3, and the memory controller that is associated with the cache block is shown as MC. Vertical lines 110, 112, 114, 116, and 118 for CA0, CA1, CA2, CA3, and MC respectively illustrate the source of various messages (base of an arrow) and destination of the messages (head of an arrow) corresponding to transactions. Time progresses from top to bottom in FIG. 35. At the time corresponding to the top of FIG. 35, coherent agent CA3 has the cache block involved in the transactions in the modified state (tracked as exclusive in the directory C26). The transactions in FIG. 35 are all to the same cache block.

The coherent agent CA0 initiates a read exclusive transaction with a CRdEx request to the memory controller (arrow 120). The coherent agents CA1 and CA2 also initiate read exclusive transactions (arrows 122 and 124, respectively). As indicated by the heads of arrows 120, 122, and 124 at line 118, the memory controller MC orders the transactions as CA0, then CA1, and then CA2 last. The directory state for the transaction from CA0 is CA3 in the exclusive state, and thus a snoop forward and invalidate (SnpFwdI) is transmitted with a current cache state of exclusive (arrow 126). The coherent agent CA3 receives the snoop and forwards a FillM completion with the data to coherent agent CA0 (arrow 128). Similarly, the directory state for the transaction from CA1 is the coherent agent CA0 in the exclusive state (from the preceding transaction to CA0) and thus the memory controller MC issues a SnpFwdI to coherent agent CA0 with a current cache state of E (arrow 130) and the directory state for the transaction from CA2 is the coherent agent CA1 with a current cache state of E (arrow 132). Once coherent agent CA0 has had an opportunity to perform at least one memory operation on the cache block, the coherent agent CA0 responds with a FillM completion to coherent agent CA1 (arrow 134). Similarly, once coherent agent CA1 has had an opportunity to perform at least one memory operation on the cache block, the coherent agent CA1 responds to its snoop with a FillM completion to coherent agent CA2 (arrow 136). While the order and timing of the various messages may vary (e.g., similar to the race conditions shown in FIGS. 29 and 30), in general the cache block may move from agent to agent with one extra message (the FillM completion) as conflicting requests resolve.

In an embodiment, due to the race conditions mentioned above, a snoop may be received before the fill completion it is to snoop (detected by the snoop carrying the expected cache state). Additionally, the snoop may be received before Ack completions are collected and the fill completion can be processed. The Ack completions result from snoops, and thus depend on progress in the virtual channel that carries snoops. Accordingly, conflicting snoops (delayed waiting on expected cache state) may fill internal buffers and back pressure into the fabric, which could cause deadlock. In an embodiment, the coherent agents C14A-C14n may configured to absorb one snoop forward and one snoop invalidation into an outstanding request in the request buffer, rather than allocating a separate entry. Non-conflicting snoops, or conflicting snoops that will reach the point of being able to process without further interconnect dependence, may then flow around the conflicting snoops and avoid the deadlock. The absorption of one snoop forward and one snoop invalidation may be sufficient because, when a snoop forward is made, forwarding responsibility is transferred to the target. Thus, another snoop forward will not be made again until the requester completes its current request and issues another new request after the prior snoop forward is completed. When a snoop invalidation is done, the requester is invalid according to the directory and again will not receive another invalidation until it processes the prior invalidation, requests the cache block again and obtains a new copy.

Thus, the coherent agent C14A-C14n may be configured to help ensure forward progress and/or prevent deadlock by detecting a snoop received by the coherent agent to a cache block for which the coherent agent has an outstanding request that has been ordered ahead of the snoop. The coherent agent may configured to absorb the second snoop into the outstanding request (e.g., into the request buffer entry storing the request). The coherent agent may process the absorbed snoop subsequent to completing the outstanding request. For example, if the absorbed snoop is a snoop forward request, the coherent agent may be configured to forward the cache block to another coherent agent indicated in the snoop forward snoop subsequent to completing the outstanding request (and may change the cache state to the state indicated by the snoop forward request). If the absorbed snoop is a snoop invalidate request, the coherent agent may update the cache state to invalid and transmit an acknowledgement completion subsequent to completing the outstanding request. Absorbing the snoop into a conflicting request may be implemented, e.g., by including additional storage in each request buffer entry for data describing the absorbed snoop.

Figure 36:
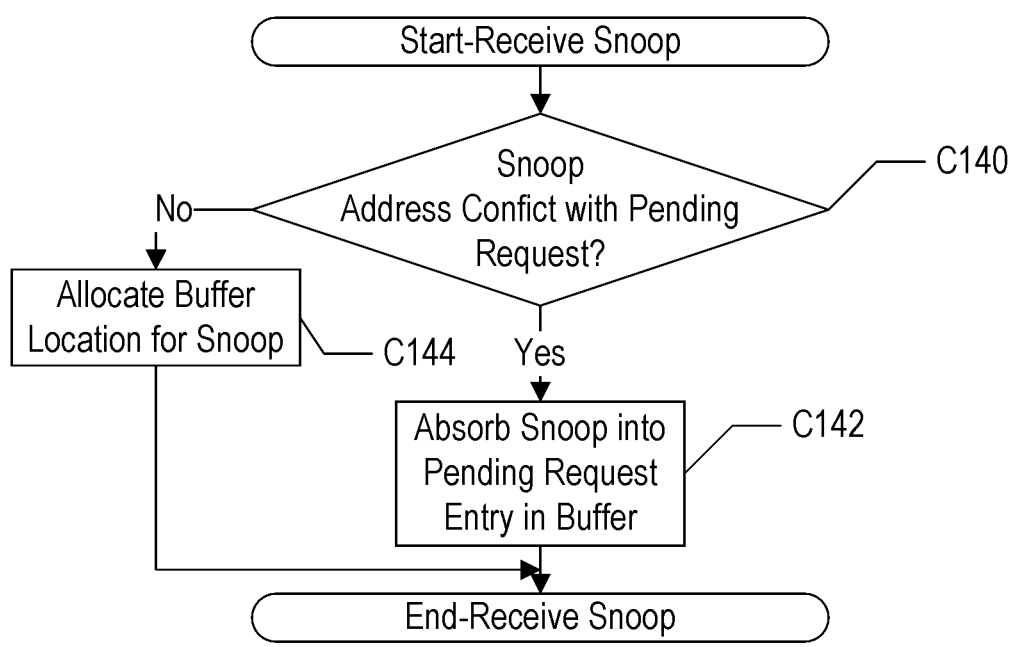
FIG. 36 is a flowchart illustrating one embodiment of a coherent agent absorbing a snoop.

FIG. 36 is a flowchart illustrating operation of one embodiment a coherent agent C14A-C14n based on receiving a snoop. While the blocks are shown in a particular order for ease of understanding, other orders may be used. Blocks may be performed in parallel in combinatorial logic in the coherent agent C14A-C14n. Blocks, combinations of blocks, and/or the flowchart as a whole may be pipelined over multiple clock cycles. The coherent agent C14A-C14n may be configured to implement the operation shown in FIG. 36. For example, the operation illustrated in FIG. 36 may be part of the detection of a snoop with expected cache state that is not consistent with the expected cache state and is pended (decision block C100 and block C102 in FIG. 34).

The coherent agent C14A-C14n may be configured to compare the address of snoop which is to be pended for a lack of consistent cache state with addresses of outstanding requests (or pending requests) in the request buffer C62. If an address conflict is detected (decision block C140, "yes" leg), the request buffer C62 may absorb the snoop into the buffer entry assigned to the pending request for which the address conflict is detected (block C142). If there is no address conflict with a pending request (decision block C140, "no" leg), the coherent agent C14A-C14n may be configured to allocate a separate buffer location (e.g., in the request buffer C62 or another buffer in the coherent agent C14A-C14n) for the snoop and may be configured to store data describing the snoop in the buffer entry (block C144).

As mentioned previously, the cache coherency protocol may support both cacheable and non-cacheable requests in an embodiment, while maintaining coherency of the data involved. The non-cacheable requests may be issued by non-coherent agents C20A-C20p, for example, and the non-coherent agents C20A-C20p may not have the capability to coherently store cache blocks. In an embodiment, it may be possible for a coherent agent C14A-C14n to issue a non-cacheable request as well, and the coherent agent may not cache data provided in response to such a request. Accordingly, a snoop forward request for a non-cacheable request would not be appropriate, e.g., in the case that the data that a given non-coherent agent C20A-C20p requests is in a modified cache block in one of the coherent agents C14A-C14n and would be forwarded to the given non-coherent agent C20A-C20p with an expectation that the modified cache block would be preserved by the given non-coherent agent C20A-C20p.

To support coherent non-cacheable transactions, an embodiment of the scalable cache coherency protocol may include multiple types of snoops. For example, in an embodiment, the snoops may include a snoop forward request and a snoop back request. As previously mentioned, the snoop forward request may cause the cache block to be forwarded to the requesting agent. The snoop back request, on the other hand, may cause the cache block to be transmitted back to the memory controller. In an embodiment, a snoop invalidate request may also be supported to invalidate the cache block (with forward and back versions to direct the completions).

More particularly, the memory controller C22A-C22m that receives a request (and even more particularly, the coherency controller C24 in the memory controller C22A-C22m) may be configured to read an entry corresponding to a cache block identified by the address in the request from the directory C26. The memory controller C22A-C22m may be configured to issue a snoop to given agent of the coherent agents C14A-C14m that has a cached copy of the cache block according to the entry. The snoop indicates that the given agent is to transmit the cache block to a source of the request based on the first request being a first type (e.g., a cacheable request). The snoop indicates that the given agent is to transmit the first cache block to the memory controller based the first request being a second type (e.g., a non-cacheable request). The memory controller C22A-C22n may be configured to respond to the source of the request with a completion based on receiving the cache block from the given agent. Additionally, as with other coherent requests, the memory controller C22A-C22n may be configured to update the entry in the directory C26 to reflect completion of the non-cacheable request based on issuing a plurality of snoops for the non-cacheable request.

Figure 37:
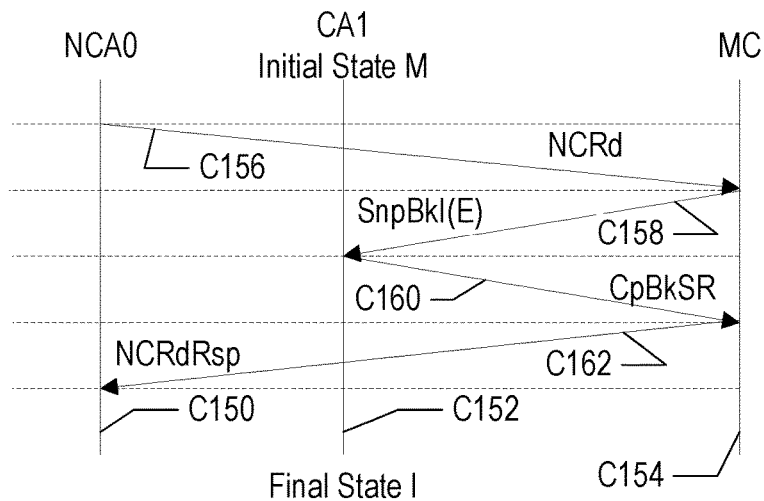
FIG. 37 is a block diagram illustrating one embodiment of a non-cacheable request.

FIG. 37 is a block diagram that illustrates an example of a non-cacheable transaction managed coherently in one embodiment. FIG. 37 may be an example of a 4-hop protocol to pass snooped data to the requestor through the memory controller. A non-coherent agent is listed as NCA0, a coherent agent is as CA1, and the memory controller that is associated with the cache block is listed as MC. Vertical lines 150, 152, and 154 for NCA0, CA1, and MC illustrate the source of various messages (base of an arrow) and destination of the messages (head of an arrow) corresponding to transactions. Time progresses from top to bottom in FIG. 37.

At the time that corresponds to the top of FIG. 37, the coherent agent CA1 has the cache block in the exclusive state (E). NCA0 issues a non-cacheable read request (NCRd) to the MC (arrow 156). The MC determines from the directory 26 that CA1 has the cache block containing the data requested by the NCRd in the exclusive state, and generates a snoop back request (SnpBkI(E)) to CA1 (arrow 158). CA1 provides a copy back snoop response (CpBkSR) with the cache block of data to the MC (arrow 160). If the data is modified, the MC may update the memory with the data, and may provide the data for the non-cacheable read request to NCA0 in a non-cacheable read response (NCRdRsp) (arrow 162), completing the request. In an embodiment, there may more than one type of NCRd request: requests that invalidate a cache block in a snooped coherent agent and requests that permit the snooped coherent agent to retain the cache block. The above discussion illustrates invalidation. In other cases, the snooped agent may retain the cache block in the same state.

A non-cacheable write request may be performed in a similar fashion, using the snoop back request to obtain the cache block and modifying the cache block with the non-cacheable write data before writing the cache block to memory. A non-cacheable write response may still be provided to inform the non-cacheable agent (NCA0 in FIG. 37), that the write is complete.

Figure 38:
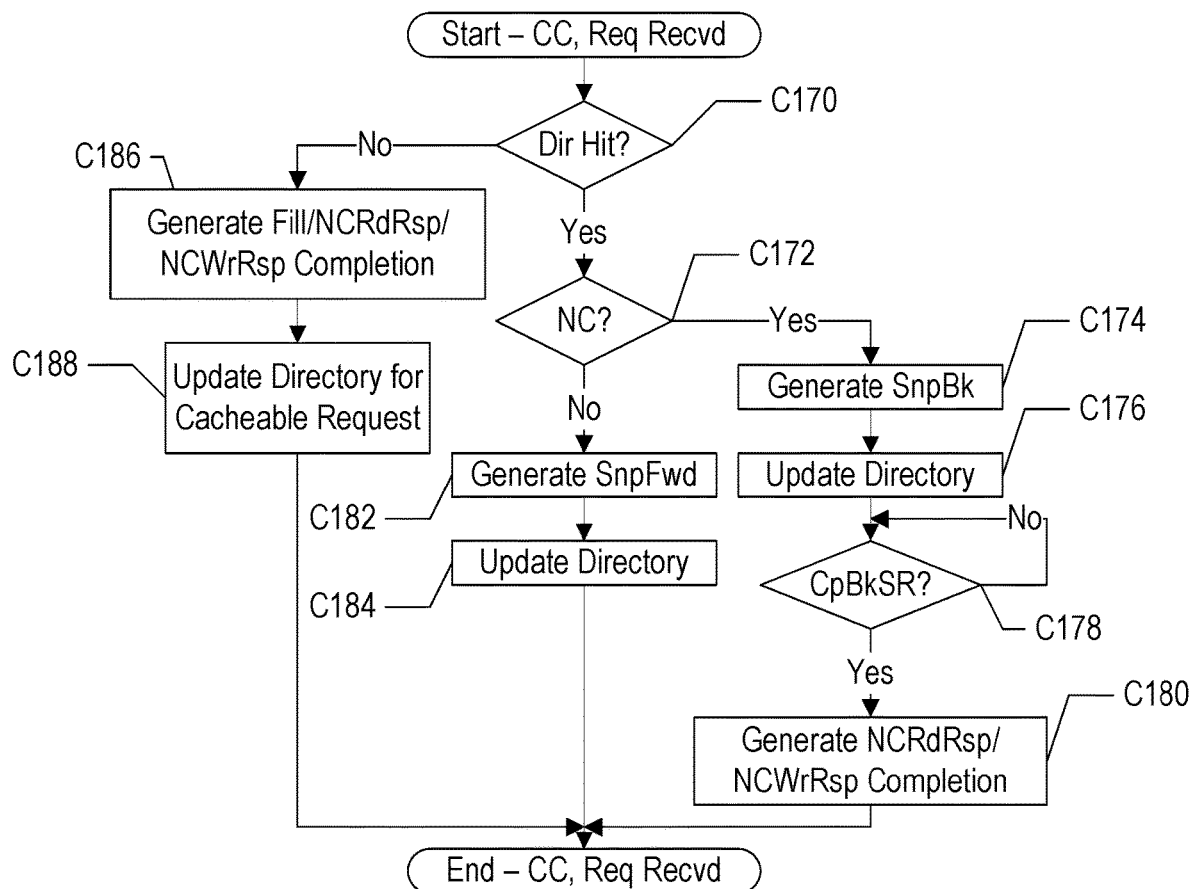
FIG. 38 is a flowchart illustrating operation of one embodiment of a coherence controller for generating snoops based on cacheable and non-cacheable properties of requests.

FIG. 38 is a flowchart illustrating operation of one embodiment of a memory controller C22A-C22m (and more particularly a coherency controller 24 in the memory controller C22A-C22m in an embodiment) in response to a request, illustrating cacheable and non-cacheable operation. The operation illustrated in FIG. 38 may be a more detailed illustration of a portion of the operation shown in FIG. 32, for example. While the blocks are shown in a particular order for ease of understanding, other orders may be used. Blocks may be performed in parallel in combinatorial logic in the coherency controller C24. Blocks, combinations of blocks, and/or the flowchart as a whole may be pipelined over multiple clock cycles. The coherency controller C24 may be configured to implement the operation shown in FIG. 38.

The coherency controller C24 may be configured to read the directory based on the address in the request. If the request is a directory hit (decision block C170, "yes" leg), the cache block exists in one or more caches in the coherent agents C14A-C14n. If the request is non-cacheable (decision block C172, "yes" leg), the coherency controller C24 may be configured to issue a snoop back request to the coherent agent C14A-C14n responsible for providing a copy of the cache block (and snoop invalidate requests to sharing agents (back variant), if applicable—block C174). The coherency controller C24 may be configured to update the directory to reflect the snoops being completed (e.g., invalidating the cache block in the coherent agents C14A-C14n-block C176). The coherency controller C24 may be configured to wait for the copy back snoop response (decision block C178, "yes" leg), as well as any Ack snoop responses from sharing coherent agents C14A-C14n, and may be configured to generate the non-cacheable completion to the requesting agent (NCRdRsp or NCWrRsp as appropriate) (block C180). The data may also be written to memory by the memory controller C22A-C22m if the cache block is modified.

If the request is cacheable (decision block C172, "no" leg), the coherency controller C24 may be configured to generate a snoop forward request to the coherent agent C14A-C14n that is responsible for forwarding the cache block (block C182), as well as other snoops if needed to other caching coherent agents C14A-C14n. The coherency controller C24 may update the directory C24 to reflect completion of the transaction (block C184).

If the request is not a hit in directory C26 (decision block C170, "no" leg), there are no cached copies of the cache block in the coherent agents C14A-C14n. In this case, no snoops may be generated and the memory controller C22A-C22m may be configured to generate a fill completion (for a cacheable request) or a non-cacheable completion (for a non-cacheable request) to provide the data or complete the request (block C186). In the case of a cacheable request, the coherency controller C24 may update the directory C26 to create an entry for the cache block and may initialize the requesting coherent agent 14A-C14n as having a copy of the cache block in the cache state requested by the coherent agent C14A-C14n (block C188).

FIG. 39 is a table C190 illustrating exemplary cache states that may be implemented in one embodiment of the coherent agents C14A-C14n. Other embodiments may employ different cache states, a subset of the cache states shown and other cache states, a superset of the cache states shown and other cache states, etc. The modified state (M), or "dirty exclusive" state, may be a state in a coherent agent C14A-C14n that has the only cached copy of the cache block (the copy is exclusive) and the data in the cached copy has been modified with respect to the corresponding data in memory (e.g., at least one byte of the data is different from a corresponding byte in the memory). Modified data may also be referred to as dirty data. The owned state (O), or "dirty shared" state, may be a state in a coherent agent C14A-C14n that has a modified copy of the cache block but may have shared the copy with at least one other coherent agent C14A-C14n (although it is possible that the other coherent agent C14A-C14n subsequently evicted the shared cache block). The other coherent agent C14A-C14n would have the cache block in the secondary shared state. The exclusive state (E), or "clean exclusive" state, may be a state in a coherent agent C14A-C14n that has the only cached copy of the cache block, but the cached copy has the same data as the corresponding data in memory. The exclusive no data (EnD) state, or "clean exclusive, no data," state, may be a state in a coherent agent C14A-14n similar to the exclusive (E) state except that the cache block of data is not being delivered to the coherent agent. Such a state may be used in a case wherein the coherent agent C14A-C14n is to modify each byte in the cache block, and thus there may be no benefit or coherency reason to supply the previous data in the cache block. The EnD state may an optimization to reduce traffic on the interconnect C28, and may not be implemented in other embodiments. The primary shared (P) state, or "clean shared primary" state, may be the state in a coherent agent C14A-C14n that has a shared copy of the cache block but also has the responsibility to forward the cache block to another coherent agent based on a snoop forward request. The secondary shared (S) state, or "clean shared secondary" state, may be a state in a coherent agent C14A-C14n that has a shared copy of the cache block but is not responsible for providing the cache block if another coherent agent C14A-C14n has the cache block in primary shared state. In some embodiments, if no coherent agent C14A-C14n has the cache block in primary shared state, the coherency controller C24 may select a secondary shared agent to provide the cache block (and may send a snoop forward request to the selected coherent agent). In other embodiments, the coherency controller C24 may cause the memory controller C22A-C22m to provide the cache block to a requestor if there is no coherent agent C14A-C14n in the primary shared state. The invalid state (I) may be a state in a coherent agent C14A-C14n that does not have a cached copy of the cache block. The coherent agent C14A-C14n in the invalid state may not have requested a copy previously, or may have any a copy and have invalidated it based on a snoop or based on eviction of the cache block to cache a different cache block.

FIG. 40 is a table C192 illustrating various messages that may be used in one embodiment of the scalable cache coherence protocol. There may be alternative messages in other embodiments, subsets of the illustrated messages and additional messages, supersets of the illustrated messages and additional messages, etc. The messages may carry a transaction identifier that links the messages from the same transaction (e.g., initial request, snoops, completions). The initial requests and snoops may carry the address of the cache block affected by the transaction. Some other messages may carry the address as well. In some embodiments, all messages may carry the address.

Cacheable read transactions may be initiated with a cacheable read request message (CRd). There may be various versions of the CRd request to request different cache states. For example, CRdEx may request exclusive state, CRdS may request secondary shared state, etc. The cache state actually provided in response to a cacheable read request may be at least as permissive as the request state, and may be more permissive. For example, CRdEx may receive a cache block in exclusive or modified state. CRdS may receive the block in primary shared, exclusive, owned, or modified states. In an embodiment, an opportunistic CRd request may be implemented and the most permissive state possible (which does not invalidate other copies of the cache block) may be granted (e.g., exclusive if no other coherent agent has a cached copy, owned or primary shared if there are cached copies, etc.).

The change to exclusive (CtoE) message may be used by a coherent agent that has a copy of the cache block in a state that does not permit modification (e.g., owned, primary shared, secondary shared) and the coherent agent is attempting to modify the cache block (e.g., the coherent agent needs exclusive access to change the cache block to modified). In an embodiment, a conditional CtoE message may be used for a store conditional instruction. The store conditional instruction is part of a load reserve/store conditional pair in which the load obtains a copy of a cache block and sets a reservation for the cache block. The coherent agent C14A-C14n may monitor access to the cache block by other agents and may conditionally perform the store based on whether or not the cache block has not been modified by another coherent agent C14A-C14n between the load and the store (successfully storing if the cache block has not been modified, not storing if the cache block has been modified). Additional details are provided below.

In an embodiment, the cache read exclusive, data only (CRdE-Donly) message may be used when a coherent agent C14A-C14n is to modify the entire cache block. If the cache block is not modified in another coherent agent C14A-C14n, the requesting coherent agent C14A-C14n may use the EnD cache state and modify all the bytes of the block without a transfer of the previous data in the cache block to the agent. If the cache block is modified, the modified cache block may be transferred to the requesting coherent agent C14A-C14n and the requesting coherent agent C14A-C14n may use the M cache state.

Non-cacheable transactions may be initiated with non-cacheable read and non-cacheable write (NCRd and NCWr) messages.

Snoop forward and snoop back (SnpFwd and SnpBk, respectively) may be used for snoops as described previously. There may be messages to request various states in the receiving coherent agent C14A-C14n after processing the snoop (e.g., invalid or shared). There may also be a snoop forward message for the CRdE-Donly request, which requests forwarding if the cache block is modified but no forwarding otherwise, and invalidation at the receiver. In an embodiment, there may also be invalidate-only snoop forward and snoop back requests (e.g., snoops that cause the receiver to invalidate and acknowledge to the requestor or the memory controller, respectively, without returning the data) shown as SnpInvFw and SnpInvBk in table C192.

Completion messages may include the fill message (Fill) and the acknowledgement message (Ack). The fill message may specify the state of the cache block to be assumed by the requester upon completion. The cacheable writeback (CWB) message may be used to transmit a cache block to the memory controller C22A-C22m (e.g., based on evicting the cache block from the cache). The copy back snoop response (CpBkSR) may be used to transmit a cache block to the memory controller C22A-C22m (e.g., based on a snoop back message). The non-cacheable write completion (NCWrRsp) and the non-cacheable read completion (NCRdRsp) may be used to complete non-cacheable requests.

Figure 41:
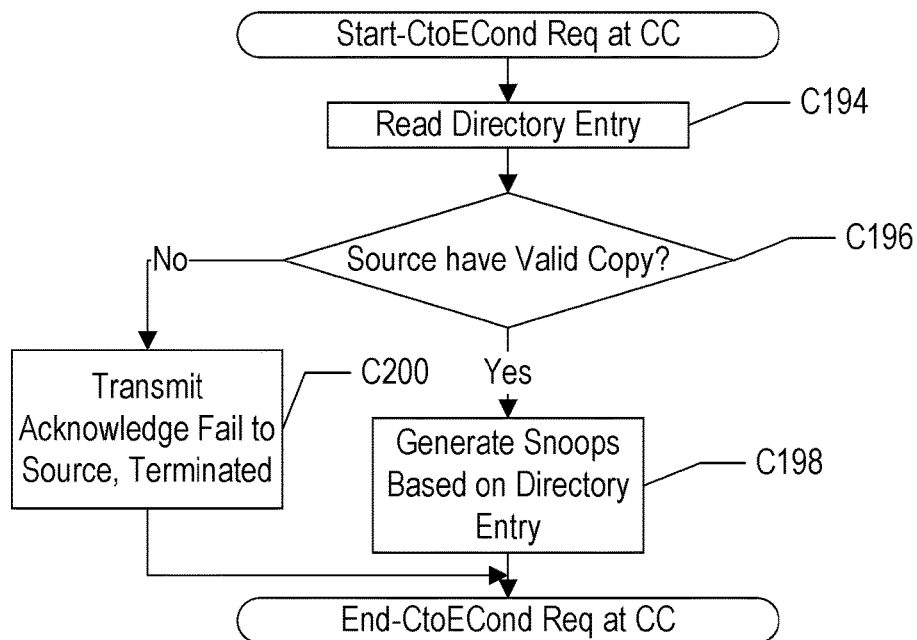
FIG. 41 is a flowchart illustrating operation of one embodiment of a coherence controller for processing a change to exclusive conditional request.

FIG. 41 is a flowchart illustrating operation of one embodiment of the coherency controller C24 based on receiving a conditional change to exclusive (CtoECond) message. For example, FIG. 41 may be a more detailed description of a portion of block C70 in FIG. 32, in an embodiment. While the blocks are shown in a particular order for ease of understanding, other orders may be used. Blocks may be performed in parallel in combinatorial logic in the coherency controller C24. Blocks, combinations of blocks, and/or the flowchart as a whole may be pipelined over multiple clock cycles. The coherency controller C24 may be configured to implement the operation shown in FIG. 41.

The CtoECond message may be issued by a coherent agent C14A-14n (the "source") based on execution of a store conditional instruction. The store conditional instruction may fail locally in the source if the source loses a copy of the cache block prior to the store condition instruction (e.g., the copy is not valid any longer). If the source still has a valid copy (e.g., in secondary or primary shared state, or owned state), when the store conditional instruction is executed, it is still possible that another transaction will be ordered ahead of the change to exclusive message from the source that causes the source to invalidate its cached copy. The same transaction that invalidates the cached copy will also cause the store conditional instruction to fail in the source. In order to avoid invalidations of the cache block and a transfer of the cache block to the source where the store conditional instruction will fail, the CtoECond message may be provided and used by the source.

The CtoECond message may be defined to have at least two possible outcomes when it is ordered by the coherency controller C24. If the source still has a valid copy of the cache block as indicted in the directory C26 at the time the CtoECond message is ordered and processed, the CtoECond may proceed similar to a non-condition CtoE message: issuing snoops and obtaining exclusive state for the cache block. If the source does not have a valid copy of the cache block, the coherency controller C24 may fail the CtoE transaction, returning an Ack completion to the source with the indication that the CtoE failed. The source may terminate the CtoE transaction based on the Ack completion.

As illustrated in FIG. 41, the coherency controller C24 may be configured to read the directory entry for the address (block C194). If the source retains a valid copy of the cache block (e.g., in a shared state) (decision block C196, "yes"

leg), the coherency controller C24 may be configured to generate snoops based on the cache states in the directory entry (e.g., snoops to invalidate the cache block so that the source may change to the exclusive state) (block C198). If the source does not retain a valid copy of the cache block (decision block C196, "no" leg), the cache controller C24 may be configured to transmit an acknowledgement completion to the source, indicating failure of the CtoECond message (block C200). The CtoE transaction may thus be terminated.

Figure 42:
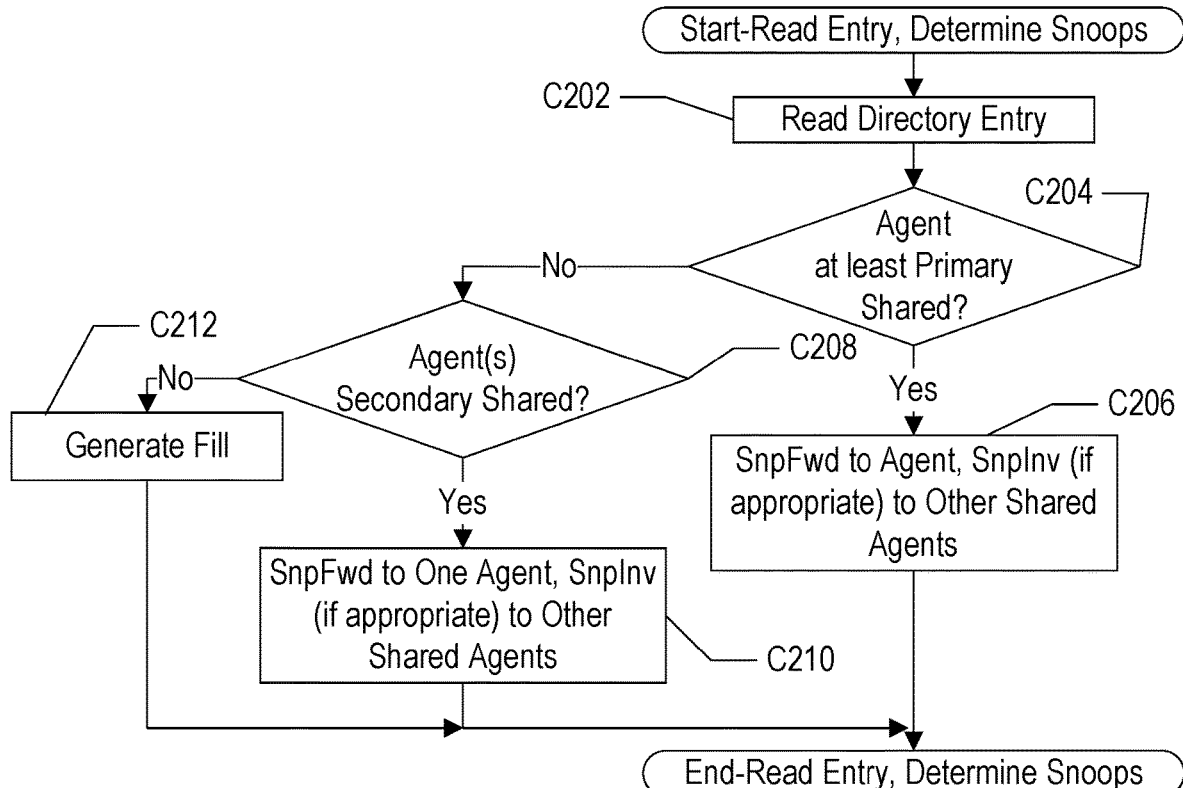
FIG. 42 is a flowchart illustrating operation of one embodiment of a coherence controller for reading a directory entry and generating snoops.

Turning now to FIG. 42, a flowchart is shown illustrating operation of one embodiment of the coherency controller C24 to read a directory entry and determine snoops (e.g., at least a portion of block C70 in FIG. 32, in an embodiment). While the blocks are shown in a particular order for ease of understanding, other orders may be used. Blocks may be performed in parallel in combinatorial logic in the coherency controller C24. Blocks, combinations of blocks, and/or the flowchart as a whole may be pipelined over multiple clock cycles. The coherency controller C24 may be configured to implement the operation shown in FIG. 42.

As illustrated in FIG. 42, the coherency controller C24 may be configured to read the directory entry for the address of the request (block C202). Based on the cache states in the directory entry, the coherency controller C24 may be configured to generate snoops. For example, based on the cache state in one of the agents being at least primary shared (decision block C204, "yes" leg), the coherency controller C24 may be configured to transmit a SnpFwd snoop to the primary shared agent, indicating that the primary shared agent is to transmit the cache block to the requesting agent. For other agents (e.g., in the secondary shared state) the coherency controller C24 may be configured to generate invalidate-only snoops (SnpInv), which indicate that the other agents are not to transmit the cache block to the requesting agent (block C206). In some cases, (e.g., a CRdS request requesting a shared copy of the cache block), the other agents need not receive a snoop since they do not need to change state. An agent may have a cache state that is at least primary shared if it is a cache state that is at least as permissive as primary shared (e.g., primary shared, owned, exclusive, or modified in the embodiment of FIG. 39).

If no agent has a cache state that is at least primary shared (decision block C204, "no" leg), the coherency controller C24 may be configured to determine if one or more agents has the cache block in the secondary shared state (decision block C208). If so (decision block C208, "yes" leg), the coherency controller C24 may be configured to select one of the agents having secondary shared state and may transmit a SnpFwd request instruction the selected agent to forward to the cache block to the requesting agent. The coherency controller C24 may be configured to generate SnpInv requests for other agents in the secondary shared state, which indicate that the other agents are not to transmit the cache block to the requesting agent (block C210). As above, SnpInv messages may not be generated and transmitted if the other agents do not need to change state.

If no agent has cache state that is secondary shared (decision block C208, "no" leg), the coherency controller C24 may be configured to generate a fill completion and may be configured to cause the memory controller to read the cache block for transmission to the request agent (block C212).

Figure 43:
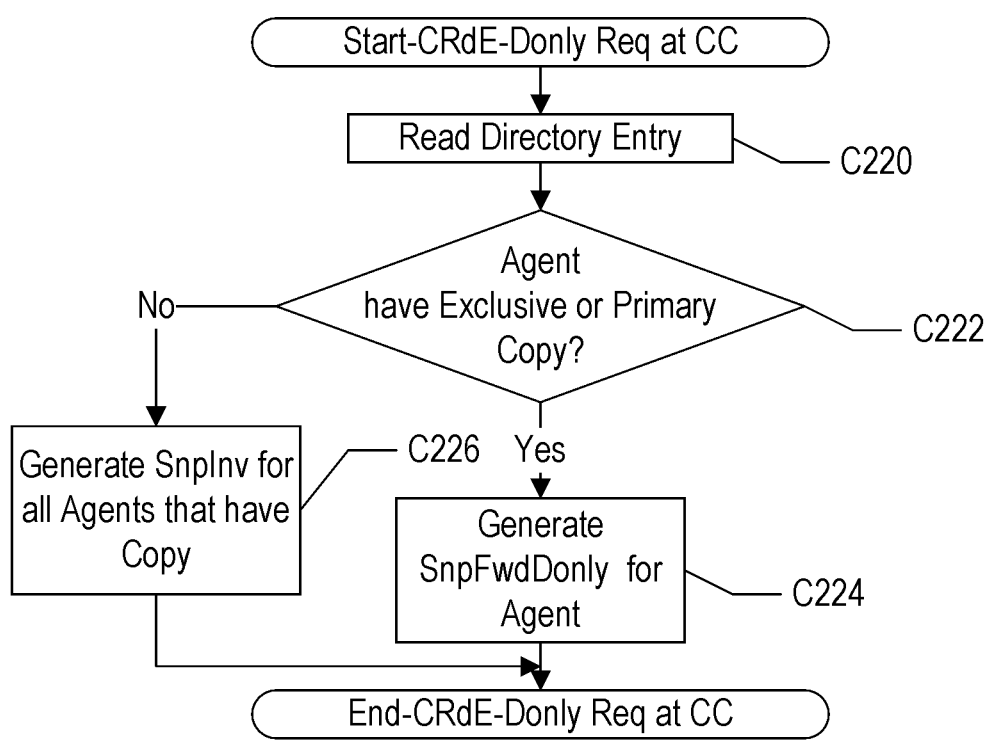
FIG. 43 is a flowchart illustrating operation of one embodiment of a coherence controller for processing an exclusive no data request.

FIG. 43 is a flowchart illustrating operation of one embodiment of the coherency controller C24 to read a directory entry and determine snoops (e.g., at least a portion of block C70 in FIG. 32, in an embodiment) in response to a CRdE-Donly request. While the blocks are shown in a particular order for ease of understanding, other orders may be used. Blocks may be performed in parallel in combinatorial logic in the coherency controller C24. Blocks, combinations of blocks, and/or the flowchart as a whole may be pipelined over multiple clock cycles. The coherency controller C24 may be configured to implement the operation shown in FIG. 43.

As mentioned above, the CRdE-Donly request may be used by a coherent agent C14A-C14n that is to modify all the bytes in a cache block. Thus, the coherency controller C24 may cause other agents to invalidate the cache block. If an agent has the cache block modified, the agent may supply the modified cache block to the request agent. Otherwise, the agents may not supply the cache block.

The coherency controller C24 may be configured to read the directory entry for the address of the request (block C220). Based on the cache states in the directory entry, the coherency controller C24 may be configured to generate snoops. More particularly, if a given agent may have a modified copy of the cache block (e.g., the given agent has the cache block in exclusive or primary state) (block C222, "yes" leg), the cache controller C24 may generate a snoop forward-Dirty only (SnpFwdDonly) to the agent to transmit the cache block to the request agent (block C224). As mentioned above, the SnpFwdDonly request may cause the receiving agent to transmit the cache block if the data is modified, but otherwise not transmit the cache block. In either case, the receiving agent may invalidate the cache block. The receiving agent may transmit a Fill completion if the data is modified and provide the modified cache block. Otherwise, the receiving agent may transmit an Ack completion. If no agent has a modified copy (decision block C222, "no" leg), the coherency controller C24 may be configured to generate a snoop invalidate (SnpInv) for each agent that has a cached copy of the cache block. (block C226). In another embodiment, the coherency controller C24 may request no forwarding of the data even if the cache block is modified, since the requester is to modify the entire cache block. That is, the coherency controller C24 may cause the agent having the modified copy to invalidate the data without forwarding the data.

Based on this disclosure, a system may comprise a plurality of coherent agents, wherein a given agent of the plurality of coherent agent comprises one or more caches to cache memory data. The system may further comprise a memory controller coupled to one or more memory devices, wherein the memory controller includes a directory configured to track which of the plurality of coherent agents is caching copies of a plurality of cache blocks in the memory devices and states of the cached copies in the plurality of coherent agents. Based on a first request for a first cache block by a first agent of the plurality of coherent agents, the memory controller may be configured to: read an entry corresponding to the first cache block from the directory, issue a snoop to a second agent of the plurality of coherent agents that has a cached copy of the first cache block according to the entry, and include an identifier of a first state of the first cache block in the second agent in the snoop. Based on the snoop, the second agent may be configured to: compare the first state to a second state of the first cache block in the second agent, and delay processing of the snoop based on the first state not matching the second state until the second state is changed to the first state in response to a different communication related to a different request than the first request. In an embodiment, the memory controller may be configured to: determine a completion count indicating a number of completions that the first agent will receive for the first request, wherein the determination is based on the states from the entry; and include the completion count in a plurality of snoops issued based on the first request including the snoop issued to the second agent. The first agent may be configured to: initialize a completion counter with the completion count based on receiving an initial completion from one of the plurality of coherent agents, update the completion counter based on receiving a subsequent completion from another one of the plurality of coherent agents, and complete first request based on the completion counter. In an embodiment, the memory controller may be configured to update the states in the entry of the directory to reflect completion of the first request based on issuing a plurality of snoops based on the first request. In an embodiment, the first agent may be configured to detect a second snoop received by the first agent to the first cache block, wherein the first agent may be configured to absorb the second snoop into the first request. In an embodiment, the first agent may be configured to process the second snoop subsequent to completing the first request. In an embodiment, the first agent may configured to forward the first cache block to a third agent indicated in the second snoop subsequent to completing the first request. In an embodiment, a third agent may configured to generate a conditional change to exclusive state request based on a store conditional instruction to a second cache block that is in a valid state at the third agent. The memory controller may configured to determine if the third agent retains a valid copy of the second cache block based on a second entry in the directory associated with the second cache block, and the memory controller may configured to transmit a completion indicating failure to the third agent and terminate the conditional change to exclusive request based on a determination that the third agent no longer retains the valid copy of the second cache block. In an embodiment, the memory controller may be configured to issue one or more snoops to other ones of the plurality of coherent agents as indicated by the second entry based on a determination that the third agent retains the valid copy of the second cache block. In an embodiment, the snoop indicates that the second agent is to transmit the first cache block to the first agent based on the first state being primary shared, and wherein the snoop indicates that the second agent is not to transmit the first cache block based on the first state being secondary shared. In an embodiment, the snoop indicates that the second agent is to transmit the first cache block even in the event that the first state is secondary shared.

In another embodiment, a system comprises a plurality of coherent agents, wherein a given agent of the plurality of coherent agent comprises one or more caches to cache memory data. The system further comprises a memory controller coupled to one or more memory devices. The memory controller may include a directory configured to track which of the plurality of coherent agents is caching copies of a plurality of cache blocks in the memory devices and states of the cached copies in the plurality of coherent agents. Based on a first request for a first cache block by a first agent of the plurality of coherent agents, the memory controller may be configured to: read an entry corresponding to the first cache block from the directory, and issue a snoop to a second agent of the plurality of coherent agents that has a cached copy of the first cache block according to the entry. The snoop may indicate that the second agent is to transmit the first cache block to the first agent based on the entry indicating that the second agent has the first cache block in at least a primary shared state. The snoop indicates that the second agent is not to transmit the first cache block to the first agent based on a different agent having the first cache block in at least the primary shared state. In an embodiment, the first agent is in a secondary shared state for the first cache block if the different agent is in the primary shared state. In an embodiment, the snoop indicates that the first agent is to invalidate the first cache block based on the different agent having the first cache block in at least the primary shared state. In an embodiment, the memory controller is configured not to issue a snoop to the second agent based on the different agent having the first cache block in the primary shared state and the first request being a request for a shared copy of the first cache block. In an embodiment, the first request may be for an exclusive state for the first cache block and the first agent is to modify an entirety of the first cache block. The snoop may indicate that the second agent is to transmit the first cache block if the first cache block is in a modified state in the second agent. In an embodiment, the snoop indicates that the second agent is to invalidate the first cache block if the first cache block is not in a modified state in the second agent.

In another embodiment, a system comprises a plurality of coherent agents, wherein a given agent of the plurality of coherent agent comprises one or more caches to cache memory data. The system further comprises a memory controller coupled to one or more memory devices. The memory controller may include a directory configured to track which of the plurality of coherent agents is caching copies of a plurality of cache blocks in the memory devices and states of the cached copies in the plurality of coherent agents. Based on a first request for a first cache block, the memory controller may be configured to: read an entry corresponding to the first cache block from the directory, and issue a snoop to a second agent of the plurality of coherent agents that has a cached copy of the first cache block according to the entry. The snoop may indicate that the second agent is to transmit the first cache block to a source of the first request based on an attribute associated with the first request having a first value, and the snoop indicates that the second agent is to transmit the first cache block to the memory controller based on the attribute having a second value. In an embodiment, the attribute is a type of request, the first value is cacheable, and the second value is non-cacheable. In another embodiment, the attribute is a source of the first request. In an embodiment, the memory controller may be configured to respond to the source of the first request based on receiving the first cache block from the second agent. In an embodiment, the memory controller is configured to update the states in the entry of the directory to reflect completion of the first request based on issuing a plurality of snoops based on the first request.

IOA

FIGS. 44-48 illustrate various embodiments of an input/output agent (IOA) that may be employed in various embodiments of the SOC. The IOA may be interposed between a given peripheral device and the interconnect fabric. The IOA agent may be configured to enforce coherency protocols of the interconnect fabric with respect to the given peripheral device. In an embodiment, the IOA ensures the ordering of requests from the given peripheral device using the coherency protocols. In an embodiment, the IOA is configured to couple a network of two or more peripheral devices to the interconnect fabric.

In many instances, a computer system implements a data/cache coherency protocol in which a coherent view of data is ensured within the computer system. Consequently, changes to shared data are propagated throughout the computer system normally in a timely manner in order to ensure the coherent view. A computer system also typically includes or interfaces with peripherals, such as input/output (I/O) devices. These peripherals, however, are not configured to understand or make efficient use of the cache coherency protocol that is implemented by the computer system. For example, peripherals often use specific order rules for their transactions (which are discussed further below) that are stricter than the cache coherency protocol. Many peripherals also do not have caches—that is, they are not cacheable devices. As a result, it can take reasonably longer for peripherals to receive completion acknowledgements for their transactions as they are not completed in a local cache. This disclosure addresses, among other things, these technical problems relating to peripherals not being able to make proper use of the cache coherency protocol and not having caches.

The present disclosure describes various techniques for implementing an I/O agent that is configured to bridge peripherals to a coherent fabric and implement coherency mechanisms for processing transactions associated with those I/O devices. In various embodiments that are described below, a system on a chip (SOC) includes memory, memory controllers, and an I/O agent coupled to peripherals. The I/O agent is configured to receive read and write transaction requests from the peripherals that target specified memory addresses whose data may be stored in cache lines of the SOC. (A cache line can also be referred to as a cache block.) In various embodiments, the specific ordering rules of the peripherals impose that the read/write transactions be completed serially (e.g., not out of order relative to the order in which they are received). As a result, in one embodiment, the I/O agent is configured to complete a read/write transaction before initiating the next occurring read/write transaction according to their execution order. But in order to perform those transactions in a more performant way, in various embodiments, the I/O agent is configured to obtain exclusive ownership of the cache lines being targeted such that the data of those cache lines is not cached in a valid state in other caching agents (e.g., a processor core) of the SOC. Instead of waiting for a first transaction to be completed before beginning to work on a second transaction, the I/O agent may preemptively obtain exclusive ownership of cache line(s) targeted by the second transaction. As a part of obtaining exclusive ownership, in various embodiments, the I/O agent receives data for those cache lines and stores the data within a local cache of the I/O agent. When the first transaction is completed, the I/O agent may thereafter complete the second transaction in its local cache without having to send out a request for the data of those cache lines and wait for the data to be returned. As discussed in greater detail below, the I/O agent may obtain exclusive read ownership or exclusive write ownership depending on the type of the associated transaction.

In some cases, the I/O agent might lose exclusive ownership of a cache line before the I/O agent has performed the corresponding transaction. For example, I/O agent may receive a snoop that causes the I/O agent to relinquish exclusive ownership of the cache line, including invalidating the data stored at the I/O agent for the cache line. A "snoop" or "snoop request," as used herein, refers to a message that is transmitted to a component to request a state change for a cache line (e.g., to invalidate data of the cache line stored within a cache of the component) and, if that component has an exclusive copy of the cache line or is otherwise responsible for the cache line, the message may also request that the cache line be provided by the component. In various embodiments, if there is a threshold number of remaining unprocessed transactions that are directed to the cache line, then the I/O agent may reacquire exclusive ownership of the cache line. For example, if there are three unprocessed write transactions that target the cache line, then the I/O agent may reacquire exclusive ownership of that cache line. This can prevent the unreasonably slow serialization of the remaining transactions that target a particular cache line. Larger or smaller numbers of unprocessed transactions may be used as the threshold in various embodiments.

These techniques may be advantageous over prior approaches as these techniques allow for the order rules of peripherals to be kept while partially or wholly negating negative effects of those order rules through implementing coherency mechanisms. Particularly, the paradigm of performing transactions in a particular order according to the order rules, where a transaction is completed before work on the next occurring transaction is started can be unreasonably slow. As an example, reading the data for a cache line into a cache can take over 500 clock cycles to occur. As such, if the next occurring transaction is not started until the previous transaction has completed, then each transaction will take at least 500 clock cycles to be completed, resulting in a high number of clock cycles being used to process a set of transactions. By preemptively obtaining exclusive ownership of the relevant cache lines as disclosed in the present disclosure, the high number of clock cycles for each transaction may be avoided. For example, when the I/O agent is processing a set of transactions, the I/O agent can preemptively begin caching the data before the first transaction is complete. As a result, the data for a second transaction may be cached and available when the first transaction is completed such that the I/O agent is then able to complete the second transaction shortly thereafter. As such, a portion of the transactions may not each take, e.g., over 500 clock cycles to be completed. An example application of these techniques will now be discussed, starting with reference to FIG. 44.

Figure 44:
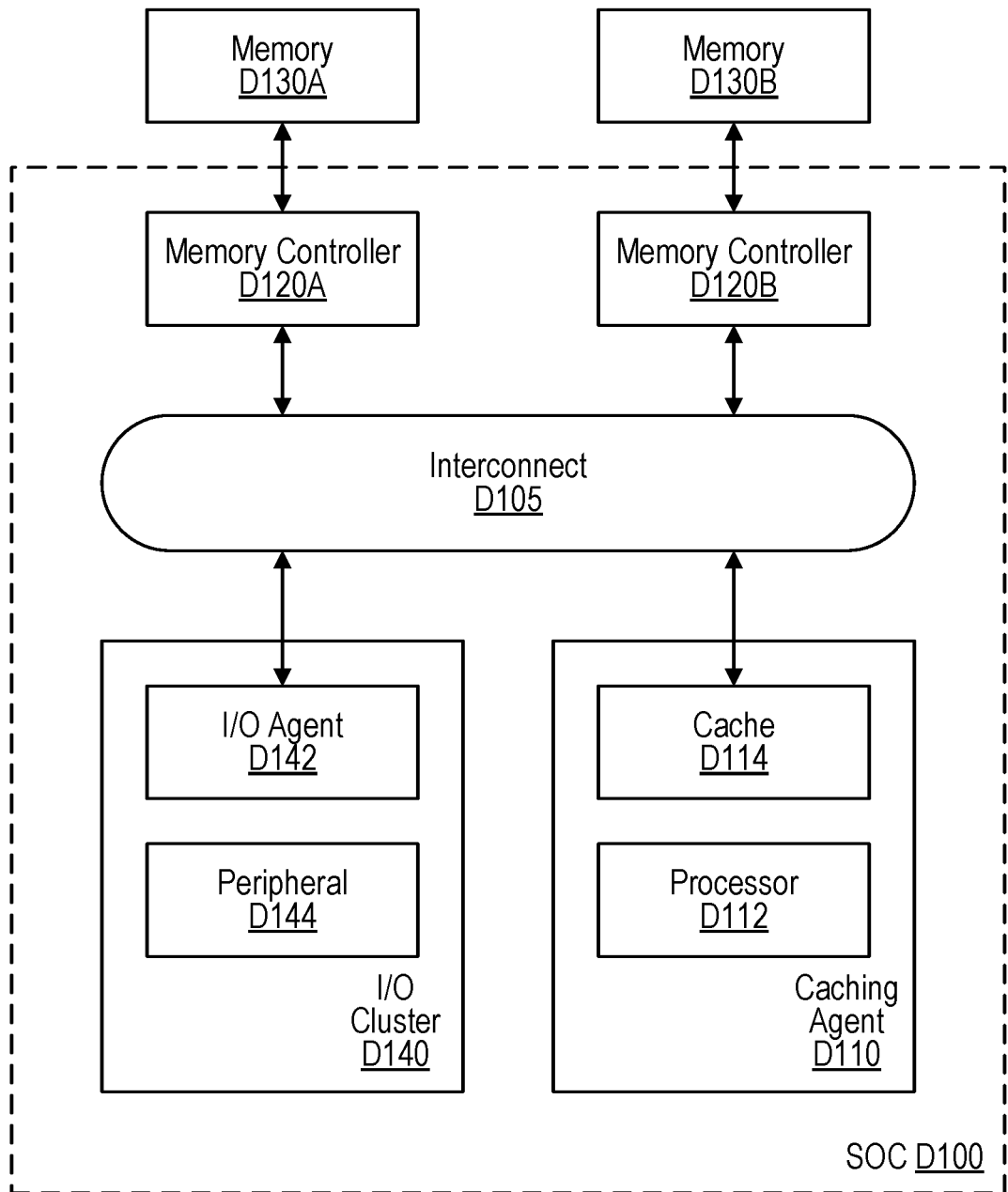
FIG. 44 is a block diagram illustrating example elements of a system on a chip, according to some embodiments.

Turning now to FIG. 44, a block diagram of an example system on a chip (SOC) D100 is illustrated. In an embodiment, the SOC D100 may be an embodiment of the SOC 10 shown in FIG. 1. As implied by the name, the components of SOC D100 are integrated onto a single semiconductor substrate as an integrated circuit "chip." But in some embodiments, the components are implemented on two or more discrete chips in a computing system. In the illustrated embodiment, SOC D100 includes a caching agent D110, memory controllers D120A and D120B coupled to memory DD130A and 130B, respectively, and an input/output (I/O) cluster D140. Components D110, D120, and D140 are coupled together through an interconnect D105. Also as shown, caching agent D110 includes a processor D112 and a cache D114 while I/O cluster D140 includes an I/O agent D142 and a peripheral D144. In various embodiments, SOC D100 is implemented differently than shown. For example, SOC D100 may include a display controller, a power management circuit, etc. and memory D130A and D130B may be included on SOC D100. As another example, I/O cluster D140 may have multiple peripherals D144, one or more of which may be external to SOC D100. Accordingly, it is noted that the number of components of SOC D100 (and also the number of subcomponents) may vary between embodiments. There may be more or fewer of each component/subcomponent than the number shown in FIG. 44.

A caching agent D110, in various embodiments, is any circuitry that includes a cache for caching memory data or that may otherwise take control of cache lines and potentially update the data of those cache lines locally. Caching agents D110 may participate in a cache coherency protocol to ensure that updates to data made by one caching agent D110 are visible to the other caching agents D110 that subsequently read that data, and that updates made in a particular order by two or more caching agents D110 (as determined at an ordering point within SOC D100, such as memory controllers D120A-B) are observed in that order by caching agents D110. Caching agents D110 can include, for example, processing units (e.g., CPUs, GPUs, etc.), fixed function circuitry, and fixed function circuitry having processor assist via an embedded processor (or processors). Because I/O agent D142 includes a set of caches, I/O agent D142 can be considered a type of caching agent D110. But I/O agent D142 is different from other caching agents D110 for at least the reason that I/O agent D142 serves as a cache-capable entity configured to cache data for other, separate entities (e.g., peripherals, such as a display, a USB-connected device, etc.) that do not have their own caches. Additionally, the I/O agent D142 may cache a relatively small number of cache lines temporarily to improve peripheral memory access latency, but may proactively retire cache lines once transactions are complete.

In the illustrated embodiment, caching agent D110 is a processing unit having a processor D112 that may serve as the CPU of SOC D100. Processor D112, in various embodiments, includes any circuitry and/or microcode configured to execute instructions defined in an instruction set architecture implemented by that processor D112. Processor D112 may encompass one or more processor cores that are implemented on an integrated circuit with other components of SOC D100. Those individual processor cores of processor D112 may share a common last level cache (e.g., an L2 cache) while including their own respective caches (e.g., an L0 cache and/or an L1 cache) for storing data and program instructions. Processor D112 may execute the main control software of the system, such as an operating system. Generally, software executed by the CPU controls the other components of the system to realize the desired functionality of the system. Processor D112 may further execute other software, such as application programs, and therefore can be referred to as an application processor. Caching agent D110 may further include hardware that is configured to interface caching agent D110 to the other components of SOC D100 (e.g., an interface to interconnect D105).

Cache D114, in various embodiments, is a storage array that includes entries configured to store data or program instructions. As such, cache D114 may be a data cache or an instruction cache, or a shared instruction/data cache. Cache D114 may be an associative storage array (e.g., fully associative or set-associative, such as a 4-way set associative cache) or a direct-mapped storage array, and may have any storage capacity. In various embodiments, cache lines (or alternatively, "cache blocks") are the unit of allocation and deallocation within cache D114 and may be of any desired size (e.g. 32 bytes, 64 bytes, 128 bytes, etc.). During operation of caching agent D110, information may be pulled from the other components of the system into cache D114 and used by processor cores of processor D112. For example, as a processor core proceeds through an execution path, the processor core may cause program instructions to be fetched from memory D130A-B into cache D114 and then the processor core may fetch them from cache D114 and execute them. Also during the operation of caching agent D110, information can be written from cache D114 to memory (e.g., memory D130A-B) through memory controllers D120A-B.

A memory controller D120, in various embodiments, includes circuitry that is configured to receive, from the other components of SOC D100, memory requests (e.g., load/store requests, instruction fetch requests, etc.) to perform memory operations, such as accessing data from memory D130. Memory controllers D120 may be configured to access any type of memory D130. Memory D130 may be implemented using various, different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), etc. Memory available to SOC D100, however, is not limited to primary storage such as memory D130. Rather, SOC D100 may further include other forms of storage such as cache memory (e.g., L1 cache, L2 cache, etc.) in caching agent D110. In some embodiments, memory controllers D120 include queues for storing and ordering memory operations that are to be presented to memory D130. Memory controllers D120 may also include data buffers to store write data awaiting to be written to memory D130 and read data that is awaiting to be returned to the source of a memory operation, such as caching agent D110.

Figure 45:
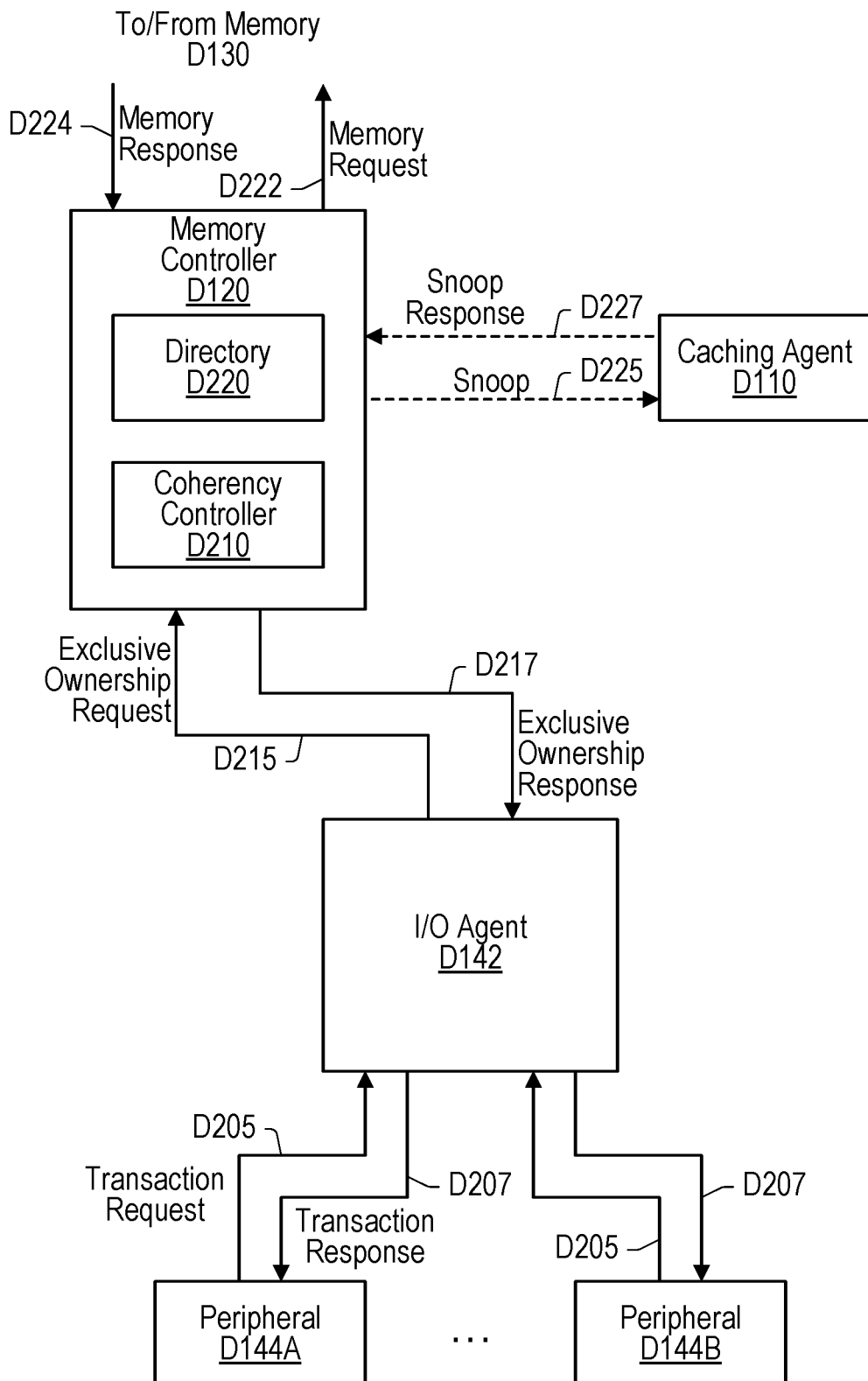
FIG. 45 is a block diagram illustrating example elements of interactions between an I/O agent and a memory controller, according to some embodiments.

As discussed in more detail with respect to FIG. 45, memory controllers D120 may include various components for maintaining cache coherency within SOC D100, including components that track the location of data of cache lines within SOC D100. As such, in various embodiments, requests for cache line data are routed through memory controllers D120, which may access the data from other caching agents D110 and/or memory D130A-B. In addition to accessing the data, memory controllers D120 may cause snoop requests to be issued to caching agents D110 and I/O agents D142 that store the data within their local cache. As a result, memory controllers 120 can cause those caching agents D110 and I/O agents D142 to invalidate and/or evict the data from their caches to ensure coherency within the system. Accordingly, in various embodiments, memory controllers D120 process exclusive cache line ownership requests in which memory controllers D120 grant a component exclusive ownership of a cache line while using snoop request to ensure that the data is not cached in other caching agents D110 and I/O agents D142.

I/O cluster D140, in various embodiments, includes one or more peripheral devices D144 (or simply, peripherals D144) that may provide additional hardware functionality and I/O agent D142. Peripherals D144 may include, for example, video peripherals (e.g., GPUs, blenders, video encoder/decoders, scalers, display controllers, etc.) and audio peripherals (e.g., microphones, speakers, interfaces to microphones and speakers, digital signal processors, audio processors, mixers, etc.). Peripherals D144 may include interface controllers for various interfaces external to SOC D100 (e.g., Universal Serial Bus (USB), peripheral component interconnect (PCI) and PCI Express (PCIe), serial and parallel ports, etc.) The interconnection to external components is illustrated by the dashed arrow in FIG. 44 that extends external to SOC D100. Peripherals D144 may also include networking peripherals such as media access controllers (MACs). While not shown, in various embodiments, SOC D100 includes multiple I/O clusters D140 having respective sets of peripherals D144. As an example, SOC D100 might include a first I/O cluster 140 having external display peripherals D144, a second I/O cluster D140 having USB peripherals D144, and a third I/O cluster D140 having video encoder peripherals D144. Each of those I/O clusters D140 may include its own I/O agent D142.

I/O agent D142, in various embodiments, includes circuitry that is configured to bridge its peripherals D144 to interconnect D105 and to implement coherency mechanisms for processing transactions associated with those peripherals D144. As discussed in more detail with respect to FIG. 45, I/O agent D142 may receive transaction requests from peripheral D144 to read and/or write data to cache lines associated with memory D130A-B. In response to those requests, in various embodiments, I/O agent D142 communicates with memory controllers D120 to obtain exclusive ownership over the targeted cache lines. Accordingly, memory controllers D120 may grant exclusive ownership to I/O agent D142, which may involve providing I/O agent D142 with cache line data and sending snoop requests to other caching agents D110 and I/O agents D142. After having obtained exclusive ownership of a cache line, I/O agent D142 may start completing transactions that target the cache line. In response to completing a transaction, I/O agent D142 may send an acknowledgement to the requesting peripheral D144 that the transaction has been completed. In some embodiments, I/O agent D142 does not obtain exclusive ownership for relaxed ordered requests, which do not have to be completed in a specified order.

Interconnect D105, in various embodiments, is any communication-based interconnect and/or protocol for communicating among components of SOC D100. For example, interconnect D105 may enable processor D112 within caching agent D110 to interact with peripheral D144 within I/O cluster D140. In various embodiments, interconnect D105 is bus-based, including shared bus configurations, cross bar configurations, and hierarchical buses with bridges. Interconnect D105 may be packet-based, and may be hierarchical with bridges, crossbar, point-to-point, or other interconnects.

Turning now to FIG. 45, a block diagram of example elements of interactions involving a caching agent D110, a memory controller D120, an I/O agent D142, and peripherals D144 is shown. In the illustrated embodiment, memory controller 120 includes a coherency controller D210 and directory D220. In some cases, the illustrated embodiment may be implemented differently than shown. For example, there may be multiple caching agents D110, multiple memory controllers D120, and/or multiple I/O agents D142.

As mentioned, memory controller D120 may maintain cache coherency within SOC D100, including tracking the location of cache lines in SOC D100. Accordingly, coherency controller D210, in various embodiments, is configured to implement the memory controller portion of the cache coherency protocol. The cache coherency protocol may specify messages, or commands, that may be transmitted between caching agents D110, I/O agents D142, and memory controllers D120 (or coherency controllers D210) in order to complete coherent transactions. Those messages may include transaction requests D205, snoops D225, and snoop responses D227 (or alternatively, "completions"). A transaction request D205, in various embodiments, is a message that initiates a transaction, and specifies the requested cache line/block (e.g. with an address of that cache line) and the state in which the requestor is to receive that cache line (or the minimum state as, in various cases, a more permissive state may be provided). A transaction request D205 may be a write transaction in which the requestor seeks to write data to a cache line or a read transaction in which the requestor seeks to read the data of a cache line. For example, a transaction request D205 may specify a non-relaxed ordered dynamic random-access memory (DRAM) request. Coherency controller D210, in some embodiments, is also configured to issue memory requests D222 to memory D130 to access data from memory D130 on behalf of components of SOC D100 and to receive memory responses D224 that may include requested data.

As depicted, I/O agent D142 receives transaction requests D205 from peripherals D144. I/O agent D142 might receive a series of write transaction requests D205, a series of read transaction requests D205, or combination of read and write transaction requests D205 from a given peripheral D144. For example, within a set interval of time, I/O agent D142 may receive four read transaction requests D205 from peripheral D144A and three write transaction requests D205 from peripheral D144B. In various embodiments, transaction requests D205 received from a peripheral D144 have to be completed in a certain order (e.g., completed in the order in which they are received from a peripheral D144). Instead of waiting until a transaction request D205 is completed before starting work on the next transaction request D205 in the order, in various embodiments, I/O agent D142 performs work on later requests D205 by preemptively obtaining exclusive ownership of the targeted cache lines. Accordingly, I/O agent D142 may issue exclusive ownership requests D215 to memory controllers D120 (particularly, coherency controllers D210). In some instances, a set of transaction requests D205 may target cache lines managed by different memory controllers D120 and as such, I/O agent 142 may issue exclusive ownership requests D215 to the appropriate memory controllers D120 based on those transaction requests D205. For a read transaction request D205, I/O agent D142 may obtain exclusive read ownership; for a write transaction request D205, I/O agent D142 may obtain exclusive write ownership.

Coherency controller D210, in various embodiments, is circuitry configured to receive requests (e.g., exclusive ownership requests D215) from interconnect D105 (e.g. via one or more queues included in memory controller D120) that are targeted at cache lines mapped to memory D130 to which memory controller D120 is coupled. Coherency controller D210 may process those requests and generate responses (e.g., exclusive ownership response D217) having the data of the requested cache lines while also maintaining cache coherency in SOC D100. To maintain cache coherency, coherency controller D210 may use directory D220. Directory D220, in various embodiments, is a storage array having a set of entries, each of which may track the coherency state of a respective cache line within the system. In some embodiments, an entry also tracks the location of the data of a cache line. For example, an entry of directory D220 may indicate that a particular cache line's data is cached in cache D114 of caching agent D110 in a valid state. (While exclusive ownership is discussed, in some cases, a cache line may be shared between multiple cache-capable entities (e.g., caching agent D110) for read purposes and thus shared ownership can be provided.) To provide exclusive ownership of a cache line, coherency controller D210 may ensure that the cache line is not stored outside of memory D130 and memory controller D120 in a valid state. Consequently, based on the directory entry associated with the cache line targeted by an exclusive ownership request D215, in various embodiments, coherency controller D210 determines which components (e.g., caching agents D110, I/O agents D142, etc.) are to receive snoops D225 and the type of snoop D225 (e.g. invalidate, change to owned, etc.). For example, memory controller D120 may determine that caching agent 110 stores the data of a cache line requested by I/O agent D142 and thus may issue a snoop D225 to caching agent D110 as shown in FIG. 45. In some embodiments, coherency controller D210 does not target specific components, but instead, broadcasts snoops D225 that are observed by many of the components of SOC D100.

In various embodiments, at least two types of snoops are supported: snoop forward and snoop back. The snoop forward messages may be used to cause a component (e.g., cache agent D110) to forward the data of a cache line to the requesting component, whereas the snoop back messages may be used to cause the component to return the data of the cache line to memory controller D120. Supporting snoop forward and snoop back flows may allow for both three-hop (snoop forward) and four-hop (snoop back) behaviors. For example, snoop forward may be used to minimize the number of messages when a cache line is provided to a component, since the component may store the cache line and potentially use the data therein. On the other hand, a non-cacheable component may not store the entire cache line, and thus the copy back to memory may ensure that the full cache line data is captured in memory controller D120. In various embodiments, caching agent D110 receives a snoop D225 from memory controller D120, processes that snoop D225 to update the cache line state (e.g., invalidate the cache line), and provides back a copy of the data of the cache line (if specified by the snoop D225) to the initial ownership requestor or memory controller D120. A snoop response D227 (or a "completion"), in various embodiments, is message that indicates that the state change has been made and provides the copy of the cache line data, if applicable. When the snoop forward mechanism is used, the data is provided to the requesting component in three hops over the interconnect D105: request from the requesting component to the memory controller D120, the snoop from the memory controller D120 to the caching, and the snoop response by the caching component to the requesting component. When the snoop back mechanism is used, four hops may occur: request and snoop, as in the three-hop protocol, snoop response by the caching component to the memory controller D120, and data from the memory controller D120 to the requesting component.

In some embodiments, coherency controller D210 may update directory D220 when a snoop D225 is generated and transmitted instead of when a snoop response D227 is received. Once the requested cache line has been reclaimed by memory controller D120, in various embodiments, coherency controller D210 grants exclusive read (or write) ownership to the ownership requestor (e.g., I/O agent D142) via an exclusive ownership response D217. The exclusive ownership response D217 may include the data of the requested cache line. In various embodiments, coherency controller D210 updates directory D220 to indicate that the cache line has been granted to the ownership requestor.

For example, I/O agent D142 may receive a series of read transaction requests D205 from peripheral D144A. For a given one of those requests, I/O agent D142 may send an exclusive read ownership request D215 to memory controller D120 for data associated with a specific cache line (or if the cache line is managed by another memory controller D120, then the exclusive read ownership request D215 is sent to that other memory controller D120). Coherency controller D210 may determine, based on an entry of directory D220, that cache agent D110 currently stores data associated with the specific cache line in a valid state. Accordingly, coherency controller D210 sends a snoop D225 to caching agent D110 that causes caching agent D110 to relinquish ownership of that cache line and send back a snoop response D227, which may include the cache line data. After receiving that snoop response D227, coherency controller D210 may generate and then send an exclusive ownership response D217 to I/O agent D142, providing I/O agent D142 with the cache line data and exclusive ownership of the cache line.

After receiving exclusive ownership of a cache line, in various embodiments, I/O agent D142 waits until the corresponding transaction can be completed (according to the ordering rules)—that is, waits until the corresponding transaction becomes the most senior transaction and there is ordering dependency resolution for the transaction. For example, I/O agents D142 may receive transaction requests D205 from a peripheral D144 to perform write transactions A-D. I/O agent D142 may obtain exclusive ownership of the cache line associated with transaction C; however, transactions A and B may not have been completed. Consequently, I/O agent D142 waits until transactions A and B have been completed before writing the relevant data for the cache line associated with transaction C. After completing a given transaction, in various embodiments, I/O agent D142 provides a transaction response D207 to the transaction requestor (e.g., peripheral D144A) indicating that the requested transaction has been performed. In various cases, I/O agent D142 may obtain exclusive read ownership of a cache line, perform a set of read transactions on the cache line, and thereafter release exclusive read ownership of the cache line without having performed a write to the cache line while the exclusive read ownership was held.

In some cases, I/O agent D142 might receive multiple transaction requests D205 (within a reasonably short period of time) that target the same cache line and, as a result, I/O agent D142 may perform bulk read and writes. As an example, two write transaction requests D205 received from peripheral D144A might target the lower and upper portions of a cache line, respectively. Accordingly, I/O agent D142 may acquire exclusive write ownership of the cache line and retain the data associated with the cache line until at least both of the write transactions have been completed. Thus, in various embodiments, I/O agent D142 may forward executive ownership between transactions that target the same cache line. That is, I/O agent D142 does not have to send an ownership request D215 for each individual transaction request D205. In some cases, I/O agent D142 may forward executive ownership from a read transaction to a write transaction (or vice versa), but in other cases, I/O agent D142 forwards executive ownership only between the same type of transactions (e.g., from a read transaction to another read transaction).

In some cases, I/O agent D142 might lose exclusive ownership of a cache line before I/O agent D142 has performed the relevant transactions against the cache line. As an example, while waiting for a transaction to become most senior so that it can be performed, I/O agent D142 may receive a snoop D225 from memory controller D120 as a result of another I/O agent D142 seeking to obtain exclusive ownership of the cache line. After relinquishing exclusive ownership of a cache line, in various embodiments, I/O agent D142 determines whether to reacquire ownership of the lost cache line. If the lost cache line is associated with one pending transaction, then I/O agent D142, in many cases, does not reacquire exclusive ownership of the cache line; however, in some cases, if the pending transaction is behind a set number of transactions (and thus is not about to become the senior transaction), then I/O agent D142 may issue an exclusive ownership request D215 for the cache line. But if there is a threshold number of pending transactions (e.g., two pending transactions) directed to the cache line, then I/O agent D142 reacquires exclusive ownership of the cache line, in various embodiments.

Figure 46A:
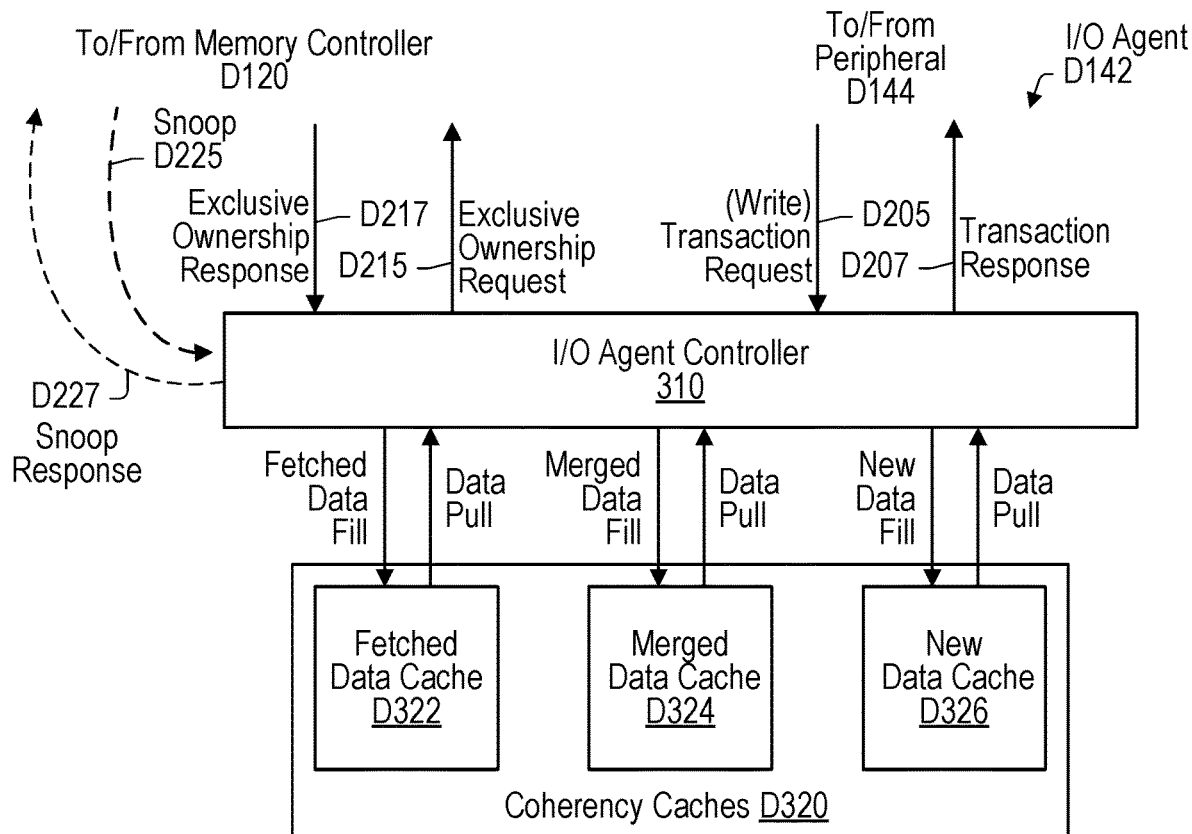
FIG. 46A is a block diagram illustrating example elements of an I/O agent configured to process write transactions, according to some embodiments.

Turning now to FIG. 46A, a block diagram of example elements associated with an I/O agent D142 processing write transactions is shown. In the illustrated embodiment, I/O agent D142 includes an I/O agent controller D310 and coherency caches D320. As shown, coherency caches D320 include a fetched data cache D322, a merged data cache D324, and a new data cache D326. In some embodiments, I/O agent D142 is implemented differently than shown. As an example, I/O agent D142 may not include separate caches for data pulled from memory and data that is to be written as a part of a write transaction.

I/O agent controller D310, in various embodiments, is circuitry configured to receive and process transactions associated with peripherals D144 that are coupled to I/O agent D142. In the illustrated embodiment, I/O agent controller D310 receives a write transaction request D205 from a peripheral D144. The write transaction request D205 specifies a destination memory address and may include the data to be written or a reference to the location of that data. In order process a write transaction, in various embodiments, I/O agent D142 uses caches D320. Coherency caches D320, in various embodiments, are storage arrays that include entries configured to store data or program instructions. Similar to cache D114, coherency caches D320 may be associative storage arrays (e.g., fully associative or set-associative, such as a 4-way associative cache) or direct-mapped storage arrays, and may have any storage capacity and/or any cache line size (e.g. 32 bytes, 64 bytes, etc.).

Fetched data cache D322, in various embodiments, is used to store data that is obtained in response to issuing an exclusive ownership request D215. In particular, after receiving a write transaction request D205 from a peripheral D144, I/O agent D142 may then issue an exclusive write ownership request D215 to the particular memory controller D120 that manages the data stored at the destination/targeted memory address. The data that is returned by that memory controller D120 is stored by I/O agent controller D310 in fetched data cache D322, as illustrated. In various embodiments, I/O agent D142 stores that data separate from the data included in the write transaction request D205 in order to allow for snooping of the fetched data prior to ordering resolution. Accordingly, as shown, I/O agent D142 may receive a snoop D225 that causes I/O agent D142 to provide a snoop response D227, releasing the data received from the particular memory controller D120.

New data cache D326, in various embodiments, is used to store the data that is included in a write transaction request D205 until ordering dependency is resolved. Once VO agent D142 has received the relevant data from the particular memory controller D120 and once the write transaction has become the senior transaction, I/O agent D142 may merge the relevant data from fetched data cache D322 with the corresponding write data from new data cache D326. Merged data cache D324, in various embodiments, is used to store the merged data. In various cases, a write transaction may target a portion, but not all of a cache line. Accordingly, the merged data may include a portion that has been changed by the write transaction and a portion that has not been changed. In some cases, I/O agent D142 may receive a set of write transaction requests D205 that together target multiple or all portions of a cache line. As such, processing the set of write transactions, most of cache line (or the entire cache line) may be changed. As an example, I/O agent D142 may process four write transaction requests D205 that each target a different 32-bit portion of the same 128-bit cache line, thus the entire line content is replaced with the new data. In some cases, a write transaction request D205 is a full cacheline write and thus the data accessed from fetched data cache D322 for the write transaction is entirely replaced by that one write transaction request D205. Once the entire content of a cache line has been replaced or I/O agent D142 has completed all of the relevant write transactions that target that cache line, in various embodiments, I/O agent D142 releases exclusive write ownership of the cache line and may then evict the data from coherency caches D320.

Figure 46B:
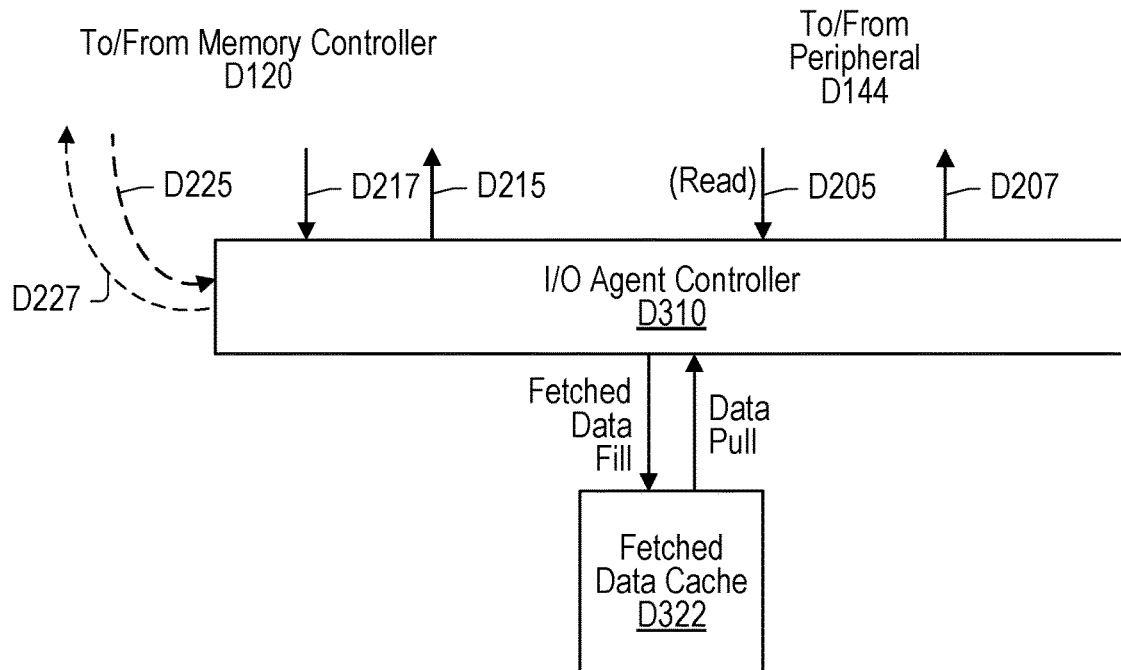
FIG. 46B is a block diagram illustrating example elements of an I/O agent configured to process read transactions, according to some embodiments.

Turning now to FIG. 46B, a block diagram of example elements associated with an I/O agent D142 processing read transactions is shown. In the illustrated embodiment, I/O agent D142 includes I/O agent controller D310 and fetched data cache D322. In some embodiments, I/O agent D142 is implemented differently than shown.

Since I/O agent D142 does not write data for read transactions, in various embodiments, I/O agent D142 does not use merged data cache D324 and new data cache D326 for processing read transactions—as such, they are not shown in the illustrated embodiment. Consequently, after receiving a read transaction request D205, I/O agent D142 may issues an exclusive read ownership request D215 to the appropriate memory controller D120 and receive back an exclusive ownership response D217 that includes the data of the targeted cache line. Once I/O agent D142 has received the relevant data and once the read transaction has become the senior pending transaction, I/O agent D142 may complete the read transaction. Once the entire content of a cache line has been read or I/O agent D142 has completed all of the relevant read transactions that target that cache line (as different read transaction may target different portions of that cache line), in various embodiments, I/O agent D142 releases exclusive read ownership of the cache line and may then evict the data from fetched data cache D322.

Figure 47:
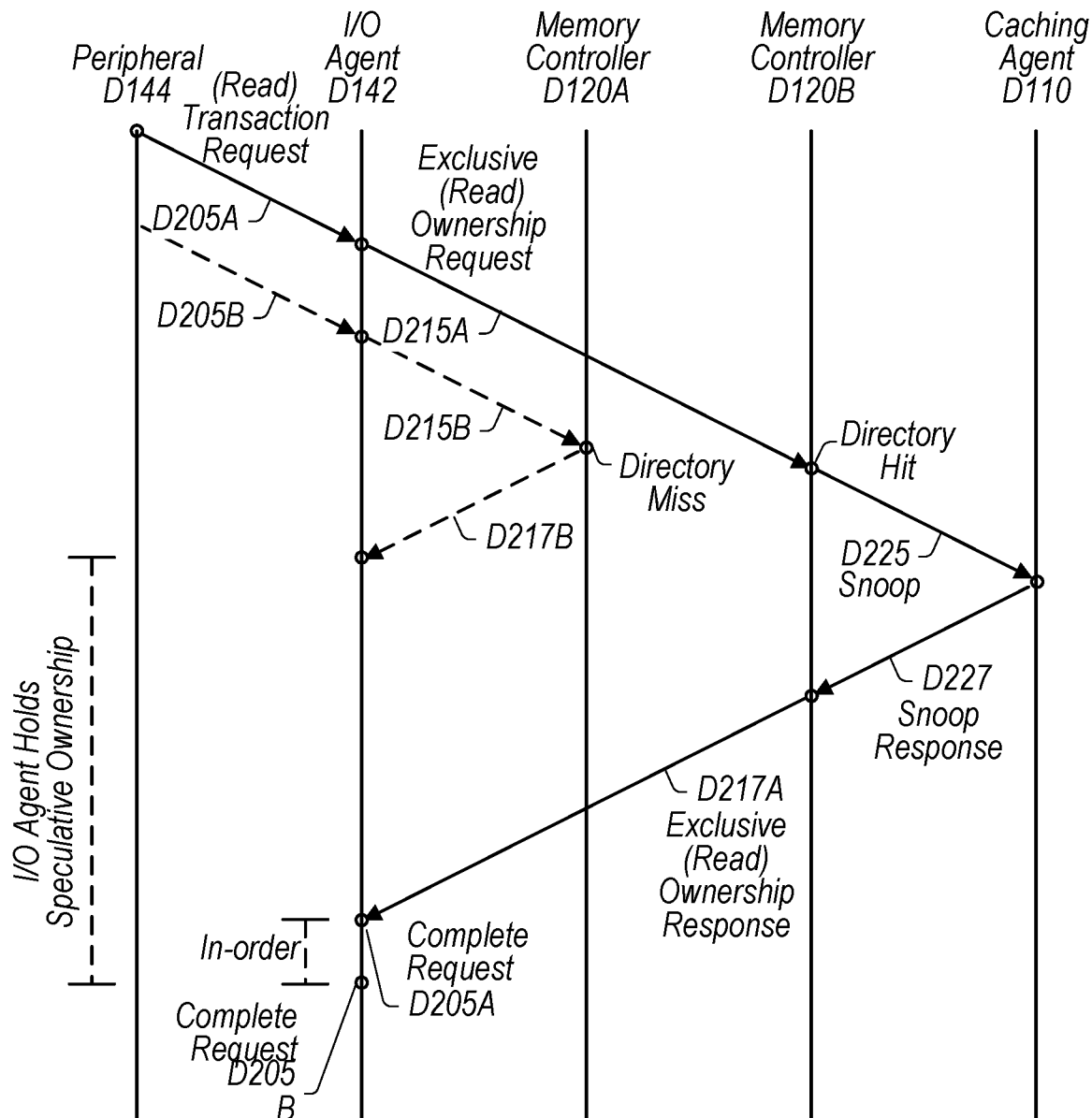
FIG. 47 is a flow diagram illustrating an example of processing read transaction requests from a peripheral component, according to some embodiments.

Turning now to FIG. 47, an example of processing read transaction requests D205 received from a peripheral D144 is shown. While this example pertains to read transaction requests D205, the following discussion can also be applied to processing write transaction requests D205. As shown, I/O agent D142 receives, from peripheral D144, a read transaction request D205A followed by a read transaction request D205B. In response to receiving transaction requests D205A-B, I/O agent 142 issues, for transaction request D205A, an exclusive read ownership request D215A to memory controller D120B and, for transaction request D205B, I/O agent D142 issues an exclusive read ownership request D215B to memory controller D120A. While I/O agent 142 communicates with two different memory controllers D120 in the illustrated embodiment, in some cases, read transaction requests D205A-B may target cache lines managed by the same memory controller D120 and thus I/O agent D142 may communicate with only that memory controller D120 to fulfill read transaction requests D205A-B.

As further depicted, a directory miss occurs at memory controller D120A for the targeted cache line of transaction request D205B, indicating that the data of the targeted cache line is not stored in a valid state outside of memory D130. Memory controller D120A returns an exclusive read ownership response D217B to I/O agent D142 that grants exclusive read ownership of the cache line and may further include the data associated with that cache line. Also as shown, a directory hit occurs at memory controller D120B for the targeted cache line of transaction request D205A. Memory controller D120B may determine, based on its directory D220, that the illustrated caching agent D110 caches the data of the targeted cache line. Consequently, memory controller D120B issues a snoop D225 to that caching agent D110 and receives a snoop response D227, which may include data associated with the targeted cache line. Memory controller D120B returns an exclusive read ownership response D217A to I/O agent D142 that grants exclusive read ownership of the targeted cache line and may further include the data associated with that cache line.

As illustrated, I/O agent D142 receives exclusive read ownership response D217B before receiving exclusive read ownership response D217A. The transactional order rules of peripheral D144, in various embodiments, impose that transaction requests D205A-B must be completed in a certain order (e.g., the order in which they were received). As a result, since read transaction request D205A has not been completed when I/O agent D142 receives exclusive read ownership response D217B, upon receiving response D217B, I/O agent D142 holds speculative read exclusive ownership but does not complete the corresponding read transaction request D205B. Once I/O agent D142 receives exclusive read ownership response D217A, I/O agent D142 may then complete transaction request D205A and issue a complete request D205A to peripheral D144. Thereafter, I/O agent D142 may complete transaction request D205B and also issue a complete request D205B to peripheral D144. Because I/O agent D142 preemptively obtained exclusive read ownership of the cache line associated with read transaction request D205B, I/O agent D142 does not have to send out a request for that cache line after completing read transaction request D205A (assuming that I/O agent D142 has not lost ownership of the cache line). Instead, I/O agent D142 may complete read transaction request D205B relatively soon after completing read transaction request D205A and thus not incur most or all of the delay (e.g., 500 clock cycles) associated with fetching that cache line into I/O agent 142's coherency caches D320.

Figure 48:
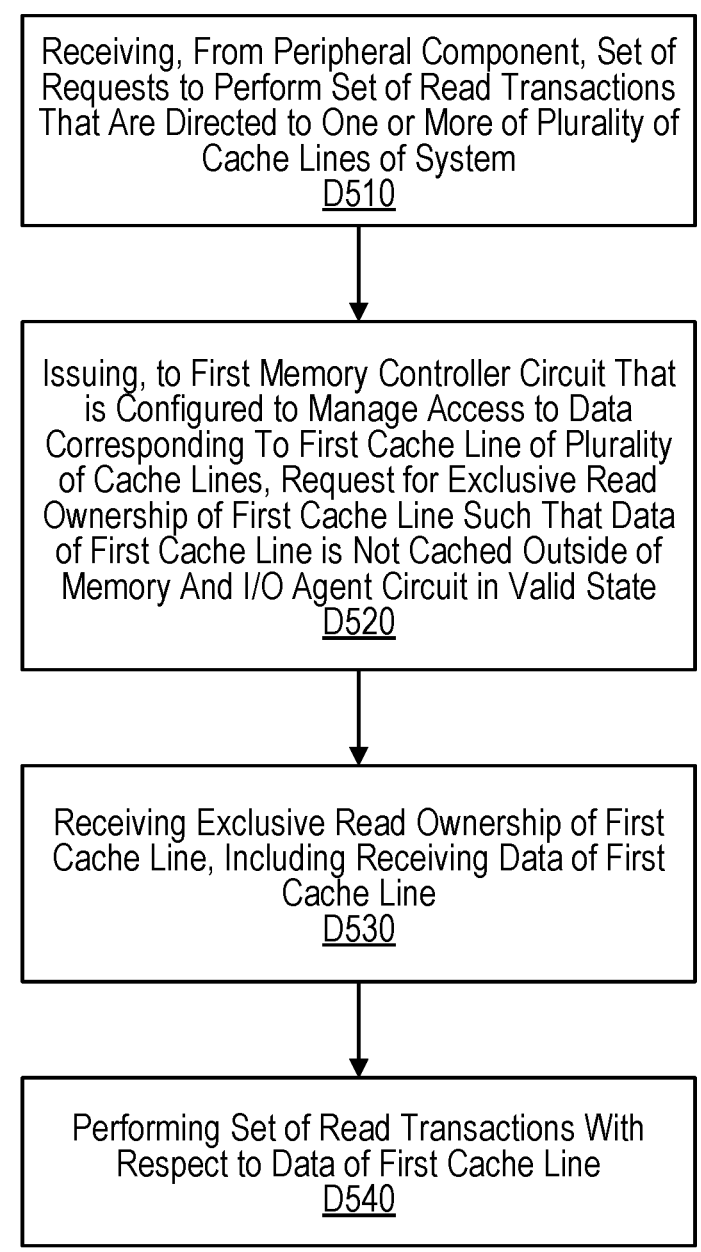
FIG. 48 is a flow diagram illustrating example method relating to the processing of read transaction requests by an I/O agent, according to some embodiments.

Turning now to FIG. 48, a flow diagram of a method 500 is shown. Method 500 is one embodiment of a method performed by an I/O agent circuit (e.g., an I/O agent 142) in order to process a set of transaction requests (e.g., transaction requests D205) received from a peripheral component (e.g., a peripheral 144). In some embodiments, method 500 includes more or less steps than shown—e.g., the I/O agent circuit may evict data from its cache (e.g., a coherency cache D330) after processing the set of transaction requests.

Method 500 begins in step D510 with the I/O agent circuit receiving a set of transaction requests from the peripheral component to perform a set of read transactions (which includes at least one read transaction) that are directed to one or more of the plurality of cache lines. In some cases, the I/O agent receives requests to perform write transactions or a mixture of read and write transactions. The I/O agent may receive those transaction requests from multiple peripheral components.

In step 520, the I/O agent circuit issues, to a first memory controller circuit (e.g., a memory controller D120) that is configured to manage access to a first one of the plurality of cache lines, a request (e.g., an exclusive ownership request D215) for exclusive read ownership of the first cache line such that data of the first cache line is not cached outside of the memory and the I/O agent circuit in a valid state. The request for exclusive read ownership of the first cache line may cause a snoop request (e.g., a snoop D225) to be sent to another I/O agent circuit (or a caching agent D110) to release exclusive read ownership of the first cache line.

In step 530, the I/O agent circuit receives exclusive read ownership of the first cache line, including receiving the data of the first cache line. In some instances, the I/O agent circuit may receive a snoop request directed to the first cache line and may then release exclusive read ownership of the first cache line before completing performance of the set of read transactions, including invalidating the data stored at the I/O agent circuit for the first cache line. The I/O agent circuit may thereafter make a determination that at least a threshold number of remaining unprocessed read transactions of the set of read transactions are directed to the first cache line and in response to the determination, send a request to the first memory controller circuit to re-establish exclusive read ownership of the first cache line. But if the I/O agent circuit makes a determination that less than a threshold number of remaining unprocessed read transactions of the set of read transactions are directed to the first cache line, then the I/O agent circuit may process the remaining read transactions without re-establishing exclusive read ownership of the first cache line.

In step 540, the I/O agent circuit performs the set of read transactions with respect to the data. In some cases, the I/O agent circuit may release exclusive read ownership of the first cache line without having performed a write to the first cache line while the exclusive read ownership was held. The I/O agent circuit may make a determination that at least two of the set of read transactions target at least two different portions of the first cache line. In response to the determination, the I/O agent circuit may process multiple of the read transactions before releasing exclusive read ownership of the first cache line.

In some cases, the I/O agent circuit may receive, from another peripheral component, a set of requests to perform a set of write transactions that are directed to one or more of the plurality of cache lines. The I/O agent circuit may issue, to a second memory controller circuit that is configured to manage access to a second one of the plurality of cache lines, a request for exclusive write ownership of the second cache line such that data of the second cache line is not cached outside of the memory and the I/O agent circuit in a valid state. Accordingly, the I/O agent circuit may receive the data of the second cache line and perform the set of write transactions with respect to the data of the second cache line. In some cases, one of the set of write transactions may involve writing data to a first portion of the second cache line. The I/O agent circuit may merge the data of the second cache line with data of the write transaction such that the first portion (e.g., lower 64 bits) is updated, but a second portion (e.g., upper 64 bits) of the second cache line is unchanged. In those cases in which the set of write transactions involves writing to different portions of the second cache line, the I/O agent circuit may release exclusive write ownership of the second cache line in response to writing to all portions of the second cache line.

D2D Circuit

FIGS. 49-55 illustrate various embodiments of a D2D circuit 26. System-on-a-chip (SOC) integrated circuits (ICs) generally include one or more processors that serve as central processing units (CPUs) for a system, along with various other components such a memory controllers and peripheral components. Additional components, including one or more additional ICs, can be included with a particular SOC IC to form a given device. Increasing a number of processors and/or other discrete components included on an SOC IC may be desirable for increased performance. Additionally, cost savings can be achieved in a device by reducing the number of other components needed to form the device in addition to the SOC IC. The device may be more compact (smaller in size) if more of the overall system is incorporated into a single IC. Furthermore, reduced power consumption for the device as a whole may be achieved by incorporating more components into the SOC.

A given SOC may be used in a variety of applications, with varying performance, cost, and power considerations. For a cost-sensitive application, for example, performance may not be as desired as cost and power consumption. On the other hand, for a performance-oriented application, cost and power consumption may not be emphasized. Accordingly, a range of SOC designs may be utilized to support the variety of applications.

Increasing reuse of a given SOC design may be desirable to reduce costs associated with designing, verifying, manufacturing, and evaluating a new SOC design. Accordingly, a technique for scaling a single SOC design for a range of applications is desirable.

As described above, a given IC design may be used in a variety of applications having a range of performance and cost considerations. In addition, reuse of an existing IC design may reduce costs compared to designing, verifying, manufacturing, and evaluating a new IC design. One technique for scaling a single IC design across a range of applications is to utilize multiple instances of the IC in applications that emphasize performance over costs, and using a single instance of the IC in the cost sensitive applications.

Utilizing multiple instances of the IC may pose several challenges. Some applications, mobile devices for example, have limited space for multiple ICs to be included. Furthermore, to reduce latency associated with inter-IC communication, an external inter-IC interface may include a large number of pins, thereby allowing a large number of bits to be exchanged, in parallel, between two or more ICs. For example, an interface for a multi-core SOC may utilize a system-wide communication bus with hundreds or even a thousand or more signals travelling in parallel. To couple two or more of such an SOC together may require an interface that provides access to a significant portion of the communication bus, potentially requiring a hundred or more pins to be wired across the two or more die. In addition, to match or to even approach internal communication frequency of the communication bus, timing characteristics of the large number of pins of the inter-IC interface should be consistent to avoid different bits of a same data word from arriving on different clock cycles. Creating a large, high-speed interface with a single pin arrangement such that two or more instances of a same IC die can be coupled together in a small physical space may present a significant challenge to IC designers.

As will be explained further below, the present disclosure describes the use of "complementary" inter-IC interfaces. The present disclosure recognizes that such inter-IC interfaces support coupling two or more instances of a same IC design in limited space and provide scalability of an IC design to support a range of applications. Such a scalable interface may include a pin arrangement that allows for two ICs to be physically coupled with little to no crossing of wires between the two ICs when the two ICs are placed face-to-face or along a common edge of the two die. To increase consistency of performance characteristics across the pins of the interface, a single design for a smaller number of pins, e.g., sixteen, thirty-two, or the like, may be repeated until a desired number of pins for the interface are implemented. Such an inter-IC interface may allow an IC to be utilized in a wide range of applications by enabling performance increases through coupling of two or more instances of the IC. This interface may further enable the two or more ICs to be coupled together in a manner that allows the coupled ICs to be used in mobile applications or other applications in which physical space for multiple ICs is limited.

Two inter-IC interfaces may be said to be "complementary" within the meaning of this disclosure when pins having "complementary functions" are positioned such that they have "complementary layouts." A pair of interface pins have "complementary functions" if a first of those pins on one integrated circuit is designed to be received by a second of those pins on another integrated circuit. Transmit and receive are one example of complementary functions, as a transmit pin on one IC that provides an output signal of a particular bit of a data word is designed to be coupled to a receive pin on another IC that accepts the particular bit of the data word as an input signal. Similarly, a pin carrying a clock signal output is considered have a complementary function to an associated pin capable of receiving the clock signal as an input.

It is noted that the term "axis of symmetry" is used throughout this disclosure. Various embodiments of an axis of symmetry are shown in FIGS. 49, 50, 51, 52, 53A, and 53B, and described below in reference to these figures.

Pins having complementary function have a complementary layout when the pins are located relative to an axis of symmetry of the interface such that a first integrated circuit having the interface may be positioned next to or coupled to a second instance of the integrated circuit so that the pins having the complementary functions are aligned. Such pins can also be said to be in "complementary positions." An example of a complementary layout would be transmit pins for particular signals (e.g., bit 0 and bit 1 of a data bus) being positioned the farthest and second farthest from the axis of symmetry on one side of the axis respectively, with the complementary receive pins (e.g., bit 0 and bit 1 of the data bus) being placed the farthest and second farthest from the axis of symmetry on an opposing side of the axis. In such an embodiment, a first instance of an IC having the complementary interface can be positioned relative to a second instance of the IC having the same inter-IC interface such that the transmit pins of the first instance are aligned with the receive pins of the second instance, and such that the receive pins of the first instance are aligned with the transmit pins of the second instance. As will be explained further with respect to FIGS. 53A and 53B, pins on two identical interfaces are considered to be "aligned" when the perimeters of the two interfaces are lined up and a straight line that is perpendicular to the two interfaces can be drawn through the pins in question. The concept of alignment as it pertains to pins of an interface is further described below in regards to FIGS. 53A and 53B.

Such a complementary pin layout enables the first and second instances to be coupled via their respective external interfaces without any signal paths between the two instances crossing. A pair of interface pins that have complementary functions as well as complementary positions are referred to as "complementary pins." Pairs of transmit and receive pins are used herein to demonstrate an example of complementary pins. In other embodiments, however, complementary pins may include pairs of bi-directional pins configured such that signals may be sent in either direction based on settings of one or more control signals. For example, complementary pins of a data bus may be configurable to send or receive data depending on whether data is being read or written.

It is noted that, as referred to herein, an interface may still be considered complementary when only a portion of the complementary pin functions of the interface are in complementary positions. For example, a given inter-IC interface may include pins associated with a plurality of communication buses, such as two or more of a memory bus, a display bus, a network bus, and the like. The given inter-IC interface is considered complementary when pins with complementary functions associated with at least one of the included buses are arranged in a complementary layout relative to the axis of symmetry of the given interface. Other buses of the interface, and/or other signals not directly related to a particular communication bus, may not have pins in complementary positions.

It is noted that in the examples illustrated throughout this disclosure, reference is made to usage of two or more ICs of a same design. It is contemplated that a same external interface with a same physical pin layout may be used to couple ICs of a different design. For example, a family of different IC designs may include the same external interface design across the family in order to enable various combinations of instances of two or more of the ICs. Such a variety of combinations may provide highly scalable system solution across a wide range of applications, thereby allowing, for example, use of smaller, less-expensive members of the family in cost sensitive applications and use of more-expensive, higher-performance members of the family in performance minded applications. Members of the family may also be combined with a small, low-power member for use in reduced power modes and a high-performance member for use when complex processes and/or many parallel processes need to be performed.

In some embodiments, the external interface is physically located along one edge of a die of an IC. Such a physical location may support a variety of multi-die configurations, such as placing two or more die on a co-planar surface with the edges that include the external interface being orientated nearest a neighboring die to reduce a wire length when the external interfaces are coupled. In another example, one die of a pair may be placed facing upwards while the other faces downwards, and then aligned by their respective interfaces. In an embodiment in which only a single one of the ICs is included, the placement of the external interface along one edge of the die may allow the external interface to be physically removed, for example, during a wafer saw operation.

Figure 49:
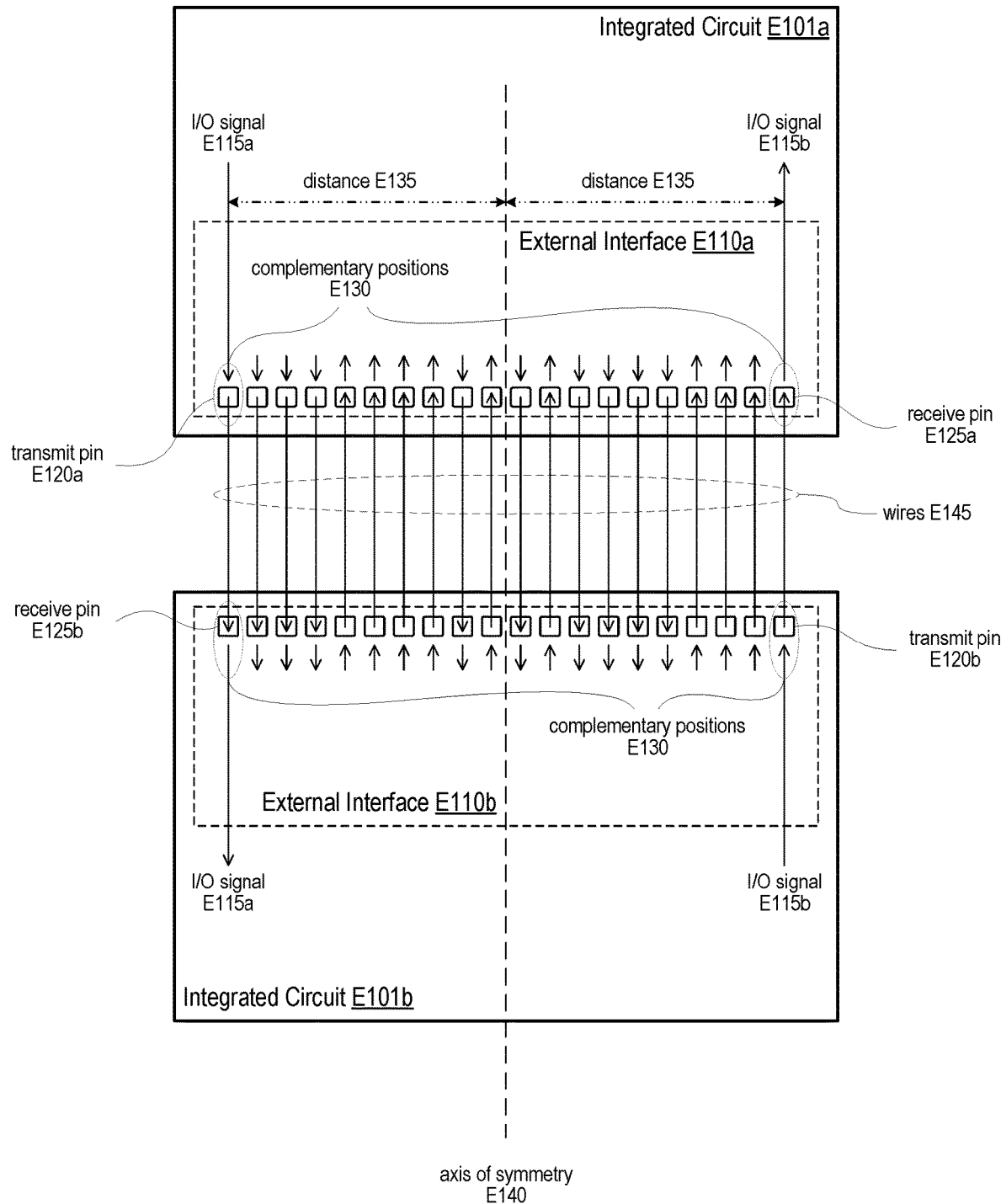
FIG. 49 illustrates a block diagram of an embodiment of a system with two integrated circuits coupled together.

FIG. 49 illustrates a block diagram of one embodiment of a system that includes two instances of an IC coupled via respective external interfaces. As illustrated, system E100 includes integrated circuits E101a and E101b (collectively integrated circuits E101), coupled via their external interfaces E110a and E110b (collectively external interfaces E110), respectively. Integrated circuits E101 may be examples of the SOC 10 shown in FIG. 1, in an embodiment. Axis of symmetry E140 is shown as a vertical dashed line located perpendicular to, and through the center of, interfaces E110a and E110b. Axis of symmetry provides a reference for the physical layout of pins included in external interfaces E110, including transmit pins E120a and E120b, and receive pins E125a and E125b that are associated with a particular bus. It is noted that, as shown, interfaces E110a and E110b are centered in, respectively, integrated circuits E101a and E101b. In other embodiments, however, an external interface may be positioned closer to a particular side of the integrated circuit.

As shown, integrated circuit E101a includes external interface E110a with a physical pin layout having transmit pin E120a and receive pin E125a for a particular bus located in complementary positions E130 relative to axis of symmetry E140. Integrated circuit E101a is an IC design that performs any particular function with a finite amount of bandwidth. For example, integrated circuit E101a may be a general-purpose microprocessor or microcontroller, a digital-signal processor, a graphics or audio processor, or other type of system-on-a-chip. In some applications, a single instance of an integrated circuit E101 may provide suitable performance bandwidth. In other applications, multiple integrated circuits E101 may be used to increase performance bandwidth. In some applications, the multiple integrated circuits E101 may be configured as a single system in which the existence of multiple integrated circuits is transparent to software executing on the single system.

As shown in FIG. 49, receive pin E125b in external interface E110b is complementary to transmit pin E120a of external interface E110a. Accordingly, I/O signal E115a sent via transmit pin E120a is common to I/O signal E115a received by receive pin E125b. In a similar manner, receive pin E125a of external interface E110a is complementary to transmit pin E120b of external interface E110b. I/O signal E115b transmitted by transmit pin E120b, therefore, is a common signal to I/O signal E115b, received by receive pin E125a. I/O signal E115a may, for example, correspond to a data bit 0 of the particular bus in integrated circuits E101a and E101b. Accordingly, I/O signal E115b would also correspond to data bit 0 of the particular bus in integrated circuits E101a and E101b.

As illustrated, a complementary pin layout is enabled by placing transmit pin E120a and receive pin E120a in a same order relative to axis of symmetry E140, each pin being the tenth pin from axis of symmetry E140. In the illustrated embodiment, transmit pin E120a and receive pin E120a are also shown as being located a same physical distance E135 from, but on opposing sides of, axis of symmetry E140. The two instances of external interface E110, therefore, may be capable of being coupled directly to one another. Although such a physical pin symmetry may enable a desirable pin alignment when integrated circuit E101b is rotated into an opposing position from integrated circuit E101a, this degree of pin symmetry is not considered a requirement for all embodiments of complementary interfaces.

As illustrated, integrated circuit E101a is coupled to a second instance, integrated circuit E101b. Integrated circuits E101a and E101b are two instances of a same IC, and therefore, include respective instances of the same circuits, same features, and, as shown, the same external interface E110. Accordingly, integrated circuit E101b includes external interface E110b with a physical pin layout having transmit pin E120b and receive pin E125b for the given input/output (I/O) signal located in complementary positions relative to axis of symmetry E140.

To couple integrated circuits E101, external interfaces E110 of the first and second instances of integrated circuit E101 are positioned such that transmit pin E120a and receive pin E125a for I/O signal E115 on integrated circuit E101a are aligned, respectively, with receive pin E125b and transmit pin E120b for I/O signal E115 on integrated circuit E101b. By rotating the die of integrated circuit E101b 180 degrees and placing a common edge of the two integrated circuits E101 adjacent to each other, transmit pin E120a of integrated circuit E101a is physically located adjacent to receive pin E125b of integrated circuit E101b. Similarly, receive pin E125a of integrated circuit E101a is physically located adjacent to transmit pin E120b of integrated circuit E101b. As used herein, "adjacent" refers to a physical location of two or more circuit elements arranged such that wires coupling the two elements do not cross wires of neighboring sets of similar elements. For example, in terms of pins of the two external interfaces, adjacent pins indicates that a wire from a given pin of the first instance to a complementary pin of the second instance does not cross a wire used to couple any of the neighboring pins of the first and second instances.

Transmit pin E120a is coupled to receive pin E125b and receive pin E125a is coupled to transmit pin E120b, via respective wires E145. It is noted, that as used herein, a "wire" refers to any suitable conductive medium that allows a signal to be transferred between coupled pairs of transmit and receive pins of external interfaces E110. For example, a wire may correspond to a bond wire attached between transmit pin E120a and receive pin E125b. Additionally, an interposer device may be used couple the pins of external interface E110a to the pins of external interface E110b. In some embodiments, integrated circuit E101a may be flipped over and attached, face-to-face, to integrated circuit E101b, either with or without an interposer device between the two integrated circuit die.

Other pins of external interface E110 may also be arranged in similar complementary positions, such that for a group of transmit pins of external interface E110, a complementary group of receive pins are located in a same order relative to axis of symmetry E140, on the opposite side from the group of transmit pins. Such a layout results in a symmetric pin arrangement in which a pair of pins that are a same number of pins from axis of symmetry E140, but on opposite sides, have complementary functions, e.g., one pin of the pair a transmit pin and the other a receive pin.

Using this complementary pin layout, sending data by integrated circuit E101a includes sending a portion of a data packet via transmit pin E120a that is located a particular distance from axis of symmetry E140, and receiving, by integrated circuit E101b, the portion of the data packet via receive pin E125b that is located the same particular distance from axis of symmetry E140. Similarly, the remaining portions of the data packet are sent by other transmit pins, in parallel with the first portion, to complementary receive pins that are located equidistant from axis of symmetry E140. It is noted that the complementary pin layout may also result in wires E145 connected between external interface E110a and E110b being similar in length. This similarity may help to enable the data packet being sent as well as received in parallel, thereby reducing skew between different bits of the data packet as well as any clock signals used to sample the data packet.

By utilizing the complementary pin layout described above, an external interface may be implemented on an integrated circuit that allows multiple instances of the integrated circuit to be coupled together in a fashion that enables use in space constrained applications while satisfying a performance requirement of the application. Reuse of an existing integrated circuit across an increased range of applications may reduce design and production costs associated with otherwise designing a new integrated circuit to satisfy the performance requirements of one or more applications of the increased range.

It is noted that system 100, as illustrated in FIG. 49, is merely an example. The illustration of FIG. 49 has been simplified to highlight features relevant to this disclosure. Various embodiments may include different configurations of the circuit elements. For example, external interface E110 is shown with twenty pins. In other embodiments, any suitable number of pins may be included in the external interface, including for example, over one thousand pins. Although only two instances of the integrated circuit are shown, it is contemplated that additional instances may be included in other embodiments. Axis of symmetry E140 is depicted as being through the center of integrated circuits E101a and E101b. In other embodiments, the external interface, and therefore the axis of symmetry, may be positioned off-center of the integrated circuit.

The integrated circuit illustrated in FIG. 49 is shown only with an external interface. Various integrated circuits may include any suitable number of additional circuit blocks. One example of an integrated circuit with additional circuit blocks is shown in FIG. 50.

Figure 50:
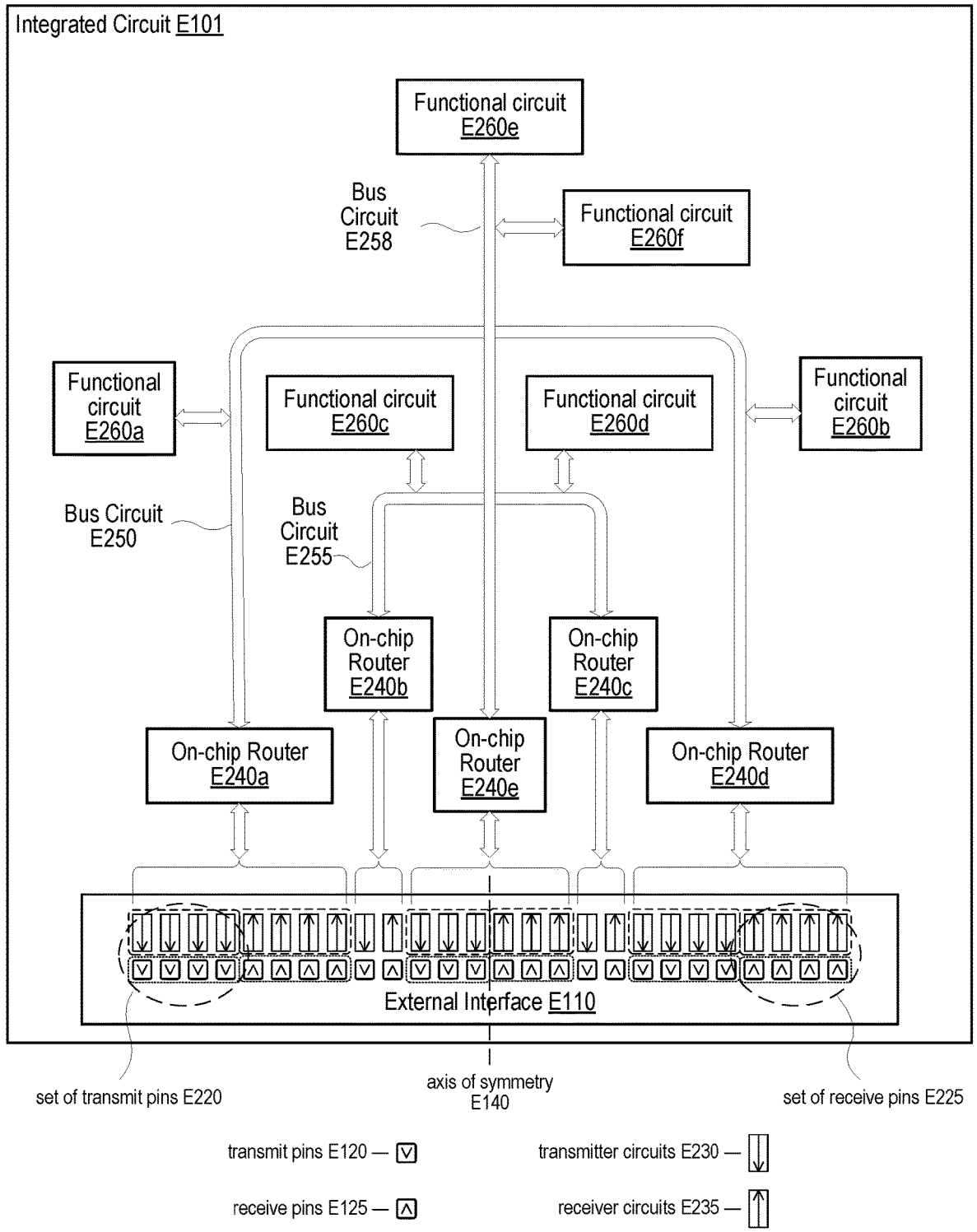
FIG. 50 shows a block diagram of an embodiment of an integrated circuit with an external interface.

Moving to FIG. 50, a diagram of an embodiment of an integrated circuit with an external interface is shown. As illustrated, integrated circuit 101 includes external interface E110 coupled to on-chip routers E240a-E240e which, in turn, are coupled to respective ones of several bus circuits including bus circuits E250, E255 and E258. The various bus circuits are coupled to respective sets of functional circuits E260a-E260f. External interface E110 is shown with a plurality of transmit pins E120 and receive pins E125, as well as associated transmitter circuits E230 and receiver circuits E235. Integrated circuit E101, as shown, corresponds to an IC design for both integrated circuits E101a and E101b in FIG. 49.

As illustrated, bus circuits E250-E258 are configured to transfer given data among the plurality of functional circuits E260a-E260f (collectively functional circuits E260). Bus circuits E250, E255, and E258 provide respective communication paths between various sets of functional circuits, including external interface E110 and respective sets of functional circuits E260. Each of the bus circuits E250-E258 may support a respective set of network protocols and/or particular types of data. For example, bus circuit E258 may be used for transferring graphics data, while bus circuit E250 may support general purpose data, and bus circuit E255 is used for audio data.

Bus circuits E250, E255, and 258 may collectively form a communication fabric within integrated circuit E101 for transferring data transactions between various functional circuits E260 and additional functional circuits that are not illustrated. To access external interface E110, and therefore, another instance of integrated circuit E101, each of bus circuits E250-E258 is coupled to a respective one or more of on-chip routers E240 that is, in turn, coupled to one or more transmitter circuits E230 and receiver circuits E235 included in external interface E110. On-chip routers E240a and E240d, as shown, provide different access points into bus circuit E250, and may be physically located at different locations on integrated circuit E101, such as near the associated transmitter and receiver circuits. Similarly, on-chip routers E240b and E240c provide different access points into bus circuit E255, and on-chip router E240e provides an access point into bus circuit E258.

As illustrated, a plurality of transmitter circuits E230 in external interface E110 are coupled to a particular set of transmit pins E220, and a plurality of receiver circuits E235 are coupled to a particular set of receive pins E225. These transmitter circuits E230 and receiver circuits E235 may be physically located by their corresponding set of transmit pins E220 and set of receive pins E225. Such a co-location of these circuits may reduce timing skew between a point in time when a given one of the set of transmitter circuits E230 in a first instance of integrated circuit E101 asserts a particular signal level and a later point in time when a corresponding one of the set of receiver circuits on a second instance of integrated circuit E101 receives the asserted signal level. This timing skew may increase in IC designs in which the transmitter circuits E230 and/or receiver circuits E235 are placed farther away from their respective transmit and receive pins.

The particular set of transmit pins E220 is arranged in a particular layout relative to axis of symmetry E140 of external interface E110. The particular set of receiver pins E225 is arranged in a complementary layout to the particular layout, relative to axis of symmetry E140. Accordingly, when two instances of integrated circuit E101 are placed facing one another, with one of the instances flipped E180 degrees from the other instance, the given transmit pin E120 is aligned with the corresponding receive pin E125. External interface E110 is configured to transfer particular data between bus circuits E250-E258 and the other instance of integrated circuit E101.

On-chip routers E240 transfer the particular data between an associated bus circuit E250-E258 and external interface E110 via a plurality of signals. On-chip routers E240 may be configured to queue one or more data packets to send to a respective one of bus circuits E250-E258 and/or queue one or more data packets received from the respective bus circuit. For example, on-chip router E240a may receive a series of data packets from the other instance of integrated circuit E101 via external interface E110. In some embodiments, on-chip router E240a may buffer one or more data packets of the series while waiting for available bandwidth in bus circuit E250 before sending the received data packets. The reverse may also occur, with on-chip router E240a buffering data packets from bus circuit E250 while waiting for bandwidth to send the packets to the other instance of integrated circuit E101. In other embodiments, on-chip router E240a may cause functional circuit E260a or E260b to delay sending a data packet until bandwidth on bus E250 and/or resources in a destination circuit are available to receive the data packet. In addition, on-chip routers E240 may include logic circuits for determining a final destination for a received data packet, e.g., a particular one (or more) of functional circuits E260. In some embodiments, on-chip routers E240 may convert data signals received from external interface E110 using one type of data protocol into a different type of data protocol compatible with the associated bus circuit.

As disclosed, integrated circuit E101 includes the plurality of transmitter circuits E230 and the plurality of receiver circuits E235 that correspond to respective ones of the plurality of transmit pins E120 and the plurality of receive pins E125. Transmitter circuits E230 include circuitry for driving data signals onto corresponding transmit pins E120. For example, transmitter circuits E230 may include driver circuits configured to receive a particular voltage level from a signal generated by an associated on-chip router E240 and then generate a corresponding voltage level on an associated transmit pin E120 such that a corresponding receiver circuit E235 in the other instance of integrated circuit E101 can detect this voltage level. Receiver circuits E235 may, for example, include input circuits configured to detect if the received voltage level on a corresponding one of receive pins E125 is above or below a particular voltage threshold, and then generate a corresponding logic level on a signal sent to an associated on-chip router E240. Transmitter circuits E230 and receiver circuits E235, as shown, are arranged in a physical layout that corresponds to the particular complementary layout, relative to axis of symmetry E140.

On-chip routers E240 includes a pair of on-chip routers (e.g., on-chip routers E240a and E240d) that are coupled to a common bus circuit (e.g., bus circuit E250). On-chip router E240a is coupled to a particular set of transmit and receive pins of external interface E110 located on the left side of axis of symmetry E140. On-chip router E240d is coupled to a different set of transmit and receive pins of the external interface located on the right side of axis of symmetry E140, complementary to the particular set of transmit and receive pins. For example, a given transmit pin E120 coupled to on-chip router E240a has a corresponding complementary receive pin E125 coupled to on-chip router E240d.

An example of a data exchange between a particular functional circuit of a first instance of integrated circuit E101 (e.g., functional circuit E260a) and a different functional circuit of a second instance of integrated circuit E101 (e.g., a second instance of functional circuit E260b) includes sending, by the functional circuit E260a in the first instance, first data via the set of transmit pins E220 of external interface E110 of the first instance. This sending comprises transmitting a particular set of signals to the second instance via external interface E110 using on-chip router E240a. Receiving the first data, by the second instance, comprises receiving, by the second instance, the particular set of signals via a set of receive pins E225 of external interface E110 that are coupled to on-chip router E240d in the second instance. On-chip router E240d may then route the received first data to the second instance of functional circuit E260b via bus circuit E250 of the second instance.

Data sent from functional circuit E260b of the second instance to functional circuit E260a of the first instance repeats this process. The second instance of integrated circuit E101 sends second data via the set of transmit pins E220 of external interface E110 of the second instance, including transmitting a different set of signals to the first instance via external interface E110 using on-chip router E240a of the second instance. Receiving, by the first instance, the second data via the set of receive pins E225 of external interface E110 of the first instance comprises receiving a different set of signals from the second instance via external interface E110 using on-chip router E240d of the first instance. The received second data is then routed to functional circuit E260a via bus circuit E250 of the first instance. Data, therefore, may be exchanged between the two instances of integrated circuit E101 using the corresponding sets of complementary transmit pins E120 and receive pins E125.

Furthermore, on-chip router E240a is coupled, via bus circuit E250 to on-chip router E240d and to the set of transmit pins E220. Similarly, on-chip router E240d is coupled to the set of receive pins E225. Functional circuit E260a in the first instance may, therefore, send and receive data via external interface E110 using the complementary set of on-chip routers E240a and E240d. Function circuit E260b of the second instance may similarly send and receive data via external interface E110 using the complementary set of on-chip routers E240a and E240d of the second instance. Accordingly, the coupled external interfaces E110 of the first and second instances may enable the respective communication fabrics of the two instances to function as a single, coherent communication fabric, thereby allowing data packets to be exchanged between functional circuits on opposite dies in a manner similar to data packets exchanged between two functional circuits on a same die. From a functional perspective, the two instances of integrated circuit E101 may perform as a single integrated circuit.

It is noted that the embodiment of FIG. 50 is one example. In other embodiments, a different combination of elements may be included. For example, a different number of bus circuits and/or on-chip routers may be included. Although FIG. 50 depicts E26 pins included in external interface E110, in other embodiments, any suitable number of pins may be included.

In the description of FIGS. 49 and 50, various pairs of pins of external interface 110 are described as complementary. In some embodiments, an order of bits of data transmitted across a particular set of transmit pins of a first instance of an IC may not align directly with the complementary set of receive pins of a second instance of the IC. An embodiment of an IC that demonstrates how misalignment of data bits may be addressed is shown in FIG. 51.

Figure 51:
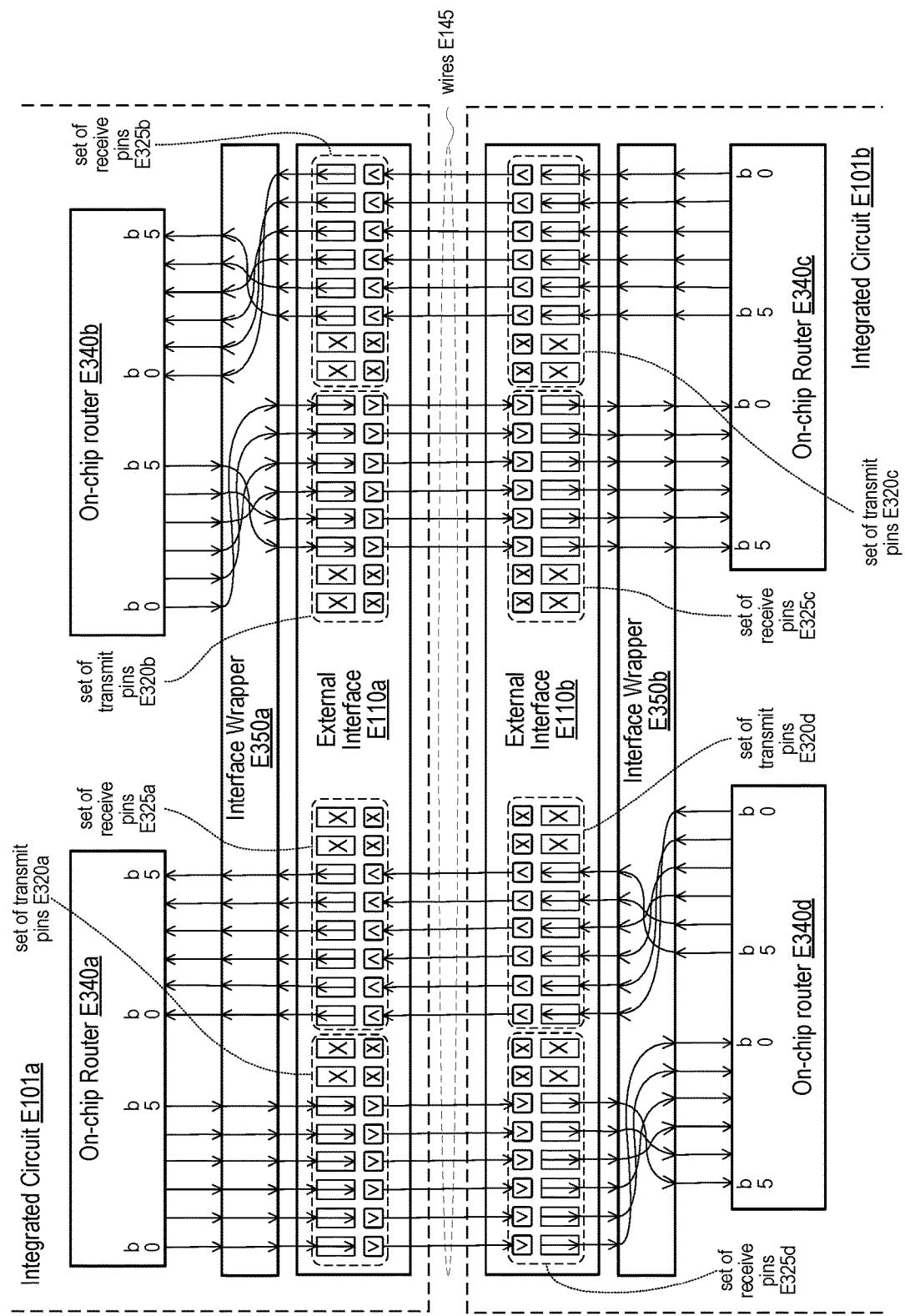
FIG. 51 depicts a block diagram of a system with two integrated circuits utilizing an interface wrapper to route pin assignments of respective external interfaces.

Turning to FIG. 51, two instances of integrated circuit E101 are shown, coupled via their respective instances of external interface E110. As shown, system E300 depicts an embodiment in which received data is misaligned from the transmit data. System E300 includes integrated circuits E101a and E101b, each with a respective external interface E110a and E110b, and a respective pair of on-chip routers: on-chip routers E340a and E340b in integrated circuit E101a and on-chip routers E340c and E340d on integrated circuit E101b. For the illustrated example, on-chip router E340a of integrated circuit E101a corresponds to on-chip router E340c of integrated circuit E101b. In a similar manner, on-chip router E340b corresponds to on-chip router E340d. Each of integrated circuits E101a and E101b further includes a respective one of interface wrappers E350a and E350b, that are configured to route individual signals between the respective on-chip routers and the external interfaces.

As illustrated, the transmit and receive pins of external interface E110a and E110b are grouped into sets of pins, including respective transmitter and receiver circuits. These sets of pins have a common number of pins, eight in the illustrated example, although any suitable number may be used. This common number of pins may be used to standardize a design for the sets of pins. Each set of pins may include a common set of signals for controlling clock signals, power, and the like. For example, each pin of a given set receives a same gated clock signal and may be coupled to a same gated power node and/or a same gated ground reference node. Utilizing a small number (e.g., one or two) of designs for the sets of pins may decrease a development time for the external interface as well as increase a uniformity for the placement, as well as for the performance characteristics (e.g., rise and fall times), for each of the pins of external interfaces E110a and E110b. As previously disclosed, although only thirty-two pins are illustrated for each instance of external interface E110, external interface E110 may actually include hundreds or thousands of pins. Accordingly, standardizing sets of pins to be implemented in the interface design as one unit, may result in a significant reduction to the times required for designing and validating external interface E110.

Individual ones of the plurality of on-chip routers E340a-E340d are assigned to a respective one or more of the sets of pins. For example, on-chip router E340a is assigned to set of transmit pins E320a and set of receive pins E325a. Likewise, on-chip routers EE340b-340d are assigned to a respective set of transmit pins and a respective set of receive pins. In various embodiments, these assignments may be fixed or may be programmable, e.g., sets of pins are assigned by setting a particular configuration register (not shown). It is noted that receive and transmit pins are grouped into separate sets in the depicted embodiment. In other embodiments, as will be shown below, a set of pins may include both transmit and receive pins.

In addition, individual ones of the plurality of on-chip routers E340a-E340d are assigned to a respective bus circuit and are therefore coupled to a plurality of functional circuits included on a same integrated circuit E101. In some embodiments, a physical orientation of on-chip routers E340 may be implemented in preference to the particular bus circuit to which the on-chip router is coupled. For example, on-chip routers E340a and E340b may be instantiated such that they are rotated 180 degrees from one to another in order to be aligned to a common bus circuit that wraps around integrated circuit E101a. In such an embodiment, the pins of on-chip router E340b may not align to the set of receive pins E325b and/or the set of transmit pins E320b of external interface E110a. Additionally, interface wrapper 350a may include several instances of a same component that are instantiated 180 degrees from one to another. In such a case, transmit and receive pins of interface wrapper E350a may not align to the pins of external interface E110a. Accordingly, a capability to reroute pins signals through interface wrapper E350a may be desired.

As shown, each of on-chip routers E340a-E340d includes six output signals and six input signals, different than the common number of pins, eight. Accordingly, two pins of each sets of pins E320 and E325 that are assigned to each on-chip router E340 are unused. On-chip routers E340a-E340d each support a particular network protocol, as described above in regard to FIG. 50. In some cases, such as shown in FIG. 51, a particular network protocol may not include a number of pins that aligns with the common number of pins included in the sets of pins. Since removing the extra pins could impact performance characteristics of the remaining pins (e.g., a parasitic capacitance seen by each of the remaining pins could differ, thereby impacting rise and fall times), in some embodiments the extraneous pins are left in the respective sets.

Each set of transmit pins E320, as shown, includes a transmit buffer and, similarly, each set of receive pins E325 includes a receive buffer. Since eight transmit pins or eight receive pins are included in each set, the respective transmit and receive buffers may be accessed as a byte of data. For example, on-chip router E340a may send data to on-chip router E340d. On-chip router E340a sends six output signals to interface wrapper E350a. Interface wrapper E350a is configured to route set of transmit pins E320a to a default pin assignment in on-chip router E340a. As shown, this default assignment is a straight-through assignment in which a bit 0 of set of transmit pins E320a is coupled a bit 0 of on-chip router E340a, and so on to a bit 5 of the set of transmit pins E320a assigned to a bit 5 of on-chip router E340a. This bit assignment assumes that the bit 0 corresponds to the left-most pin of the sets of pins in external interface E110a.

Note that integrated circuit E101b is rotated 180 degrees in relation to integrated circuit E101a. Accordingly, bit 0 corresponds to the right-most pin of the sets of pins in external interface E110b. Since wires E145 between external interface E110 and E110b are, as shown, straight across, bit 0 of set of transmit pins E320 is coupled to bit 7 of set of receive pins E325d and, similarly, bit 5 of set of transmit pins E320a is coupled to bit 2 of set of receive pins E325d. Accordingly, interface wrapper E350b routes set of receive pins E325d using a non-default pin assignment to on-chip router E340d.

In a similar manner, sending data from on-chip router E340d to on-chip router E340a may include sending, by on-chip router E340d, signals via set of transmit pins E320d of external interface E110b using a non-default pin assignment to route set of transmit pins E320*d* to on-chip router E340*d*. Receiving, by on-chip router E340*a*, the data via set of receive pins E325*a* of external interface E110*a* comprises routing set of receive pins E325*a* to on-chip router E340*a* using the default pin assignment.

In some embodiments, interface wrappers E350*a* and E350*b* may adjust routing between a given on-chip router E340 and the transmit and receive pins of the assigned set (or sets) of pins on any given clock cycle during which no data is being transferred by the given on-chip router E340. For example, an amount particular of data may be sent between on-chip router E340*b* and on-chip router E340*c*. Interface wrapper E350*a* routes, for a first portion of the particular data, the plurality of signals between on-chip router E340*b* and set of transmit pins E320*b* using a first pin assignment, and then re-routes, for a second portion of the particular data, the plurality of signals between on-chip router E340*b* and set of transmit pins E320*b* using a second pin assignment different from the first pin assignment.

Integrated circuits E101*a* and E101*b*, e.g., may each include one or more processing cores capable of executing instructions of a particular instruction set architecture. Accordingly, instructions of a particular program may cause a core to modify the pin assignments in interface wrappers E350*a* and/or E350*b* at particular points in time, or for particular types of data. For example, image data may be sent using one pin assignment and then switch to a different pin assignment for audio data or for commands associated with the image data. In addition, interface wrapper E350*a* and E350*b* may be capable of re-routing pin assignments for one on-chip router while a different router on the same IC is sending or receiving data.

It is noted that the examples of FIG. 51 are merely for demonstrating disclosed concepts. System E300 has been simplified to clearly illustrate the described techniques. In other embodiments, additional sets of transmit and receive pins may be included in the external interfaces as well as additional on-chip routers. Other circuit blocks of integrated circuits E101*a* and E101*b* have been omitted for clarity.

Figure 52:
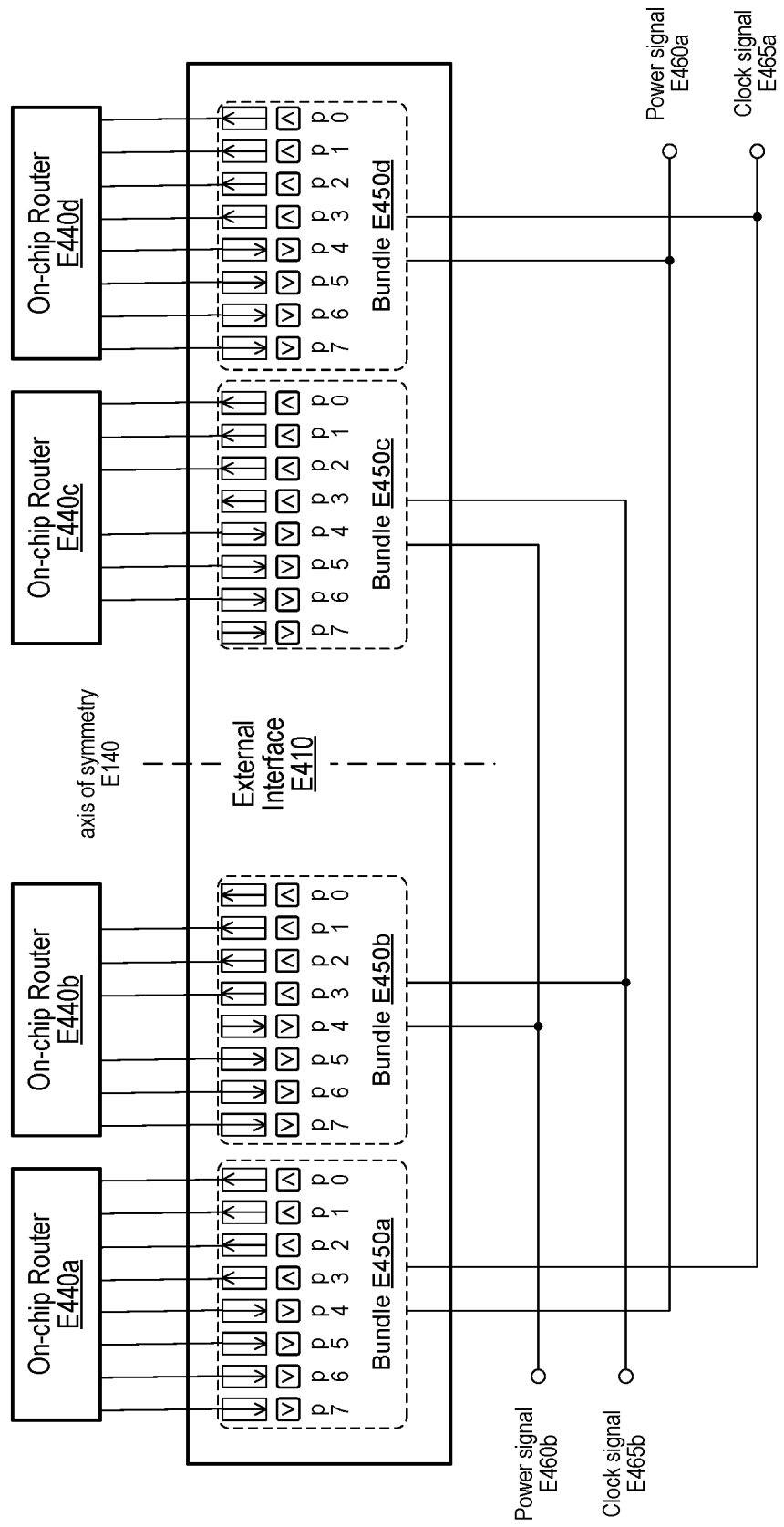
FIG. 52 illustrates a block diagram of an embodiment of an integrated circuit with an external interface utilizing pin bundles.

FIG. 51 describes how sets of pins in the external interface may be implemented and utilized. Various techniques may be utilized for implementing such sets of pins. In FIG. 51, the pins of the external interface are grouped into sets of transmit pins that are separate from the sets of receive pins. FIG. 52 illustrates another example for grouping sets of pins that include both transmit and receive pins.

Proceeding to FIG. 52, a block diagram of an embodiment of an integrated circuit with an external interface is shown. In the illustrated embodiment, integrated circuit E101 includes external interface E410 and on-chip routers E440*a*-E440*d* (collectively on-chip routers E440). External interface E410 includes four sets of transmit and receive pins, bundles E450*a*-E450*d* (collectively bundles E450), in which the transmit and receive pins are arranged in a complementary layout relative to axis of symmetry E140. Each of the illustrated bundles E450*a*-E450*d* includes eight pins, four transmit pins and four receive pins.

As illustrated, the transmit and receive pins of external interface E410 are grouped into sets of pins, bundles E450*a*-E450*d*, wherein each of bundles E450 have a common number of pins (eight). On-chip routers E440 are assigned to a respective one of bundles E450. In other embodiments, however, one or more on-chip routers E440 may be assigned to two or more bundles E450. As described above, sets of transmit and receive pins may be implemented using standardized bundles E450 in order to increase consistency across the pins of external interface E410. Within each bundle E450, the included transmit and receive pins share a common power signal and clock signal.

Each bundle E450 may be coupled to any appropriate power signal and clock signal. As shown, bundles E450*a* and E450*d* are coupled to receive power signal E460*a* and clock signal E465*a*, while bundles E450*b* and E450*c* are coupled to receive power signal E460*b* and clock signal E465*b*. In some embodiments, power signal E460*a* may be controlled independently from power signal E460*b*, including for example, using a different voltage level and/or implementing different power gates to enable/disable the respective bundles E450. In a similar manner, clock signal E465*a* may also be controlled independently from clock signal E465*b*. According clock signal E465*a* may be enabled and/or set to a particular frequency independently from clock signal E465*b*. In the present embodiment, bundles E450*a* and E450*d* are a complementary pair, as are bundles E450*b* and E450*c*. In addition to using a standardized pin bundle to implement each of bundles E450, use of common power and clock signals for a complementary pair of bundles E450 may further increase performance consistency between the two bundles E450 of a complementary pair.

As shown, on-chip routers E440*a* and E440*d* are assigned to bundles E450*a* and E450*d*, respectively. In a similar manner, on-chip routers E440*b* and E440*c* are respectively assigned to bundles E450*b* and E450*c*. On-chip routers E440*a* and E440*d* include a same number of transmit and receive pins as are included in a standardized bundle, resulting in no unused pins in bundles E450*a* and E450*d*. On-chip routers E440*b* and E440*c*, in contrast, include fewer transmit and receive pins than the common number of pins included in a standardized bundle, resulting in one unused transmit pin and one unused receive pin in bundles E450*b* and E450*c*, respectively.

On-chip routers E440*a* and E440*d*, as illustrated, may send data packets via bundles E450*a* and E450*d* using all transmit pins of the respective bundles. At a different point in time, however, on-chip routers E440*a* and E440*d* may send a plurality of data packets, wherein ones of the plurality of data packets include a smaller number of bits, resulting in fewer than all transmit pins of the respective bundle E450 being used. Likewise, when receiving data packets, fewer than all receive pins in bundle E450*a* and E450*d* may be used to receive a given data packet.

It is noted that FIG. 52 is merely one example of the disclosed concepts. Although four on-chip routers and four pin bundles are shown, any suitable number may be included in other embodiments. As illustrated, four transmit pins and four receive pins are shown within each pin bundle. In other embodiments, any suitable number of transmit and receive pins may be included. In some embodiments, the number of transmit pins may be different than the number of receive pins. In other embodiments, transmit and receive pins may be implemented in separate bundles.

Figure 53A:
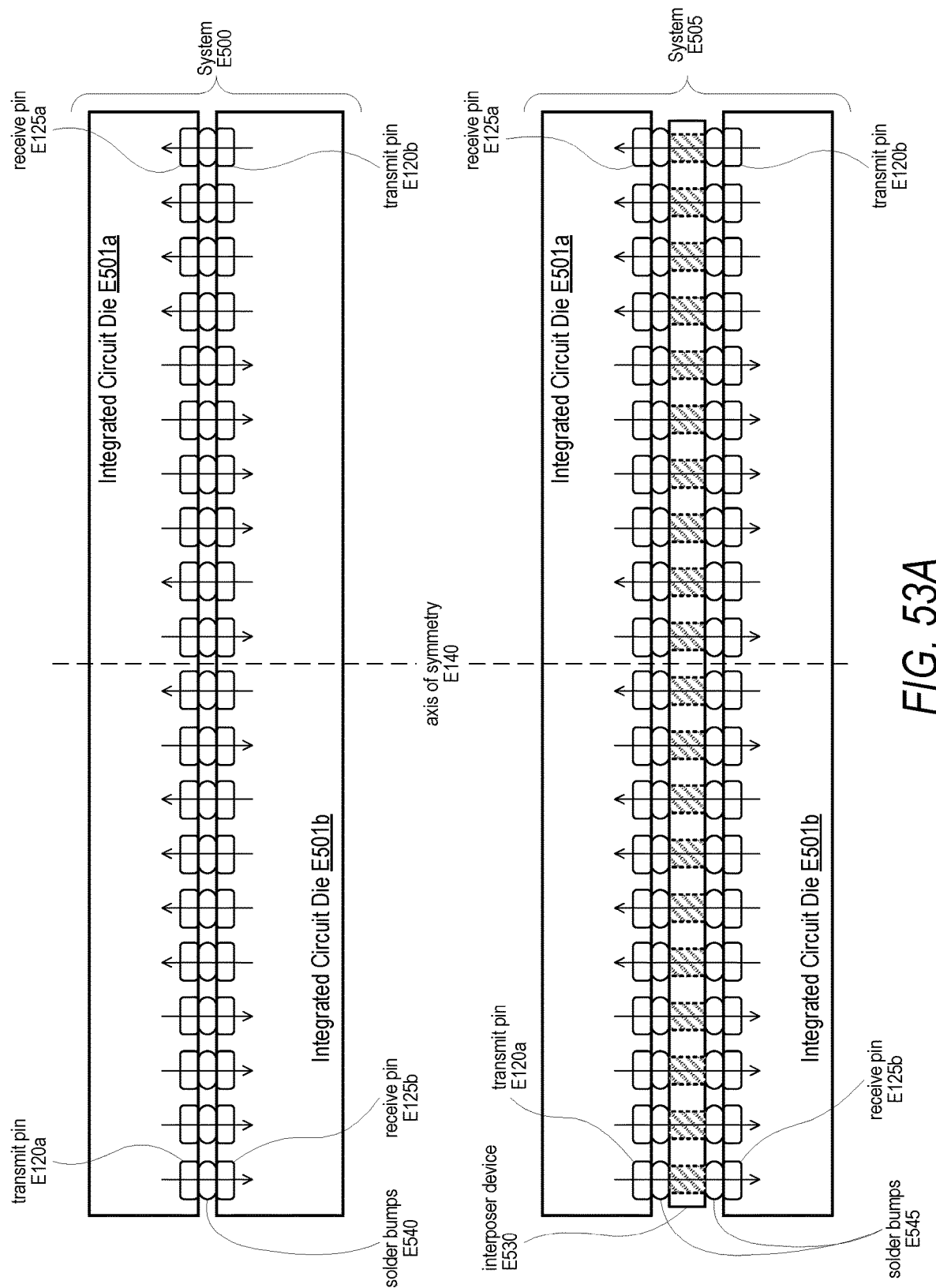
FIG. 53A depicts two examples of two integrated circuits coupled together using complementary interfaces.
Figure 53B:
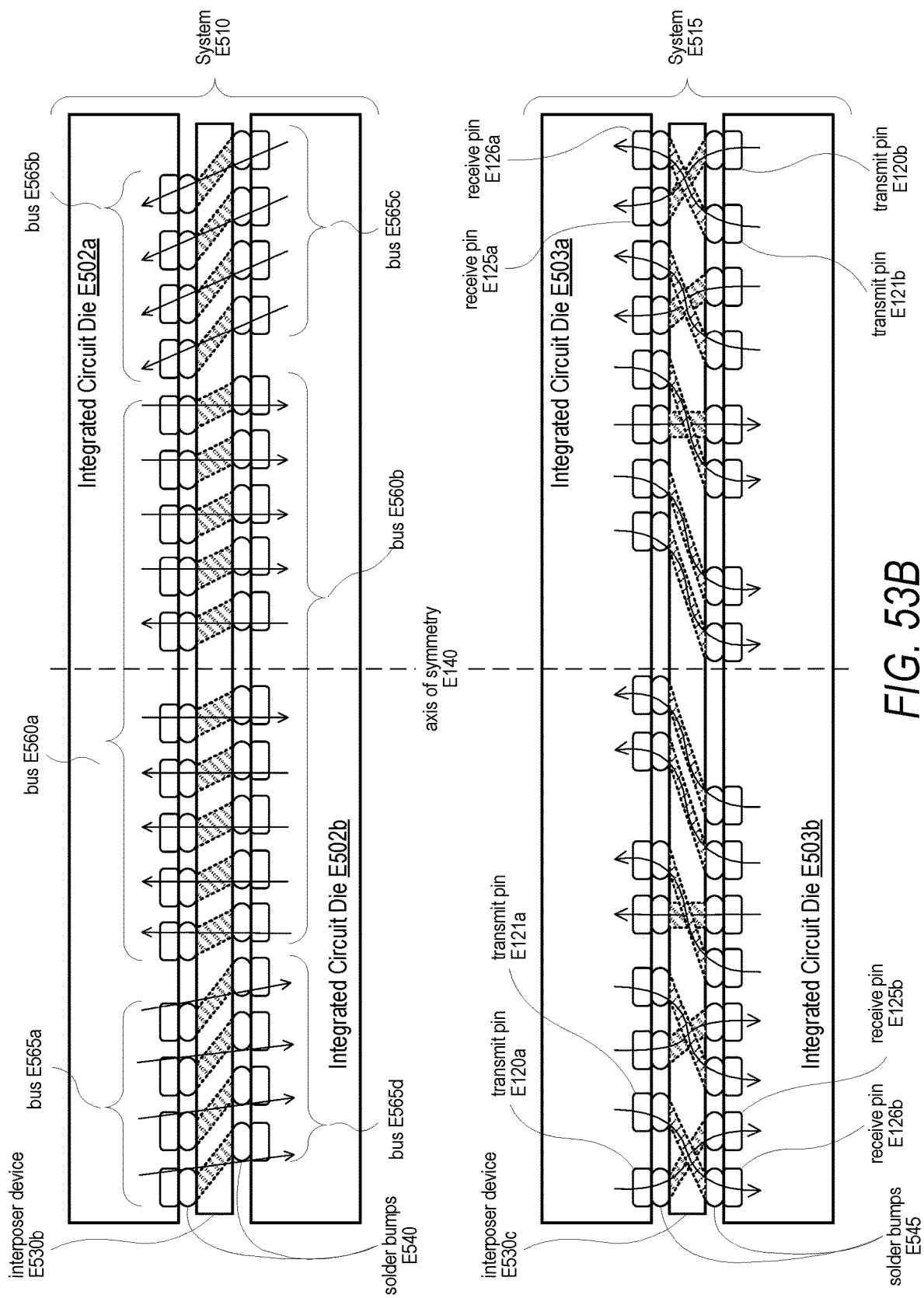
FIG. 53B depicts two additional examples of two integrated circuits coupled together.

In FIGS. 49 and 51, two integrated circuits are shown coupled via their respective external interfaces. In some embodiments, the two integrated circuits may be placed on a co-planar surface with both ICs facing a same direction and with one IC rotated such that the pins of their respective external interfaces are aligned in a manner that allows the pins of the two external interfaces to be coupled without crossing any wires. In other embodiments, as shown in FIGS. 53A and 53B, two ICs may be attached, face-to-face, with their respective external interfaces aligned. FIG. 53B further depicts an example of two die that are coupled via a non-aligned external interface.

Proceeding now to FIG. 53A, two embodiments are depicted for attaching two integrated circuits together via an external interface. In one embodiment, system E500 shows integrated circuit die E501a coupled to integrated circuit die E501b using solder bumps E540. In another embodiment, system E505 depicts integrated circuit die E501a coupled to integrated circuit die E501b using interposer device E530, as well as two sets of solder bumps E545. In the present embodiment, integrated circuit die E501a and E501b correspond to integrated circuits E101a and E101b in FIG. 49. \

As shown in FIG. 49, the external interfaces of integrated circuits E101a and E101b may be coupled using wires (e.g., soldered bond wires or microstrip conductors deposited on circuit boards) with the two dies placed on a co-planar surface, the faces of both dies facing a same direction. Such a technique may enable a low cost assembly solution, but may require a surface area of an associated circuit board that is larger than a footprint of the two dies. To reduce this footprint, system E500 includes two integrated circuit die E501a and E501b placed face-to-face with pins of the respective external interfaces aligned and soldered directly to one another using solder bumps E540. For example, transmit pin E120a is soldered directly to receive pin E125b and receive pin E125a is soldered directly to transmit pin E120b. The complementary pin layout described above for the external interfaces E110 in FIG. 49 enables this direct soldering between different instances of the same interface. Placement of complementary pairs of pins equidistant from axis of symmetry E140 provides the alignment that enables the direct connections.

System E505 presents a similar solution as system E500, but with an addition of interposer device E530a to provide a conductive connection between an external interface of each die. In system E505 transmit pin E120a of integrated circuit die E501a is soldered to a particular pin of interposer device E530a. This particular pin is then soldered to receive pin E125b. In a like manner, receive pin E125a is soldered to a different pin of interposer device E530a, which in turn, is soldered to transmit pin E120b. Although interposer device E530a may allow routing of pins of integrated circuit die E501a to pins of integrated circuit die E501b that are not physically aligned, use of the complementary pin layout for the external interfaces of integrated circuit die E501a and E501b allows interposer device E530a to have conductive paths between the two die straight across. Such a straight connection may reduce a physical path between pins of integrated circuit E501a and E501b, as compared to routing connections between misaligned pins on the two die. Use of interposer device E530a may further allow routing of one or more pins of the external interfaces or other pins of either of integrated circuit die E501a and E501b to an edge of interposer device E530 where the pins may, for example, be coupled to other integrated circuits.

In FIG. 53A, the pins of the external interfaces of integrated circuits E501a and E501b are depicted with complementary pins that are equidistant from axis of symmetry E140. In some embodiments, not all pins of an interface may include such an equidistant pin layout. Turning now to FIG. 53B, two more examples of two coupled ICs are shown. The ICs included in systems E510 and E515, however, do not include pins that are all equidistant from the axis of symmetry.

As illustrated, system E510 demonstrates an example of an external interface that includes complementary pins. Similar to integrated circuit die E501a and E501b, integrated circuit die E502a and E502b are two instances of a same integrated circuit design that are coupled through a common external interface design. The pins of the external interface of integrated circuit die E502a and E502b include transmit and receive pins for two buses, bus E560 and bus E565. The pins for bus E565 are split into two sections per die, bus E565a and E565b on integrated circuit die E502a, and bus E565c and E565d on integrated circuit die E502b. Each die also includes respective pins for bus E560, E560a on integrated circuit die E502a and E560b on integrated circuit die E502b. The complementary pins of bus E565a and E565d are not equidistant from axis of symmetry E140, and although the pins are arranged in a same order, a straight line that is parallel to the edges of the die cannot be drawn through the pins of buses E565a and E565d, and similarly with the pins of buses E565b and E565c. Accordingly, the pins of bus E565 are not aligned.

As shown, pins of bus E560a that have complementary functions also are not arranged equidistant from axis of symmetry E140. Unlike the pins of bus E565, however, lines parallel to the edges of the die can be drawn through the complementary pairs of pins of buses E560a and E560b. Accordingly, the pins of bus E560 are aligned.

System E515, as presented, demonstrates an example of an external interface that is not complementary. Like system E510, system E515 includes two instances of a same integrated circuit design, integrated circuit die E503a and E503b. In system E515, the pins of the external interface are not aligned, and as a result, multiple signal paths cross. For example, the signal path between transmit pin E120a and receive pin E125b crosses the path from transmit pin E121a and receive pin E126b. On the opposite side of axis of symmetry E140, the signal path between transmit pin E120b and receive pin E125a crosses the path from transmit pin E121b and receive pin E126a. Due to this misalignment, integrated circuits E503a and E503b are not considered to have a complementary interface.

It is noted that that alignment of complementary pins of an external interface may result in a reduction of noise coupling between adjacent signals. When two or more signal paths cross, the wires carrying the signals may come into close proximity, which in turn, may increase a susceptibility to noise coupling in which a first signal path receives electromagnetic interference from signal transitions on a second signal path. The closer the two signal paths, the greater the susceptibility to noise being transmitted between the two paths. By aligning the pins of the interface, a suitable distance may be maintained between adjacent signal paths, thereby reducing the noise susceptibility to an acceptable level. The aligned pin layout may further reduce a length of the signal paths through the interposer device, which may reduce an impedance between the complementary pairs of pins, allowing for operation of the system to occur at lower voltage levels and/or higher clock frequencies.

It is further noted that the examples of FIGS. 53A and 53B are merely for demonstrating the disclosed techniques. Other techniques for coupling two or more IC die are contemplated. For example, in some embodiments, pins for each of two or more IC die may be coupled directly to a circuit board with connections between the die routed through the circuit board.

The circuits and techniques described above in regards to FIGS. 49-53 may couple two external interfaces using a variety of methods. Two methods associated with coupling interfaces are described below in regards to FIGS. 54 and 55.

Moving now to FIG. 54, a flow diagram for an embodiment of a method for coupling two integrated circuits together is shown. Method E600 may be performed by a system that includes two or more instances of an integrated circuit, such as system E100 in FIG. 49. Referring collectively to FIGS. 49 and 54, method E600 begins in block E610.

At block E610, method E600 includes sending, by integrated circuit E101a to integrated circuit E101b, first data via a set of transmit pins of external interface E110a. As shown, integrated circuits E101a and E101b are two instances of a common integrated circuit design. As such, a physical pin layout of the two instances is the same. In other embodiments, however, it is contemplated that respective instances of two different integrated circuits may be used. In FIG. 49, transmit pins of external interface E110a of integrated circuit E101a are coupled to respective receive pins of external interface E110b of integrated circuit E101b, including transmit pin E120a coupled to receive pin E125b. Integrated circuit E101a may therefore, use external interface E110a to send the first data to integrated circuit E101b.

Method E600, at block E620, further includes receiving, by integrated circuit E101a from integrated circuit E101b, second data via a set of receive pins of external interface E110a. As illustrated, receive pins of external interface E110a are coupled to respective receive pins of external interface E110b, including receive pin E125a coupled to transmit pin E120b. The set of transmit pins and the set of receive pins are located in complementary positions relative to axis of symmetry E140 of integrated circuit E101. Accordingly, transmit pins E120a and E120b correspond to a same transmit pin in the common integrated circuit design. Likewise, receive pins E125a and E125b correspond to a same receive pin in the common integrated circuit design. This complementary pin layout of the external interface, relative to axis of symmetry E140, allows the two instances of the common integrated circuit design to be coupled by their respective external interfaces without a need to reroute any pins of the external interface. Instead, direct connections between external interfaces E110a and E110b may be possible without crossing any associated wires. Such a technique for coupling the two instances of the common integrated circuit may allow for an external interface with a large number of pins (e.g., greater than one thousand pins).

In some embodiments, method E600 may end in block E620, or in other embodiments, may repeat in response to new data to be exchanged between the two integrated circuits E101a and E101b. It is noted that the method of FIG. 54 is merely an example for coupling two integrated circuits.

Figure 55:
FIG. 55 shows a flow diagram of an embodiment of a method for routing signals data between an external interface and on-chip routers within an integrated circuit.

Turning now to FIG. 55, a flow diagram for an embodiment of a method for routing signals between pins of an external interface and one or more on-chip routers is illustrated. In a similar manner as for method E600 above, method E700 may be performed by a system with two or more integrated circuits, such as system E300 in FIG. 51. Referring collectively to FIGS. 51 and 55, method E700 begins in block E710.

Method E700, at block E710, includes routing, by integrated circuit E101a, set of transmit pins E320b to on-chip router E340b using a non-default pin assignment to send first data via set of transmit pins E320a. As shown in FIG. 51, integrated circuit E101a includes interface wrapper E350a that is configured to route signals from on-chip routers E340a and E340b to respective sets of transmit and receive pins in external interface E110a. Interface wrapper E350a may use a default pin assignment for routing set of transmit pins E320b to output signals from on-chip router E340b. Under some conditions, however, interface wrapper E350a may be configured to reroute the output signals from on-chip router E340b to set of transmit pins E320b using a non-default pin assignment. For example, as shown in FIG. 51, on-chip router E340b has fewer output signals than a number of transmit pins included in set of transmit pins E320b. The non-default pin assignment may be used to adjust where individual bits of the first data are received by integrated circuit E101b.

At block E720, method E700 includes routing, by integrated circuit E101a, set of receive pins E325a to on-chip router E340a using a default pin assignment to receive second data via set of receive pins E325a. As illustrated, interface wrapper E350a may be further configured, in some cases, to use the default pin assignment to couple set of receive pins E325a to on-chip router E340a, for example, when interface wrapper E350b in integrated circuit E101b uses a non-default pin assignment to reroute a pin assignment before the second data is sent from set of transmit pins E320d in external interface E110b such that the individual bits of the second data arrive in a desired order.

Such use of default and non-default pin assignments may increase a flexibility of the external interfaces of two integrated circuits that are coupled together. By allowing signals to be rerouted between the external interfaces and the on-chip routers, consistency of signals passing between the two external interfaces may be increased as compared to rerouting signals via wires between the two external interfaces. In addition, programmable routing capabilities of the interface wrappers may increase a flexibility of the external interfaces, potentially allowing the external interfaces to be utilized for an increased number of data types to be transferred between the integrated circuits without a need to pre-process data before sending or post-process received data in order to place transferred data bits in a proper bit position.

It is noted that the method of FIG. 55 is merely an example for routing data between an on-chip router and an external interface. Method E700 may be performed by any instances of the integrated circuits disclosed in FIGS. 49-53. Variations of the disclosed methods are contemplated, including combinations of operations of methods E600 and E700. For example, block E710 of method E700 may be performed prior to performance of block E610 in method E600, and block E720 may be performed prior to performance of block E620 of method E600.

Hashing

FIGS. 56-68 illustrate various embodiments of an address hashing mechanism that may be employed by one embodiment of the SOC 10. In an embodiment, hashing circuitry is configured to distribute memory request traffic to system memory according to a selectively programmable hashing protocol. At least one programming of the programmable hashing protocol evenly distributes a series of memory requests over a plurality of memory controllers in the system for a variety of memory requests in the series. At least one programming of the programmable hashing protocol distributes adjacent requests within the memory space, at a specified granularity, to physically distant memory interfaces.

Various computer systems exist that include a large amount of system memory, that is directly accessible to processors and other hardware agents in the system via a memory address space (as compared to, for example, an I/O address space that is mapped to specific I/O devices). The system memory is generally implemented as multiple dynamic random access memory (DRAM) devices. In other cases, other types of memory such as static random access memory (SRAM) devices, magnetic memory devices of various types (e.g., MRAM), non-volatile memory devices such as Flash memory or read-only memory (ROM), other types of random access memory devices can be used as well. In some cases, a portion of the memory address space can be mapped to such devices (and memory mapped I/O devices can be used as well) in addition to the portions of the memory address space that are mapped to the RAM devices.

The mapping of memory addresses to the memory devices can strongly affect the performance of the memory system (e.g., in terms of sustainable bandwidth and memory latency). For example, typical non-uniform memory architecture (NUMA) systems are constructed of computing nodes that include processors, peripheral devices, and memory. The computing nodes communicate and one computing node can access data in another computing node, but at increased latency. The memory address space is mapped in large continuous sections (e.g., one node includes addresses 0 to N−1, where N is the number of bytes of memory in the node, another node includes addresses N to 2N−1, etc.). This mapping optimizes access to local memory at the expense of accesses to non-local memory. However, this mapping also constrains the operating system in both the manner of mapping virtual pages to physical pages and the selection of the computing node in which a given process can execute in the system to achieve higher performance. Additionally, the bandwidth and latency of the accesses by a process to large amounts of data is bounded by the performance of a given local memory system, and suffers if memory in another computing node is accessed.

Figure 56:
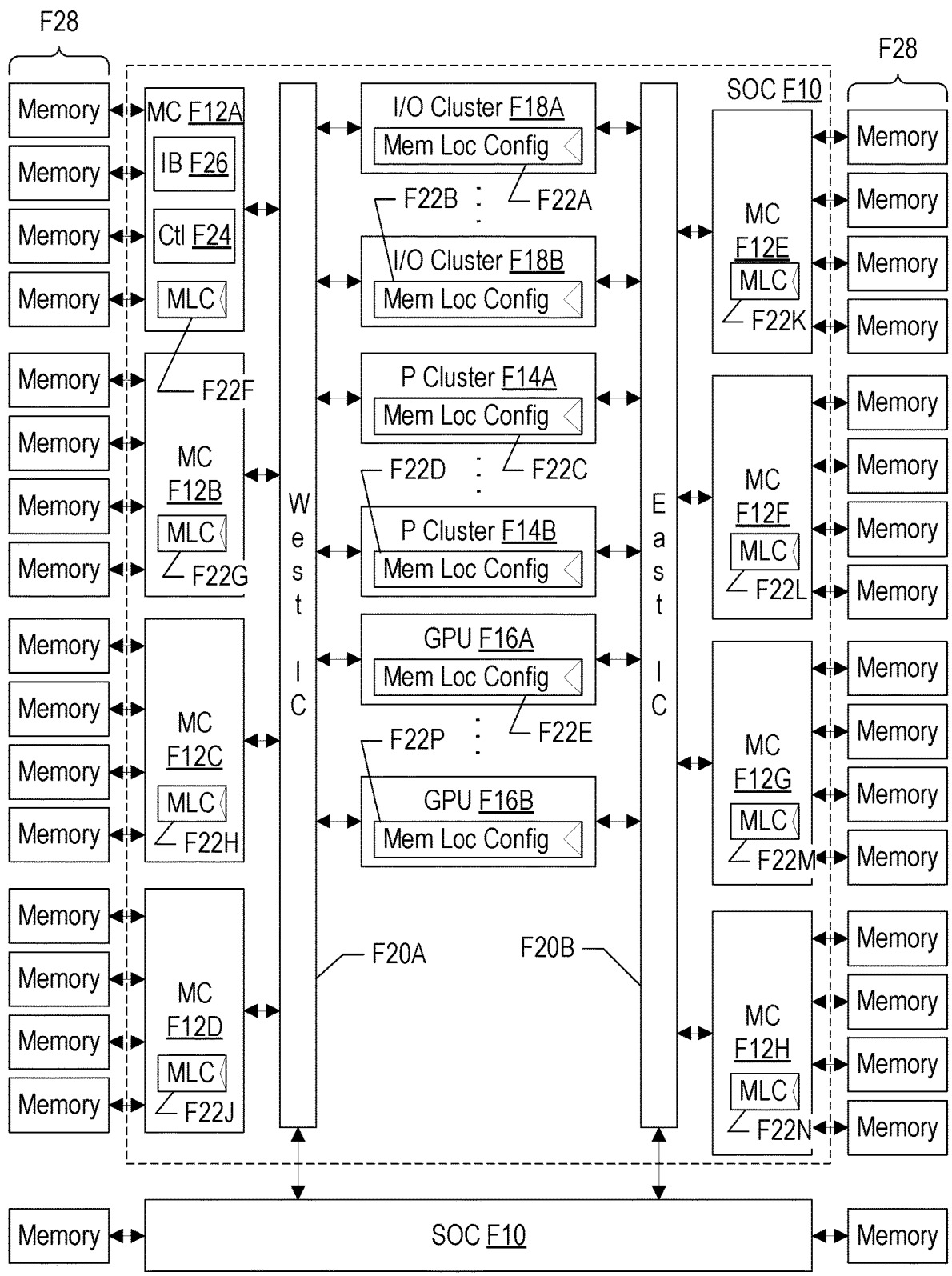
FIG. 56 is a block diagram of one embodiment of a plurality of systems on a chip (SOCs), where a given SOC includes a plurality of memory controllers.

FIG. 56 is a block diagram of one embodiment of a plurality of systems on a chip (SOCs) F10 forming a system. The SOCs F10 may be instances of a common integrated circuit design, and thus one of the SOCs F10 is shown in more detail. Other instances of the SOC F10 may be similar. The SOCs F10 may be instances of the SOC shown in FIG. 1, for example. In the illustrated embodiment, the SOC F10 comprises a plurality of memory controllers F12A-F12H, one or more processor clusters (P clusters) F14A-F14B, one or more graphics processing units (GPUs) F16A-F16B, one or more I/O clusters F18A-F18B, and a communication fabric that comprises a west interconnect (IC) F20A and an east IC F20B. The I/O clusters F18A-F18B, P clusters F14A-F14B, and GPUs F16A-F16B may be coupled to the west IC F20A and east IC F20B. The west IC F20A may be coupled to the memory controllers F12A-F12D, and the east IC F20B may be coupled to the memory controllers F12E-F12H.

The system shown in FIG. 56 further includes a plurality of memory devices F28 coupled to the memory controllers F12A-F12H. In the example of FIG. 56, 59 memory devices F28 are coupled to each memory controller F12A-F12H. Other embodiments may have more or fewer memory devices F28 coupled to a given memory controller F12A-F12H. Furthermore, different memory controllers F12A-F12H may have differing numbers of memory devices F28. Memory devices F28 may vary in capacity and configuration, or may be of consistent capacity and configuration (e.g., banks, bank groups, row size, ranks, etc.). Each memory device F28 may be coupled to its respective memory controller F12A-F12H via an independent channel in this implementation. Channels shared by two or more memory devices F28 may be supported in other embodiments. In an embodiment, the memory devices F28 may be mounted on the corresponding SOC F10 in a chip-on-chip (CoC) or package-on-package (PoP) implementation. In another embodiment, the memory devices F28 may be packaged with the SOC F10 in a multi-chip-module (MCM) implementation. In yet another embodiment, the memory devices F28 may be mounted on one or more memory modules such as single inline memory modules (SIMMs), dual inline memory modules (DIMMs), etc. In an embodiment the memory devices F28 maybe dynamic random access memory (DRAM), such as synchronous DRAM (SDRAM) and more particularly Double data rate (DDR) SDRAM. In an embodiment, the memory devices F28 may be implemented to the low power (LP) DDR SDRAM specification, also known and mobile DDR (mDDR) SDRAM.

In an embodiment, the interconnects F20A-F20B may also be coupled to an off-SOC interface to the other instance of the SOC F10, scaling the system to more than one SOC (e.g., more than one semiconductor die, where a given instance of the SOC F10 may be implemented on a single semiconductor die but multiple instances may be coupled to form a system). Thus, the system may be scalable to two or more semiconductor dies on which instances of SOC F10 are implemented. For example, the two or more semiconductor dies may be configured as a single system in which the existence of multiple semiconductor dies is transparent to software executing on the single system. In an embodiment, the delays in a communication from die to die may be minimized, such that a die-to-die communication typically does not incur significant additional latency as compared to an intra-die communication as one aspect of software transparency to the multi-die system. In other embodiments, the communication fabric in the SOC F10 may not have physically distinct interconnects F20A-F20B, but rather may be a full interconnect between source hardware agents in the system (that transmit memory requests) and the memory controllers F12A-F12H (e.g., a full crossbar). Such embodiments may still include a notion of interconnects F20A-F20B logically, for hashing and routing purposes, in an embodiment.

The memory controller F12A is shown in greater detail in FIG. 56 and may include a control circuit F24 and various internal buffer(s) F26. Other memory controllers F12B-F12H may be similar. The control circuit F24 is coupled to the internal buffers F26 and the memory location configuration registers F22F (discussed below). Generally, the control circuit F24 may be configured to control the access to memory devices F28 to which the memory controller F12A is coupled, including controlling the channels to the memory devices F28, performing calibration, ensuring correct refresh, etc. The control circuit F24 may also be configured to schedule memory requests to attempt to minimize latency, maximize memory bandwidth, etc. In an embodiment, the memory controllers F12A-F12H may employ memory caches to reduce memory latency, and the control circuit F24 may be configured to access the memory cache for memory requests and process hits and misses in the memory cache, and evictions from the memory cache. In an embodiment, the memory controllers F12A-F12H may manage coherency for the memory attached thereto (e.g., a directory-based coherency scheme) and the control circuit F24 may be configured to manage the coherency. A channel to a memory device F28 may comprise the physical connections to the device, as well as low level communication circuitry (e.g., physical layer (PHY) circuitry).

As illustrated in FIG. 56, the I/O clusters F18A-F18B, the P clusters F14A-F14B, the GPUs F16A-FF16B, and the memory controllers F12A-F12H include memory location configuration (MLC) registers (reference numerals F22A-F22H, F22J-F22N, and F22P). The west and east IC F20A-F20B may, in some embodiments, also include memory location configuration registers. Because the system includes multiple memory controllers F12A-F12H (and possibly multiple sets of memory controllers in multiple instances of the SOC F10), the address accessed by a memory request may be decoded (e.g., hashed) to determine the memory controller F12A-F12H, and eventually the specific memory device F28, that is mapped to the address. That is, the memory addresses may be defined within a memory address space that maps memory addresses to memory locations in the memory devices. A given memory address in the memory address space uniquely identifies a memory location in one of the memory devices F28 that is coupled to one of the plurality of memory controllers F12A-F12H. The MLC registers F22A-F22H, F22J-F22N, and F22P may be programmable to describe the mapping, such that hashing the memory address bits as specified by the MLC registers F22A-F22H, F22J-F22N, and F22P may identify the memory controller F12A-F12H, and eventually the memory device F28 (and the bank group and/or bank within the memory device F28, in an embodiment), to which the memory request is directed.

There may be more than one MLC register in a given circuit. For example, there may be an MLC register for each level of granularity in a hierarchy of levels of granularity to identify the memory controller F12A-F12H. The number of levels decoded by a given circuit may depend on how many levels of granularity the given circuit uses to determine how to route a memory request to the correct memory controller F12A-F12H, and in some cases to even lower levels of granularity within the correct memory controller F12A-F12H. The memory controllers F12A-F12H may include MLC registers for each level of hierarchy, down to at least the specific memory device F28. Generally, levels of granularity may be viewed as a recursive power of 2 at least two of the plurality of memory controllers F12A-F12H. Accordingly, while the MLC registers F22A-F22H, F22J-F22N, and F22P are given the same general reference number, the MLC registers F22A-F22H, F22J-F22N, and F22P may not be all the same set of registers. However, instances of the registers F22A-F22H, F22J-F22N, and F22P that correspond to the same level of granularity may be the same, and may be programmed consistently. Additional details are discussed further below.

The memory controllers F12A-F12H may be physically distributed over the integrated circuit die on which the SOC F10 is implemented. Thus, the memory controllers in the system may be physically distributed over multiple integrated circuit die, and physically distributed within the integrated circuit die. That is, the memory controllers F12A-F12H may be distributed over the area of the semiconductor die on which the SOC F10 is formed. In FIG. 56, for example, the location of the memory controllers F12A-F12H within the SOC F10 may be representative of the physical locations of those memory controllers F12A-F12H within the SOC F10 die area. Accordingly, determining the memory controller F12A-F12H to which a given memory request is mapped (the "targeted memory controller") may be used to route the memory request over a communication fabric in the SOC F10 to the targeted memory controller. The communication fabric may include, e.g., the West IC F20A and the East IC F20B, and may further include additional interconnect, not shown in FIG. 56. In other embodiments, the memory controllers F12A-F12H may not be physically distributed. Nevertheless, a hashing mechanism such as described herein may be used to identify the targeted memory controller F12A-F12H The I/O clusters F18A-F18B, the P clusters F14A-F14B, and the GPUs F16A-F16B may be examples of hardware agents that are configured to access data in the memory devices F28 through the memory controllers F12A-F12H using memory addresses. Other hardware agents may be included as well. Generally, a hardware agent may be a hardware circuit that may be a source of a memory request (e.g., a read or a write request). The request is routed from the hardware agent to the targeted memory controller based on the contents of the MLC registers.

In an embodiment, memory addresses may be mapped over the memory controllers F12A-F12H (and corresponding memory controllers in other instances of the SOC F10 included in the system) to distribute data within a page throughout the memory system. Such a scheme may improve the bandwidth usage of the communication fabric and the memory controllers for applications which access most or all of the data in a page. That is, a given page within the memory address space may be divided into a plurality of blocks, and the plurality of blocks of the given page may be distributed over the plurality of memory controllers in a system. A page may be the unit of allocation of memory in a virtual memory system. That is, when memory is assigned to an application or other process/thread, the memory is allocated in units of pages. The virtual memory system creates a translation from the virtual addresses used by the application and the physical addresses in the memory address space, which identify locations in the memory devices F28. Page sizes vary from embodiment to embodiment. For example, a F16 kilobyte (16 kB) page size may be used. Smaller or larger page sizes may be used (e.g., 4 kB, 8 kB, 1 Megabyte (MB), 4 MB, etc.). In some embodiments, multiple page sizes are supported in a system concurrently. Generally, the page is aligned to a page-sized boundary (e.g., a 16 kB page is allocated on 16 kB boundaries, such that the least significant F14 address bits form an offset within a page, and the remaining address bits identify the page).

The number of blocks into which a given page is divided may be related to the number of memory controllers and/or memory channels in the system. For example, the number of blocks may be equal to the number of memory controllers (or the number of memory channels). In such an embodiment, if all of the data in the page is accessed, an equal number of memory requests may be sent to each memory controller/memory channel. Other embodiments may have a number of blocks equal to a multiple of the number of memory controllers, or to a fraction of the memory controllers (e.g., a power of two fraction) such that a page is distributed over a subset of the memory controllers.

In an embodiment, the MLC registers may be programmed to map adjacent blocks of a page to memory controllers that are physically distant from each other within the SOC(s) F10 of the system. Accordingly, an access pattern in which consecutive blocks of a page are accessed may be distributed over the system, utilizing different portions of the communication fabric and interfering with each other in a minimal way (or perhaps not interfering at all). For example, memory requests to adjacent blocks may take different paths through the communication fabric, and thus would not consume the same fabric resources (e.g., portions of the interconnects F20A-F20B). That is, the paths may be at least partially non-overlapping. In some cases, the paths may be completely non-overlapping. Additional details regarding the distribution of memory accesses are provided below with regard to FIG. 57. Maximizing distribution of memory accesses may improve performance in the system overall by reducing overall latency and increasing bandwidth utilization. Additionally, flexibility in scheduling processes to processors may be achieved since similar performance may occur on any similar processor in any P cluster F14A-F14B.

The MLC registers F22A-F22H, F22J-F22N, F22P may independently specify the address bits that are hashed to select each level of granularity in the system for a given memory address. For example, a first level of granularity may select the semiconductor die to which the memory request is routed. A second level of granularity may select a slice, which may be a set of memory controllers (e.g., the upper 4 memory controllers FF12A-12B and F12E-F12F may form a slice, and the lower 4 memory controllers F12C-F12D and F12F-F12G may form another slice). Other levels of granularity may include selecting a "side" (East or West in FIG. 1), and a row within a slice. There may be additional levels of granularity within the memory controllers F12A-F12H, finally resulting in a selected memory device F28 (and perhaps bank group and bank within the device F28, in an embodiment). Any number of levels of granularity may be supported in various embodiments. For example, if more than two die are included, there may be one or more levels of granularity coarser than the die level, at which groups of die are selected.

The independent specification of address bits for each level of granularity may provide significant flexibility in the system. Additionally, changes to the design of the SOC F10 itself may be managed by using different programming in the MLC registers, and thus the hardware in the memory system and/or interconnect need not change to accommodate a different mapping of addresses to memory devices. Furthermore, the programmability in the MLC registers may allow for memory devices F28 to be depopulated in a given product that includes the SOC(s) F10, reducing cost and power consumption if the full complement of memory devices F28 is not required in that product.

In an embodiment, each level of granularity is a binary determination: A result of binary zero from the hash selects one result at the level, and a result of binary one from the hash select the other result. The hashes may be any combinatorial logic operation on the input bits selected for the levels by the programming of the MLC registers. In an embodiment, the hash may be an exclusive OR reduction, in which the address bits are exclusive-ORed with each other, resulting in a binary output. Other embodiments may produce a multi-bit output value to select among more than two results.

The internal buffers F26 in a given memory controller F12A-F12H may be configured to store a significant number of memory requests. The internal buffers F26 may include static buffers such as transaction tables that track the status of various memory requests being processed in the given memory controller F12A-F12H, as well as various pipeline stages through which the requests may flow as they are processed. The memory address accessed by the request may be a significant portion of the data describing the request, and thus may be a significant component of the power consumption in storing the requests and moving the requests through the various resources within the given memory controller F12A-F12H. In an embodiment, the memory controllers F12A-F12H may be configured to drop a bit of address from each set of address bits (corresponding to each level of granularity) used to determine the targeted memory controller. In an embodiment, the remaining address bits, along with the fact that the request is at the targeted memory controller, may be used to recover the dropped address bits if needed. In some embodiments, the dropped bit may be an address bit that is not included in any other hash corresponding to any other level of granularity. The exclusion of the dropped bit from other levels may allow the recovery of the drop bits in parallel, since the operations are independent. If a given dropped bit is not excluded from other levels, it may be recovered first, and then used to recover the other dropped bits. Thus, the exclusion may be an optimization for recovery. Other embodiments may not require recovery of the original address and thus the dropped bits need not be unique to each hash, or may recover the bits in a serial fashion if exclusion is not implemented. The remaining address bits (without the dropped bits) may form a compacted pipe address that maybe used internal to the memory controller for processing. The dropped address bits are not needed, because the amount of memory in the memory devices F28 coupled to the given memory controller F12A-F12H may be uniquely addressed using the compacted pipe address. The MLC registers F22A-F22H, F22J-FF22N, and 22P may include registers programmable to identify the drop bits, in an embodiment.

The SOC F10 in FIG. 56 includes a particular number of memory controllers F12A-F12H, P clusters F14A-F14B, GPUs F16A-F16B, and I/O clusters F18A-F18B. Generally, various embodiments may include any number of memory controllers F12A-F12H, P clusters F14A-F14B, GPUs F16A-F16B, and I/O clusters F18A-F18B, as desired. As mentioned above, the P clusters F14A-F14B, the GPUs F16A-F16B, and the I/O clusters F18A-F18B generally comprise hardware circuits configured to implement the operation described herein for each component. Similarly, the memory controllers F12A-12H generally comprise hardware circuits (memory controller circuits) to implement the operation described herein for each component. The interconnect F20A-F20B and other communication fabric generally comprise circuits to transport communications (e.g., memory requests) among the other components. The interconnect F20A-F20B may comprise point to point interfaces, shared bus interfaces, and/or hierarchies of one or both interfaces. The fabric may be circuit-switched, packet-switched, etc.

Figure 57:
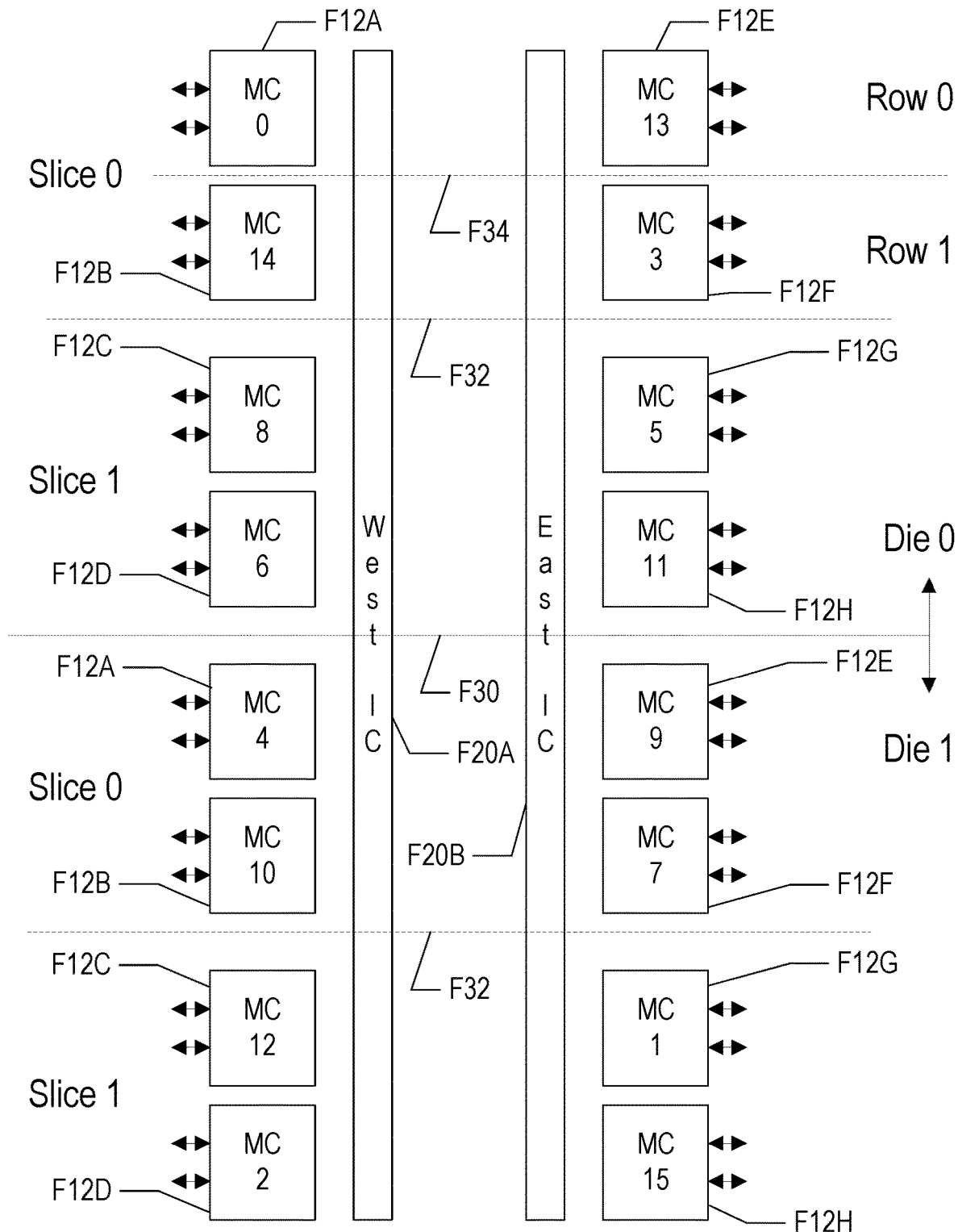
FIG. 57 is a block diagram illustrating one embodiment of memory controllers and physical/logical arrangement on the SOCs.

FIG. 57 is a block diagram illustrating one embodiment of a plurality of memory controllers and physical/logical arrangement on the SOC die(s), for one embodiment. The memory controllers F12A-F12H are illustrated for two instances of the SOC F10, illustrated as die 0 and die 1 in FIG. 57 (e.g., separated by short dotted line 30). Die 0 may be the portion illustrated above the dotted line 30, and die 1 may be the portion below the dotted line 30. The memory controllers F12A-F12H on a given die may be divided into slices based on the physical location of the memory controllers F12A-F12H. For example, in FIG. 57, slice 0 may include the memory controllers F12A-F12B and F12E-F12F, physically located on one half of the die 0 or die 1. Slice 1 may include the memory controllers F12C-F12D and F12G-F12H, physically located on the other half of die 0 or die 1. Slice on a die are delimited by dashed lines 32 in FIG. 57. Within the slices, memory controllers F12A-F12H may be divided into rows based on physical location in the slice. For example, slice 0 of die 0 is shown in FIG. 56 to include two rows, the memory controllers F12A and F12E above the dotted line 34 in row 0, physically located on one half of the area occupied by slice 0. The memory controllers F12B and F12F row 1 of slice 1, physically located on the other half of the area occupied by slice 0, below the dotted line 34 on the other half of the area occupied by slice 0. Other slices may similarly be divided into rows. Additionally, a given memory controller F12A-F12H may be reachable via either the west interconnect F20A or the east interconnect F20B.

Accordingly, to identify a given memory controller F12A-F12H on a given die 0 or 1 to which a memory address is mapped, the memory address may be hashed at multiple levels of granularity. In this embodiment, the levels may include the die level, the slice level, the row level, and the side level (east or west). The die level may specify which of the plurality of integrated circuit die includes the given memory controller. The slice level may specify which of the plurality of slices within the die includes the given memory controller, where the plurality of memory controllers on the die are logically divided into a plurality of slices based on physical location on the given integrated circuit die and a given slice includes at least two memory controllers of the plurality of memory controllers within a die. Within the given slice, memory controllers may be logically divided into a plurality of rows based on physical location on the die, and more particularly within the given slice. The row level may specify which of the plurality of rows includes the given memory controller. The row may be divided into a plurality of sides, again based on physical location in the die and more particularly within the given row. The side level may specify which side of a given row includes the given memory controller.

Other embodiments may include more or fewer levels, based on the number of memory controllers 12A-12H, the number of die, etc. For example, an embodiment that includes more than two die may include multiple levels of granularity to select the die (e.g., die groups may be used to group pairs of SOCs 10 in a four die implementation, and the die level may select among die in the selected pair). Similarly, an implementation that includes four memory controllers per die instead of 8 may eliminate one of the slice or row levels. An implementation that includes a single die, rather than multiple die, may eliminate the die level.

At each of the levels of granularity, a binary determination is made based on a hash of a subset of address bits to select one or the other level. Thus, the hash may logically operate on the address bits to generate a binary output (one bit, either zero or one) Any logical function may be used for the hash. In an embodiment, for example, exclusive-OR (XOR) reduction may be used in which the hash XORs the subset of address bits together to produce the result. An XOR reduction may also provide reversibility of the hash. The reversibility may allow the recovery of the dropped bits, but XORing the binary result with the address bits that where not dropped (one dropped bit per level). Particularly, in an embodiment, the dropped address bit may be excluded from subsets of address bits used for other levels. Other bits in the hash may be shared between hashes, but not the bit that is to be dropped. While the XOR reduction is used in this embodiment, other embodiments may implement any logically reversible Boolean operation as the hash.

Figure 58:
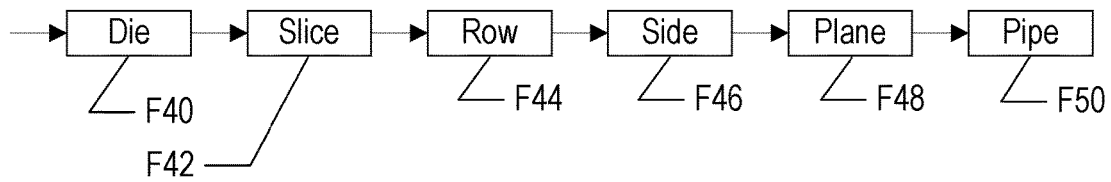
FIG. 58 is a block diagram of one embodiment of a binary decision tree to determine a memory controller that services a particular address.

FIG. 58 is a block diagram of one embodiment of a binary decision tree to determine a memory controller F12A-F12H (and die) that services a particular memory address (that is, the memory controller to which the particular memory address is mapped). The decision tree may include determining a die (reference numeral F40), a slice on the die (reference numeral F42), a row in the slice (reference numeral F44), and a side within the row (reference numeral F46). In an embodiment, there may be additional binary decisions to guide the processing of the memory request within the memory controller. For example, the embodiment of FIG. 58 may include a plane level F48 and a pipe level F50. The internal levels of granularity may map the memory request to the specific memory device F28 that stores the data affected by the memory request. That is, the finest level of granularity may be the level that maps to the specific memory device F28. The memory planes may be independent, allowing multiple memory requests to proceed in parallel. Additionally, the various structures included in the memory controller (e.g., a memory cache to cache data previously accessed in the memory devices F28, coherency control hardware such as duplicate tags or a directory, various buffers and queues, etc.) may be divided among the planes and thus the memory structures may be smaller and easier to design to meet timing at a given frequency of operation, etc. Accordingly, performance may be increased through both the parallel processing and the higher achievable clock frequency for a given size of hardware structures. There may be additional levels of internal granularity within the memory controller as well, in other embodiments.

The binary decision tree illustrated in FIG. 58 is not intended to imply that the determinations of die level F40, slice level F42, row level F44, side level F46, plane level F48, and pipe F50 are made serially. The logic to perform the determinations may operate in parallel, selecting sets of address bits and performing the hashes to generate the resulting binary decisions.

Returning to FIG. 57, the programmability of the address mapping to the memory controllers F12A-F12H and the dies 0 and 1 may provide for a distribution of consecutive addresses among physically distant memory controllers F12A-F12H. That is, if a source is accessing consecutive addresses of a page of memory, for example, the memory requests may distribute over the different memory controllers (at some address granularity). For example, consecutive cache blocks (e.g., aligned 64 byte or 128 byte blocks) may be mapped to different memory controllers F12A-F12H. Less granular mappings may be used as well (e.g., 256 byte, 512 byte, or 1 kilobyte blocks may map to different memory controllers). That is, a number of consecutive memory addresses that access data in the same block may be routed to the same memory controller, and then next number of consecutive memory addresses may be routed to a different memory controller.

Mapping consecutive blocks to physically distributed memory controllers F12A-F12H may have performance benefits. For example, since the memory controllers F12A-F12H are independent of each other, the bandwidth available in the set of memory controllers F12A-F12H as a whole may be more fully utilized if a complete page is accessed. Additionally, in some embodiments, the route of the memory requests in the communication fabric may be partially non-overlapped or fully non-overlapped. That is, at least one segment of the communication fabric that is part of the route for one memory request may not be part of the route for another memory request, and vice versa, for a partially non-overlapped route. Fully non-overlapped routes may use distinct, complete separate parts of the fabric (e.g., no segments may be the same). Thus, the traffic in the communication fabric may be spread out and may not interfere with each other as much as the traffic might otherwise interfere.

Accordingly, the MLC registers F22A-F22H, F22J-F22N, and F22P may be programmable with data that causes the circuitry to route a first memory request having a first address to a first memory controller of the plurality of memory controllers and to route a second memory request having a second address to a second memory controller of the plurality of memory controllers that is physically distant from the first memory controller when the first address and the second address are adjacent addresses at a second level of granularity. The first route of the first memory request through the communication fabric and a second route of the second memory request through the communication fabric are completely non-overlapped, in an embodiment. In other cases, the first and second routes may be partially non-overlapped. The one or more registers may be programmable with data that causes the communication fabric to route a plurality of memory requests to consecutive addresses to different ones of the plurality of memory controllers in a pattern that distributes the plurality of memory requests over to physically distant memory controllers.

For example, in FIG. 57, the memory controllers F12A-F12H on die 0 and die 1 are labeled MC 0 to MC 15. Beginning with address zero in a page, consecutive addresses at the level of granularity defined in the programming of the MLC registers F22A-F22H, F22J-F22N, and F22P may first access MC0 (memory controller F12A in die 0), then MC1 (memory controller 12G in die 1), MC2 (memory controller F12D in die 1), MC3 (memory controller F12F in die 0), MC4 (memory controller F12A in die 1), MC5 (memory controller F12G in die 0), MC6 (memory controller F12D in die 0), MC7 (memory controller F12F in die 1), MC8 (memory controller F12C in die 0), MC9 (memory controller F12E in die 1), MC10 (memory controller F12B in die 1), MC11 (memory controller F12H in die 0), MC12 (memory controller F12C in die 1), MC13 (memory controller F12E in die 0), MC14 (memory controller F12B in die 0), and then MC15 (memory controller F12H in die 1). If the second level of granularity is smaller than 1/Nth of a page size, where N is the number of memory controllers in the system (e.g., in this embodiment, F16), the next consecutive access after MC15 may return to MC0. While a more random access pattern may result in memory requests routing to physically near memory controllers, the more common regular access patterns (even if a stride is involved in which one or more memory controller is skipped in the above order) may be well distributed in the system.

Figure 59:
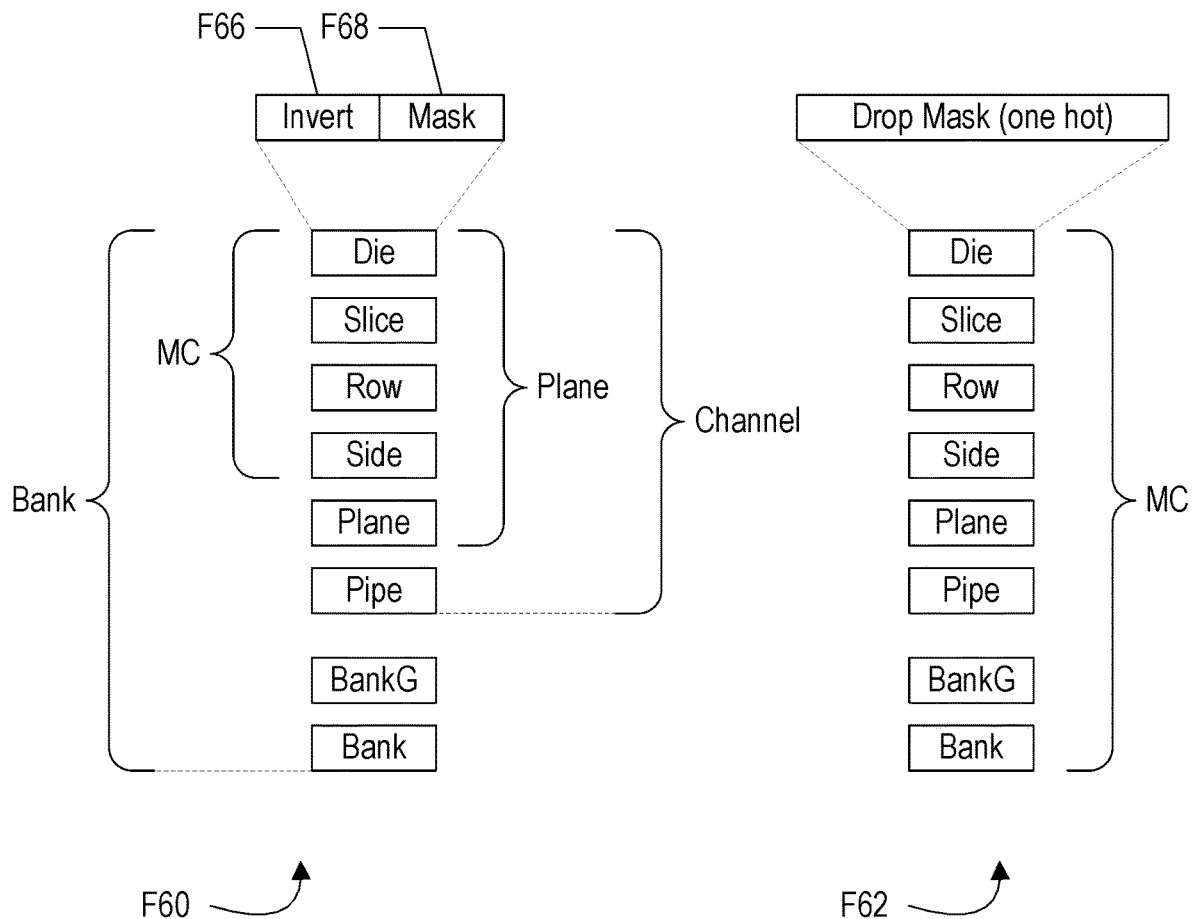
FIG. 59 is a block diagram illustrating one embodiment of a plurality of memory location configuration registers.

FIG. 59 is a block diagram illustrating one embodiment of a plurality of memory location configuration registers F60 and F62. Generally, the registers F60 in a given hardware agent may be programmable with data identifying which address bits are included in the hash at one or more of the plurality of levels of granularity. In the illustrated embodiment, the registers F60 may include a die register, a slice register, a row register, a side register, a plane register, and a pipe register corresponding to the previously-described levels, as well as a bank group (BankG) and bank register the define the bank group and bank within a memory device F28 that stores the data (for an embodiment in which the DRAM memory devices have both bank groups and banks). It is noted that, while separate registers F60 are shown for each level of granularity in FIG. 59, other embodiments may combine two or more levels of granularity as fields within a single register, as desired.

The die register is shown in exploded view for one embodiment, and other registers F60 may be similar. In the illustrated embodiment, the die register may include an invert field F66, and a mask field F68. The invert field F66 may be a bit with the set state indicating invert and the clear state indicating no invert (or vice-versa or a multi-bit value may be used). The mask field F68 may be a field of bits corresponding to respective address bits. The set state in a mask bit may indicate the respective address bit is included in the hash, and the clear state may indicate that the respective address bit is excluded from the hash, for that level of granularity (or vice-versa).

The invert field F66 may be used to specify that the result of the hash of the selected address bits is to be inverted. The inversion may permit additional flexibility in the determination of the memory controller. For example, programming a mask of all zeros results in a binary 0 at that level of granularity for any address, forcing the decision the same direction each time. If a binary 1 is desired at a given level of granularity for any address, the mask may be programmed to all zeros and the invert bit may be set.

Each of MLC registers F22A-F22H, F22J-F22N, and F22P may include a subset or all of the registers F60, depending on the hardware agent and the levels of granularity used by that hardware agent to route a memory request. Generally, a given hardware agent may employ all of the levels of granularity, down to the bank level, if desired (curly brace labeled "Bank" in FIG. 59). However, some hardware agents need not implement that many levels of granularity. For example, a hardware agent may employ the die, slice, row, and side levels of granularity, delivering the memory requests to the targeted memory controller F12A-F12H on the targeted die (curly brace labeled "MC" in FIG. 59). The memory controller F12A-F12H may handle the remaining hashing levels. Another hardware agent may have two routes to a given memory controller F12A-F12H, one for each plane. Thus, such a hardware agent may employ the die, slice, row, side, and plane registers (curly brace labeled "Plane" in FIG. 59). Yet another hardware agent may include the die, slice, row, side, and plane levels of granularity, as well as the pipe level, identifying the desired channel (curly brace labeled "Channel" in FIG. 59). Thus, a first hardware agent may be programmable for a first number of the plurality of levels of granularity and a second hardware agent may be programmable for a second number of the plurality of levels of granularity, wherein the second number is different from the first number. In other embodiments, bank group, bank, and other intra-device levels of granularity may be specified differently than the other levels of granularity and thus may be separately-defined registers not included in the registers F60. In still other embodiments, bank group, bank, and other intra-device levels of granularity may be fixed in hardware.

Another set of registers that may be included in some sets of MLC registers F22A-F22H, F22J-F22N, and F22P are drop registers F62 shown in FIG. 59. Particularly, in an embodiment, the drop registers F62 may be included in the MLC registers F22F-F22H and F22J-F22N, in the memory controllers F12A-F12H. The drop registers F62 may include a register for each level of granularity and may be programmable to identify at least one address bit in the subset of address bits corresponding to that level of granularity that is to be dropped by the targeted memory controller F12A-F12H. The specified bit is one of the bits specified in the corresponding register F60 as a bit included in the hash of that level of granularity. In an embodiment, the dropped address bit may be exclusively included in the hash of for that level of granularity (e.g., the dropped address bit is not specified at any other level of granularity in the registers F60). Other bits included in a given hash may be shared in other levels of granularity, but the dropped bit may be unique to the given level of granularity. The drop registers F62 may be programmed in any way to indicate the address bit that is to be dropped (e.g., a bit number may be specified as a hexadecimal number, or the bit mask may be used as shown in FIG. 59). The bit mask may include a bit for each address bit (or each selectable address bit, if some address bits are not eligible for dropping). The bit mask may be a "one hot" mask, in which there is one and only one set bit, which may indicate the selected drop bit. In other embodiments, a single bit mask in a single drop register F62 may specify a drop bit for each level of granularity and thus may not be a one hot mask.

The memory controller may be programmed via the drop registers F62 to specify the drop bits. The memory controller (and more particularly, the control circuit F24 may be configured to generate an internal address for each memory request (the "compacted pipe address" mentioned above, or more briefly "compacted address") for use internally in the memory controller in the internal buffers F26 and to address the memory device F28. The compacted pipe address may be generated by dropping some or all of the specified address bits, and shifting the remaining address bits together.

As mentioned previously, the numerous internal buffers with copies of the address may save power by removing unnecessary address bits. Additionally, with a reversible hash function dropped bits may be recovered to recover the full address. The existence of the memory request in a given memory controller F12A-F12H provides the result of the hash at a given level of granularity, and hashing the result with the other address bits that are included in that level of granularity results in the dropped address bit. Recovery of the full address may be useful if it is needed for a response to the request, for snoops for coherency reasons, etc.

Figure 60:
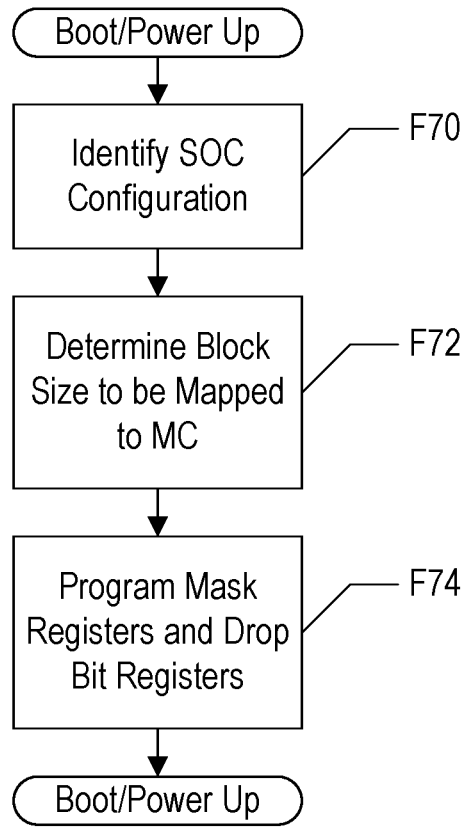
FIG. 60 is a flowchart illustrating operation of one embodiment of the SOCs during boot/power up.

Turning now to FIG. 60, a flowchart illustrating operation of one embodiment of the SOCs during boot/power up is shown. For example, the operation of illustrated in FIG. 60 may be performed by instructions executed by a processor (e.g., low level boot code executed to initialize the system for execution of the operating system). Alternatively, all or a portion of the operation shown in FIG. 60 may be performed by hardware circuitry during boot. While the blocks are shown in a particular order for ease of understanding, other orders may be used. Blocks may be performed in parallel in combinatorial logic in the SOCs F10. Blocks, combinations of blocks, and/or the flowchart as a whole may be pipelined over multiple clock cycles.

The boot code may identify the SOC configuration (e.g., one or more chips including SOC F10 instances, SOC design differences such as a partial SOC that includes fewer memory controllers F12A-F12H or one of a plurality of SOC designs supported by the system, memory devices F28 coupled to each memory controller F12A-F12H, etc.) (block F70). Identifying the configuration may generally be an exercise in determining the number of destinations for memory requests (e.g., the number of memory controllers F12A-F12H in the system, the number of planes in each memory controller F12A-F12H, the number of memory controllers F12A-F12H that will be enabled during use, etc.). A given memory controller F12A-F12H could be unavailable during use, e.g., if the memory devices F28 are not populated at the given memory controller F12A-F12H or there is a hardware failure in the memory devices F28. In other cases, given memory controller F12A-F12H may be unavailable in certain test modes or diagnostic modes. Identifying the configuration may also include determining the total amount of memory available (e.g., the number of memory devices F28 coupled to each memory controller F12A-F12H and the capacity of the memory devices F28).

These determinations may affect the size of a contiguous block within a page that is to be mapped to each memory controller F12A-F12H, representing a tradeoff between spreading the memory requests within a page among the memory controllers F12A-F12H (and SOC F10 instances, when more than one instance is provided) and the efficiencies that may be gained from grouping requests to the same addresses. The boot code may thus determine the block size to be mapped to each memory controller F12A-F12H (block F72). In other modes, a linear mapping of addresses to memory controllers F12A-F12H may be used (e.g., mapping the entirety of the memory devices F28 in on memory controller F12A-F12H to a contiguous block of addresses in the memory address space), or a hybrid of interleaved at one or more levels of granularity and linear at other levels of granularity may be used. The boot code may determine how to program the MLC registers F22A-F22H, F22J-F22N, and F22P to provide the desired mapping of addresses to memory controllers F12A-F12H (block F74). For example, the mask registers F60 may be programmed to select the address bits at each level of granularity and the drop bit registers F62 may be programmed to select the drop bit for each level of granularity.

Figure 61:
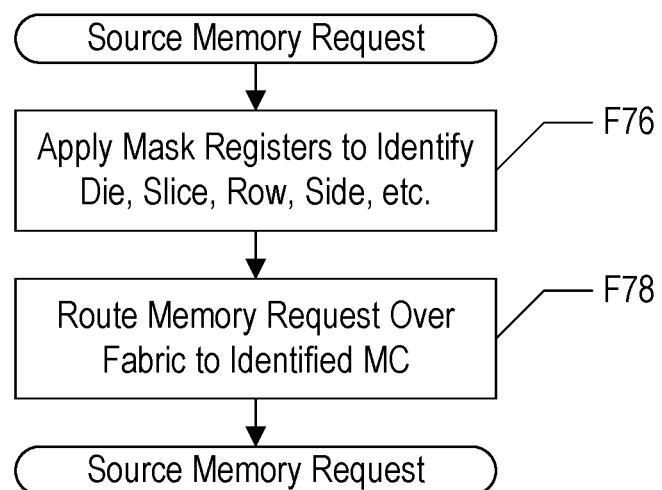
FIG. 61 is a flowchart illustrating operation of one embodiment of the SOCs to route a memory request.

FIG. 61 is a flowchart illustrating operation of various SOC components to determine the route for a memory request from a source component to the identified memory controller F12A-F12H for that memory request. While the blocks are shown in a particular order for ease of understanding, other orders may be used. Blocks may be performed in parallel in combinatorial logic in the SOCs F10. Blocks, combinations of blocks, and/or the flowchart as a whole may be pipelined over multiple clock cycles.

The component may apply the registers F60 to the address of the memory request to determine the various levels of granularity, such as the die, slice, row, side, etc. (block F76). Based on the results at the levels of granularity, the component may route the memory request over the fabric to the identified memory controller F12A-F12H (block F78).

Figure 62:
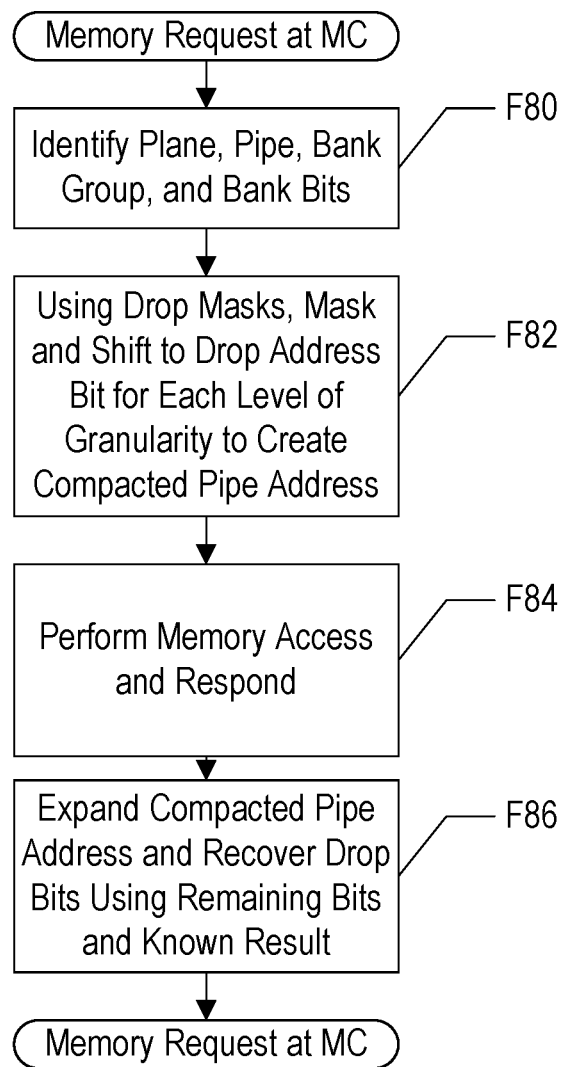
FIG. 62 is a flowchart illustrating operation of one embodiment of a memory controller in response to a memory request.

FIG. 62 is a flowchart illustrating operation of one embodiment of a memory controller F12A-F12H in response to a memory request. While the blocks are shown in a particular order for ease of understanding, other orders may be used. Blocks may be performed in parallel in combinatorial logic in the SOCs F10. Blocks, combinations of blocks, and/or the flowchart as a whole may be pipelined over multiple clock cycles.

The memory controller F12A-F12H may use the plane, pipe, bank group, and bank mask registers F60 to identify the plane, pipe, bank group, and bank for the memory request (block F80). For example, the memory controller F12A-F12H may logically AND the mask from the corresponding register F60 with the address, logically combine the bits (e.g., XOR reduction) and invert if indicated. The memory controller F12A-F12H may use the drop masks from the drop registers F62 to drop the address bits specified by each level of granularity (e.g., die, slice, row, side, plane, pipe, bank group, and bank), and may shift the remaining address bits together to form the compacted pipe address (block F82). For example, the memory controller F12A-F12H may mask the address with the logical AND of the inverse of the drop masks, and may shift the remaining bits together. Alternatively, the memory controller F12A-F12H may simply shift the address bits together, naturally dropping the identified bits. The memory controller F12A-F12H may perform the specified memory request (e.g., read or write) (block F84) and may respond to the source (e.g., with read data or a write completion if the write is not a posted write). If the full address is needed for the response or other reasons during processing, the full may be recovered from the compacted pipe address, the contents of the registers F60 for each level, and the known result for each level that corresponds to the memory controller F12A-F12H that received the memory request (block F86).

The large number of memory controllers F12A-F12H in the system, and the large number of memory devices F28 coupled to the memory controllers F12A-F12H, may be a significant source of power consumption in the system. At certain points during operation, a relatively small amount of memory may be in active use and power could be conserved by disabling one or more slices of memory controllers/ memory devices when accesses to those slices have been infrequent. Disabling a slice may include any mechanism that reduces power consumption in the slice, and that causes the slice to be unavailable until the slice is re-enabled. In an embodiment, data may be retained by the memory devices F28 while the slice is disabled. Accordingly, the power supply to the memory devices F28 may remain active, but the memory devices F28 may be placed in a lower power mode (e.g., DRAM devices may be placed in self-refresh mode in which the devices internally generate refresh operations to retain data, but are not accessible from the SOC F10 until self-refresh mode is exited). The memory controller(s) F12A-F12H in the slice may also be in a low power mode (e.g., clock gated). The memory controller(s) F12A-F12H in the slice may be power gated and thus may be powered up and reconfigured when enabling the slice and after disable.

In an embodiment, software (e.g., a portion of the operating system) may monitor activity in the system to determine if a slice or slices may be disabled. The software may also monitor attempts to access data in the slice during a disabled time, and may reenable the slice as desired. Furthermore, in an embodiment, the monitor software may detect pages of data in the slice that are accessed at greater than a specified rate prior to disabling the slice, and may copy those pages to another slice that will not be disabled (remapping the virtual to physical address translations for those pages). Thus, some pages in the slice may remain available, and may be accessed while the slice is disabled. The process of reallocating pages that are being accessed and disabling a slice is referred to herein as "folding" a slice. Reenabling a folded slice may be referred to as "unfolding" a slice, and the process of reenabling may include remapping the previously reallocated pages to spread the pages across the available slices (and, if the data in the reallocated pages was modified during the time that the slice was folded, copying the data to the reallocated physical page).

Figure 63:
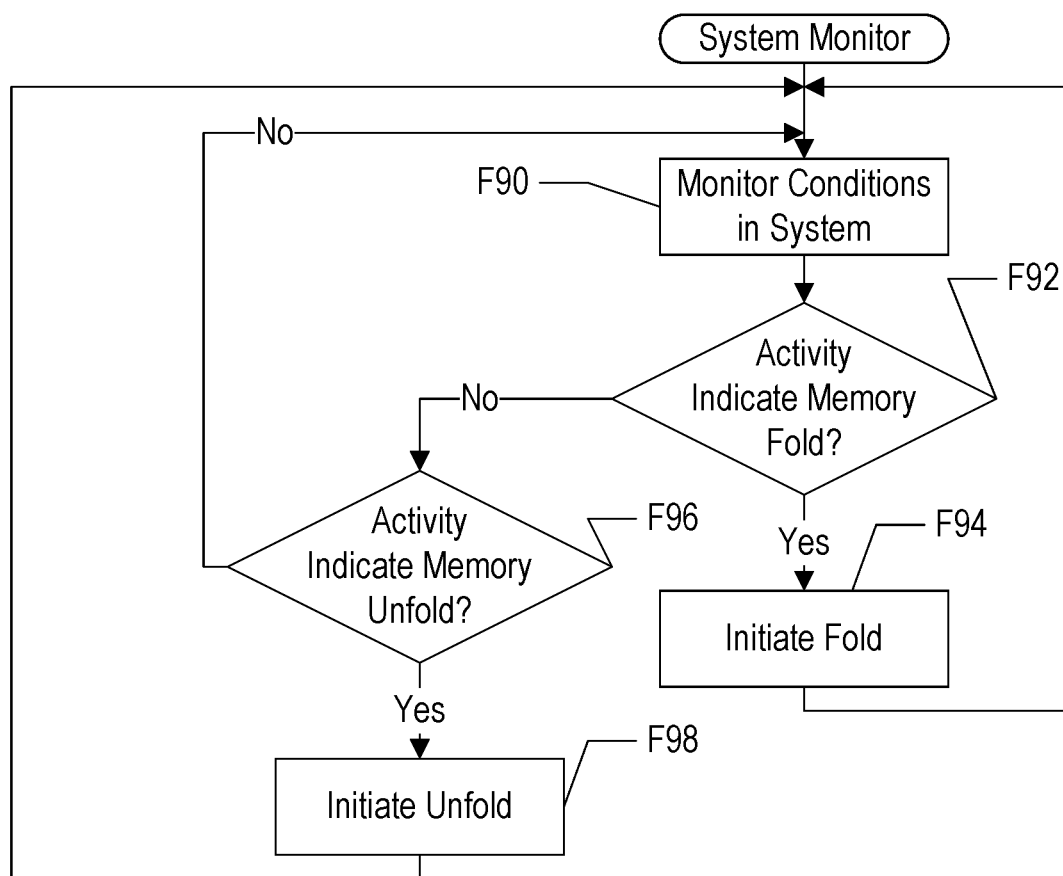
FIG. 63 is a flowchart illustrating operation of one embodiment of monitoring system operation to determine memory folding.

FIG. 63 is a flowchart illustrating operation of one embodiment of monitoring system operation to determine whether or not to fold or unfold memory. While the blocks are shown in a particular order for ease of understanding, other orders may be used. One or more code sequences ("code") comprising a plurality of instructions executed by one or more processors on the SOC(s) F10 may cause operations including operations as shown below. For example, a memory monitor and fold/unfold code may include instructions which when executed by the processors on the SOC(s) F10, may cause the system including the SOCs to perform operations including the operations shown in FIG. 63.

The memory monitor and fold/unfold code may monitor conditions in the system to identify opportunities to fold a slice or activity indicating that a folded slice is to be unfolded (block F90). Activity that may be monitored may include, for example, access rates to various pages included in a given slice. If the pages within a given slice are not accessed at a rate above a threshold rate (or a significant number of pages are not access at a rate above the threshold rate), then the given slice may be a candidate for folding since the slice is often idle. Power states in the processors within the SOCs may be another factor monitored by the memory monitor and fold/unfold code, since processors in lower power states may access memory less frequently. Particularly, processors that are in sleep states may not access pages of memory. Consumed bandwidth on the communication fabrics in the SOC(s) F10 may be monitored. Other system factors may be monitored as well. For example, memory could be folded due to the system detecting that a battery that supplies power is reaching a low state of charge. Another factor could be a change in power source, e.g., the system was connected to a continuous, effectively unlimited power source (e.g., a wall outlet) and was unplugged so it is now relying on battery power. Another factor could be system temperature overload, power supply overload, or the like were folding memory may reduce the thermal or electrical load. Any set of factors that indicate the activity level in the system may be monitored in various embodiments.

If the activity indicates that one or more memory slices could be folded without a significant impact on performance (decision block F92, "yes" leg), the memory monitor and fold/unfold code may initiate a fold of at least one slice (block F94). If the activity indicates that demand for memory may be increasing (or may soon be increasing) (decision block F96, "yes" leg), the memory monitor and fold/unfold code may initiate an unfold (block F98).

Figure 64:
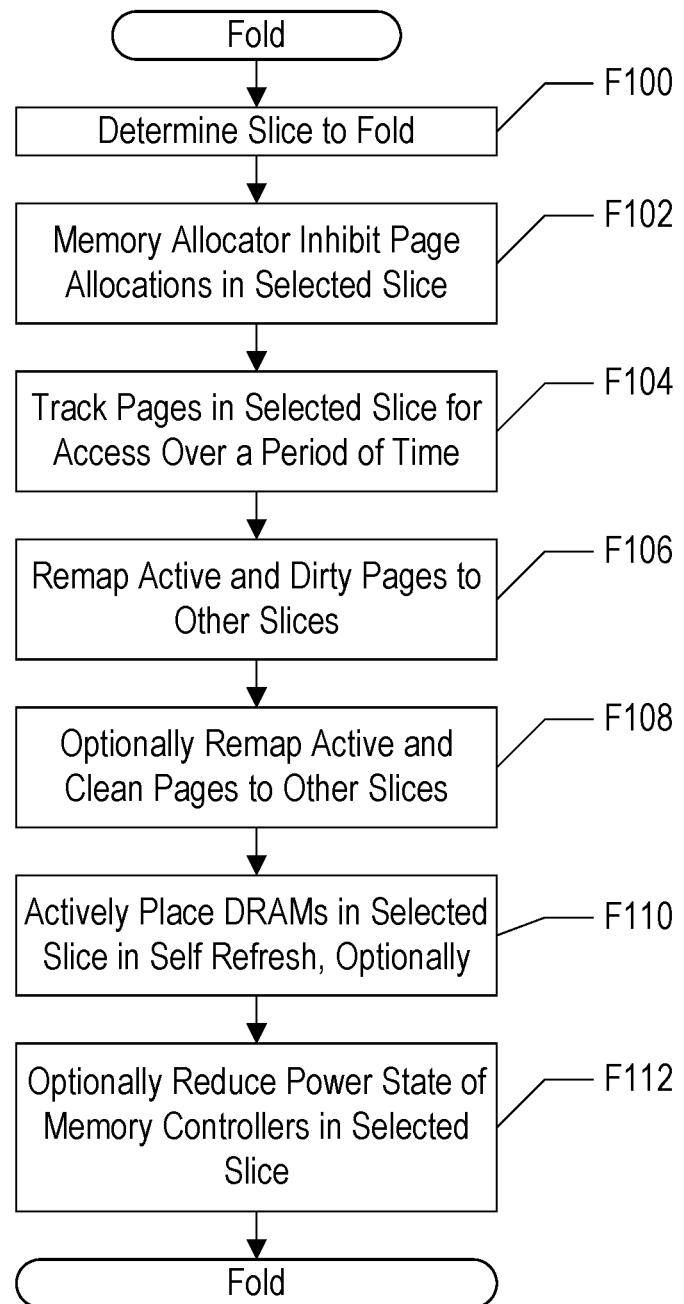
FIG. 64 is a flowchart illustrating operation of one embodiment of folding a memory slice.

In an embodiment, folding of slices may be gradual and occur in phases. FIG. 64 is a flowchart illustrating one embodiment of a gradual fold of a slice. While the blocks are shown in a particular order for ease of understanding, other orders may be used. Code executed by one or more processors on the SOC(s) F10 may cause operations including operations as shown below.

The folding process may begin by determine a slice to fold (block F100). The slice may be selected by determining that the slice is least frequently-accessed among the slices, or among the least frequently accessed. The slice may be selected randomly (not including slices that may be designated to remain active, in an embodiment). The slice may be selected based on a lack of wired and/or copy-on-write pages (discussed below) in the slice, or the slice may have fewer wired and/or copy-on write pages than other slices. A slice may be selected based on its relative independence from other folded slices (e.g., physical distance, lack of shared segments in the communication fabric with other folded slices, etc.). Any factor or factors may be used to determine the slice. The slice may be marked as folding. In one embodiment, folding process may disable slices in powers of 2, matching the binary decision tree for hashing. At least one slice may be designated as unfoldable, and may remain active to ensure that data is accessible in the memory system.

Initiating a fold may include inhibiting new memory allocations to physical pages in the folding slice. Thus, the memory monitor and fold/unfold code may communicate with the virtual memory page allocator code that allocates physical pages for virtual pages that have not yet been mapped into memory, to cause the virtual memory page allocator to cease allocating physical pages in the slice (block F102). The deactivation/disable may also potentially wait for wired pages in the slice to become unwired. A wired page may be a page that is not permitted to be paged out by the virtual memory system. For example, pages of kernel code and pages of related data structures may be wired. When a copy-on-write page is allocated, it may be allocated to a slice that is to remain active and thus may not be allocated to a folding slice. Copy-on-write pages may be used to permit independent code sequences (e.g., processes, or threads within a process or processes) to share pages as long as none of the independent code sequences writes the pages. When an independent code sequence does generate a write, the write may cause the virtual memory page allocator to allocate a new page and copy the data to the newly-allocated page.

Thus, the virtual memory page allocator may be aware of which physical pages are mapped to which slices. In an embodiment, when folding is used, linear mapping of addresses to memory may be used employed instead of spreading the blocks each page across the different memory controllers/memory. Alternatively, the mapping of addresses may be contiguous to a given slice, but the pages may be spread among the memory controllers/memory channels within the slice. In one particular embodiment, the address space may be mapped as single contiguous blocks to each slice (e.g., one slice may be mapped to addresses 0 to slice_size−1, another slice may be mapped to addresses slice_size to 2*slice_size−1, etc. Other mechanisms may use interleave between page boundaries, or map pages to a limited number of slices that may be folded/unfolded as a unit, etc.

During the transition period when a slice is being folded, the pages in the selected (folding) slice may be tracked over a period of time to determine which pages are actively accessed (block F104). For example, access bits in the page table translations may be used to track which pages are being accessed (checking the access bits periodically and clearing them when checked so that new accesses may be detected). Pages found to be active and dirty (the data has been modified since being loaded into memory) may be moved to a slice that will remain active. That is, the pages may be remapped by the virtual memory page allocator to a different slice (block F106). Pages found to be active but clean (not modified after the initial load into memory) may be optionally remapped to a different slice (block F108). If an active but clean page is not remapped, an access to the page after the slice has been folded may cause the slice to be enabled/activated again and thus may limit the power savings that may be achieved. Thus, the general intent may be that actively-accessed pages do not remain in the disabled/folded slice.

Once the above is complete the memory devices F28 (e.g., DRAMs) in the slice may be actively placed into self-refresh (block F110). Alternatively, the memory devices F28 may descend naturally into self-refresh because accesses are not occurring over time, relying on the power management mechanisms built into the memory controller F12A-F12H hardware to cause the transition to self-refresh. Other types of memory devices may be actively placed in a low power mode according to the definition of those devices (or may be allowed to descend naturally). Optionally, the memory controllers F12A-F12H in the slice may be reduced to a lower power state due to the lack of traffic but may continue to listen and respond to memory requests if they occur (block F112).

In an embodiment, if there is high enough confidence that the data in the folded slice is not required, a hard fold may be applied as a more aggressive mode on top the present folding. That is, the memory devices F28 may actually be powered off if there is no access to the folded slice over a prolonged period.

Unfolding (re-enabling or activate) a slice may be either gradual or rapid. Gradual unfolding may occur when the amount of active memory or bandwidth needed by the running applications is increasing and is approaching a threshold at which the currently active slices may not serve the demand and thus would limit performance. Rapid unfolding may occur at a large memory allocation or a significant increase in bandwidth demand (e.g., if the display turned on, a new application is launched, a user engages with the system such as unlocking the system or otherwise interacting with the system by pressing a button or other input device, etc.).

Figure 65:
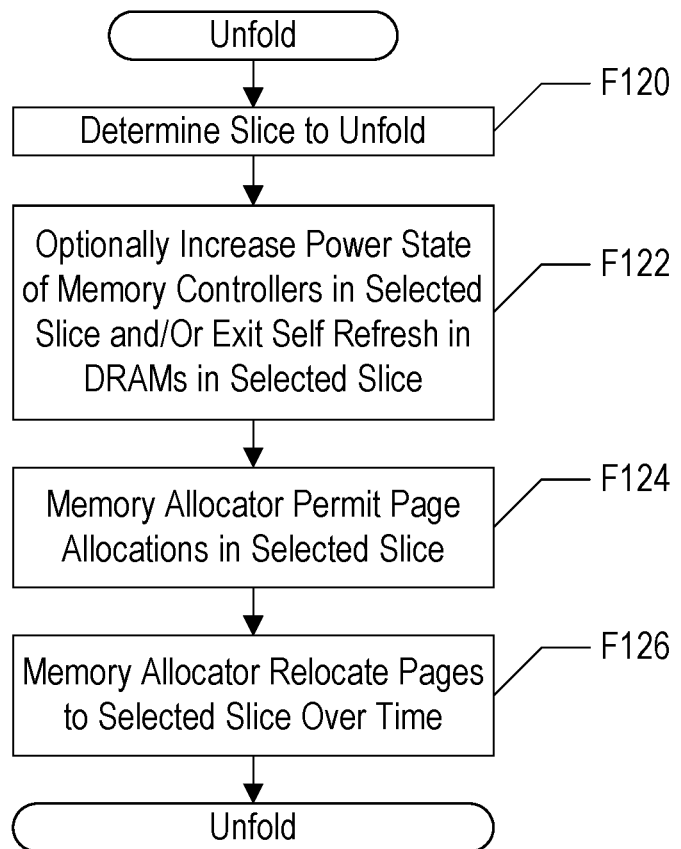
FIG. 65 is a flowchart illustrating operation of one embodiment of unfolding a memory slice.

FIG. 65 is a flowchart illustrating one embodiment of unfolding a memory slice. While the blocks are shown in a particular order for ease of understanding, other orders may be used. Code executed by one or more processors on the SOC(s) F10 may cause operations including operations as shown below.

A slice to unfold may be selected (block F120), or multiple slices such as a power of 2 number of slices as discussed above. Any mechanism for selecting a slice/slices may be used. For example, if a memory access to a folded slice occurs, the slice may be selected. A slice may be selected randomly. A slice may be selected based on its relative independence from other non-folded slices (e.g., physical distance, lack of shared segments in the communication fabric with non-folded slices, etc.). Any factor or combinations of factors may be used to select a slice for unfolding.

The power state of the memory controller(s) F12A-F12H in the unfolding slice may optionally be increased, and/or the DRAMs may be actively caused to exit self-refresh (or other low power mode, for other types of memory devices F28) (block F122). Alternatively, the memory controllers F12A-F12H and the memory devices F28 may naturally transition to higher performance/power states in response to the arrival of memory requests when physical pages within the unfolding memory slice arrive. The memory monitor and fold/unfold code may inform the virtual memory page allocator that physical page allocations within the selected memory slice are available for allocation (block F124). Over time, the virtual memory page allocator may allocate pages within the selected memory slice to newly-requested pages (block F126). Alternatively or in addition to allocating newly-requested pages, the virtual memory page allocator may relocate pages that were previously allocated in the selected memory slice back to the selected memory slice. In other embodiment, the virtual memory page allocator may rapidly relocate pages to the selected slice.

The slice may be defined as previously described with regard to FIG. 57 (e.g., a slice may be a coarser grain then a row). In other embodiments, for the purposes of memory folding, a slice may be any size down to a single memory channel (e.g., single memory device F28). Other embodiments may define a slice as one or more memory controllers F12A-F12H. Generally, a slice is a physical memory resource to which a plurality of pages are mapped. The mapping may be determined according to the programming of the MLC registers F22A-F22H, F22J-F22N, and F22P, in an embodiment. In another embodiment, the mapping may be fixed in hardware, or programmable in another fashion.

In an embodiment, the choice of slice size may be based, in part, on the data capacity and bandwidth used by low power use cases of interested in the system. For example, a slice size may be chosen so that a single slice may sustain a primary display of the system and have the memory capacity to hold the operating system and a small number of background applications. Use cases might include, for example, watching a movie, playing music, screensaver on but fetching email or downloading updates in background.

Figure 66:
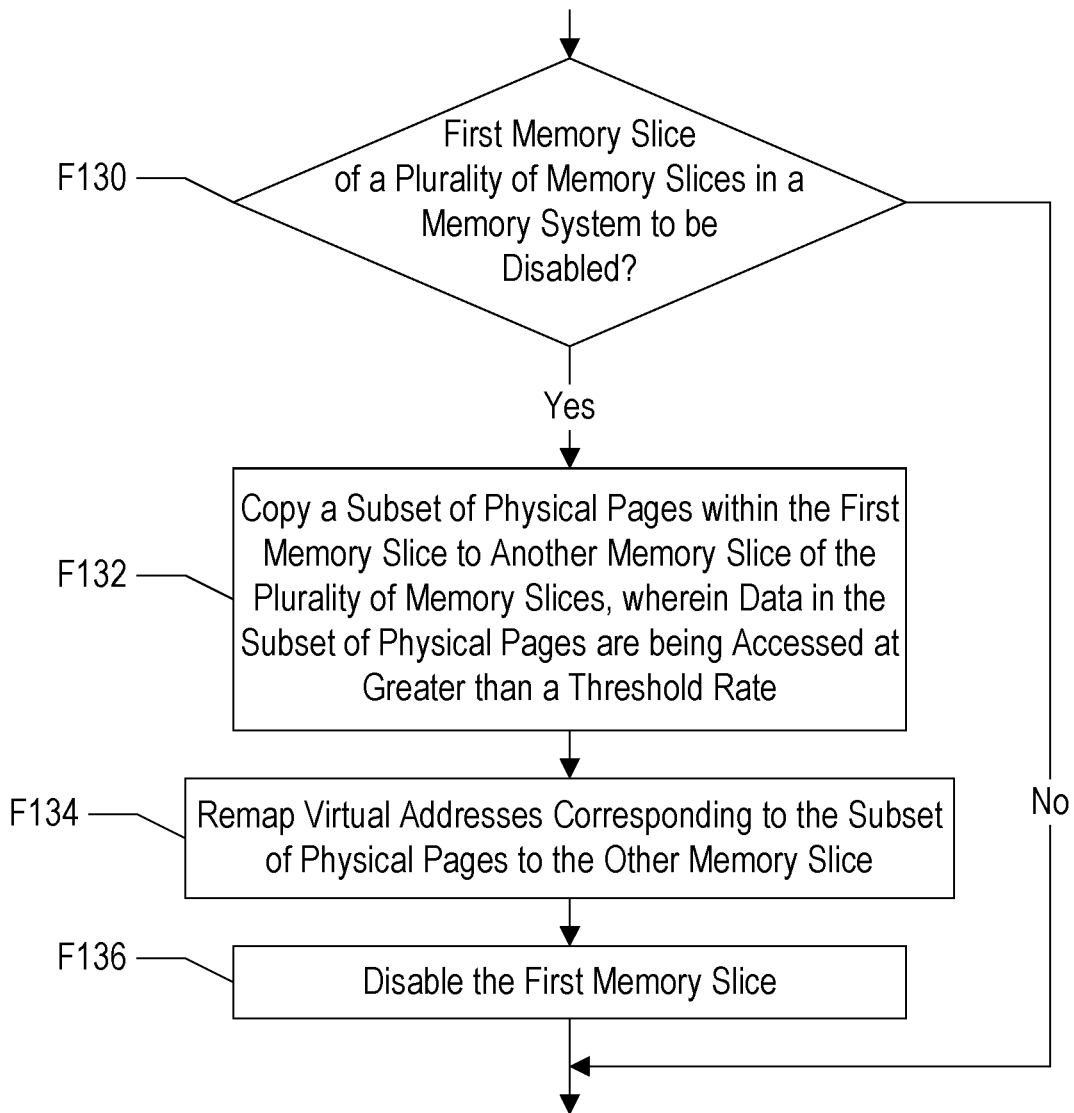
FIG. 66 is a flowchart illustrating one embodiment of a method of memory folding.

FIG. 66 is a flowchart illustrating one embodiment of a method for folding a memory slice (e.g., for disabling or deactivating the slice). While the blocks are shown in a particular order for ease of understanding, other orders may be used. Code executed by one or more processors on the SOC(s) F10 may cause operations including operations as shown below.

The method may include detecting whether or not a first memory slice of a plurality of memory slices in a memory system is to be disabled (decision block F130). If the detection indicates that the first memory slice is not to be disabled (decision block F130, "no" leg), the method may be complete. If the detection indicates that the first memory slice is to be disabled, the method may continue (decision block F130, "yes" leg). Based on detecting that the first memory slice is to be disabled, the method may include copying a subset of physical pages within the first memory slice to another memory slice of the plurality of memory slices. Data in the subset of physical pages may be accessed at greater than a threshold rate (block F132). The method may include, based on the detecting that the first memory slice is to be disabled, remapping virtual addresses corresponding to the subset of physical pages to the other memory slice (block F134). The method may also include, based on the detecting that the first memory slice is to be disable, disabling the first memory slice (block F136). In an embodiment, disabling the first memory slice may comprise actively placing one or more dynamic access memories (DRAMs) in the first memory slice in self refresh mode. In another embodiment, disabling the first memory slice may comprise permitting one or more dynamic access memories (DRAMs) in the first memory slice to transition to self-refresh mode due to a lack of access. In an embodiment, the memory system comprises a plurality of memory controllers, and the physical memory resource comprises at least one of the plurality of memory controllers. In another embodiment, the memory system comprises a plurality of memory channels and a given dynamic random access memory (DRAM) is coupled to one of the plurality of memory channels. The given memory slice comprises at least one of the plurality of memory channels. For example, in an embodiment, the given memory slice is one memory channel of the plurality of memory channels.

In an embodiment, determining that the first memory slice is to be disabled may comprise: detecting that an access rate to the first memory slice is lower than a first threshold; and identifying the subset of physical pages that is accessed more frequently than a second threshold. In an embodiment, the method may further comprise disabling allocation of the plurality of physical pages corresponding to the first memory slice to virtual addresses in a memory allocator based on detecting that the access rate is lower than the first threshold. The method may further comprise performing the identifying subsequent to disabling allocation of the plurality of physical pages. In an embodiment, the copying comprises copying data from one or more physical pages of the subset that include data that has been modified in the memory system to the other memory slice. In some embodiment, the copying further comprises copying data from remaining physical pages of the subset subsequent to copying the data from the one or more physical pages.

In accordance with the above, a system may comprise one or more memory controllers coupled to one or more memory devices forming a memory system, wherein the memory system includes a plurality of memory slices, and wherein a given memory slice of the plurality of memory slices is a physical memory resource to which a plurality of physical pages are mapped. The system may further comprise one or more processors; and a non-transitory computer readable storage medium storing a plurality of instructions which, when executed by the one or more processors, cause the system to perform operations comprising the method as highlighted above. The non-transitory computer readable stored medium is also an embodiment.

Figure 67:
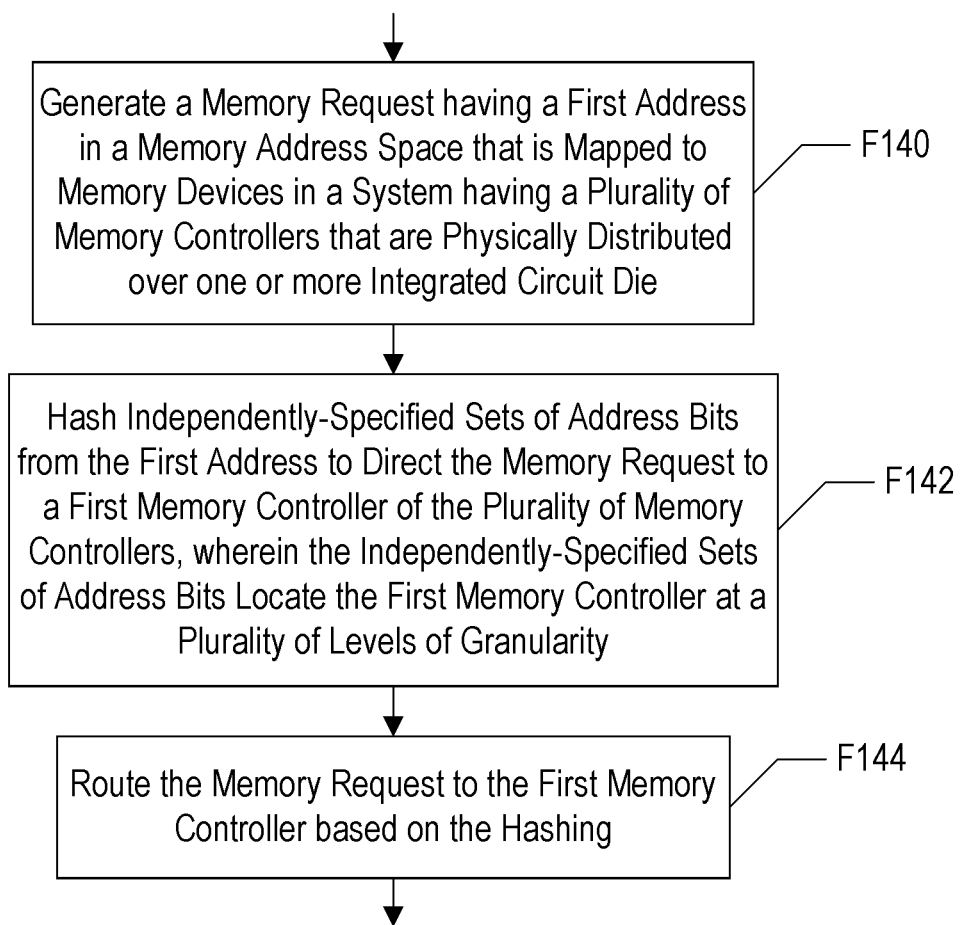
FIG. 67 is a flowchart illustrating one embodiment of a method of hashing a memory address.

FIG. 67 is a flowchart illustrating one embodiment of a method for hashing an address to route a memory request for the address to a targeted memory controller and, in some cases, to a targeted memory device and/or bank group and/or bank in the memory device. While the blocks are shown in a particular order for ease of understanding, other orders may be used. Various components of the SOC F10, such as source hardware agents, communication fabric components, and/or memory controller components may be configured to perform portions or all of the method.

The method may include generating a memory request having a first address in a memory address space that is mapped to memory devices in a system having a plurality of memory controllers that are physically distributed over one or more integrated circuit die (block F140). In an embodiment, a given memory address in the memory address space uniquely identifies a memory location in one of the memory devices coupled to one of the plurality of memory controllers, a given page within the memory address space is divided into a plurality of blocks, and the plurality of blocks of the given page are distributed over the plurality of memory controllers. The method may further comprise hashing independently-specified sets of address bits from the first address to direct the memory request to a first memory controller of the plurality of memory controllers, wherein the independently-specified sets of address bits locate the first memory controller at a plurality of levels of granularity (block F142). The method may still further comprise routing the memory request to the first memory controller based on the hashing (block F144).

In an embodiment, the one or more integrated circuit die are a plurality of integrated circuit die; the plurality of levels of granularity comprise a die level; and the die level specifies which of the plurality of integrated circuit die includes the first memory controller. In an embodiment, the plurality of memory controllers on a given integrated circuit die are logically divided into a plurality of slices based on physical location on the given integrated circuit die; at least two memory controllers of the plurality of memory controllers are included in a given slice of the plurality of slices; the plurality of levels of granularity comprise a slice level; and the slice level specifies which of the plurality of slices includes the first memory controller. In an embodiment, the at least two memory controllers in the given slice are logically divided into a plurality of rows based on physical location on the given integrated circuit die; the plurality of levels of granularity comprise a row level; and the row level specifies which of the plurality of rows includes the first memory controller. In an embodiment, the plurality of rows include a plurality of sides based on physical location on the given integrated circuit die; the plurality of levels of granularity comprise a side level; and the side level specifies which side of a given row of the plurality of rows includes the first memory controller. R In an embodiment, a given hardware agent of a plurality of hardware agents that generate memory requests comprises one or more registers, and the method further comprises programming the one or more registers with data identifying which address bits are included in the hash at one or more of the plurality of levels of granularity. In an embodiment, a first hardware agent of the plurality of hardware agents is programmable for a first number of the plurality of levels of granularity and a second hardware agent of the plurality of hardware agents is programmable for a second number of the plurality of levels of granularity, wherein the second number is different from the first number. In an embodiment, a given memory controller of the plurality of memory controllers comprises one or more registers programmable with data identifying which address bits are included in the plurality of levels of granularity and one or more other levels of granularity internal to the given memory controller.

Figure 68:
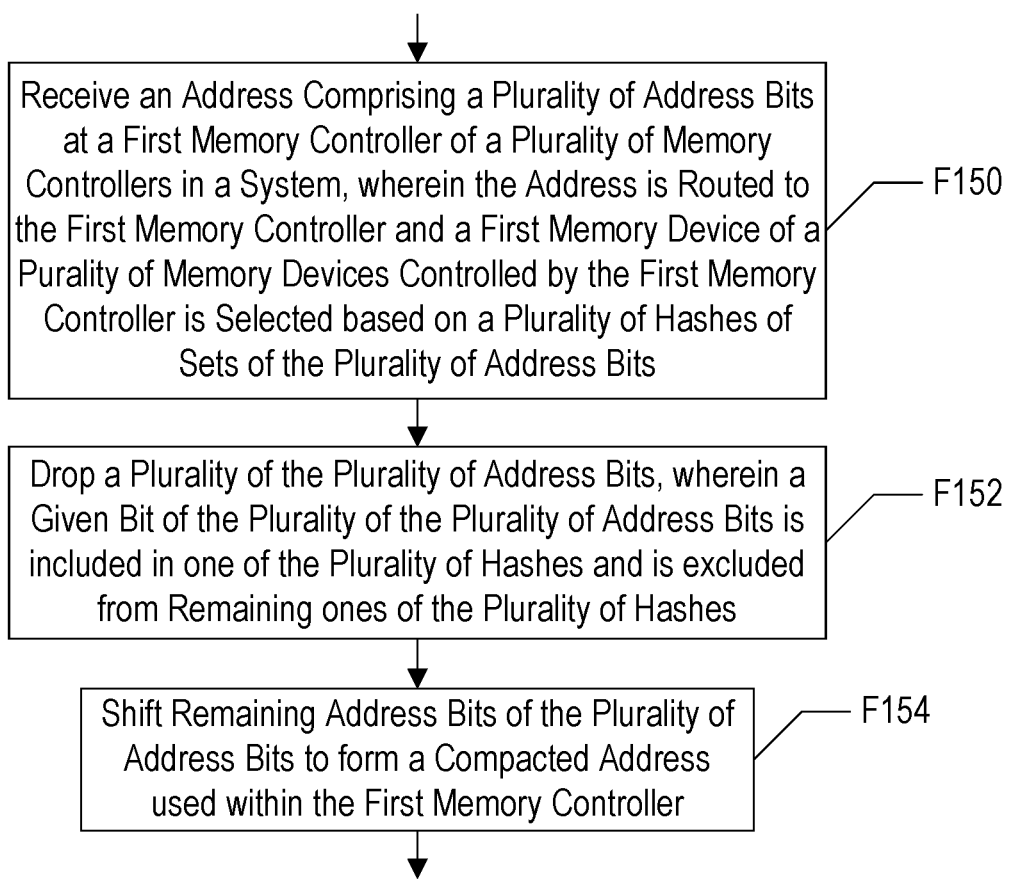
FIG. 68 is a flowchart illustrating one embodiment of a method of forming a compacted pipe address.

FIG. 68 is a flowchart illustrating one embodiment of a method for dropping address bits to form a compacted pipe address in a memory controller. While the blocks are shown in a particular order for ease of understanding, other orders may be used. The memory controller may be configured to perform portions or all of the method.

The method may include receiving an address comprising a plurality of address bits at a first memory controller of a plurality of memory controllers in a system. The address is routed to the first memory controller and a first memory device of a plurality of memory devices controlled by the first memory controller is selected based on a plurality of hashes of sets of the plurality of address bits (block F150). The method may further include dropping a plurality of the plurality of address bits (block F152). A given bit of the plurality of address bits is included in one of the plurality of hashes and is excluded from remaining ones of the plurality of hashes. The method may include shifting remaining address bits of the plurality of address bits to form a compacted address used within the first memory controller (block F154).

In an embodiment, the method may further comprise recovering the plurality of address bits based on the sets of the plurality of address bits used in the plurality of hashes and an identification of the first memory controller. In an embodiment, the method may further comprise accessing a memory device controlled by the memory controller based on the compacted address. In an embodiment, the method may further comprise programming a plurality of configuration registers to identify the sets of the plurality address bits that included in respective ones of the plurality of hashes. In an embodiment, the programming may comprises programming the plurality of configuration registers with bit masks that identify the sets of the plurality of address bits. In an embodiment, the method further comprises programming a plurality of configuration registers to identify the plurality of address bits that are dropped. In an embodiment, the programming comprises programming the plurality of configuration registers with one-hot bit masks.

Multiple Tapeouts from a Common Database

Integrated circuits include a variety of digital logic circuits and/or analog circuits that are integrated onto a single semiconductor substrate or "chip." A wide variety of integrated circuits exist, from fixed-function hardware to microprocessors to systems on a chip (SOCs) that include processors, integrated memory controllers, and a variety of other components that form a highly integrated chip that can be the center of a system.

A given integrated circuit can be designed for use in a variety of systems (e.g., an "off the shelf" component). The given integrated circuit can include a set of components that allow it to be used in the various systems, but a particular system may not require all of the components or the full functionality and/or performance of all of the components. The extra components/functionality are effectively wasted, a sunk cost and a consumer of power (at the least, leakage power) in the system. For portable systems that at least sometimes operate on a limited power supply (e.g., a battery), as opposed to the essentially unlimited supply of a wall outlet, the inefficient use of power leads to inefficient use of the limited supply and even unacceptably short times between charging requirements for the limited supply.

Matching integrated circuit functionality to the requirements of a given system is therefore important to producing a high quality product. However, custom integrated circuit design for many different systems also represents a cost in terms of design and validation effort for each integrated circuit.

In an embodiment, a methodology and design of an integrated circuit supports more than one tape out, and ultimately manufacture, of different implementations of the integrated circuit based on a common design database. The design may support a full instance in which all circuit components included in the design are included in the manufactured chip, as well as one or more partial instances that include a subset of the circuit components in the manufactured chip. The partial instances may be manufactured on smaller die, but the circuit components and their physical arrangement and wiring with the partial instance may be the same as the corresponding area within the full instance. That is, the partial instance may be created by removing a portion of the area of the full instance, and the components thereon, from the design database to produce the partial instance. The work of designing, verifying, synthesizing, performing timing analysis, performing design rules checking, performing electrical analysis, etc. may be shared across the full instance and the partial instances. Additionally, an integrated circuit chip that is appropriate for a variety of products with varying compute requirements, form factors, cost structures, power supply limitations, etc. may be supported out of the same design process, in an embodiment.

For example, the full instance may include a certain number of compute units (e.g., central processing unit (CPU) processors, graphics processing units (GPUs), coprocessors attached to the CPU processors, other specialty processors such as digital signal processors, image signal processors, etc.). Partial instances may include fewer compute units. The full instance may include a certain amount of memory capacity via a plurality of memory controllers, and the partial instances may include fewer memory controllers supporting a lower memory capacity. The full instance may include a certain number of input output (I/O) devices and/or interfaces (also referred to as peripheral devices/interfaces or simply peripherals). The partial instance may have fewer I/O devices/interfaces.

In an embodiment, the partial instances may further include a stub area. The stub area may provide terminations for input signals to the circuit components included in the partial instances, where the sources for those input signals in the full instance are circuit components in the removed area and thus the input signals are not connected in the absence of the stub. Output signals from the circuit components to circuit components in the removed area may at least reach the edge of the stub and may be unconnected. In an embodiment, the stub area may include metallization to connect the input signals to power (digital one) or ground (digital zero) wires (e.g., power and ground grids) as needed to provide proper function of the circuit components in the partial instance. For example, a power manager block in the partial instance may receive inputs from the removed circuit components, and the inputs may be tied to power or ground to indicate that the removed circuit components are powered off, idle, etc. so that the power manager block does not wait on the removed circuit component's response when changing power states, etc. In an embodiment, the stub area may include only metallization (wiring). That is, the stub area may exclude active circuitry (e.g., transistors formed in the semiconductor substrate). The metallization layers (or metal layers) are formed above the surface area of the semiconductor substrate to provide the wire interconnect between active circuit elements (or to provide the digital one/zero values in the stub area). Managing the partial instance designs in this manner may minimize the amount of verification of the partial instances over the effort in the full instance. For example, additional timing verification may not be needed, additional physical design verification may be minimal, etc.

Figure 69:
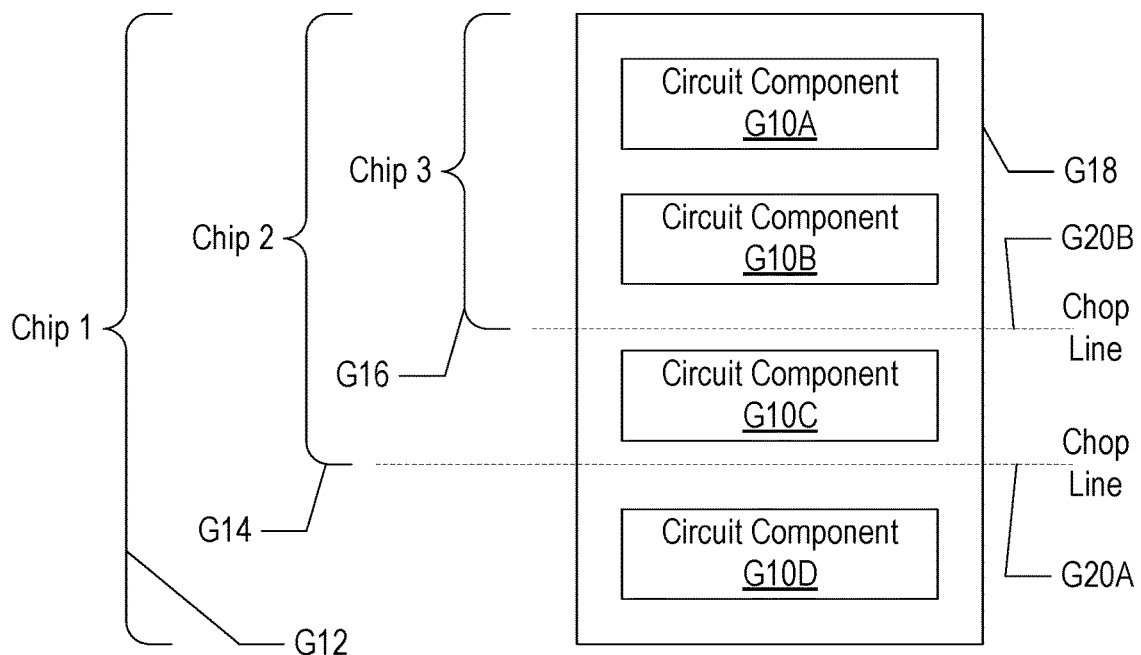
FIG. 69 is a block diagram of one embodiment of an integrated circuit design that supports full and partial instances.

FIG. 69 is a block diagram illustrating one embodiment of a full instance and several partial instances of an integrated circuit. The full instance of the integrated circuit is indicated by curly brace G12 ("chip 1") and partial instances of the integrated circuit are indicate by curly braces G14 and G16 ("chip 2" and "chip 3"). The full instance, chip 1, includes a plurality of circuit components G10A-G10D. The physical locations of the circuit components G10A-G10D on a surface of a semiconductor substrate chip or die (reference numeral G18) for the full instance is indicated by the placement of the circuit components 10A-10D. FIG. 69 is a simplified representation and there may be more circuit components and the physical arrangement may be more varied then that shown in FIG. 69. Various interconnect between the circuit components G10A-G10D is used for inter-component communication, not shown in FIG. 69. The interconnect, was well as interconnect within the circuit components G10A-G10D themselves, may be implemented in metallization layers above the semiconductor substrate surface.

Each partial instance corresponds to a "chop line" G20A-G20B in FIG. 69. The chop line divides those circuit components G10A-G10D that are included in the full instance from circuit components G10A-G10D that are included in the various partial instances. Thus, for example, chip 2 is defined by the chop line G20A and includes circuit components G10A-G10C but not circuit component G10D. Similarly, chip 3 is defined by the chop line G20B and includes circuit components G10A-G10B but not circuit components G10C-G10D. The chop lines may be defined in the design database, or may be part of the design process but may not be represented explicitly in the design database.

Generally, the design database may comprise a plurality of computer files storing descriptions of the circuit components G10A-G10D and their interconnection. The design database may include, for example, register-transfer level (RTL) descriptions of the circuits expressed in hardware description language (HDL) such as Verilog, VHDL, etc. The design database may include circuit descriptions from a circuit editor tool, for circuits that are implemented directly rather than synthesized from the RTL descriptions using a library of standard cells. The design database may include netlists resulting from the synthesis, describing the standard cell instances and their interconnect. The design database may include physical layout descriptions of the circuit components and their interconnect, and may include the tape out description files with describe the integrated circuits in terms of geometric shapes and layers that can be used to create masks for the integrated circuit fabrication process. The tape out description files may be expressed in graphic design system (GDSII) format, open artwork system interchange standard (OASIS) format, etc. Any combination of the above may be included in the design database.

The chop lines G20A-G20B divide the chip G18 area into subareas within which subsets of the circuit components G10A-G10D are instantiated. For example, the chop line G20B divides the chip G18 area into a first subarea (above the line G20B in as oriented in FIG. 69) and a second subarea (below the line G20B). The chop line G20A further divides the second subarea into third and fourth subareas, where the third subareas is adjacent to, or abuts, the first subarea. The combination of the first subarea and the second subarea represents the full instance. The first subarea alone (along with a stub area) represents the smallest partial instance (chip 3). The first subarea and the third subarea represent the other partial instance in this example (chip 2).

The physical locations of circuit components within a given subarea, and interconnect within the circuit components and between the circuit components, may not change between the full instance and the partial instances. Thus, when the circuit components within the full instance meet timing requirements, physical design requirements, and electrical requirements for successful manufacture and use of the full instance, then the same requirements should also be met by the partial instances for the most part. Physical design and electrical requirements within the stub areas may need to be verified, and certain physical design requirements may be applied to the subareas such as corner exclusions, controlled collapse chip connect (C4) bump exclusion zones, etc. as discussed below. However, once the full instance is verified and ready for tape out, the tape out of the partial instances may proceed with minimal efforts, in an embodiment.

Figure 70:
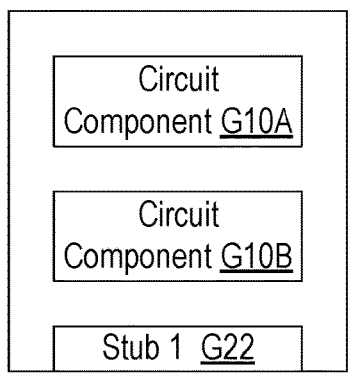
FIGS. 70-72 are various embodiments of full and partial instances of the integrated circuit shown in FIG. 69.
Figure 71:
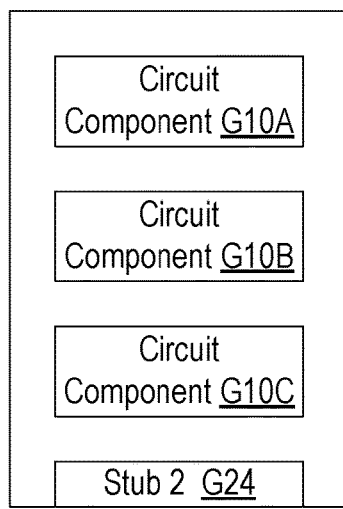
Figure 72:
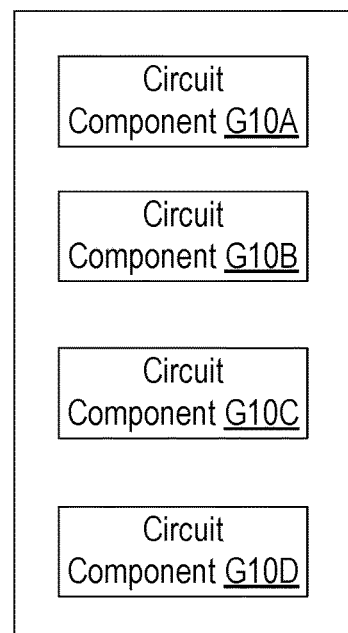

FIGS. 70-72 illustrate the partial instances and the full instance for the embodiment shown in FIG. 69. FIG. 72 is the full instance, and thus includes the circuit components G10A-G10D. FIGS. 70 and 71 correspond to chip 3 and chip 2, respectively. Thus, the partial instance in FIG. 70 includes the circuit components G10A-G10B from the first subarea, as well as a stub area G22 (stub 1). The partial instance in FIG. 71 includes the circuit components G10A-G10B from the first subarea, the circuit component G10C from the second subarea, and a stub area G24 (stub 2).

A circuit component may be any group of circuits that are arranged to implement a particular component of the IC (e.g., a processor such as a CPU or GPU, a cluster of processors or GPUs, a memory controller, a communication fabric or portion thereof, a peripheral device or peripheral interface circuit, etc.). A given circuit component may have a hierarchical structure. For example, a processor cluster circuit component may have multiple instances of a processor, which may be copies of the same processor design placed multiple times within the area occupied by the cluster.

In accordance with this description, a method may comprise defining, in a design database corresponding to an integrated circuit design, an area to be occupied by the integrated circuit design when fabricated on a semiconductor substrate. For example, the area may be the area of the full instance as shown in FIGS. 69 and 72. The method may further comprise defining a chop line (which may be one of multiple chop lines). The chop line may demarcate the area into a first subarea and a second subarea, wherein a combination of the first subarea and the second subarea represents the full instance. The first subarea and a stub area represent a partial instance of the integrated circuit that includes fewer circuit components than the full instance. In the design database, a physical location of a plurality of circuit components included in both the full instance and the partial instance of the integrated circuit are defined in the first subarea. Relative location of the plurality of circuit components within the first subarea and the interconnect of the plurality of circuit components within the first subarea may be unchanged in the full instance and the partial instance. A physical location of another plurality of circuit components included in the full instance but excluded from the partial instance is defined in the second subarea. A stub area is also defined in the design database. The stub area may include terminations for wires that would otherwise traverse the chop line between the first and second subareas. The stub area may ensure correct operation of the plurality of circuit components in the first subarea in the absence of the second subarea in the partial instance. A first data set for the full instance may be produced using the first subarea and the second subarea, the first data set defining the full instance for manufacturing of the full instance. A second data set for the partial instance may also be produced using the first subarea and the stub area. The second data set defines the partial instance for manufacture of the partial instance. In an embodiment, the method may further comprise defining a second chop line in the second subarea, dividing the second subarea into a third subarea and a fourth subarea. The third subarea may be adjacent to the first subarea, and the third subarea and the first subarea may represent a second partial instance of the integrated circuit. The method may further include producing a third data set for the second partial instance using the first subarea, the third subarea, and a second stub area. The third data set defines the second partial instance for manufacture of the second partial instance.

As mentioned above, the stub area may exclude circuitry. For example, the stub area may exclude active circuitry such as transistors or other circuits formed in the semiconductor substrate. The stub area may exclude circuits that may be formed in the metallization layers as well (e.g., explicit resistors, inductors, or capacitors). While the metallization layers have parasitic properties (e.g., resistance, inductance, and capacitance), explicitly-defined circuits may not be permitted. The stub area may include only wiring in one or more metallization layers above a surface area of the semiconductor substrate.

Another method may include receiving the first data set and the second data set, e.g., at a semiconductor manufacturing facility or "foundry." The method may further include manufacturing a first plurality of the full instance of the integrated circuit based on the first data set and manufacturing a second plurality of the partial instance of the integrated circuit based on the second data set.

An integrated circuit implementing a partial instance in accordance with this disclosure may comprise a plurality of circuit components physically arranged on a surface of a semiconductor substrate forming the integrated circuit; and a plurality of wire terminations along a single edge of the surface (e.g., the stub area). The plurality of wire terminations may be electrically connected to a plurality of supply wires of the integrated circuit to provide fixed digital logic levels on wires that are inputs to one or more of the plurality of circuit components. The power supply wires may be part of a power supply grid (e.g., power and/or ground) in the metallization layers of the integrated circuit. The power and ground grids may also be referred to as power and ground grids. The input wires that are terminated by the wire terminations are oriented to intersect the single edge and lack a circuit configured to drive the wires within the integrated circuit (e.g., the wires are driven in the full instance by the circuit components in the second subarea that are not present in the partial instance). The area along the single edge that includes the plurality of wire terminations also excludes active circuit elements. For example, the area long the single edge may include only wiring in one or more metallization layers above a surface area of the semiconductor substrate.

The methodology described herein may affect a variety of areas of the overall design process for an integrated circuit. For example, floor planning is an element of the design process in which the various circuit components are allocated to areas on the semiconductor substate. During floor planning, the existence of the partial instances and the location of the chop lines may be considered, ensuring that circuit components that are included in all instances are in the first subarea and other circuit components are included in the second subarea (or third and fourth subareas, etc.). Additionally, the shape of the subareas may be carefully designed to provide efficient use of area in both the full instance and the partial instances. Main busses or other interconnect that may provide communication between circuit components throughout the full instance may be designed to correctly manage communication in the various instances (e.g., in a partial instance, the busses may be terminated in the stub area or may be unconnected in the stub area, and thus communications should not be transmitted in the direction of the stub area). The floor plan may also consider the requirements for tape out for both the full instance and the partial instances (e.g., various exclusion zones as discussed in further detail below). Additionally, the floor plan may attempt to minimize the number of wires that traverse the chop line to simplify the verification that the partial instances will operate correctly.

A consideration, in an embodiment, at the floor planning stage may include the definition of certain critical connections that could be impacted by the chopping to partial instances. Clock interconnect and analog interconnect may be examples. The clock interconnect (or "clock tree") is often designed so that the distance and electrical load from the clock generator, or clock source, to the clock terminations at various state elements in the circuit components is approximately the same, or "balanced". The state elements may include, e.g., flipflops ("flops"), registers, latches, memory arrays, and other clocked storage devices.

Figure 73:
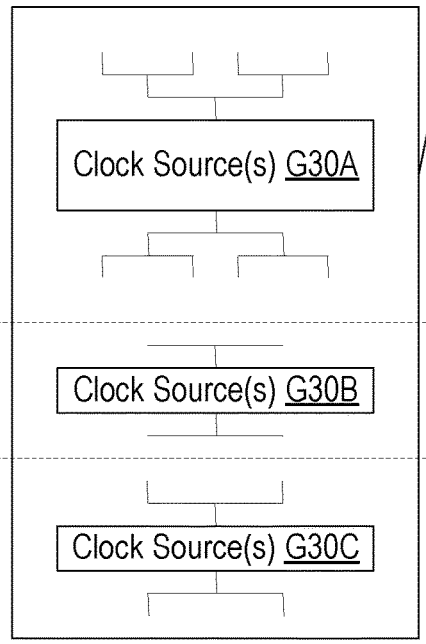
FIG. 73 is a block diagram of one embodiment of the integrated circuit shown in FIG. 69 with local clock sources in each sub area of the integrated circuit.

In order to maintain the balance among the various instances of the integrated circuit design, independent clock trees may be defined between local clock sources in each subarea and the state elements within that subarea. For example, FIG. 73 is a block diagram illustrating an embodiment of the full instance of the integrated circuit (chip 18) and the chop lines G20A-G20B demarcating the subareas of the full instance for chopping into the partial instances. Local clock source(s) G30A-G30C are illustrated, each driving independent clock trees illustrated by the lines within each subarea. The clock trees may not cross the chop lines G20A-G20B. That is, the clock tree within a given subarea may remain within that subarea.

A clock source may be any circuit that is configured to generate a clock signal to the circuitry coupled to its clock tree. For example, a clock source may be a phase lock loop (PLL), a delay lock loop (DLL), a clock divider circuit, etc. The clock source may be coupled to a clock input to the integrated circuit on which an external clock signal is provided, which the clock source may multiply up in frequency or divide down in frequency while locking phase or clock edges to the external signal.

Thus, a method may further comprise defining, in the first subarea, one or more first clock trees to distribute clocks within the first subarea and defining, in the second subarea, one or more second clock trees to distributed clocks with the second subarea. The one or more first clock trees may be electrically isolated from the one or more second clock trees in the full instance. The clock trees may be physically independent as shown in FIG. 73 (e.g., connected to different local clock sources). The clock trees may not cross a chop line into another subarea. In a method of manufacture, the first data set may further comprise one or more first clock trees to distribute clocks within the first subarea and one or more second clock trees to distribute clocks with the second subarea, and wherein the one or more first clock trees may be electrically isolated from the one or more second clock trees in the full instance.

In an embodiment, an integrated circuit may comprise one or first more clock trees to distribute clocks within a first subarea of the first area; and one or more second clock trees to distributed clocks with the second subarea. The one or more first clock trees may be electrically isolated from the one or more second clock trees.

Figure 74:
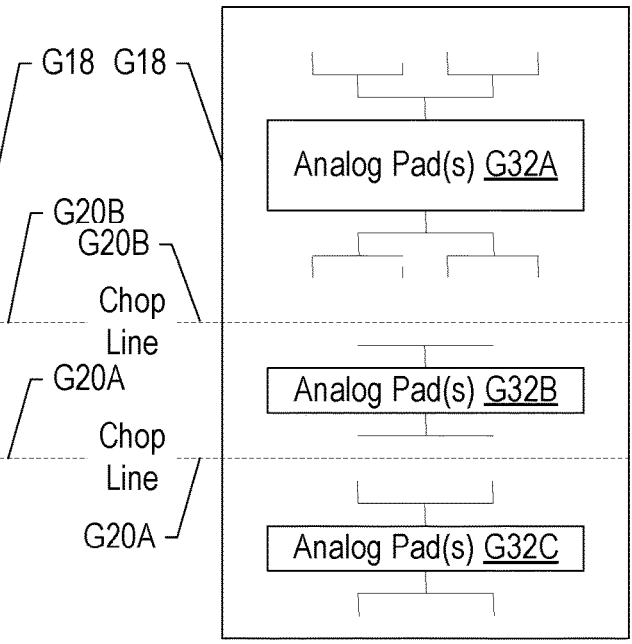
FIG. 74 is a block diagram of one embodiment of the integrated circuit shown in FIG. 69 with local analog pads in each sub area of the integrated circuit.

FIG. 74 is a block diagram of one embodiment of the full die G18, demarcated by the chop lines G20A-G20B, and the provision of local analog pads G32A-G32C within each subarea defined by the chop lines G20A-G20B. The analog pads G32A-G32C may provide connection points for analog inputs to the chip. Analog signals often have special requirements, such as shielding from digital noise that can affect the accuracy and functionality of the analog signals, which are continuous value signals in contrast to digital signals that have meaning only at the digital values and not in transition therebetween. Ensuring that the analog requirements are met within each subarea may simplify the design of the integrated circuit overall. In an embodiment, if there is no usage of analog signals within a given subarea, that subarea may exclude analog pads and signal routing.

Thus, a method may further include defining, in the first subarea, one or more first analog inputs and defining, in the second subarea, one or more second analog inputs. The one or more first analog inputs may remain with the first subarea and the one or more second analog inputs may remain within the second subarea. That is, analog signals on the inputs or derived from the inputs may be transported on wires that do not cross the chop lines G20A-G20B. In a method of manufacture, the first data set may further includes one or more first analog inputs in the first subarea, wherein the one or more first analog inputs remain with the first subarea, and wherein the first data set further includes one or more second analog inputs in the second subarea, wherein the one or more second analog inputs remain within the second subarea.

In accordance with this disclosure, an integrated circuit may comprise a first plurality of circuit components physically arranged within a first area of a surface of a semiconductor substrate forming the integrated circuit and a second plurality of circuit components physically arranged within a second area of the surface of the semiconductor substrate forming the integrated circuit. One or more first analog inputs may be provided within the first area, wherein the one or more first analog inputs are isolated to the first plurality of circuit components. One or more second analog inputs within the second area, wherein the one or more second analog inputs are isolated to the second plurality of circuit components.

Another feature of integrated circuits that may be considered is the design for test (DFT) strategy. DFT generally includes a port or ports on which a DFT interface is defined, such as an interface compatible with the joint test access group (JTAG) specifications. DFT may include defining scan chains of state elements in the design so that the state can be scanned in and scanned out, and scan chains may be defined to remain within a given sub area, for example. Separate DFT ports may be provided within each subarea to minimize cross-chop line communication as much as possible. If cross-chop line communication is needed, such signals may be terminated (inputs to a subarea) and no-connected (outputs of a subarea) in the stub area, similar to other signals. In an embodiment, scan networks and other DFT networks may be designed as hierarchical rings, so that the portions in the removed circuit components may be disconnected from the DFT network without further impact on the remaining network.

In an embodiment, some circuit components may be instantiated multiple times within the full instance. One or more of the instances may be in the subareas that are not included in the one or more of the partial instances. These circuit components may be designed to meet all requirements (timing, physical, electrical) at each location of an instance, and thus may be over-designed for some other locations (e.g., the circuit component may be designed for worst case clock skew across its locations, etc.). Additionally, the partial instances may have a different packaging solution, which may require additional design to handle differences in the packages (e.g., different IR voltage drops).

In an embodiment, the foundry may require the fabrication of certain "non-logical" cells on the semiconductor substrate. These cells are not part of the integrated circuit itself, but may be used by the foundry to tune the manufacturing process. The foundry-required cells may have strict rules and may be die-size dependent, and thus planning for the placement of these cells in the floorplan of the full instance so that they are properly located in the partial instance(s) may be needed.

Figure 75:
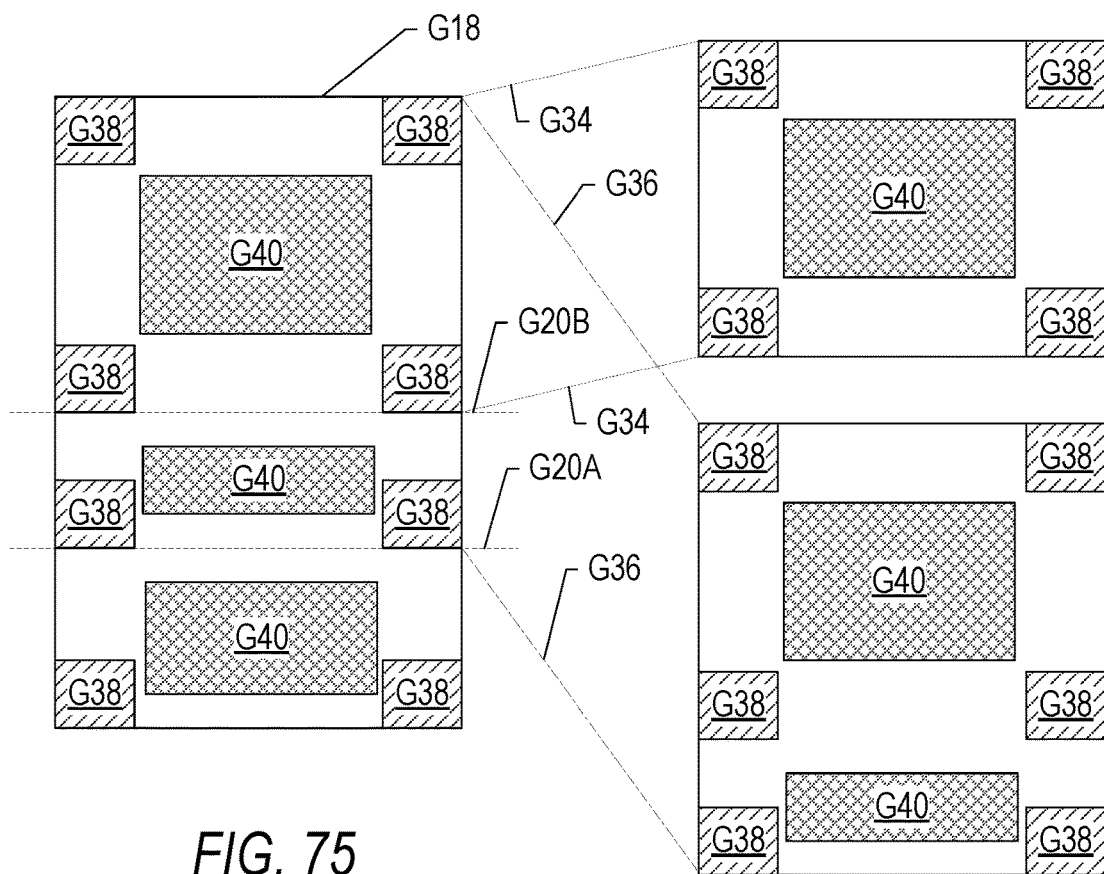
FIG. 75 is a block diagram of one embodiment of the integrated circuit shown in FIG. 69 with block out areas at the corners of each subarea and areas for interconnect "bumps" that exclude areas near the edges of each subarea.

FIG. 75 illustrates an embodiment of another consideration for the integrated circuit design: exclusion areas (or exclusion zones) of various types. On the left side in FIG. 75 is the full instance (chip 1) of the full die G18, along with the partial instances on the right side, Chip 3 at the top (with its location in the full instance, above the chip line G20B, indicated by the dotted lines G34) and chip 2 at the bottom (with its location in the full instance, above the chop line G20A, indicated by the dot and dash lines G36). For each instance, the corners of the chips have exclusion zones in which circuitry is not permitted (or must follow much stricter design rules) than other parts of the semiconductor substrate surface. The corner exclusion zones may be defined because the mechanical stress on the corners of the semiconductor die may be greater than at other locations of the chip. The corner exclusion zones are indicated by cross hatched areas denoted by reference numeral G38 in FIG. 75.

Accordingly, the full instance has corner exclusive zones at each of its four corners, as well as "corner" exclusion zones along the sides of the chip, at the corners of the subareas adjacent to the chop lines G20A-G20B which will end up being corners of the chips for the partial instances. The additional corner exclusion zones may be the same size as the corner exclusion zones of the full instance, or may be different sizes if the size of the corner exclusion zones scale with overall die size.

Thus, a method may further comprise defining a plurality of exclusion zones at respective corners of the semiconductor substrate, wherein circuit components are excluded from the plurality of exclusion zones according to mechanical requirements of a fabrication process to be employed to manufacture the integrated circuit. The method may further comprise defining additional exclusion zones at corners of the first subarea adjacent to the chop line, whereby the partial instance includes exclusion zones at respective corners of the semiconductor substrate with the partial instance formed thereon. The first data set in the method of manufacturing may include a plurality of exclusion zones at respective corners of the semiconductor substrate, wherein circuit components are excluded from the plurality of exclusion zones according to mechanical requirements of a fabrication process to be employed to manufacture the integrated circuit; and the first data set may include additional exclusion zones at corners of the first subarea adjacent to the second subarea, whereby the partial instance includes exclusion zones at respective corners of the semiconductor substrate with the partial instance formed thereon.

Additionally, an integrated circuit (e.g., including a full instance) may comprise a first plurality of circuit components physically arranged within a first area of a surface of a semiconductor substrate forming the integrated circuit; a plurality of exclusion zones at respective corners of the semiconductor substrate, wherein circuit components are excluded from the plurality of exclusion zones according to mechanical requirements of a fabrication process employed to manufacture the integrated circuit; and another plurality of exclusion zones separate from the respective corners along a pair of nominally parallel edges of the semiconductor substrate, wherein circuit components are excluded from the other plurality of exclusion zones, and wherein the other plurality of exclusion zones are dimensioned substantially the same as the plurality of exclusion zones.

FIG. 75 also illustrates the permissible locations of C4 bumps on the full instance and partial instances of the integrated circuit, shown as double cross hatched areas in FIG. 75, reference numeral G40. Areas outside of the areas indicated by the double cross hatched areas G40 may not be permissible locations for C4 bumps (e.g., exclusion zones for C4 bumps) or there may be more stringent rules for the placement of C4 bumps in those areas. The permissible locations/exclusion zones thus exist for each edge of each instance. That is, there may be C4 exclusion zones around the periphery of the full die G18, as well as on both sides of the chop lines G20A-G20B. Accordingly, a method may further comprise defining a second exclusion zone along an edge of the first subarea that is adjacent to the second subarea, wherein controlled collapse chip connection (C4) connections are excluded from the second exclusion zone. In a method of manufacture, the first data set may further include a second exclusion zone along an edge of the first subarea that is adjacent to the second subarea, wherein controlled collapse chip connection (C4) connections are excluded from the second exclusion zone. In an embodiment, an integrated circuit may comprise a second exclusion zone along a line between the plurality of exclusion zones, wherein controlled collapse chip connection (C4) connections are excluded from the second exclusion zone.

Figure 76:
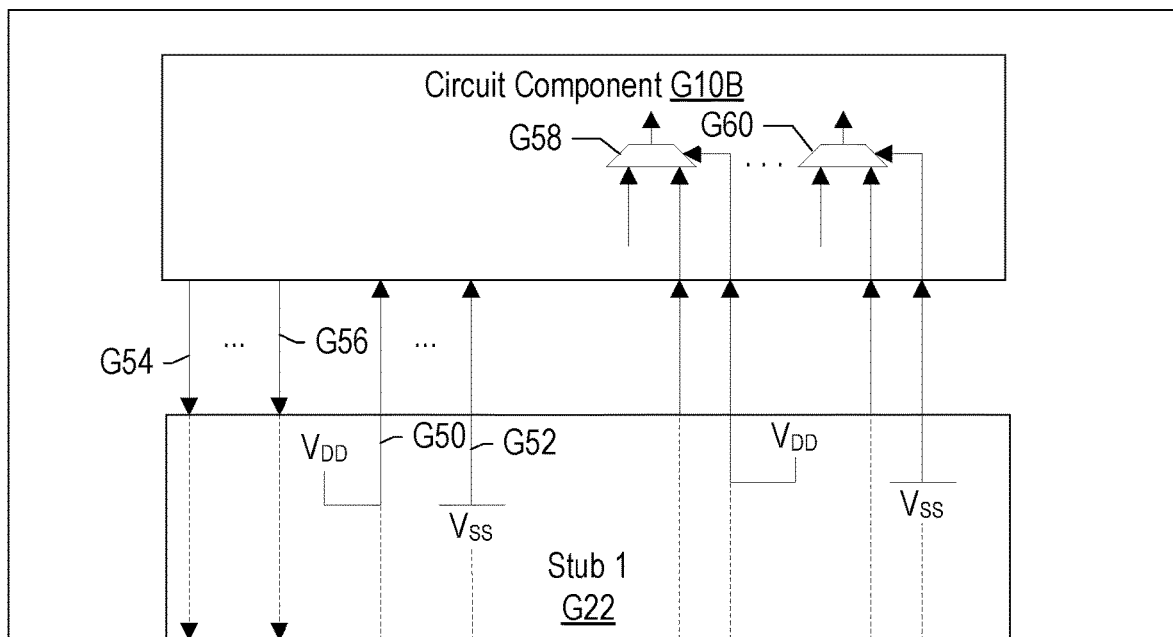
FIG. 76 is a block diagram illustrating one embodiment of a stub and a corresponding circuit component.

FIG. 76 is a block diagram illustrating one embodiment, in greater detail, of the circuit component G10B and the stub area G22 for the chip 3G embodiment shown in FIG. 70. Similar connections to the circuit component G10A may be provided as well, and the stub area G24 in FIG. 71 may be similar with the circuit components G10A-G10C. The stub area G22 may include terminations such as $V_{DD}$ terminations G50 (for inputs to be tied up, or tied to a binary one) and $V_{SS}$, or ground, terminations G52 (for inputs to be tied down, or to a binary zero) for the circuit component G10B for inputs that would be provided by a removed circuit component that is part of the full instance but not part of a partial instance, illustrated by the dotted lines in FIG. 76 from the terminations to the edge of the stub area G22. The choice of binary one or binary zero for a given termination may depend on the logical effect of the input within the circuit component G10B. Generally, the termination may be selected as whichever value will cause the receiving circuit to proceed without further input from the removed circuit component that would source the input in the full instance (e.g., as an output of the removed circuit component). The termination provides a known value when there is a lack of a driving circuit for the signal. Outputs of the circuit component G10B that would be connected to a removed circuit component may reach the stub area G22 (e.g., reference numerals G54 and G56), but may be no-connects (e.g., not connected to a receiving circuit). In the full instance, or a larger partial instance, the output wires G54 and G56 may extend through to circuit components that are not present in the partial instance (illustrated by dotted lines in FIG. 76).

Thus, the inputs that are terminated in the stub area may be wires that extend to the stub area and are oriented to intersect the edge of the integrated circuit along which the stub area is arranged. The inputs lack a circuit configured to drive the wires within the integrated circuit (e.g., the wires are driven in the full instance by the circuit components that are not present in the partial instance).

In other cases, it may be desirable to substitute a local input for an input from a removed circuit component. For example, a loop back circuit used for testing, or a ring interconnect structure, may complete the loop back/ring locally in a partial instance. To support such instances, the receiving circuit component (e.g., the circuit component G10B) may include the logic circuitry to select between the local signal and the input from the removed component. For example, in FIG. 76, the circuit component G10B may include a plurality of multiplexors (muxes) G58 and G60. Each mux G58 or G60 may be coupled to an input wire normally sourced from a circuit component that is not present in the partial instance. The input wire may reach the stub area G22 but may be a no-connect. Alternatively, the input wire may be terminated in a binary one or zero, if desired. Terminating such an input may prevent it from floating and possibly causing wasted current if the floating input is between power and ground for a significant period. The mux select wire may also be provided from the stub area G22, and may be terminated in a binary 0 ($V_{SS}$) or a binary 1 ($V_{DD}$), which may cause the mux to select the local wire. When the source circuit component of the input wire is present (e.g., in the full instance or a larger partial instance), the mux select wire may be provided from the source circuit component (dotted line in FIG. 76). In such a case, the mux select wire may be a dynamic signal that may select between the local input and the input from the source circuit component as desired during operation, or may be tied to the opposite binary value as compared to the mux select wire in the stub area G22.

Accordingly, in an embodiment of the methodology, the full instance may include the other plurality of circuit components in the second subarea, which may include a plurality of outputs that are a plurality of inputs to the plurality of circuit components in the first subarea. The plurality of circuit components may comprise a plurality of multiplexor circuits having respective ones of the plurality of inputs as inputs. The method may comprise representing, in the stub area, a plurality of select signals for the plurality of multiplexor circuits. The plurality of select signals may be terminated within the stub area with a binary value that selects a different input of the plurality of multiplexor circuits than the mux inputs to which the plurality of inputs are connected. The plurality of select signals may be terminated in the second subarea with a different binary value, in an embodiment.

In an embodiment, an integrated circuit may comprise a plurality of circuit components physically arranged on a surface of a semiconductor substrate forming the integrated circuit. The plurality of circuit components include a plurality of multiplexor circuits, wherein a given multiplexor circuit of the plurality of multiplexor circuits has a first input wire, a second input wire, and a select control wire. The integrated circuit may further comprise an area along a single edge of the surface, wherein: the area is an electrical source of the select control wire, the second input wires reach the single edge of the surface and are unconnected, and the select control wires are electrically connected to supply wires of the integrated circuit. A voltage on the supply wires during use corresponds to a digital logic level that causes the plurality of multiplexor circuits to select the first input wires as outputs of the plurality of multiplexor circuits.

Figure 77:
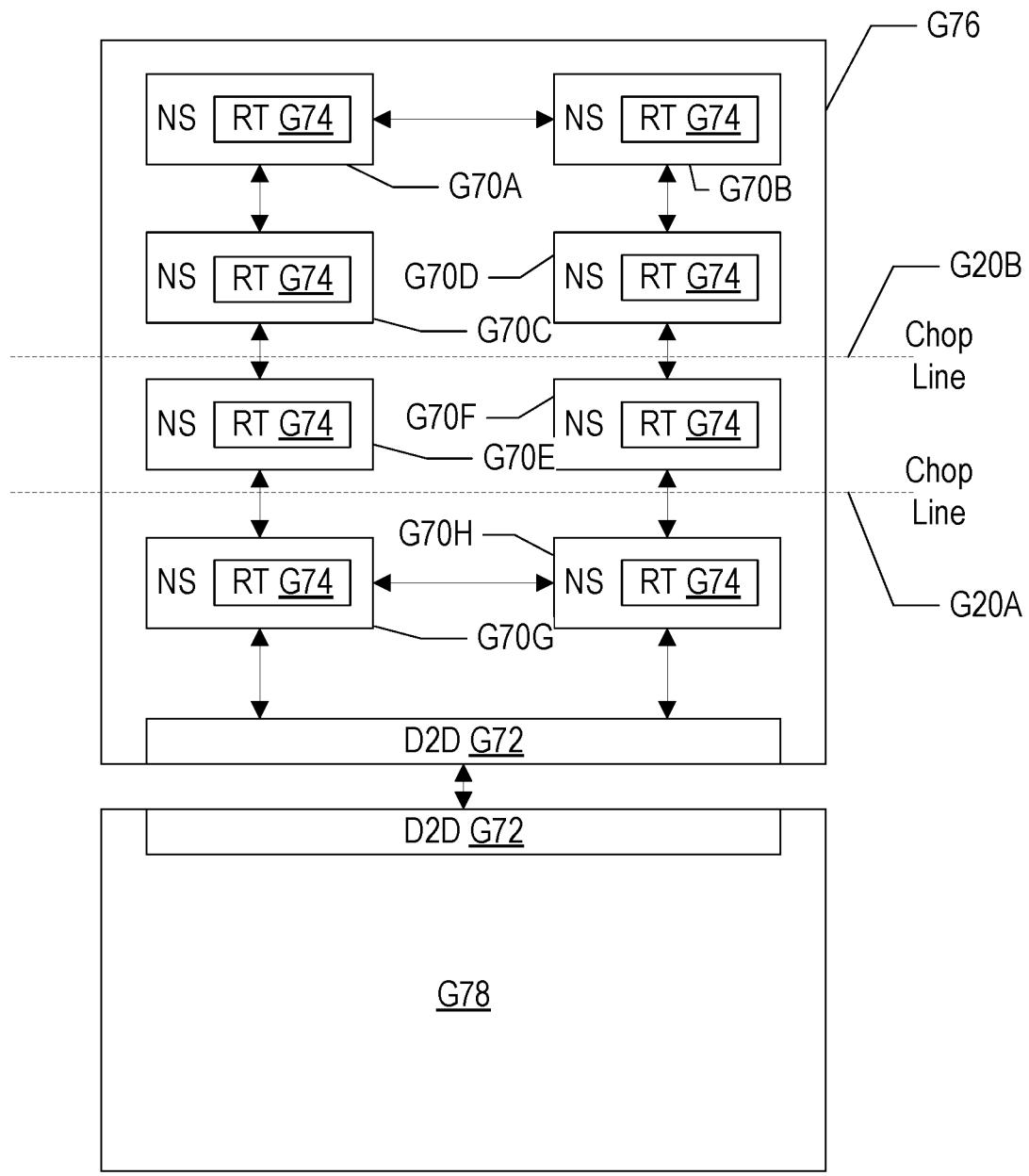
FIG. 77 is a block diagram illustrating one embodiment of a pair of integrated circuits and certain additional details of the pair of integrated circuits.

Turning now to FIG. 77, a block diagram of one embodiment of a pair of integrated circuits G76 and G78, which may be full instances of the chip G18, is shown. The chop lines G20A-G20B are shown for the integrated circuit G76, and certain additional details of the integrated circuit G76 are shown for an embodiment. In particular, the integrated circuit G76 may include a plurality of network switches G70A-G70H which may be part of a communication network in the integrated circuit G76. The communication network may be an example of circuit components, and may be configured to provide communication between other circuit components (e.g., processors, memory controllers, peripherals, etc.).

The network switches G70A-G70H may be coupled to each other using any topology, such as ring, mesh, star, etc. When a given communication message, or packet, is received in a network switch G70A-G70H, the network switch G70A-G70H may determine which output the packet is to be transmitted on to move the packet toward its destination. The direction may depend on which instance of the integrated circuit the network switches have been fabricated. For example, if the full instance is fabricated, a given network switch such as the network switch G70E may transmit a packet either upward or downward as shown in FIG. 77 (or, if another circuit component, not shown, coupled to the network switch G70E is a target of the packet, the network switch G70E may transmit the packet to that circuit component). However, if a partial instance is formed based on the chop line G20A, the network switch G70E may not transmit packets downward because there is no receiving circuit there. Similarly, network switch G70F may not transmit packets downward in that scenario. If a partial instance is formed by based on the chop line G20B, the network switches G70C and G70D may not transmit packets in the downward direction.

Accordingly, the operation of at least some of the network switches G70A-G70H may depend on the instance. There may be multiple ways to manage the differences. For example, an input to the switches may specify the instance (output by the stub areas or by a circuit component in the area below the chop line 20B for the full instance). In the illustrated embodiment, a routing table or other programmable resource G74 may be included in each network switch 70A-70H. The routing table G74 may be programmed at initialization (e.g., by boot code or other firmware) based on the instance that is in place.

Similarly, various instances may have different numbers of memory controllers (e.g., the circuit components in the removed subareas may include memory controllers, and there may be additional memory controllers in the remaining subareas). The memory address space may be mapped onto the memory controllers, and thus the mapping may change based on the number of memory controllers actually existing in a given full or partial instance. The network switches G70A-G70H that carry memory operation packets may be programmable with data describing the address mapping using a programmable resource as well. Other circuit components that may need to be informed of the address mapping to operate properly may similarly have a programmable resource.

In the illustrated embodiment, the pair of integrated circuits G76 and G78 may be configured to communicate with each other and act is if they were one integrated circuit die. For example, the network switches G70A-G70H on each integrated circuit G76 and G78 may be configured to communicate over a die to die (D2D) interface circuit G72 to form one communication interconnect across the integrated circuits G76 and G78. Thus, a packet originating on either integrated circuit die may have a destination on the other integrated circuit die and may be transmitted to the target, via the D2D interface circuits G72, seamlessly and thus essentially not visible to software executing in the system. The D2D interface circuits G72 may be examples of the D2D circuit 26 shown in FIG. 1.

Since the partial instances of the integrated circuit is including less than a full instance of circuitry, one of the component circuits that may be removed from each of the partial instances is the D2D interface circuit G72. That is, the D2D interface circuit G72 may be instantiated in the subarea that is removed from each of the partial instances (e.g., below the chop line G20A in the illustrated embodiment).

Figure 78:
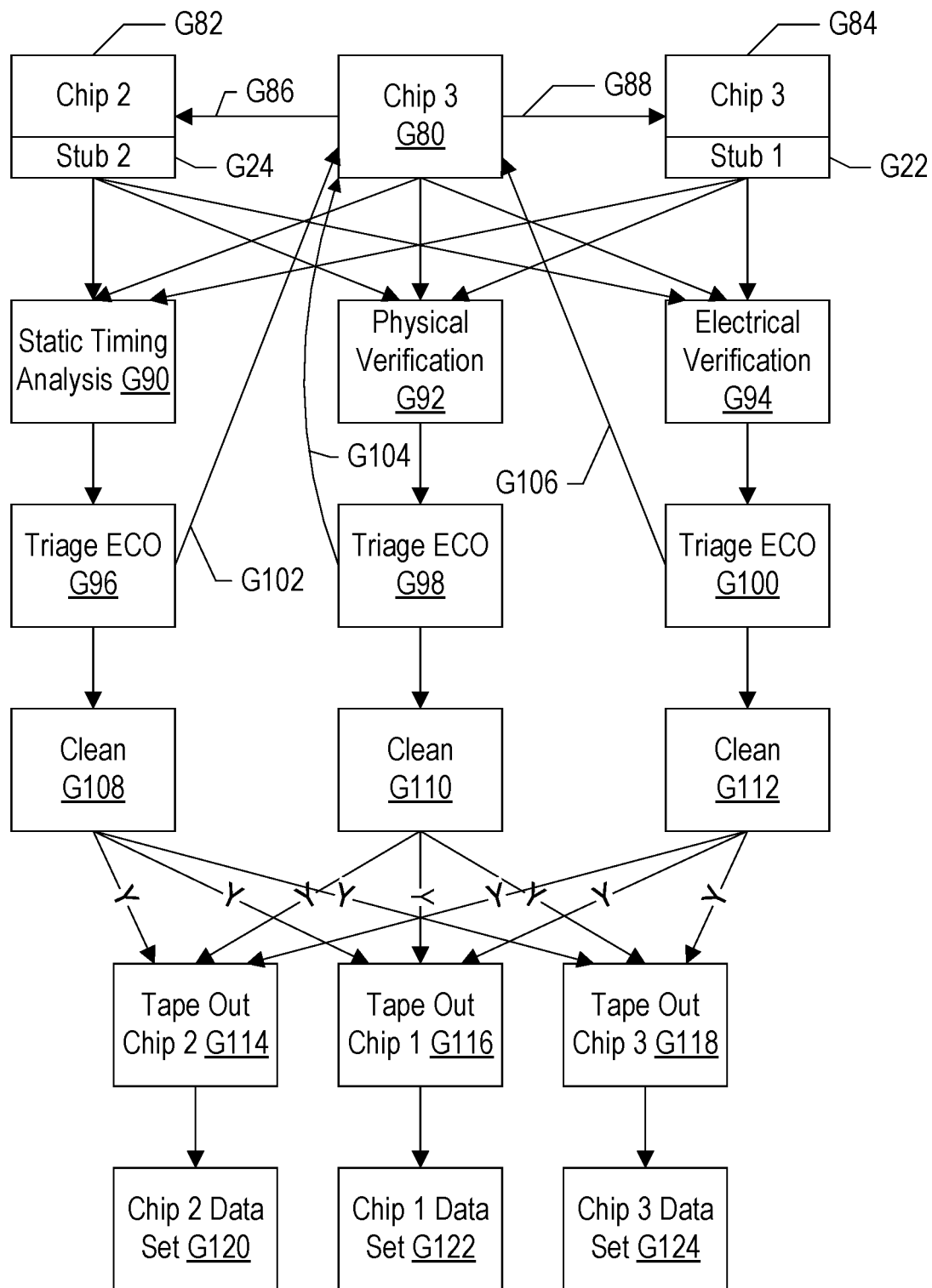
FIG. 78 is a flow diagram illustrating one embodiment of an integrated circuit design methodology.

FIG. 78 is a flow diagram illustrating various portions of the design and validation/verification methodology for one embodiment of an integrated circuit that supports full and partial instances. The design database for the full instance is shown at the top center of FIG. 78 (reference numeral G80). The design databases for the partial instances are shown to the left and right of the full instance (reference numerals G82 and G84). The design databases G82 and G84 draw the content for the subareas forming those integrated circuits from the design database G80, as indicated by the arrows G86 and 88, along with the corresponding stub areas G22 and G24 as shown in FIG. 78.

The databases G80, G82, and G84 may be analyzed using static timing analysis to verify that the designs meet timing requirements (block G90), physical verification to verify that the designs meet various physical design rules (block G92), and electrical verification to verify that the designs (along with the package to be used for each design, which may vary between the full and partial instances) meeting electrical requirements such as power grid stability, impedance, etc. (block G94). The physical design rules may include features such as minimum spacings between devices and/or wiring in the wiring layers, device sizes, etc. The physical design rules may also include the corner exclusion, C4 bump exclusions, etc. as mentioned above. Additionally, in an embodiment, there may be additional "antenna" rules to be dealt with because of the outputs from circuit components that are no-connects in the partial instances.

The results of the various verification steps may be reviewed and triaged for design changes (engineering change orders, or ECOs) that may be expected to improve the results in subsequent runs of the various verifications (Triage ECO blocks G96, G98, and G100). The ECOs may be implemented in the design database G80 (arrows G102, G104, and G106), regardless of which instance resulted in the ECO. Thus, the design database G80 may be somewhat overdesigned if the worst case correction needed in the design resulted from one of the partial instances. The design databases G82 and G84 may be extracted from the design database G80 after the changes are made to update the partial instances, in cases where changes were made in a subarea included in the partial instances.

Once the various verifications are completed (clean blocks G108, G110, and G112), tape outs may be performed for the full instance and the partial instances (blocks G114, G116, and G118), resulting in the data sets for each instance (blocks G120, G122, and G124).

There may be additional analysis and design flows in various embodiments, but similarly any ECOs identified by the various design efforts may be implemented in the full instance design database G80 and then extract to the partial design databases G82 and G84.

Another area the integrated circuit design methodology that may be impacted by the support for full and partial instances of an integrated circuit design is design validation (DV). DV generally includes testing an integrated circuit design, or portion thereof such as a given circuit component, to ensure that the design operates as expected and meets the functional and/or performance requirements for the design. For example, DV may include defining a test bench to stimulate the design and measure operation against expected results. The test bench may include, for example, additional HDL code describing the stimulus. To avoid significant rework and additional resources to perform DV on all instances of the design, a configurable test bench environment may be defined that covers each instance. At the component level, reproduction of chip-level differences among the instances may be used to test the components.

Figure 79:
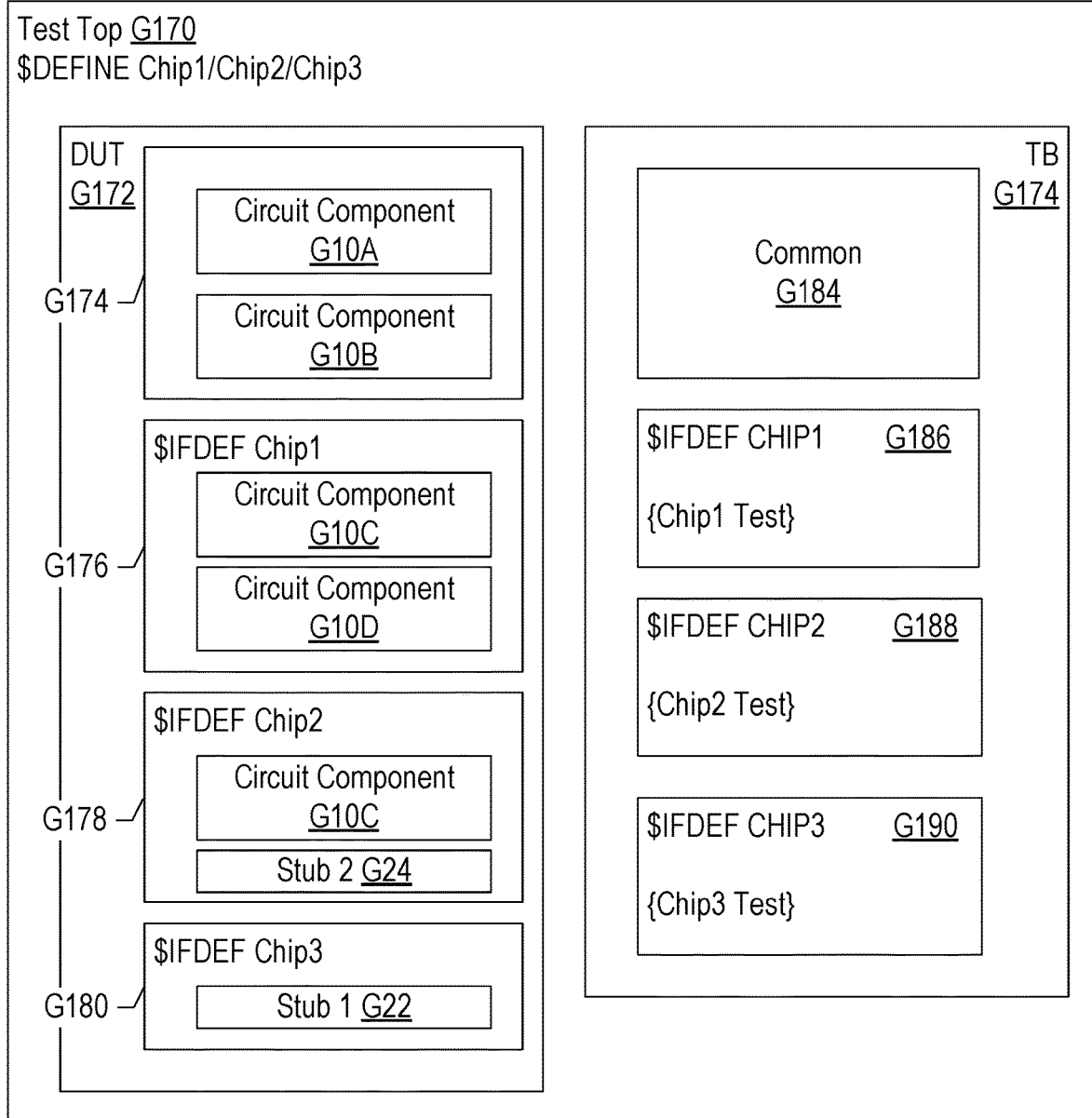
FIG. 79 is a block diagram illustrating a test bench arrangement for testing the full and partial instances.

FIG. 79 is a block diagram illustrating one embodiment of a test bench arrangement for chip-level DV. The test bench may include a test top level G170 that may include a define statement ($DEFINE) which can be selected to be Chip1 (full instance), Chip2 (partial instance), or Chip3 (partial instance) in this example. That is, for a given simulation, the $DEFINE statement may be set to the instance being tested (one of the labels Chip1, Chip2, or Chip3). The test top level G170 may further include the device under test (DUT) G172 (e.g., the integrated circuit in its partial and full instances) and a test bench (TB) G174.

The DUT G172 may include the portion of the integrated circuit that is included in each of the instances (e.g., circuit components G10A-G10B in this example, that are common to each instance). The common portion G176 may be unconditionally included in the DUT G172 for a given simulation. One of three additional portions may be conditionally included depending on which instance is being tested in the given simulation. For example, in Chip 1 is being tested (and thus the $DEFINE statement recites Chip1), the other circuit components G10C-G10D may be included (reference numeral G178). If Chip 2 is being tested (and thus the $DEFINE statement recites Chip2), the circuit component G10C and the stub G24 may be included (reference numeral G180). If Chip 3 is being tested (and thus the $DEFINE statement recites Chip3), the stub G22 may be included (reference numeral G182).

The test bench G174 may similarly be configurable based on the $DEFINE statement. The test bench G174 may include a common portion G184 that corresponds to the common portion G176 (e.g., stimulus for the common portion G176). Other portions G184, G186, or G188 may be selectively included based on the $DEFINE statement reciting Chip1, Chip2, and Chip3 respectively. The stimulus for the corresponding portions G178, G180, and G182, respectively may be included. That is, the stimulus for the combination of circuit components G10C-G10D may be included in portion G186; the stimulus for the combination of circuit component G10C and the stub G24 may be included in portion G188; and the stimulation for the stub G22 may be included in portion G190. In an embodiment, since the stub G22 may not include any active circuitry, the portion G190 may be omitted. Alternatively, differences in operation in the common portion G176 may be captures in the portion G190.

Thus, the same overall setup of the test top level G170 allows for the simulation of any instance of the design with only the change of the $DEFINE statement to select the design.

Figure 80:
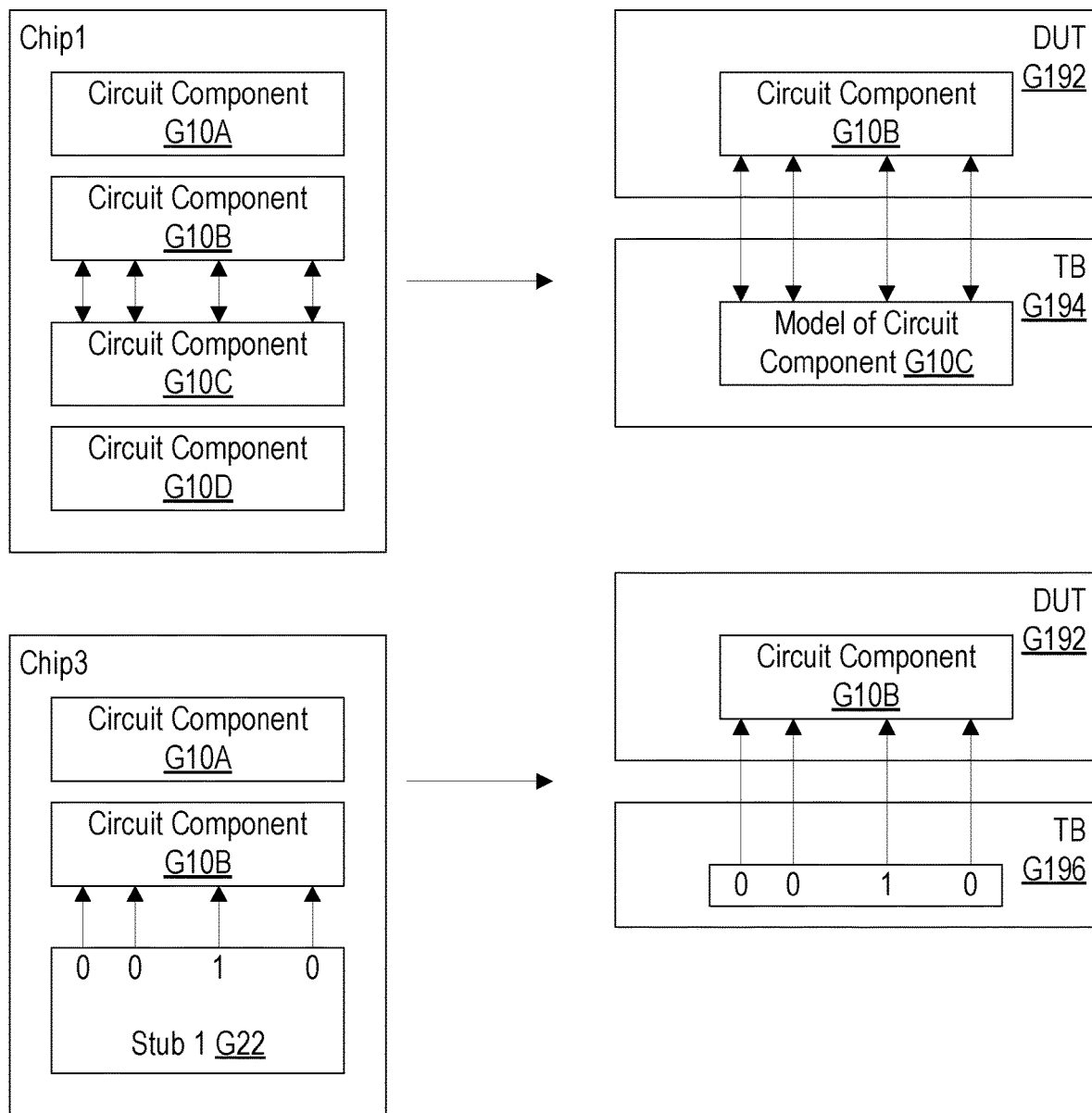
FIG. 80 is a block diagram illustrating a test bench arrangement for component-level testing.

FIG. 80 illustrates an example of circuit component-level testing via replication. In the example, chip 1 is shown with certain inputs/outputs (e.g., an interface) between the circuit component G10C and the circuit component G10B. Other interfaces between other ones of the circuit components G10A and G10D and received by the circuit component G10B but they are not illustrated in FIG. 80 for simplicity.

A test arrangement for the circuit component G10B may thus include the circuit component G10B in the DUT (reference numeral G192). The interface between the circuit component G10B and the circuit component G10C may be modeled via a model of the circuit component G10C in the test bench G194. The model may be a behavioral model of the circuit component G10C. Alternatively, the model may be a bus function model of the circuit component G10C, the faithfully reproduces operation of the circuit component G10C on the interface but may omit many internal operations. Any model may be used. The test arrangement may be duplicated to test the chip 3 arrangement, for example, in which the stub G22 is included to tie up and tie down various input signals to the circuit component G10B on the interface that were sourced from the circuit component G10C. The reproduced arrangement many include the DUT G192 and a test bench G196 that instantiates the tie ups and tie downs of the stub G22.

In an embodiment, design integration (DI) may be modified as well. Design integration may include the process of connecting the various circuit components G10A-G10D, providing any needed "glue logic" that may allow correct communication between the circuit components G10A-G10D, etc. Various configuration may change when different instances of the integrated circuit are taped-out. For example, routing of packets via the network switches G70A-G70H (or the subsets of the switches included in a given instance) may depend on the instance. The programming of the routing tables G74 may thus change based on the instance. Other behaviors of the design may change as well, such as power management. Fuses may be uses to identify the instance, and thus the programming of the routing tables G74 or various configuration registers in other circuit components G10A-G10D if the behavior are not adequately controlled by pullups and pull downs in the stubs G22 or G24. The fuses may be part of the stubs, or may be included in the circuit components G10A-GG10D and may be selectively blown for a given instance.

Figure 81:
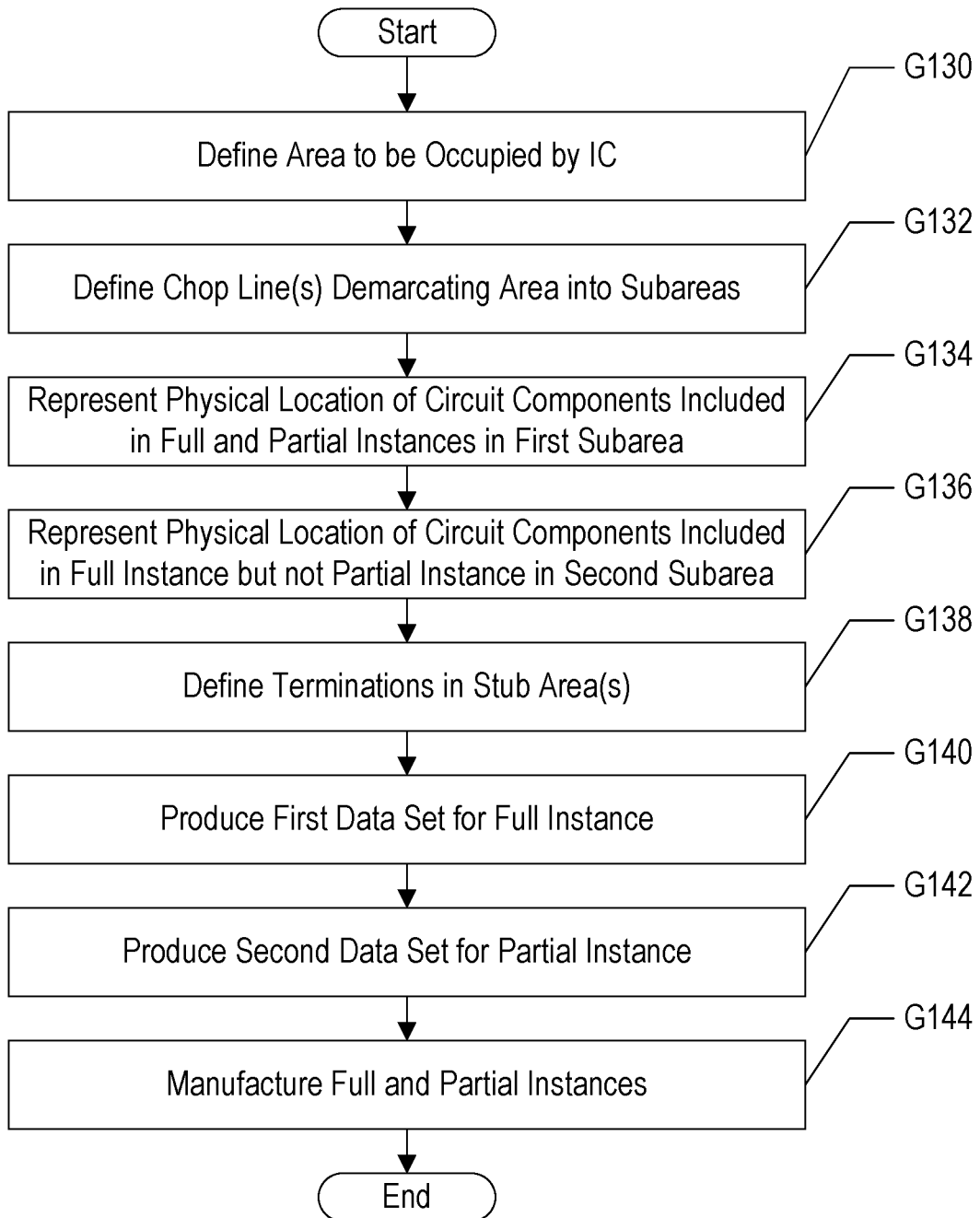
FIG. 81 is a flowchart illustrating one embodiment of a design and manufacturing method for an integrated circuit.

FIG. 81 is a flowchart illustrating one embodiment of a design and manufacturing method for an integrated circuit. While the blocks are shown in a particular order for ease of understanding, other orders may be used. Blocks that are independent may be performed in parallel.

The method may comprise defining, in a design database corresponding to an integrated circuit design, an area to be occupied by the integrated circuit design when fabricated on a semiconductor substrate (block G130). The method may further comprise defining a chop line, or more than one chop line as desired. The chop line may demarcate the area into a first subarea and a second subarea, wherein a combination of the first subarea and the second subarea represents a full instance of the integrated circuit, and wherein the first subarea and a stub area represents a partial instance of the integrated circuit that includes fewer circuit components than the full instance (block G132). The method may further comprise representing, in the design database, a physical location of a plurality of circuit components included in both the full instance and the partial instance of the integrated circuit in the first subarea (block G134). In an embodiment, a relative location of the plurality of circuit components within the first subarea and the interconnect of the plurality of circuit components within the first subarea is unchanged in the full instance and the partial instance. The method may further comprise representing, in the design database, a physical location of another plurality of circuit components included in the full instance but excluded from the partial instance in the second subarea (block G136). The method may further comprise defining, in the stub area in the design database, terminations for wires that would otherwise traverse the chop line between the first and second subareas, ensuring correct operation of the plurality of circuit components in the first subarea in the absence of the second subarea in the partial instance (block G138). The method may further comprise producing a first data set for the full instance using the first subarea and the second subarea (block G140). The first data set may define the full instance for manufacturing the full instance. The method may further comprise producing a second data set for the partial instance using the first subarea and the stub area, the second data set defining the partial instance for manufacture of the partial instance (block G142). The method may further comprise manufacturing full and partial instances based on the first and second data sets, respectively (block G144).

In an embodiment, the stub area may exclude circuitry. For example, the stub area may include only wiring in one or more metallization layers above a surface area of the semiconductor substrate. In an embodiment, the other plurality of circuit components in the second subarea may include a plurality of outputs that are a plurality of inputs to the plurality of circuit components in the first subarea. The plurality of circuit components may comprise a plurality of multiplexor circuits having respective ones of the plurality of inputs as inputs. The method may further comprise representing, in the stub area, a plurality of select signals for the plurality of multiplexor circuits. The plurality of select signals may be terminated within the stub area with a binary value that selects a different input of the plurality of multiplexor circuits than the inputs to which the plurality of inputs are connected. The plurality of select signals may be terminated in the second subarea with a different binary value.

In an embodiment, the method may further comprise defining a plurality of exclusion zones at respective corners of the semiconductor substrate. Circuit components may be excluded from the plurality of exclusion zones according to mechanical requirements of a fabrication process to be employed to manufacture the integrated circuit. The method may still further comprise defining additional exclusion zones at corners of the first subarea adjacent to the chop line, whereby the partial instance includes exclusion zones at respective corners of the semiconductor substrate with the partial instance formed thereon.

In an embodiment, the method may further comprise defining a second exclusion zone along an edge of the first subarea that is adjacent to the second subarea. Controlled collapse chip connection (C4) connections may be excluded from the second exclusion zone. In an embodiment, the method may further comprise defining, in the first subarea, one or more first analog inputs; and defining, in the second subarea, one or more second analog inputs. The one or more first remain within the first subarea and the one or more second analog inputs remain within the second subarea. In an embodiment, the method may comprise defining, in the first subarea, one or more first clock trees to distribute clocks within the first subarea; and defining, in the second subarea, one or more second clock trees to distributed clocks with the second subarea. The one or more first clock trees may be electrically isolated from the one or more second clock trees in the full instance. In an embodiment, the method may further comprise defining, in the design database, a second chop line in the second subarea. The second chip line may divide the second subarea into a third subarea and a fourth subarea, wherein the third subarea is adjacent to the first subarea. The third subarea and the first subarea may represent a second partial instance of the integrated circuit. The method may further comprises producing a third data set for the second partial instance using the first subarea, the third subarea, and a second stub area. The third data set may define the second partial instance for manufacture of the second partial instance.

Figure 82:
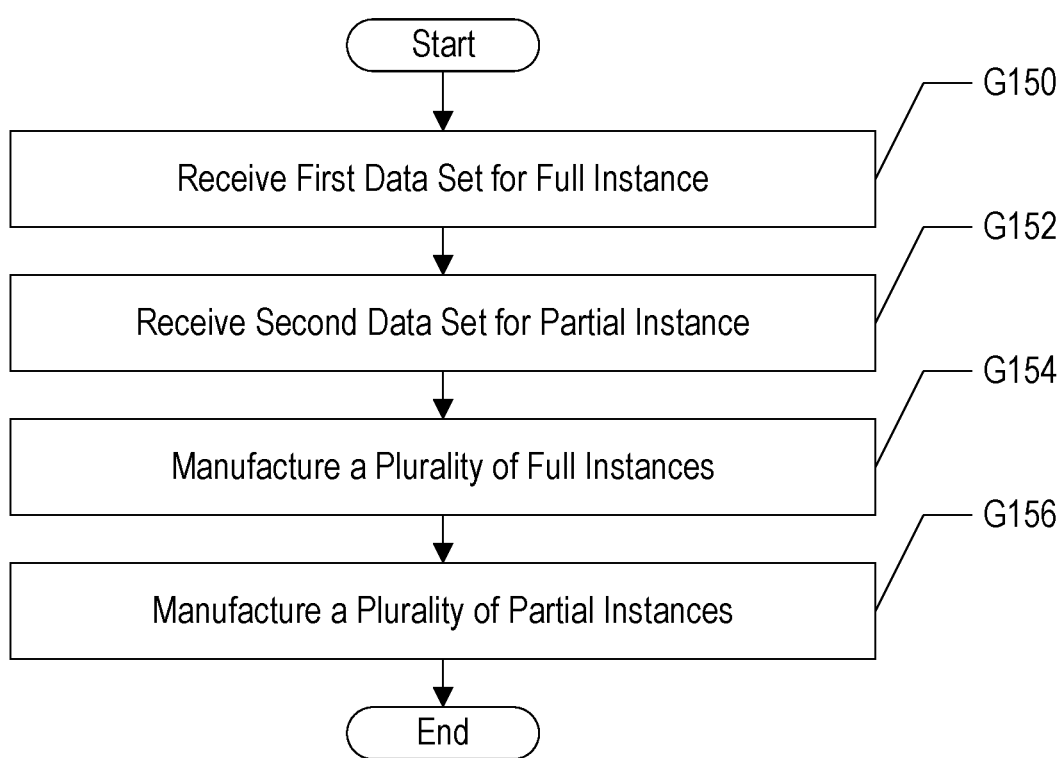
FIG. 82 is a flowchart illustrating one embodiment of a method to manufacture integrated circuits.

FIG. 82 is a flowchart illustrating one embodiment of a method to manufacture integrated circuits. While the blocks are shown in a particular order for ease of understanding, other orders may be used. Blocks that are independent may be performed in parallel.

In an embodiment, a method may comprise receiving a first data set for a full instance of an integrated circuit design (block G150). The first data set may define the full instance for manufacturing the full instance. The full instance may include a first plurality of circuit components physically located in a first subarea of an area occupied on a semiconductor substrate by the full instance and a second plurality of circuit components physically located in a second subarea of the area occupied on the semiconductor substrate by the full instance. The method may further comprise receiving a second data set for a partial instance of the integrated circuit design (block G152). The second data set may define the partial instance for manufacturing the partial instance. The partial instance may include the first plurality of circuit components in the first subarea, wherein a relative location of the first plurality of circuit components within the first subarea and the interconnect of the first plurality of circuit components within the first subarea is unchanged in the full instance and the partial instance. The partial instance may further include a stub area adjacent to the first subarea, wherein the stub area includes terminations for wires that would otherwise interconnect components in the first and second subareas, ensuring correct operation of the first plurality of circuit components in the first subarea in the absence of the second subarea in the partial instance. The method may further comprise manufacturing a first plurality of the full instance of the integrated circuit based on the first data set (block G154); and manufacturing a second plurality of the partial instance of the integrated circuit based on the second data set (block G156).

In an embodiment, the stub area excludes circuitry. For example, the stub area may include only wiring in one or more metallization layers above a surface area of the semiconductor substrate. In an embodiment, the other plurality of circuit components in the second subarea include a plurality of outputs that are a plurality of inputs to the first plurality of circuit components in the first subarea; and the first plurality of circuit components comprise a plurality of multiplexor circuits having respective ones of the plurality of inputs as inputs. The stub area may further comprise a plurality of select signals for the plurality of multiplexor circuits. In an embodiment, the plurality of select signals are terminated within the stub area with a binary value that selects a different input of the plurality of multiplexor circuits than the inputs to which the plurality of inputs are connected. The plurality of select signals may be terminated in the second subarea with a different binary value in the full instance.

In an embodiment, the first data set may include a plurality of exclusion zones at respective corners of the semiconductor substrate. Circuit components may be excluded from the plurality of exclusion zones according to mechanical requirements of a fabrication process to be employed to manufacture the integrated circuit. The first data set may further include additional exclusion zones at corners of the first subarea adjacent to the second subarea, whereby the partial instance includes exclusion zones at respective corners of the semiconductor substrate with the partial instance formed thereon. In an embodiment, the first data set may further include a second exclusion zone along an edge of the first subarea that is adjacent to the second subarea, wherein controlled collapse chip connection (C4) connections are excluded from the second exclusion zone. In an embodiment, the first data set may further include one or more first analog inputs in the first subarea and one or more second analog inputs in the second subarea. The one or more first analog inputs may remain with the first subarea; and the one or more second analog inputs remain within the second subarea. In an embodiment, the first data set may further comprise one or more first clock trees to distribute clocks within the first subarea and one or more second clock trees to distributed clocks with the second subarea, and wherein the one or more first clock trees are electrically isolated from the one or more second clock trees in the full instance.

Computer System

Turning next to, a block diagram of one embodiment of a system 700 is shown. In the illustrated embodiment, the system 700 includes at least one instance of a system on a chip (SOC) 10 coupled to one or more peripherals 704 and an external memory 702. A power supply (PMU) 708 is provided which supplies the supply voltages to the SOC 10 as well as one or more supply voltages to the memory 702 and/or the peripherals 154. In some embodiments, more than one instance of the SOC 10 may be included (and more than one memory 702 may be included as well). The memory 702 may include the memories 12A-12m illustrated in FIG. 1, in an embodiment.

The peripherals 704 may include any desired circuitry, depending on the type of system 700. For example, in one embodiment, the system 700 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 10 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

Figure 83:
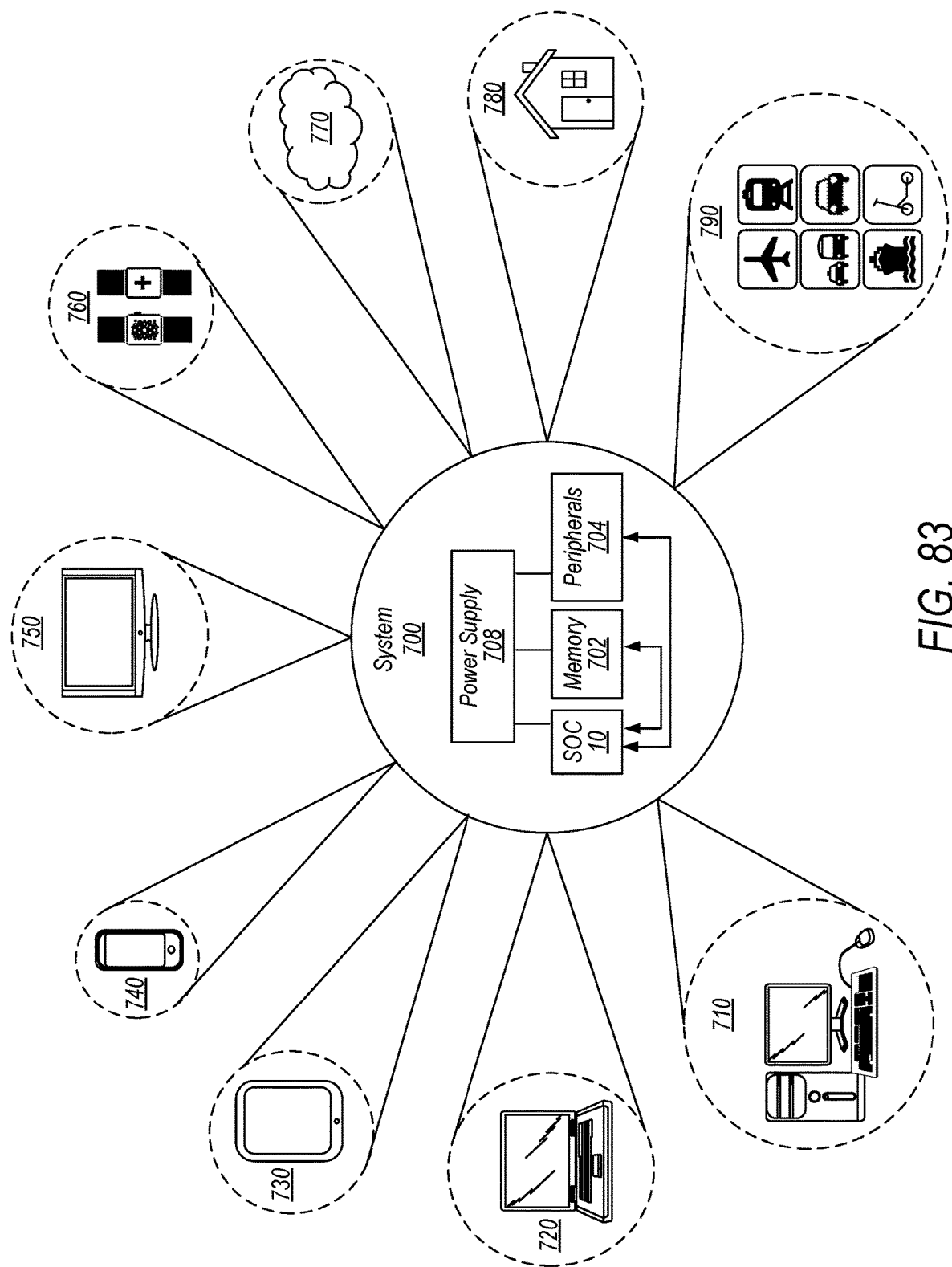
FIG. 83 is a block diagram one embodiment of a system.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 83 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 83 are illustrative only and are not intended to be limiting. Other devices are possible and are contemplated.

Computer Readable Storage Medium

Figure 84:
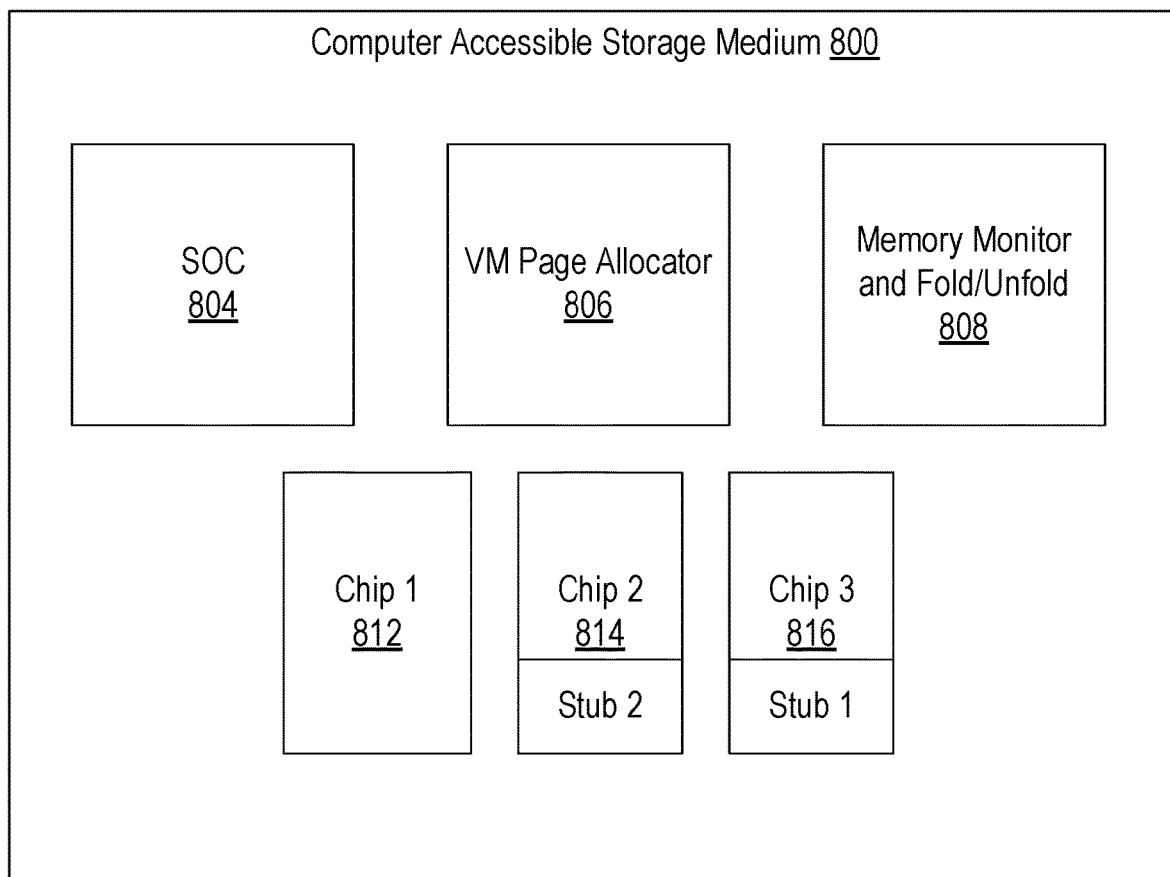
FIG. 84 is a block diagram of one embodiment of a computer accessible storage medium.

Turning now to FIG. 84, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 84 may store a database 804 representative of the SOC 10. Generally, the database 804 may be a database which can be read by a program and used, directly or indirectly, to fabricate the hardware comprising the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 804 on the computer accessible storage medium 800 may be the netlist (with or without the synthesis library) or the data set, as desired.

While the computer accessible storage medium 800 stores a representation of the SOC 10, other embodiments may carry a representation of any portion of the SOC 10, as desired, including any of the various embodiments described above with regard to FIGS. 1-82, and any combination or subset of the embodiment described above.

As illustrated in FIG. 84, the computer accessible storage medium 800 may further store one or more of a virtual memory page allocator 806 and memory monitor and fold/unfold code 808. The virtual memory page allocator 806 may comprise instructions which, when executed on a computer such as the various computer systems described herein including one or more SOCs F10 (and more particularly executed on a processor in one or more of the P clusters F14A-F14B), cause the computer to perform operations including those described above for the virtual memory page allocator (e.g., with respect to FIGS. 63-66). Similarly, memory monitor and fold/unfold code F808 may comprise instructions which, when executed on a computer such as the various computer systems described herein including one or more SOCs F10 (and more particularly executed on a processor in one or more of the P clusters F14A-F14B), cause the computer to perform operations including those described above for the memory monitor and fold/unfold code (e.g., with respect to FIGS. 63-66).

Also as illustrated in FIG. 68, the computer accessible storage medium 800 in FIG. 15 may store databases 812, 814, and 816 representative of the full instance of the integrated circuit G18 and the partial instances of the integrated circuit G18. Similar to the database 802, each of the databases 812, 814, and 816 may be a database which can be read by a program and used, directly or indirectly, to fabricate the hardware comprising the instances.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Additional details of various embodiments are set forth in the following examples:

1. A system, comprising:
   a plurality of processor cores;
   a plurality of graphics processing units;
   a plurality of peripheral devices distinct from the processor cores and graphics processing units;
   one or more memory controller circuits configured to interface with a system memory; and
   an interconnect fabric configured to provide communication between the one or more memory controller circuits and the processor cores, graphics processing units, and peripheral devices;
   wherein the processor cores, graphics processing units, peripheral devices and memory controllers are configured to communicate via a unified memory architecture.

2. The system of example 1, wherein the processor cores, graphics processing units, and peripheral devices are configured to access any address within a unified address space defined by the unified memory architecture.

3. The system of example 2, wherein the unified address space is a virtual address space distinct from a physical address space provided by the system memory.

4. The system of any of examples 1-3 wherein the unified memory architecture provides a common set of semantics for memory access by the processor cores, graphics processing units, and peripheral devices.

5. The system of example 4 wherein the semantics include memory ordering properties.

6. The system of examples 4 or 5 wherein the semantics include quality of service attributes.

7. The system of any of examples 4-6 wherein the semantics include cache coherency.

8. The system of any preceding example, wherein the one or more memory controller circuits include respective interfaces to one or more memory devices that are mappable of random access memory.

9. The system of example 8 wherein one or more memory devices comprise dynamic random access memory (DRAM).

10. The system of any preceding example, further comprising one or more levels of cache between the processor cores, graphics processing units, peripheral devices, and the system memory.

11. The system as recited in example 10 wherein the one or more memory controller circuits include respective memory caches interposed between the interconnect fabric and the system memory, wherein the respective memory caches are one of the one or more levels of cache.

12. The system of any preceding example, wherein the interconnect fabric comprises at least two networks having heterogeneous interconnect topologies.

13. The system of any preceding example, wherein the interconnect fabric comprises at least two networks having heterogeneous operational characteristics.

14. The system of example 12 or 13, wherein the at least two networks include a coherent network interconnecting the processor cores and the one or more memory controller circuits.

15. The system of any of examples 12-14, wherein the at least two networks include a relaxed-ordered network coupled to the graphics processing units and the one or more memory controller circuits.

16. The system of example 15, wherein the peripheral devices include a subset of devices, wherein the subset includes one or more of a machine learning accelerator circuit or a relaxed-order bulk media device, and wherein the relaxed-ordered network is further coupled to the subset of devices to the one or more memory controller circuits.

17. The system of any of examples 12-16, wherein the at least two networks include an input-output network coupled to interconnect the peripheral devices and the one or more memory controller circuits.

18. The system of example 17, wherein the peripheral devices include one or more real-time devices.

19. The system of any of examples 12-18 wherein the at least two networks comprise a first network that comprises one or more characteristics to reduce latency compared to a second network of the at least two networks.

20. The system of example 19 wherein the one or more characteristics comprise a shorter route than the second network.

21. The system of example 19 or 20 wherein the one or more characteristics comprise wiring in metal layers the have lower latency characteristics than the wiring for the second network.

22. The system of any of examples 12-21 wherein the at least two networks comprise a first network that comprises one or more characteristics to increase bandwidth compared to a second network of the at least two networks.

23. The system of example 22 wherein the one or more characteristics comprise wider interconnect compared to the second network.

24. The system of example 22 or 23 wherein the one or more characteristics comprise wiring in metal layers that are more dense than the metal layers used for the wiring for the second network.

25. The system of any of examples 12-24, wherein the interconnect topologies employed by the at least two networks include at least one of a star topology, a mesh topology, a ring topology, a tree topology, a fat tree topology, a hypercube topology, or a combination of one or of the topologies.

26. The system of any of examples 12-25, wherein the operational characteristics employed by the at least two networks include at least one of strongly-ordered memory coherence or relaxed-ordered memory coherence.

27. The system of any of examples 12-26 wherein the at least two networks are physically and logically independent.

28. The system of any of examples 12-27 wherein the at least two networks are physically separate in a first mode of operation, and wherein a first network of the at least two networks and a second network of the at least two networks are virtual and share a single physical network in a second mode of operation.

29. The system of any preceding example, wherein the processor cores, graphics processing units, peripheral devices, and interconnect fabric are distributed across two or more integrated circuit dies.

30. The system of example 29, wherein a unified address space defined by the unified memory architecture extends across the two or more integrated circuit dies in a manner transparent to software executing on the processor cores, graphics processing units, or peripheral devices.

31. The system of any of examples 29-30 wherein the interconnect fabric extends across the two or more integrated circuit dies and wherein a communication is routed between a source and a destination transparent to a location of the source and the destination on the integrated circuit dies.

32. The system of any of examples 29-31 wherein the interconnect fabric extends across the two integrated circuit dies using hardware circuits to automatically route a communication between a source and a destination independent of whether or not the source and destination are on the same integrated circuit die.

33. The system of any of examples 29-32, further comprising at least one interposer device configured to couple buses of the interconnect fabric across the two or integrated circuit dies.

34. The system of any of examples 1-33 wherein a given integrated circuit die includes a local interrupt distribution circuit to distribute interrupts among processor cores in the given integrated circuit die.

35. The system of example 34 comprising two or more integrated circuit dies that include respective local interrupt distribution circuits and at least one of the two or more integrated circuit dies includes a global interrupt distribution circuit, wherein the local interrupt distribution circuits and the global interrupt distribution circuit implement a multi-level interrupt distribution scheme.

36. The system of example 35 wherein the global interrupt distribution circuit is configured to transmit an interrupt request to the local interrupt distribution circuits in a sequence, and wherein the local interrupt distribution circuits are configured to transmit the interrupt request to local interrupt destinations in a sequence before replying to the interrupt request from the global interrupt distribution circuit.

37. The system of any of examples 1-36 wherein a given integrated circuit die comprises a power manager circuit configured to manage a local power state of the given integrated circuit die.

38. The system of example 37 comprising two or more integrated circuit dies that include respective power manager circuits configured to manage the local power state of the integrated circuit die, and wherein at least one of the two or more integrated circuit die includes another power manager circuit configured to synchronize the power manager circuits.

39. The system of any preceding example, wherein the peripheral devices include one of more of: an audio processing device, a video processing device, a machine learning accelerator circuit, a matrix arithmetic accelerator circuit, a camera processing circuit, a display pipeline circuit, a nonvolatile memory controller, a peripheral component interconnect controller, a security processor, or a serial bus controller.

40. The system of any preceding example, wherein the interconnect fabric interconnects coherent agents.

41. The system of example 40, wherein an individual one of the processor cores corresponds to a coherent agent.

42. The system of example 40, wherein a cluster of processor cores corresponds to a coherent agent.

43. The system of any preceding example, wherein a given one of the peripheral devices is a non-coherent agent.

44. The system of example 43, further comprising an input/output agent interposed between the given peripheral device and the interconnect fabric, wherein the input/output agent is configured to enforce coherency protocols of the interconnect fabric with respect to the given peripheral device.

45. The system of example 44 wherein the input/output agent ensures the ordering of requests from the given peripheral device using the coherency protocols.

46. The system of example 44 or 45 wherein the input/output agent is configured to couple a network of two or more peripheral devices to the interconnect fabric.

47. The system of any preceding example, further comprising hashing circuitry configured to distribute memory request traffic to system memory according to a selectively programmable hashing protocol.

48. The system of example 47 wherein at least one programming of the programmable hashing protocol evenly distributes a series of memory requests over a plurality of memory controllers in the system for a variety of memory requests in the series.

49. The system of example 29, wherein at least one programming of the programmable hashing protocol distributes adjacent requests within the memory space, at a specified granularity, to physically distant memory interfaces.

50. The system of any preceding example further comprising a plurality of directories configured to track a coherency state of subsets of the unified memory address space, wherein the plurality of directories are distributed in the system.

51. The system of example 51 wherein the plurality of directories are distributed to the memory controllers.

52. The system of any preceding example wherein a given memory controller of the one or more memory controller circuits comprises a directory configured to track a plurality of cache blocks that correspond to data in a portion of the system memory to which the given memory controller interfaces, wherein the directory is configured to track which of a plurality of caches in the system are caching a given cache block of the plurality of cache blocks, wherein the directory is precise with respect to memory requests that have been ordered and processed at the directory even in the event that the memory requests have not yet completed in the system.

53. The system of any of examples 50-52 wherein the given memory controller is configured to issue one or more coherency maintenance commands for the given cache block based on a memory request for the given cache block, wherein the one or more coherency maintenance commands include a cache state for the given cache block in a corresponding cache of the plurality of caches, wherein the corresponding cache is configured to delay processing of a given coherency maintenance command based on the cache state in the corresponding cache not matching the cache state in the a given coherency maintenance command.

54. The system of any of examples 50-53 wherein a first cache is configured to store the given cache block in a primary shared state and a second cache is configured to store the given cache block in a secondary shared state, and wherein the given memory controller is configured to cause the first cache transfer the given cache block to a requestor based on the memory request and the primary shared state in the first cache.

55. The system of any of examples 50-54 wherein the given memory controller is configured to issue one of a first coherency maintenance command and a second coherency maintenance command to a first cache of the plurality of caches based on a type of a first memory request, wherein the first cache is configured to forward a first cache block to a requestor that issued the first memory request based on the first coherency maintenance command, and wherein the first cache is configured to return the first cache block to the given memory controller based on the second coherency maintenance command.

Numerous variations and modifications will become apparent to those skilled in the art once the above disclosure is fully appreciated. It is intended that the following claims be interpreted to embrace all such variations and modifications.

What is claimed is:
1. An integrated circuit, comprising:
 a plurality of processor cores;
 a plurality of graphics processing units;
 a plurality of peripheral devices distinct from the processor cores and graphics processing units;
 one or more memory controller circuits configured to interface with a system memory;
 an interconnect fabric configured to provide communication between the one or more memory controller circuits and the processor cores, graphics processing units, and peripheral devices; and
 an off-chip interconnect coupled to the interconnect fabric and configured to couple the interconnect fabric to a corresponding interconnect fabric on another instance of the integrated circuit, wherein the interconnect fabric and the off-chip interconnect provide an interface that is configured to connect the one or more memory controller circuits, the processor cores, the graphics processing units, and the peripheral devices in either a single instance of the integrated circuit or two or more instances of the integrated circuit, and wherein the interface is further configured to couple multiple instances of the integrated circuit in a manner that the multiple instances of the integrated circuit transparently appear to software as a single system.

2. The integrated circuit of claim 1, wherein a unified address space defined by a unified memory architecture extends across the two or more instances of the integrated circuit die transparent to software executing on the processor cores, graphics processing units, or peripheral devices.

3. The integrated circuit of claim 2, wherein the unified address space maps to the single instance transparent to software.

4. The integrated circuit of claim 1, further comprising a local interrupt distribution circuit to distribute interrupts among processor cores in the integrated circuit.

5. The integrated circuit of claim 4, further comprising a global interrupt distribution circuit, wherein the local interrupt distribution circuits and the global interrupt distribution circuit implement a multi-level interrupt distribution scheme when two or more instances of the integrated circuit are used.

6. The integrated circuit of claim 5, wherein the global interrupt distribution circuit is configured to transmit an interrupt request to the local interrupt distribution circuits in at least two instances in a sequence, and wherein the local interrupt distribution circuits are configured to transmit the interrupt request to local interrupt destinations in a sequence before replying to the interrupt request from the global interrupt distribution circuit.

7. The integrated circuit of claim 1, wherein a given integrated circuit die comprises a power manager circuit configured to manage a local power state of the given integrated circuit die.

8. The integrated circuit of claim 7, further comprising another power manager circuit configured to synchronize the power manager circuits on the two or more instances of the integrated circuit.

9. The integrated circuit of claim 1, wherein the peripheral devices include one of more of: an audio processing device, a video processing device, a machine learning accelerator circuit, a matrix arithmetic accelerator circuit, a camera processing circuit, a display pipeline circuit, a nonvolatile memory controller, a peripheral component interconnect controller, a security processor, or a serial bus controller.

10. The integrated circuit of claim 1, wherein the interconnect fabric interconnects coherent agents.

11. The integrated circuit of claim 10, wherein an individual one of the processor cores corresponds to a coherent agent.

12. The integrated circuit of claim 10, wherein a cluster of processor cores corresponds to a coherent agent.

13. The integrated circuit of claim 1, wherein a given one of the peripheral devices is a non-coherent agent.

14. The integrated circuit of claim 13, further comprising an input/output agent interposed between the given peripheral device and the interconnect fabric, wherein the input/output agent is configured to enforce coherency protocols of the interconnect fabric with respect to the given peripheral device.

15. The integrated circuit of claim 14, wherein the input/output agent ensures the ordering of requests from the given peripheral device using the coherency protocols.

16. The integrated circuit of claim 14, wherein the input/output agent is configured to couple a network of two or more peripheral devices to the interconnect fabric.

17. The integrated circuit of claim 1, further comprising hashing circuitry configured to distribute memory request traffic to system memory according to a selectively programmable hashing protocol.

18. The integrated circuit of claim 17, wherein at least one programming of the programmable hashing protocol evenly distributes a series of memory requests over a plurality of memory controllers in the system for a variety of memory requests in the series.

19. The integrated circuit of claim 18, wherein at least one programming of the programmable hashing protocol distributes adjacent requests within the memory space, at a specified granularity, to physically distant memory interfaces.

20. A system, comprising:
a plurality of instances of an integrated circuit, the integrated circuit comprising:
a plurality of processor cores;
a plurality of graphics processing units;
a plurality of peripheral devices distinct from the processor cores and graphics processing units;
one or more memory controller circuits configured to interface with a system memory;
an interconnect fabric configured to provide communication between the one or more memory controller circuits and the processor cores, graphics processing units, and peripheral devices; and
an off-chip interconnect coupled to the interconnect fabric and configured to couple the interconnect fabric to a corresponding interconnect fabric on another one of the plurality of instances of the integrated circuit, wherein the interconnect fabric and the off-chip interconnect provide an interface that is configured to connect the one or more memory controller circuits, the processor cores, the graphics processing units, and the peripheral devices in either a single instance of the integrated circuit or two or more instances of the integrated circuit, and wherein the interface is further configured to couple the plurality of instances of the integrated circuit in a manner that the plurality of instances of the integrated circuit transparently appear to software as a single system.

21. The system as recited in claim 20, further comprising a substrate configured to couple the off-chip interconnect from one of the plurality of instances to the off-chip interconnect of another one of the plurality of instances.

22. The system as recited in claim 20, further comprising a network integrated circuit configured to couple to the off-chip interconnect in the plurality of instances and to route communications between the plurality of instances.

* * * * *